Nov. 17, 1970 D. N. SENZIG 3,541,516

VECTOR ARITHMETIC MULTIPROCESSOR COMPUTING SYSTEM

Filed June 30, 1965 45 Sheets-Sheet 1

INVENTOR
DONALD N. SENZIG

BY

ATTORNEY

Nov. 17, 1970 D. N. SENZIG 3,541,516

VECTOR ARITHMETIC MULTIPROCESSOR COMPUTING SYSTEM

Filed June 30, 1965 45 Sheets-Sheet 6

VECTOR ARITHMETIC MULTIPROCESSOR COMPUTING SYSTEM

Filed June 30, 1965

Nov. 17, 1970 D. N. SENZIG 3,541,516

VECTOR ARITHMETIC MULTIPROCESSOR COMPUTING SYSTEM

Filed June 30, 1965

45 Sheets-Sheet 12

Nov. 17, 1970 D. N. SENZIG 3,541,516

VECTOR ARITHMETIC MULTIPROCESSOR COMPUTING SYSTEM

Filed June 30, 1965 45 Sheets-Sheet 14

SINGLE WORD FETCH CLOCK

Nov. 17, 1970 D. N. SENZIG 3,541,516

VECTOR ARITHMETIC MULTIPROCESSOR COMPUTING SYSTEM

Filed June 30, 1965 45 Sheets-Sheet 19

VECTOR ARITHMETIC MULTIPROCESSOR COMPUTING SYSTEM

Filed June 30, 1965

VECTOR ARITHMETIC MULTIPROCESSOR COMPUTING SYSTEM

Filed June 30, 1965

Nov. 17, 1970 D. N. SENZIG 3,541,516

VECTOR ARITHMETIC MULTIPROCESSOR COMPUTING SYSTEM

Filed June 30, 1965 45 Sheets-Sheet 32

Nov. 17, 1970 D. N. SENZIG 3,541,516

VECTOR ARITHMETIC MULTIPROCESSOR COMPUTING SYSTEM

Filed June 30, 1965 45 Sheets-Sheet 33

TEST $\underline{X}^i$ FRACTION & $\underline{S}i$

Nov. 17, 1970 D. N. SENZIG 3,541,516

VECTOR ARITHMETIC MULTIPROCESSOR COMPUTING SYSTEM

Filed June 30, 1965 45 Sheets-Sheet 35

Nov. 17, 1970 D. N. SENZIG 3,541,516

VECTOR ARITHMETIC MULTIPROCESSOR COMPUTING SYSTEM

Filed June 30, 1965

45 Sheets-Sheet 40

X COLUMN OUTPUT SELECTOR

United States Patent Office 3,541,516

Patented Nov. 17, 1970

3,541,516

VECTOR ARITHMETIC MULTIPROCESSOR COMPUTING SYSTEM

Donald N. Senzig, Yorktown Heights, N.Y., assignor to International Business Machines Corporation, Armonk, N.Y., a corporation of New York Filed June 30, 1965, Ser. No. 468,437
Int. Cl. G06f *15/32*
U.S. Cl. 340—172.5 37 Claims

ABSTRACT OF THE DISCLOSURE

A vector arithmetic multiprocessor computing system especially adapted for the performance of vector arithmetic problems wherein identical operations are to be performed substantially simultaneously upon a plurality of different units of data or operands. The system encompasses special memory and arithmetic unit controls for simultaneously performing such operations. It includes a Data Restructuring Arithmetic Unit Control for restructuring a vector of data, and also for controlling the plurality of arithmetic units for performing a plurality of simultaneous operations; an Index and Address Unit for accessing memory, and a Mill which contains the plurality of arithmetic units and special associated registers. The system controls include means for performing both fixed point and floating point arithmetic operations and for providing both normalized and unnormalized answers.

SECTION 1

Preamble and Objects

The present invention relates to a multiprocessing computing system capable of performing simultaneous operations on arrays of data. More particularly it relates to such a system having necessary controls and storage for performing specific operations on certain elements of such arrays.

Recent advances in computer design have led to vast improvements in both speed of computing circuitry and also in speed of various storage organs within a computer. Concurrent advances in the art of programming have also lead to vast improvements in both the speeds of computing certain types of problems and also the adaptability of computers for solving wide varieties of problems. However, the majority of existing computing systems are quite limited in that they normally must proceed through various programs in a serial or step-by-step method. A number of computers recently placed on the commercial market actually have multiple arithmetic units which may be operated simultaneously, however, these numbers of multiarithmetic units or multiprocessors have been relatively small, i.e., three or four units in a given system.

As indicated by this recent approach in the computer arts towards providing faster and more powerful computers providing a lower cost per computation factor, the concept of multiprocessing is definitely in existence in the computer industry. However, most of these systems must be programmed in a high degree of detail, assigning various operations to various ones of the process units in such a multiprocessor system which places very rigorous requirements on a programmer to even partially optimize the utilization of the computer. The alternative is to rely on hardware to find the parallelism which solution is inadequate in terms of cost. It may thus be seen that although the concept of having a computing system with more than one process unit is known in the art, the optimum utilization of such a computer has been limited by the demands on programming and hardware.

In those methematical problems where computation is being done on arrays of data, usually the same mathematical operation is being carried out on each member of the array. It will be understood that a vector would be a specific interrelated group of numbers within a much larger array, which array is organized in a particular configuration or order such as a matrix as is well known in the mathematical arts.

Before proceeding further, it is desirable to specifically define some terms. A *vector* $x$ is the ordered array of elements $(\underline{x}_1, \underline{x}_2 \ldots \underline{x}_i \ldots)$ wherein the variable $\underline{x}_i$ is called the $\underline{i}^{th}$ component of the vector $\underline{x}$. A matrix is an ordered two-dimension array of variables.

$$\begin{matrix} \underline{A}_1^1, \underline{A}_2^1 \ldots \underline{A}_n^1 \\ \underline{A}_1^2, \underline{A}_2^2 \ldots \underline{A}_n^2 \\ \underline{A}_1^m, \underline{A}_2^m \ldots \underline{A}_n^m \end{matrix}$$

The vector $(\underline{A}_1^i, \underline{A}_2^i \ldots \underline{A}_n^i)$ is called the $i^{th}$ *row vector* of $\underline{A}$ and is denoted by $\underline{A}^i$. The vector $(\underline{A}_j^1, \underline{A}_j^2 \ldots \underline{A}_j^m)$ is called the $\underline{j}^{th}$ column vector of $\underline{A}$ and is denoted by $\underline{A}_j$.

It will be evident that such operations or computations involving vector mathematics would be well suited to a multiprocessor type of computer. There are no known commercially available computers on the market capable of performing more than two or three operations simultaneously which power falls far short of that desirable for optimumly performing most vector problems.

However, perhaps the most important shortcoming of present day systems is the inadequacy of available memory organizations to access a plurality of storage locations within a computing memory organization simultaneously to bring out all of the desired operands for a plurality of arithmetic units in a substantially simultaneous manner. Further, no known system provides for the flexible simultaneous accessing of a plurality of memory storage locations. This latter feature is most necessary for the satisfactory and efficient handling of vector problems.

The need for a computing system capable of handling such array or vector problems at increased speeds is quite pressing in the scientific community. There are many areas wherein the solution of problems makes the development of such a vector multiprocessing computer quite attractive. For example, in the area of global weather prediction, a three-dimensional grid covering the entire world must be stepped along through relatively short periods of simulated time to produce a forecast of weather occurrences within a reasonable amount of real time in order that proper weather precautions may be taken where indicated. This type of problem with its demand for increased speed in processing large arrays of data illustrates the applicability of a computer designed specifically for array processing. Another example is in the field of atomic energy wherein the control of certain operations requires the extremely high speed computation of thermonuclear energizes which must be fed into control locations all within a short period of time from the obtaining of raw data. The above two problems are only typical of the many areas in which a computing system capable of performing multiple operations on arrays of numbers is needed. Many other scientific problems similarly require calculations on large arrays of data.

It has now been found that a greatly improved multiprocessor computer may be achieved by providing a memory system wherein plural operands may be accessed simultaneously and plural operations performed simultaneously in a suitable plurality of arithmetic units. The system is arranged for all of the arithmetic units to be performing same operation and, therefore, a single control unit is provided for the entire system. Further flexibility is obtained by providing for selective masking of certain of the arithmetic units for particular operations therein and highly flexible accessing means for said machine storage is provided in order to obtain various vectors from a particular array for processing operations.

It is accordingly a primary object to provide such a system capable of performing a wide latitude of operations on a vector or mathematical quantities provided by the system at any point in time.

It is another object to provide a system capable of performing novel vector instruction operations.

It is a further object to provide such a system capable of simultaneously operating on as many sets of operands as there are arithmetic units.

It is yet another object of the persent invention to provide such a system capable of multiaccessing said machine storage in a wide range of accessing modes.

It is another object to provide such a system capable of selectively inhibiting the operation of selected members of said plurality of arithmetic units for particular operations.

It is still another object of the present invention to make operations which are normally considered data dependent performable within a fixed predetermined time.

It is another object to provide such a system capable of performing the same operation on a plurality of arithmetic units.

The foregoing and other objects, features and advantages of the invention will be apparent from the following more particular description of preferred embodiments of the invention as illustrated in the accompanying drawings.

Figures 2, 2A:
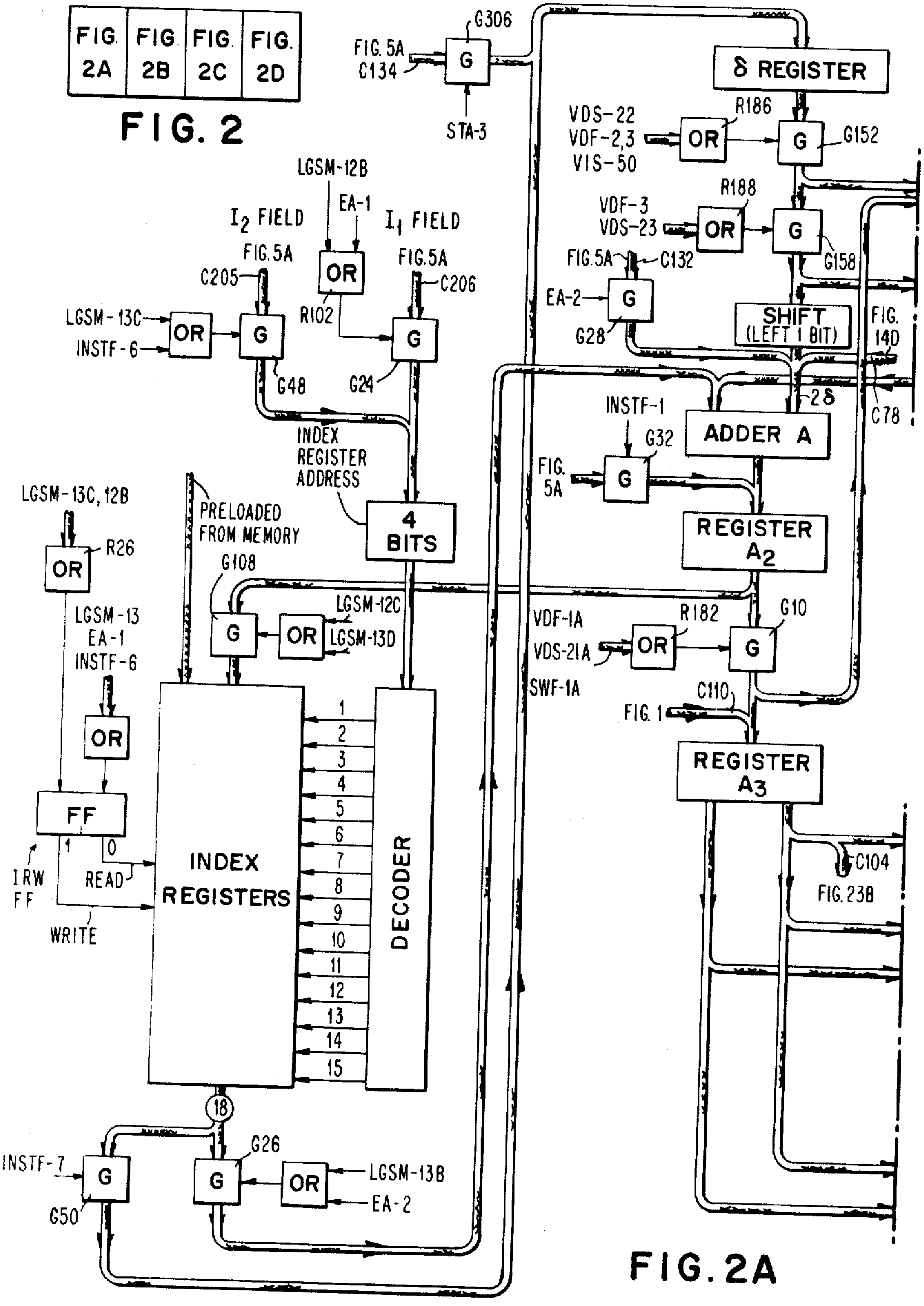
Figure 2B:
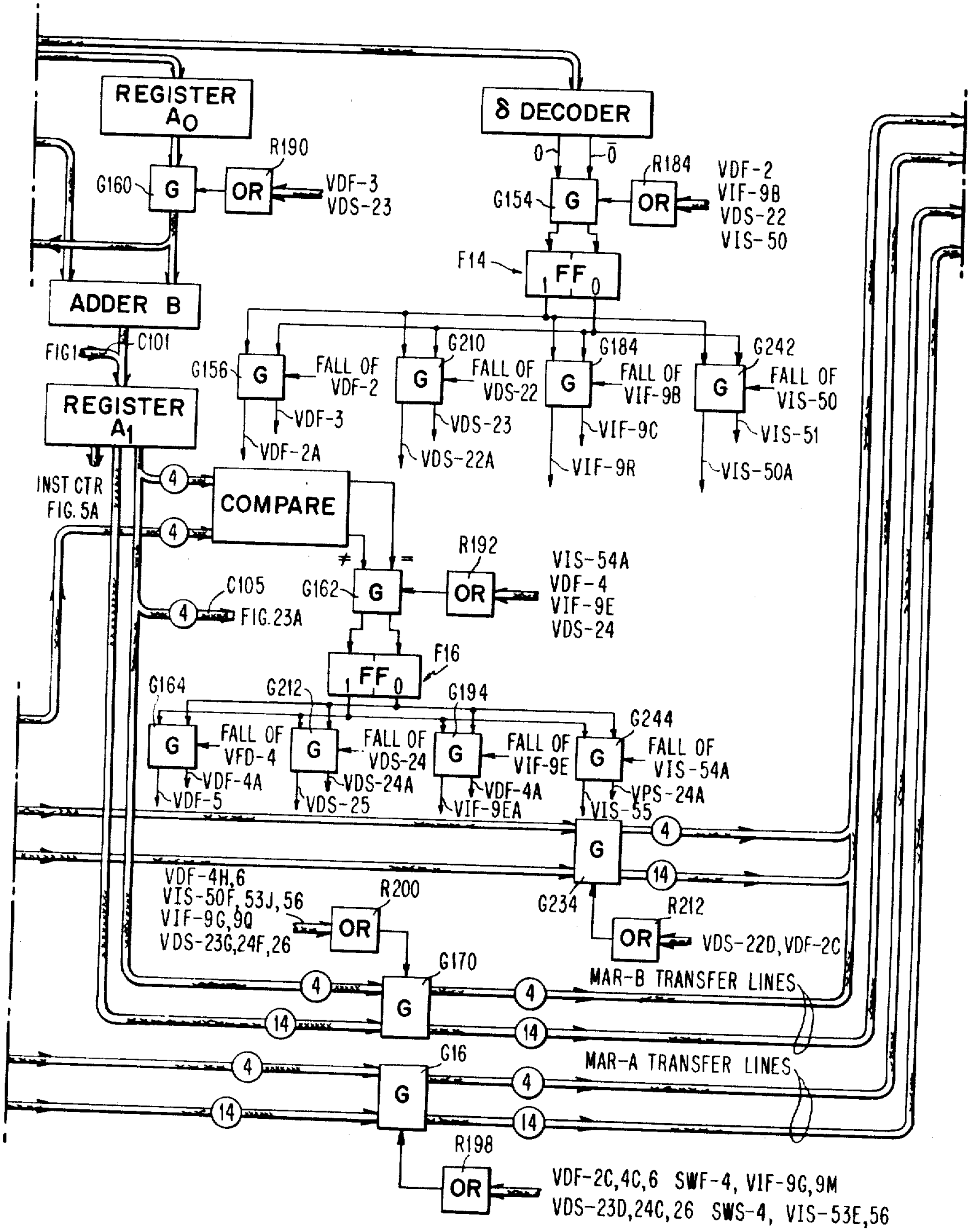
Figure 2C:
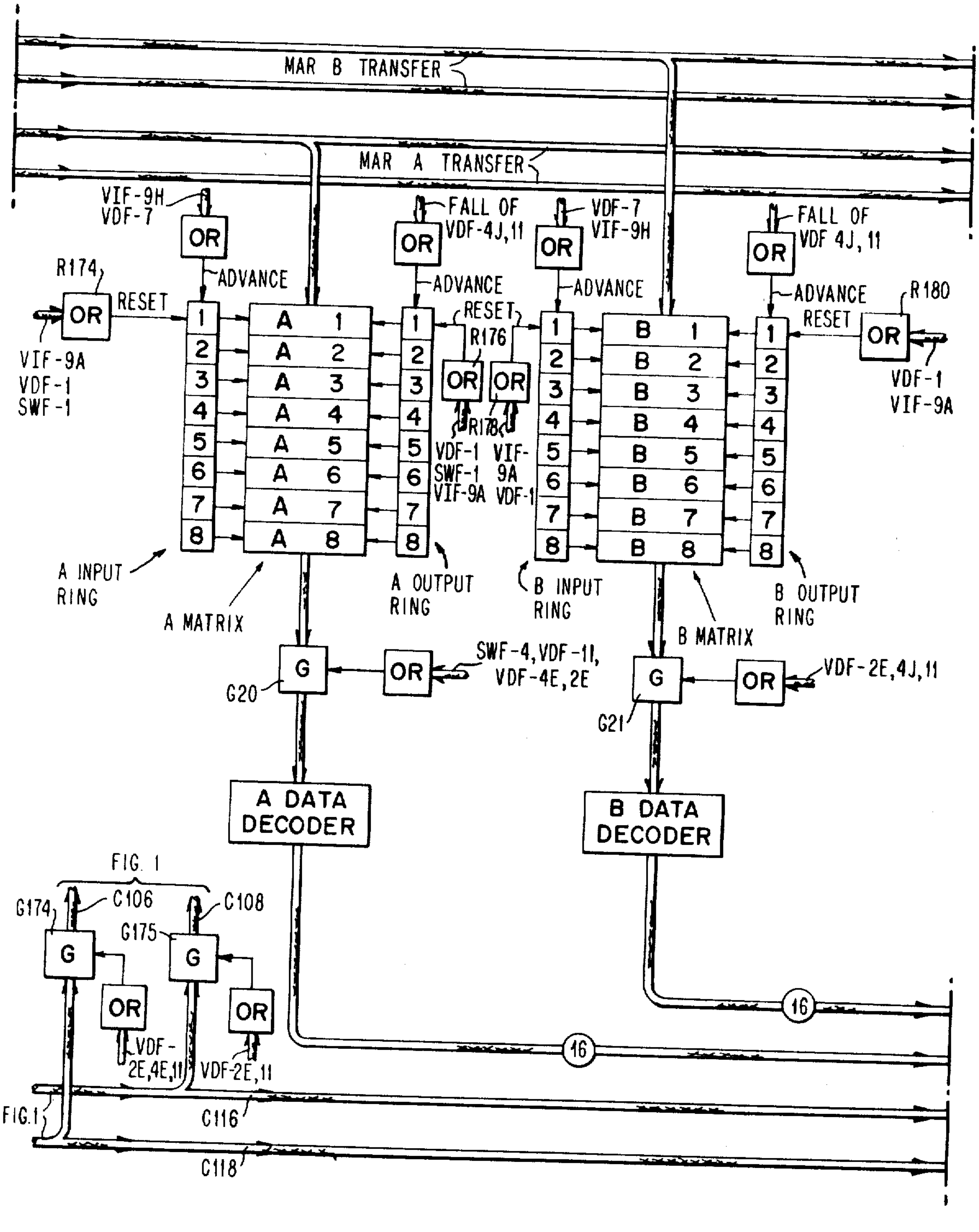
Figure 2D:
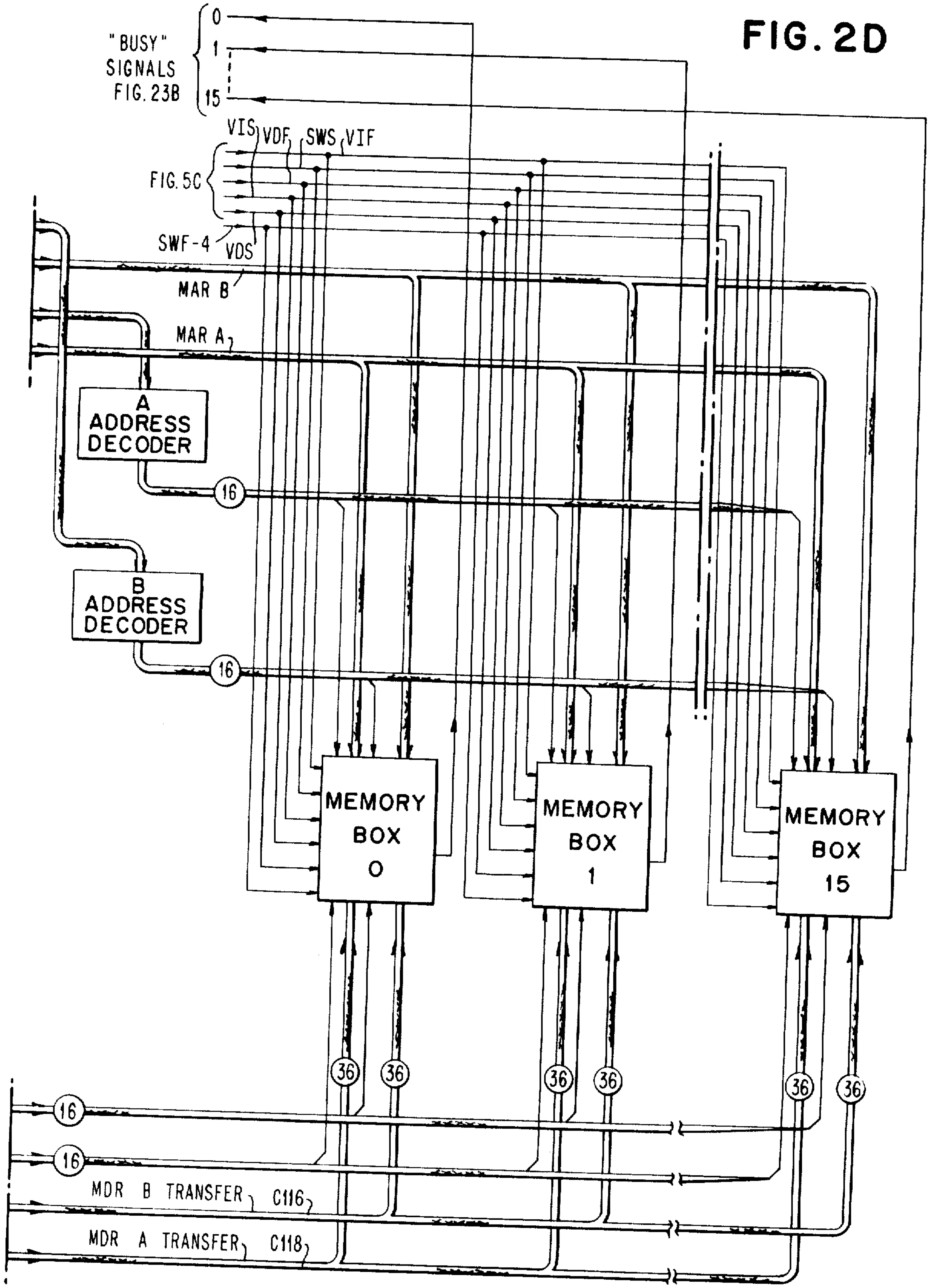

FIGS. 2 through 2D comprise a logical schematic diagram of the Address Generation portion of the present system.

Figure 3:
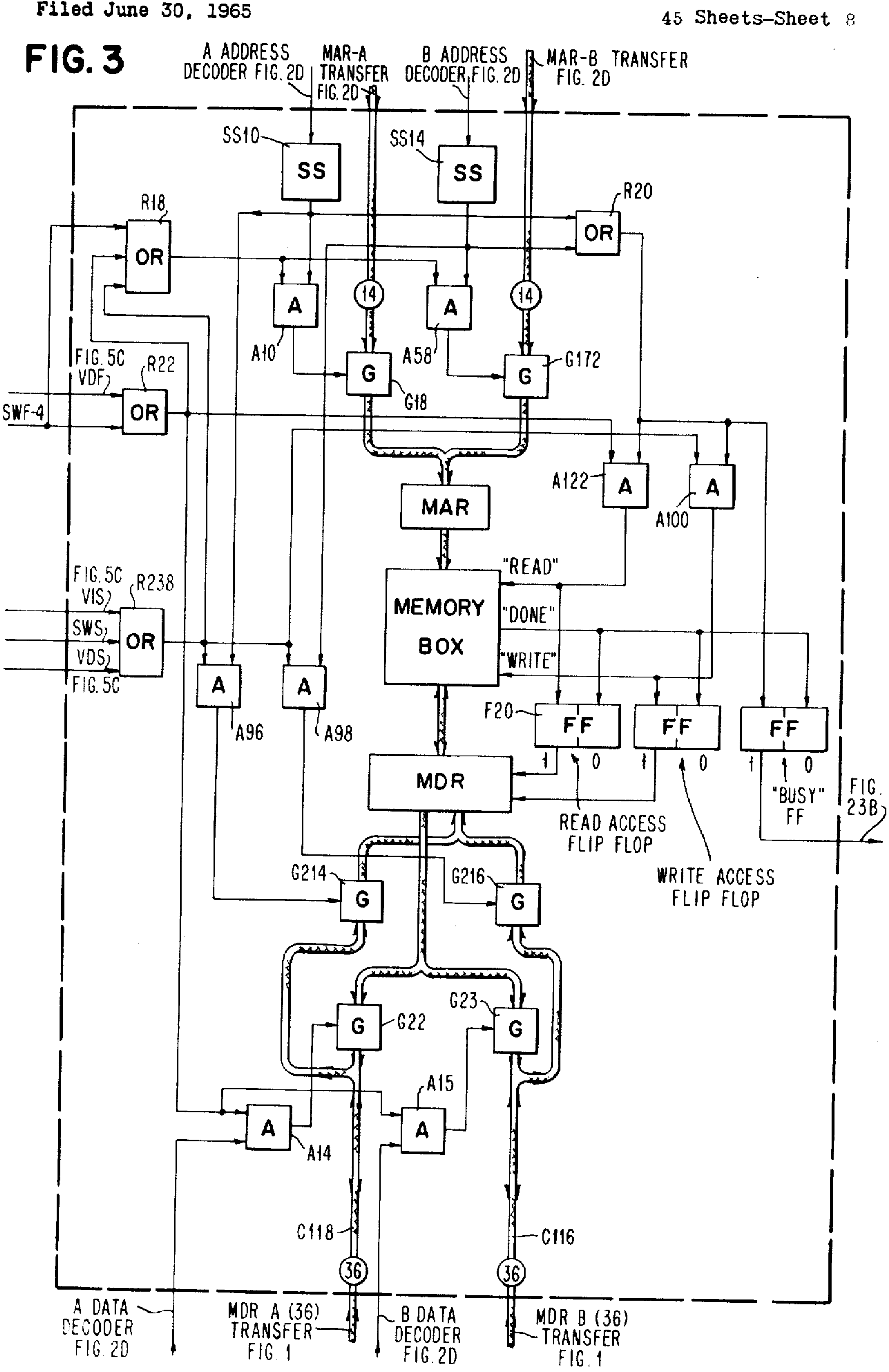

FIG. 3 is a logical schematic diagram of the individual Memory Box controls necessary in performing the disclosed operations in the present system.

Figure 4:
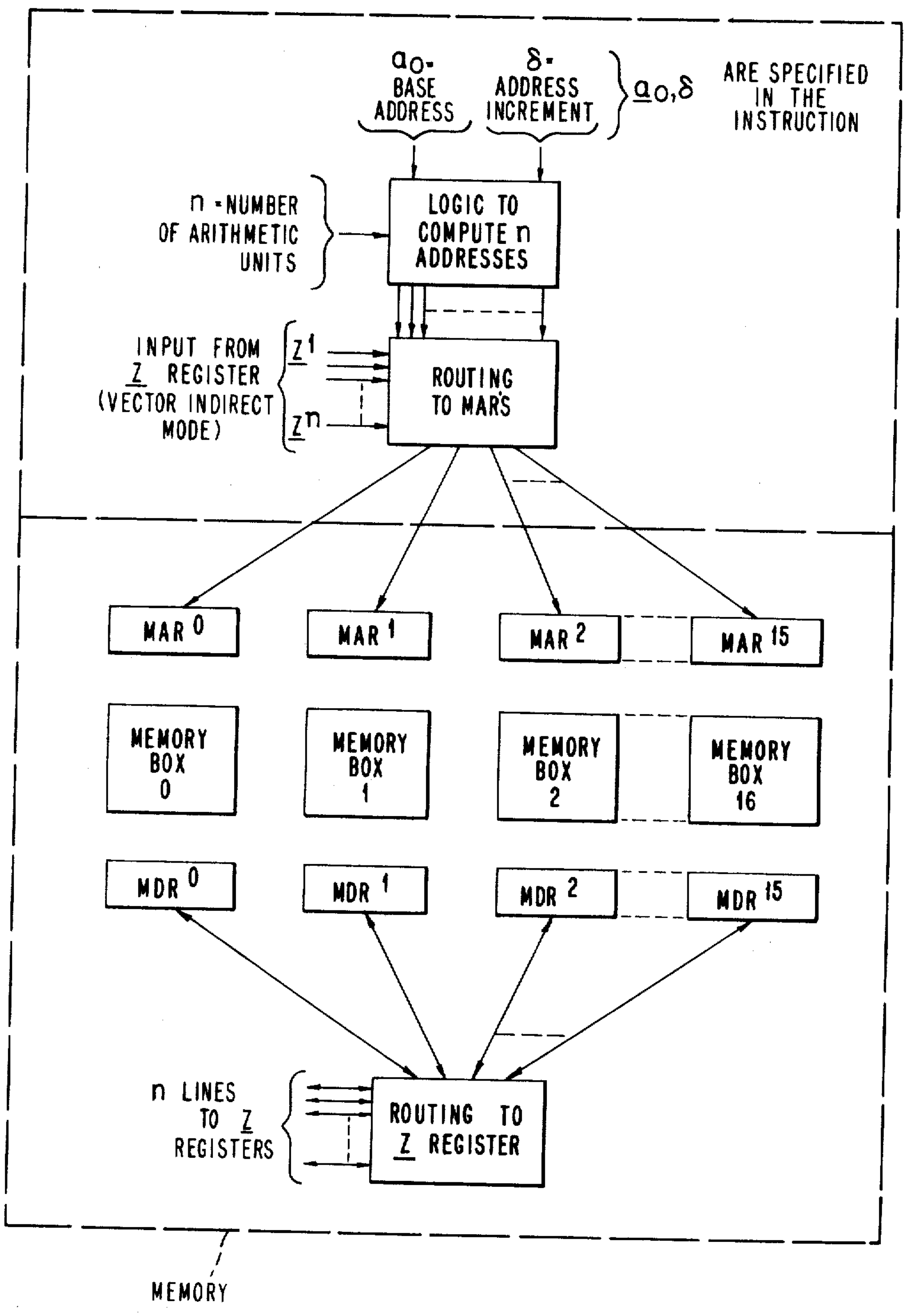

FIG. 4 is a functional block diagram illustrating the manner in which addresses are generated according to the teachings of the present invention.

Figures 5, 5A:
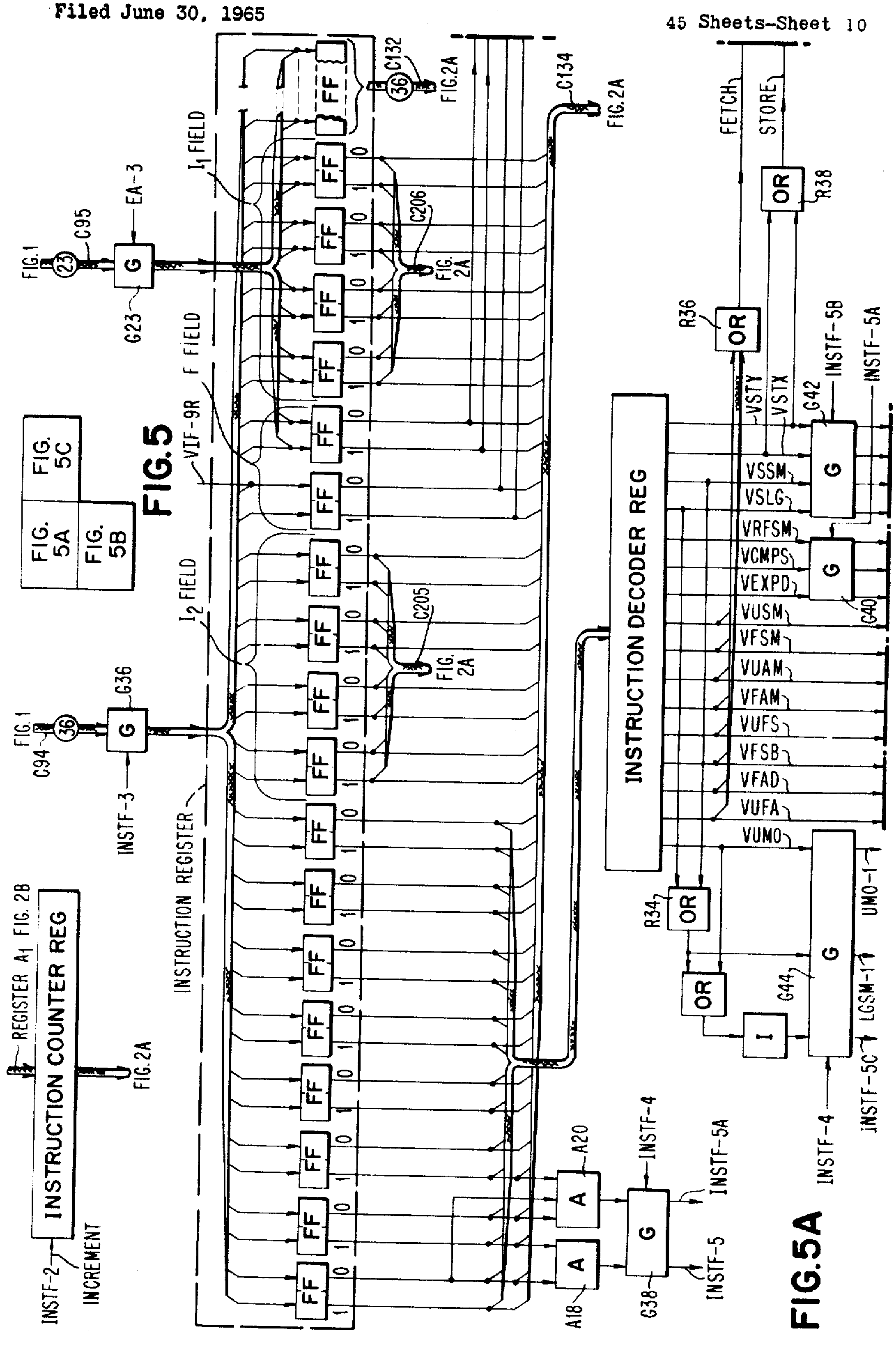
Figure 5B:
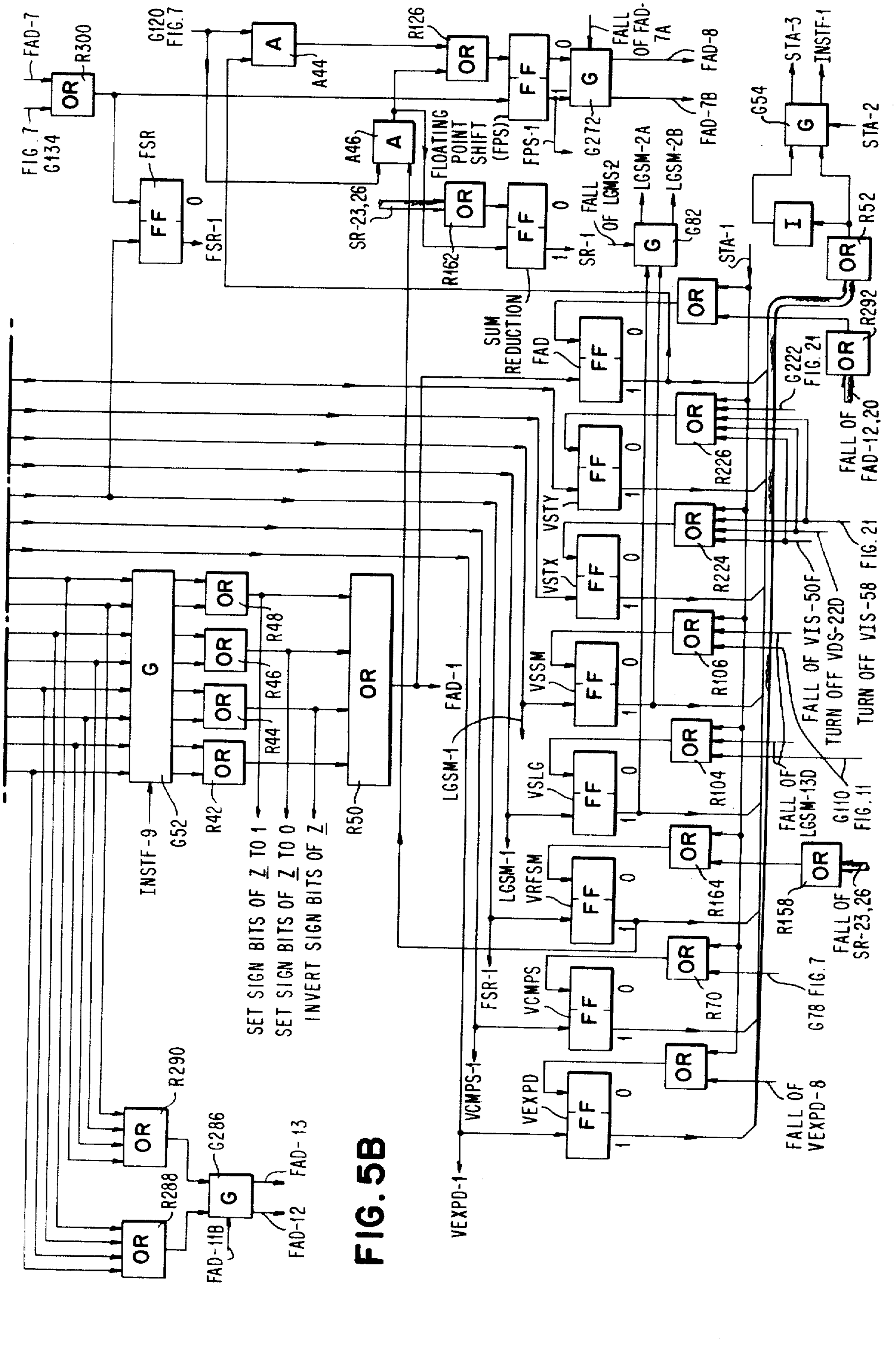
Figure 5C:
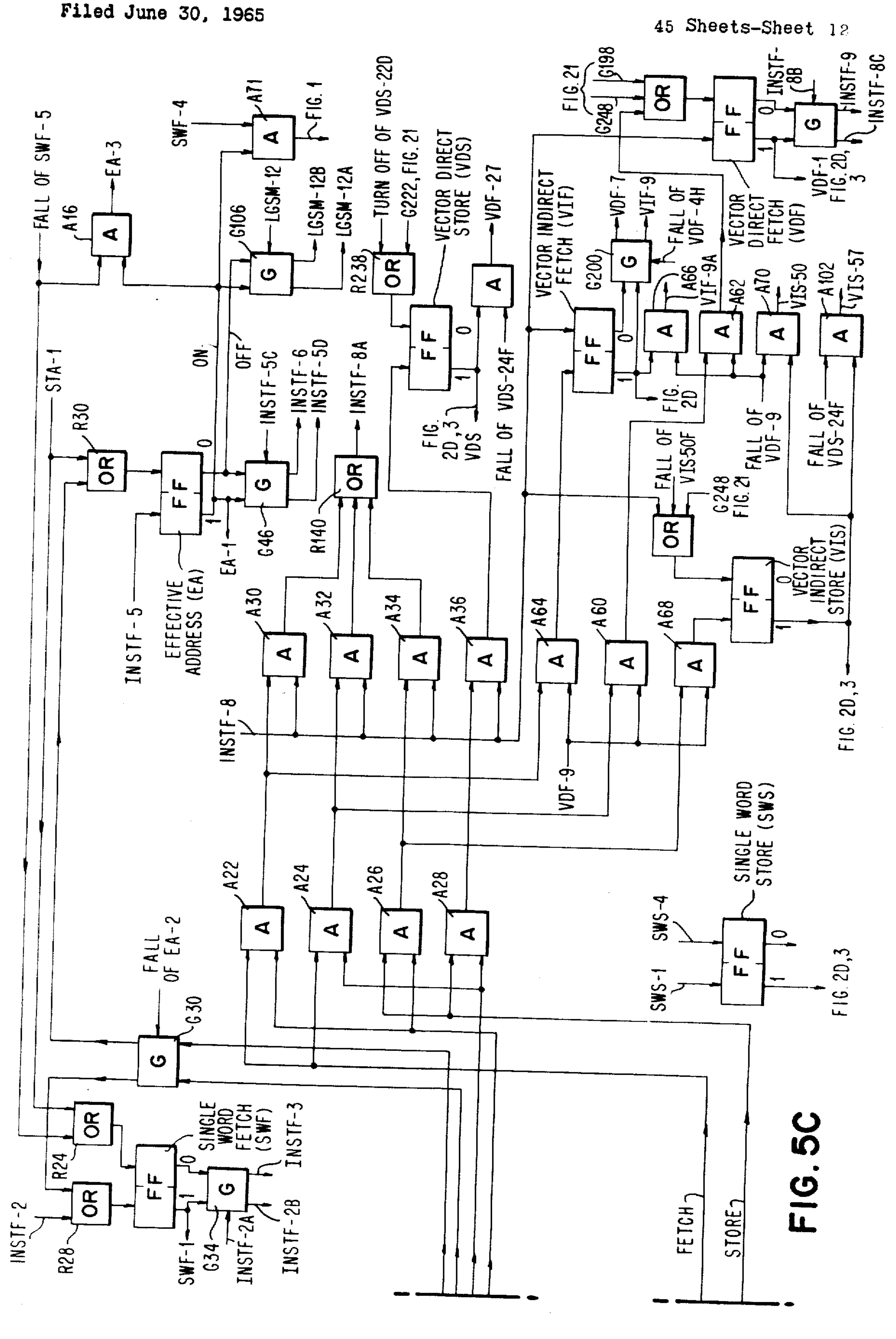

FIGS. 5 through 5C comprise a logical schematic diagram of the Instruction Register, its associated Decoder and a large number of the control elements which determine the branching of the system in performing various operations.

Figure 6:
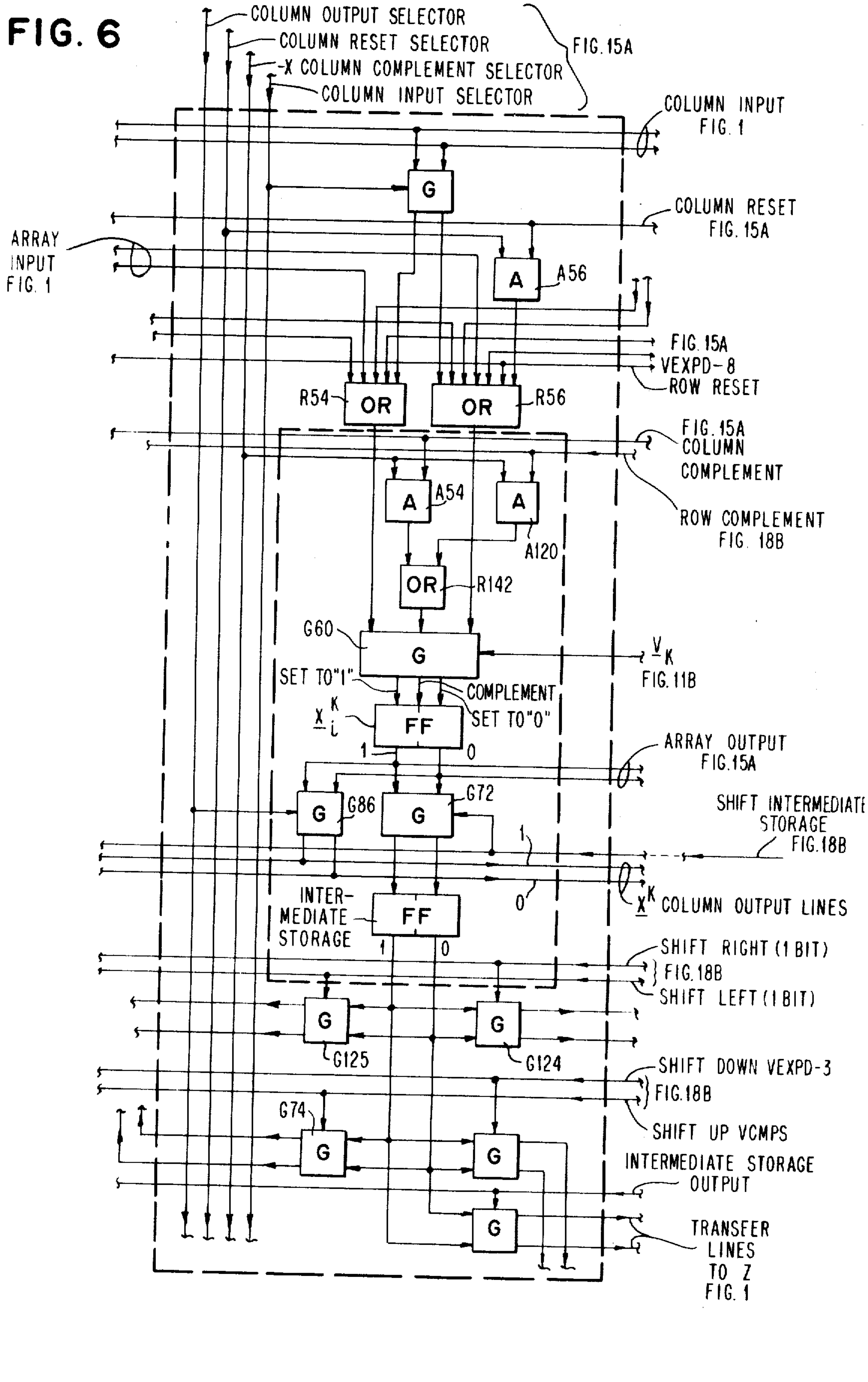

FIG. 6 is a logical schematic diagram of a single bit storage position in one row of the X Register.

Figure 6A:
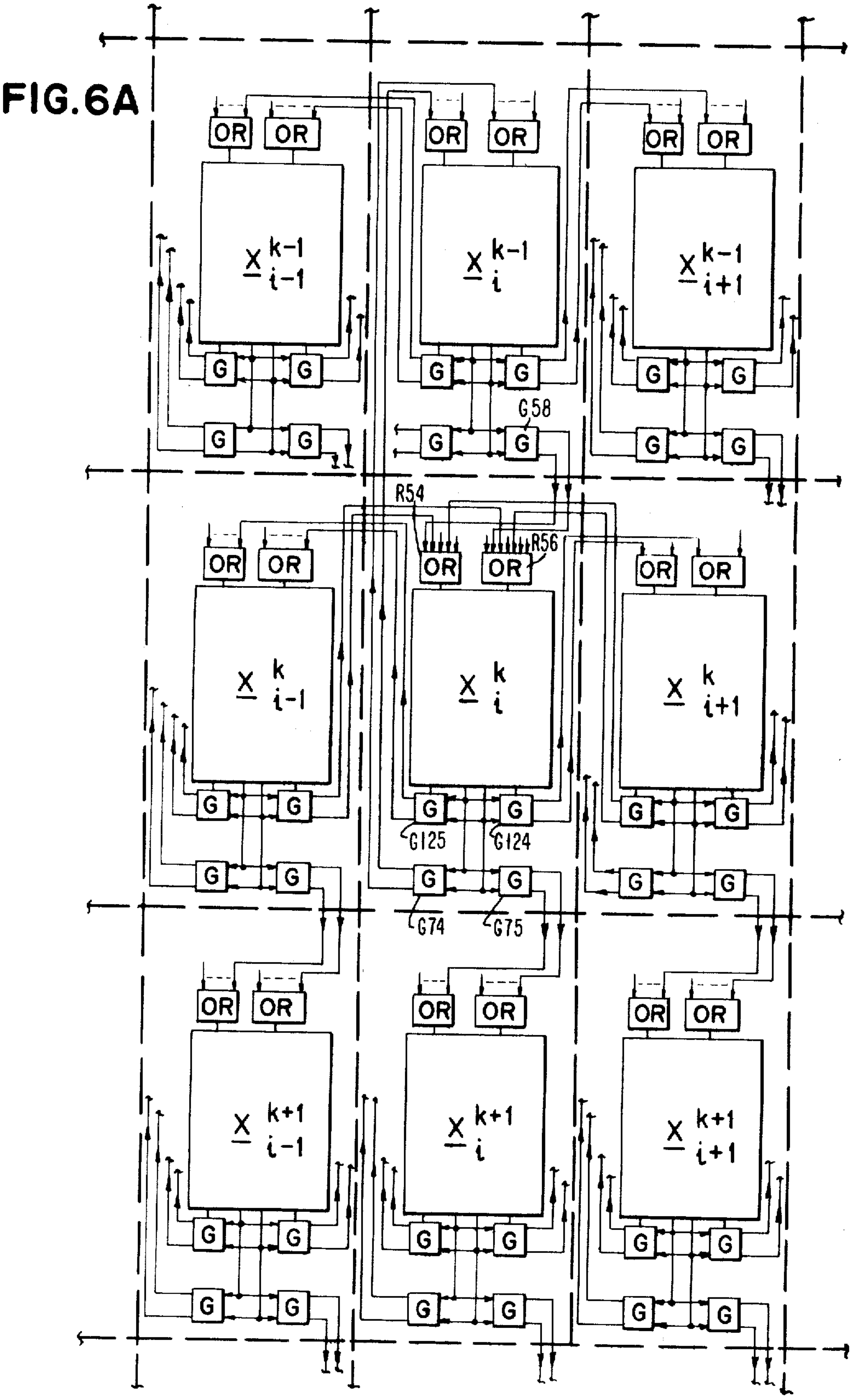

FIG. 6A is a block diagram illustrating 9 bit storage positions of the X Register and illustrates generally how various shifting operations are accomplished.

Figure 7:
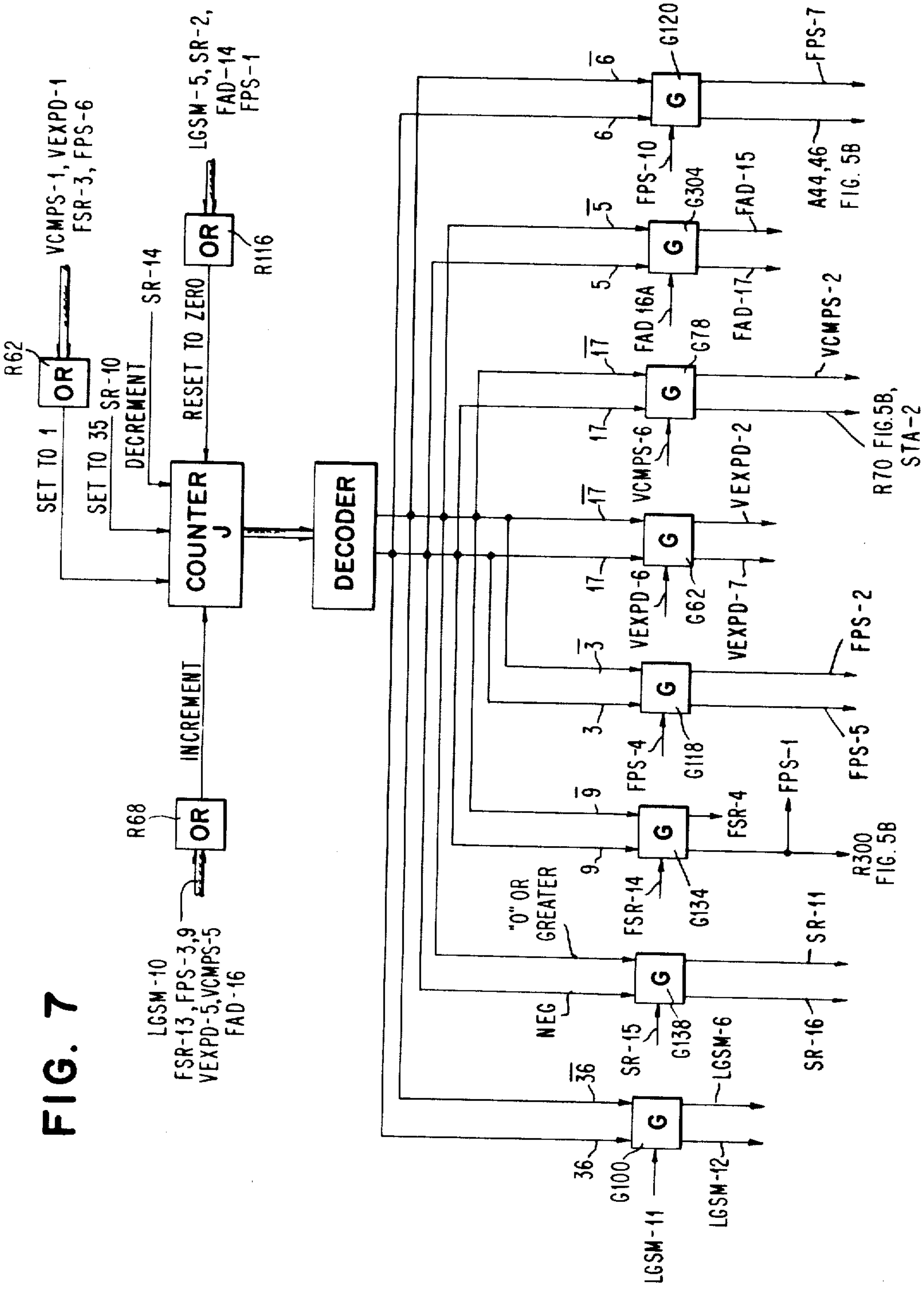

FIG. 7 is a logical schematic diagram of the Counter J and its associated controls.

Figure 8:
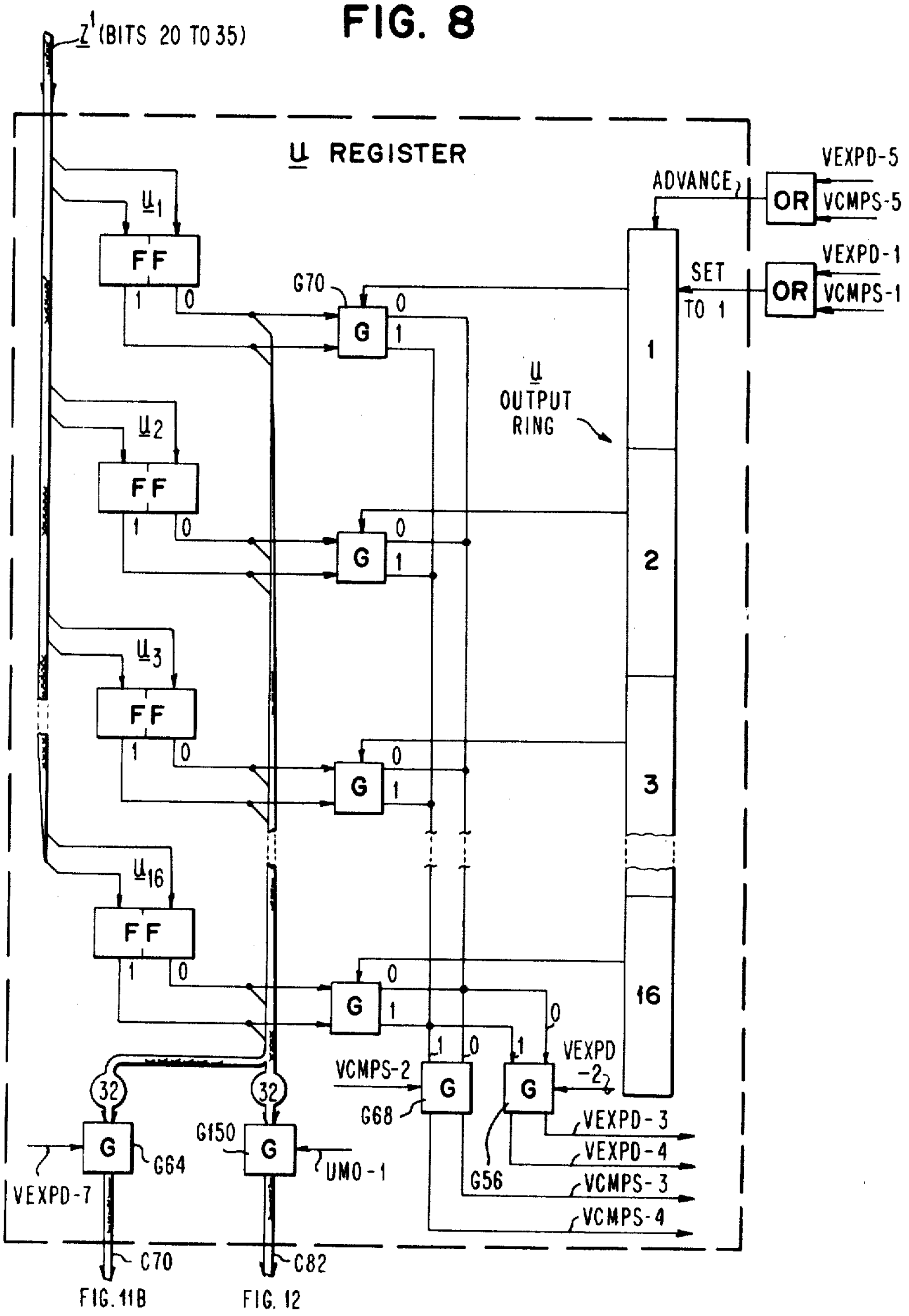

FIG. 8 is a logical schematic diagram of the u Register and its associated controls.

Figure 9:
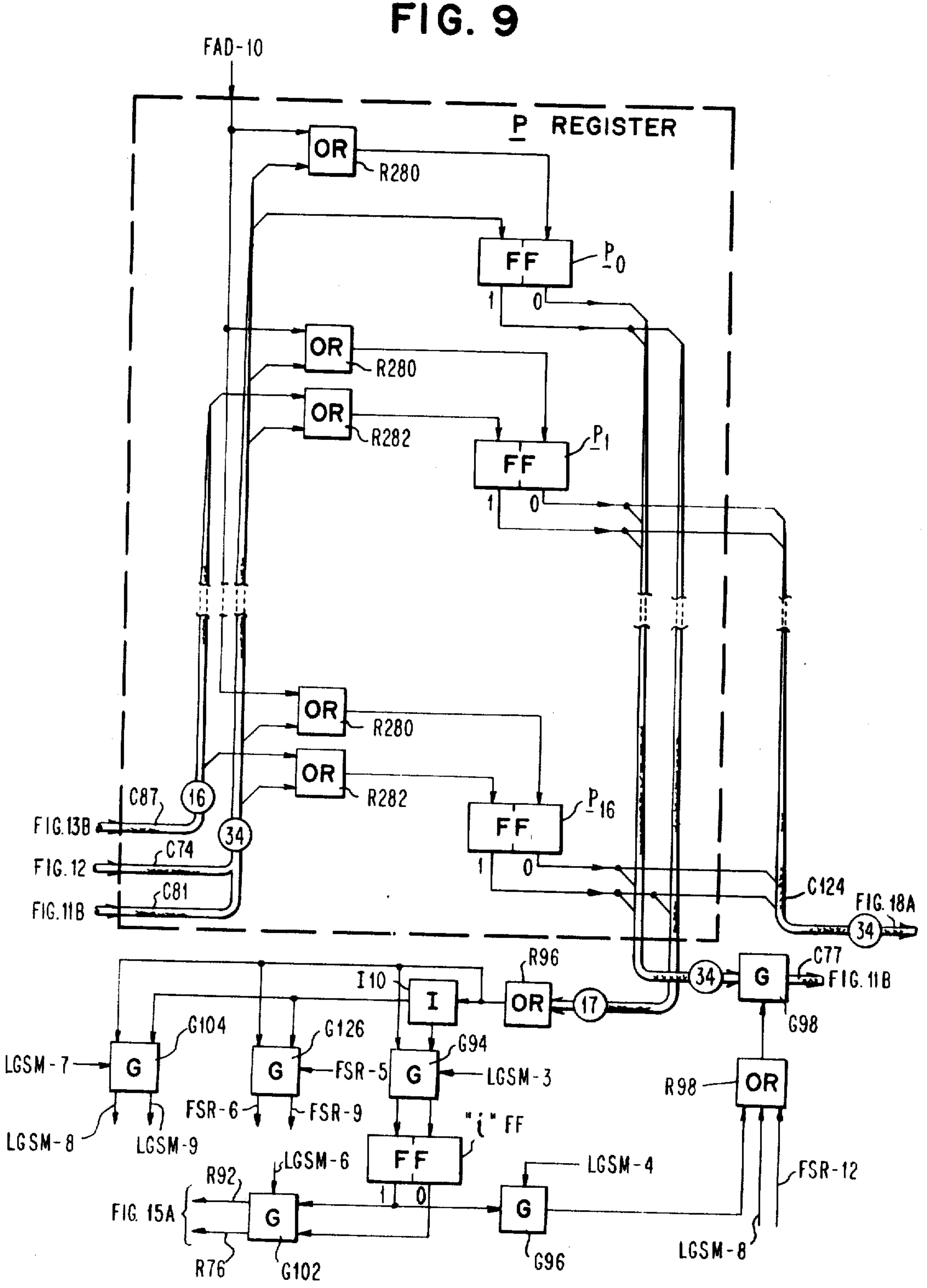

FIG. 9 is a logical schematic diagram of the p Register and its associated controls.

Figure 10:
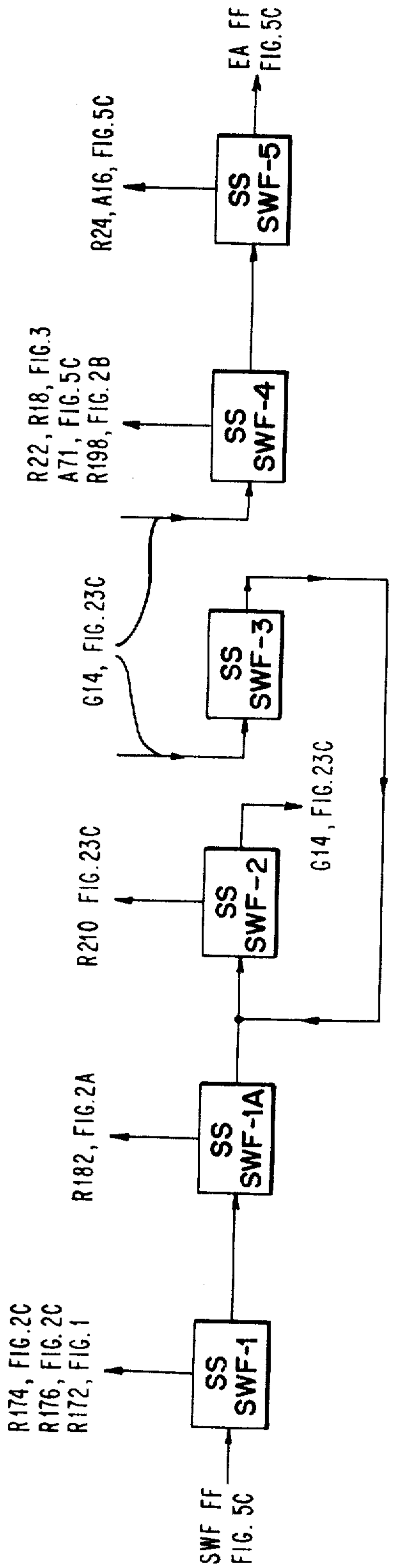

FIG. 10 is a logical schematic diagram which illustrates the manner in which the Timing controls for the present system may be embodied and specifically, shows a Timing Clock for performing the Single Word Fetch instruction.

Figure 10A:
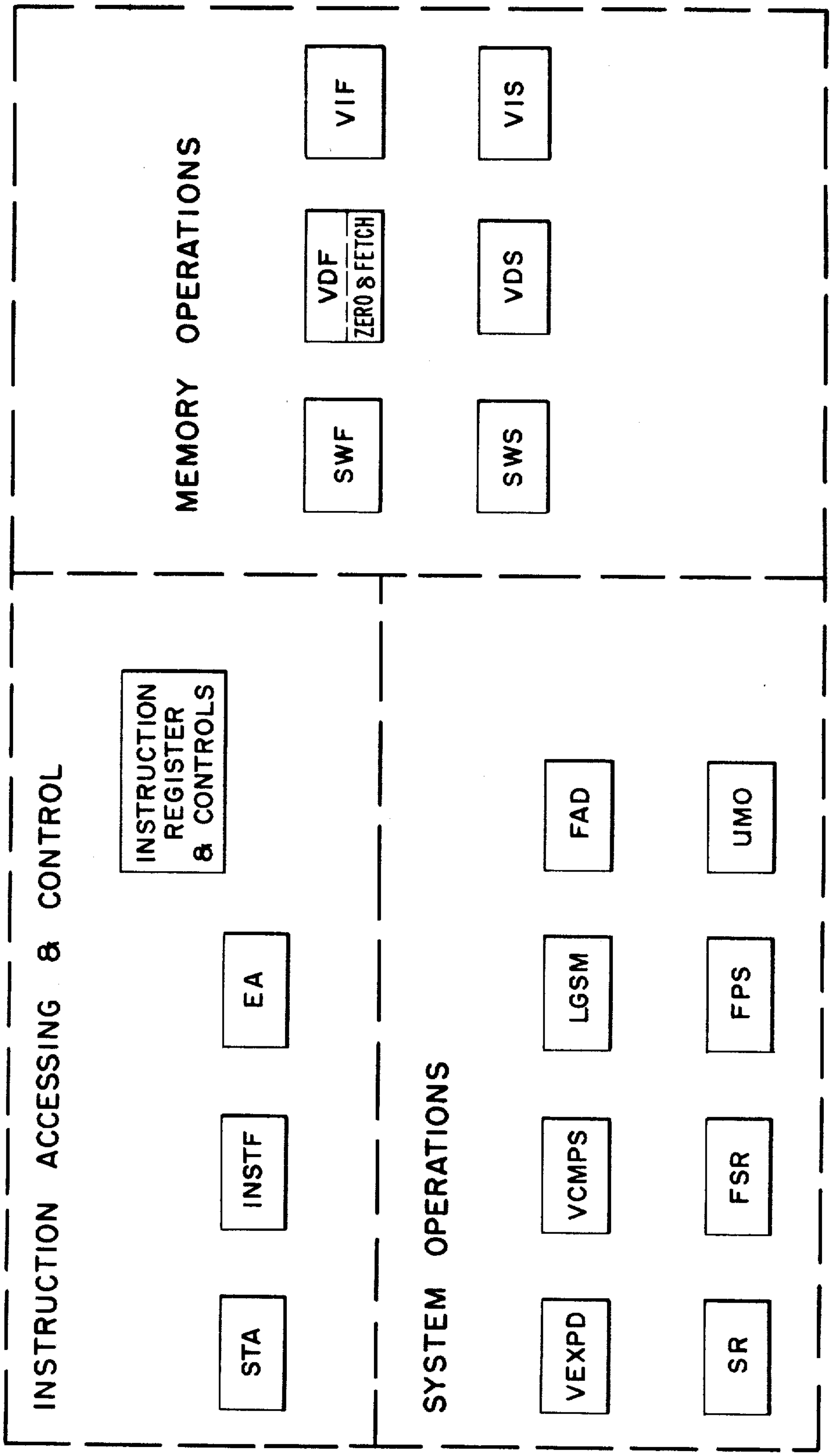

FIG. 10A is a block diagram showing the various system clocks as blocks generally indicating their functional relationship.

Figure 11A:
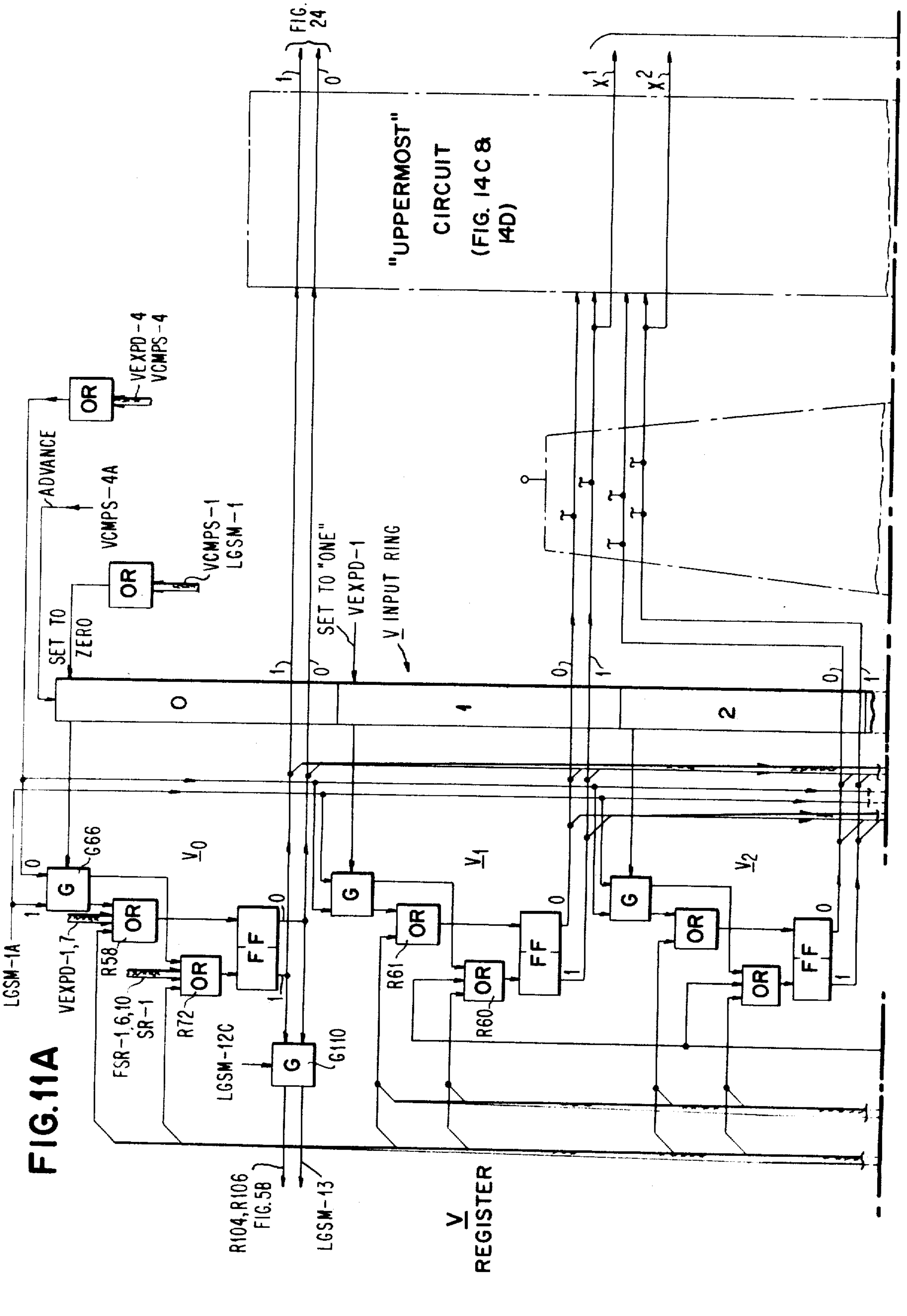
Figure 11B:
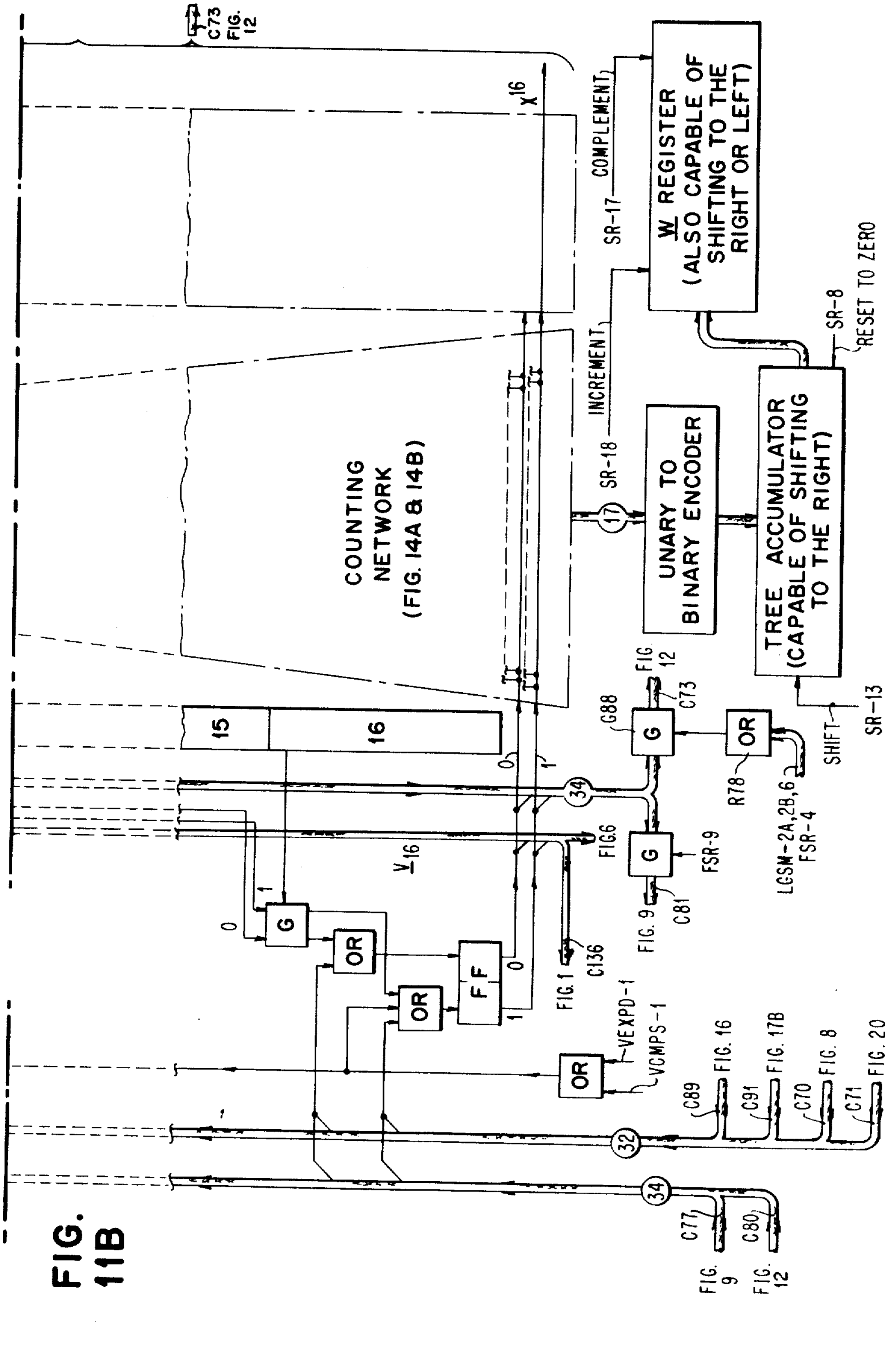

FIGS. 11A and 11B comprise a logical schematic diagram of the v Register and indicates the general connections between this register to the Counting Network and the Uppermost Circuits.

Figure 12:
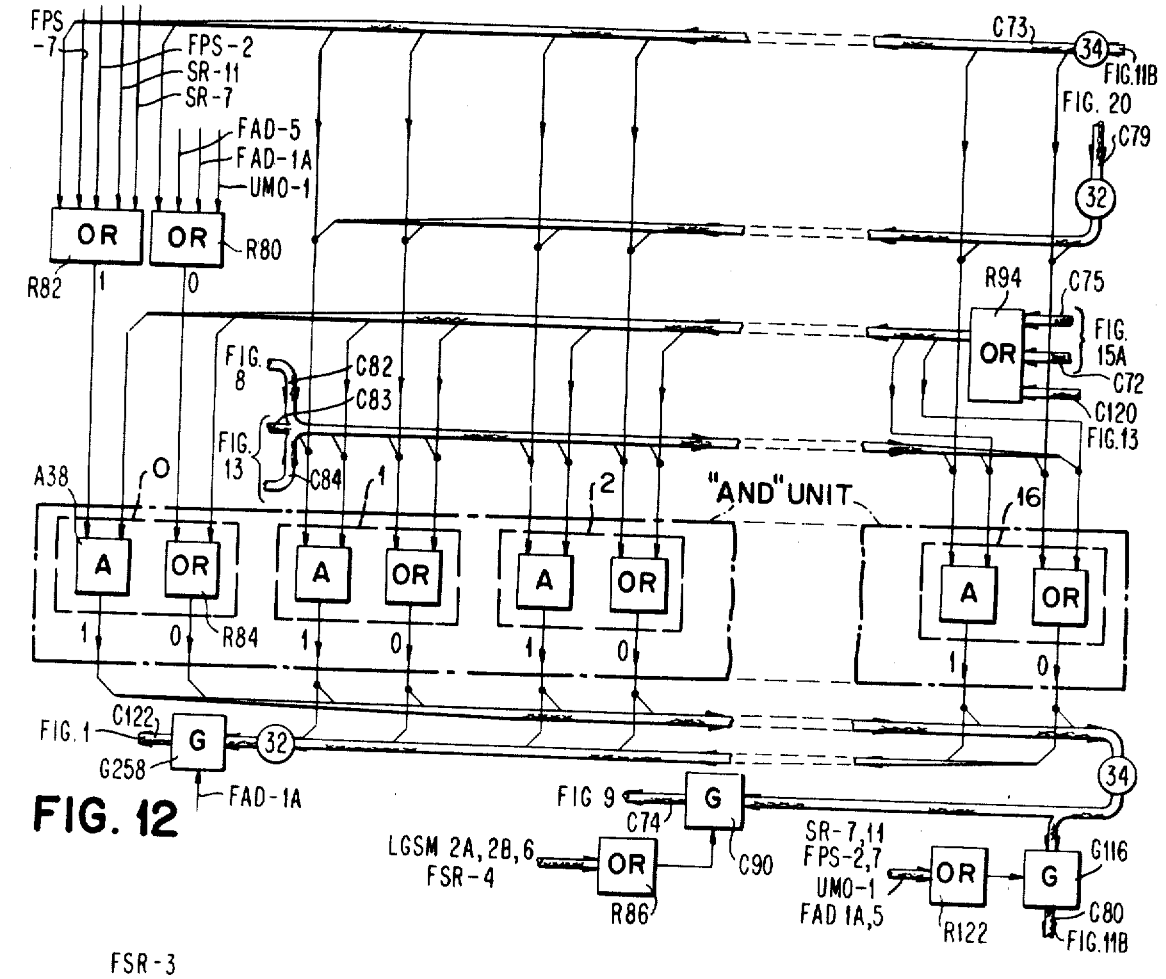

FIG. 12 is a logical schematic diagram of the AND Unit.

Figure 13A:
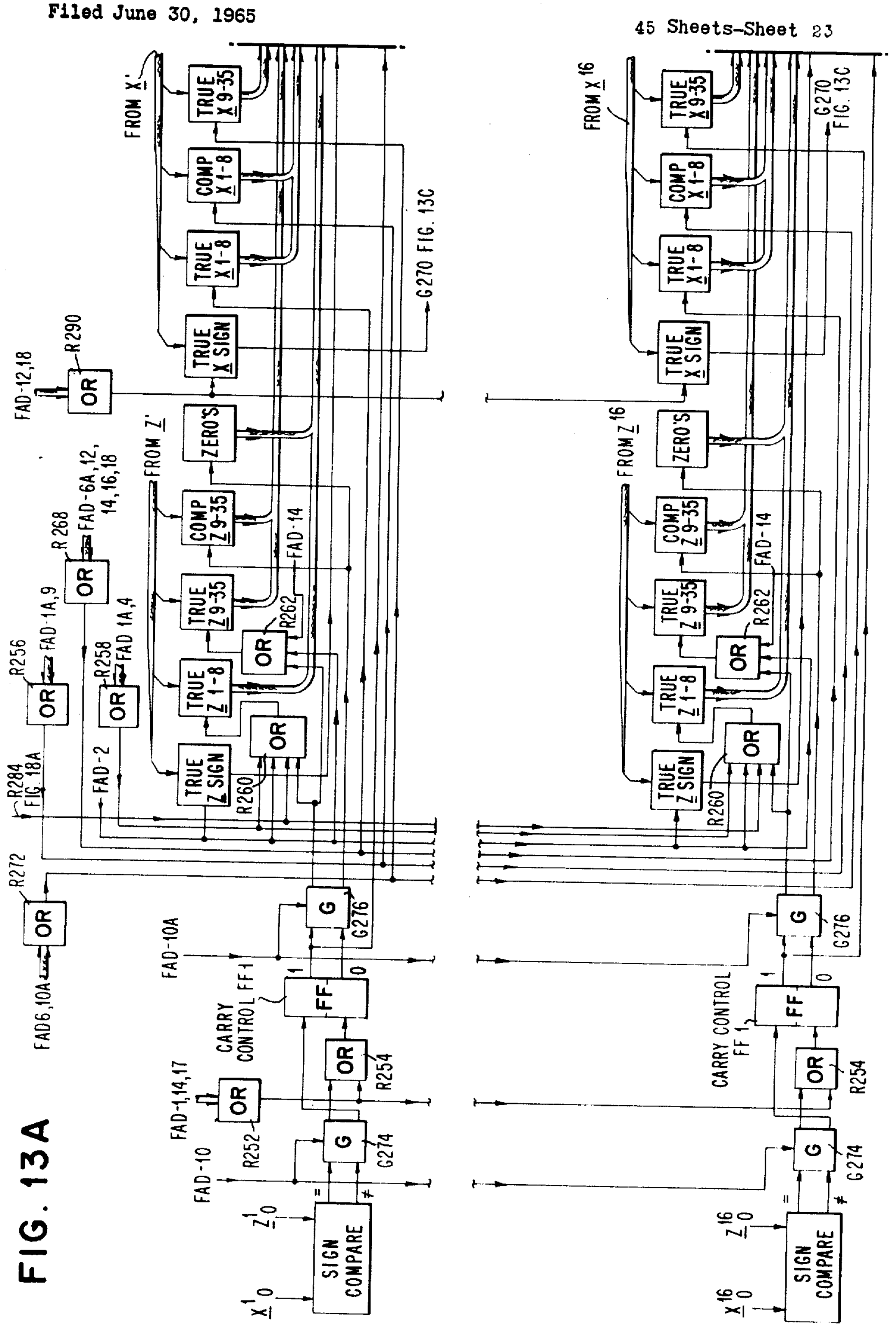
Figure 13B:
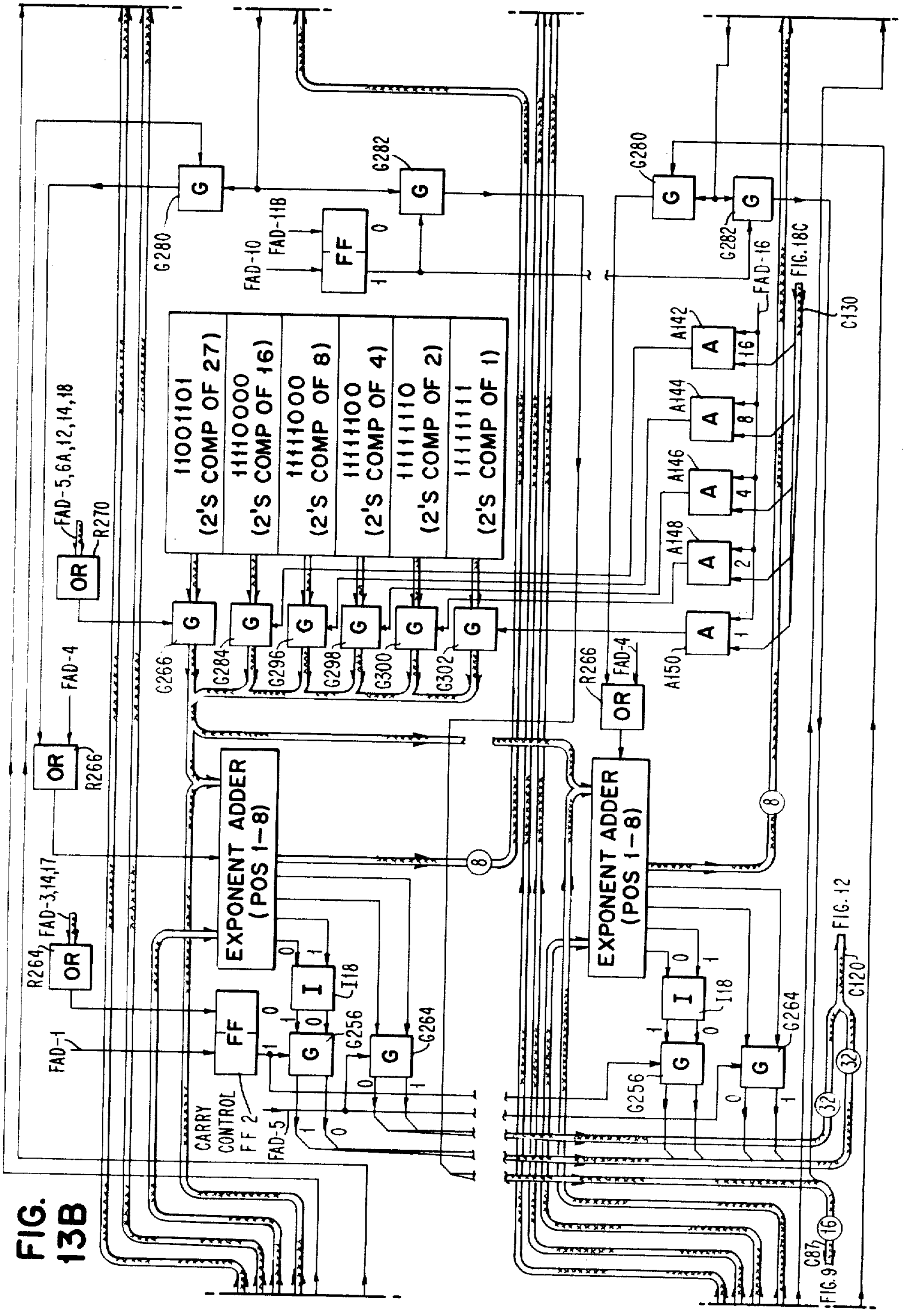
Figures 13, 13C:
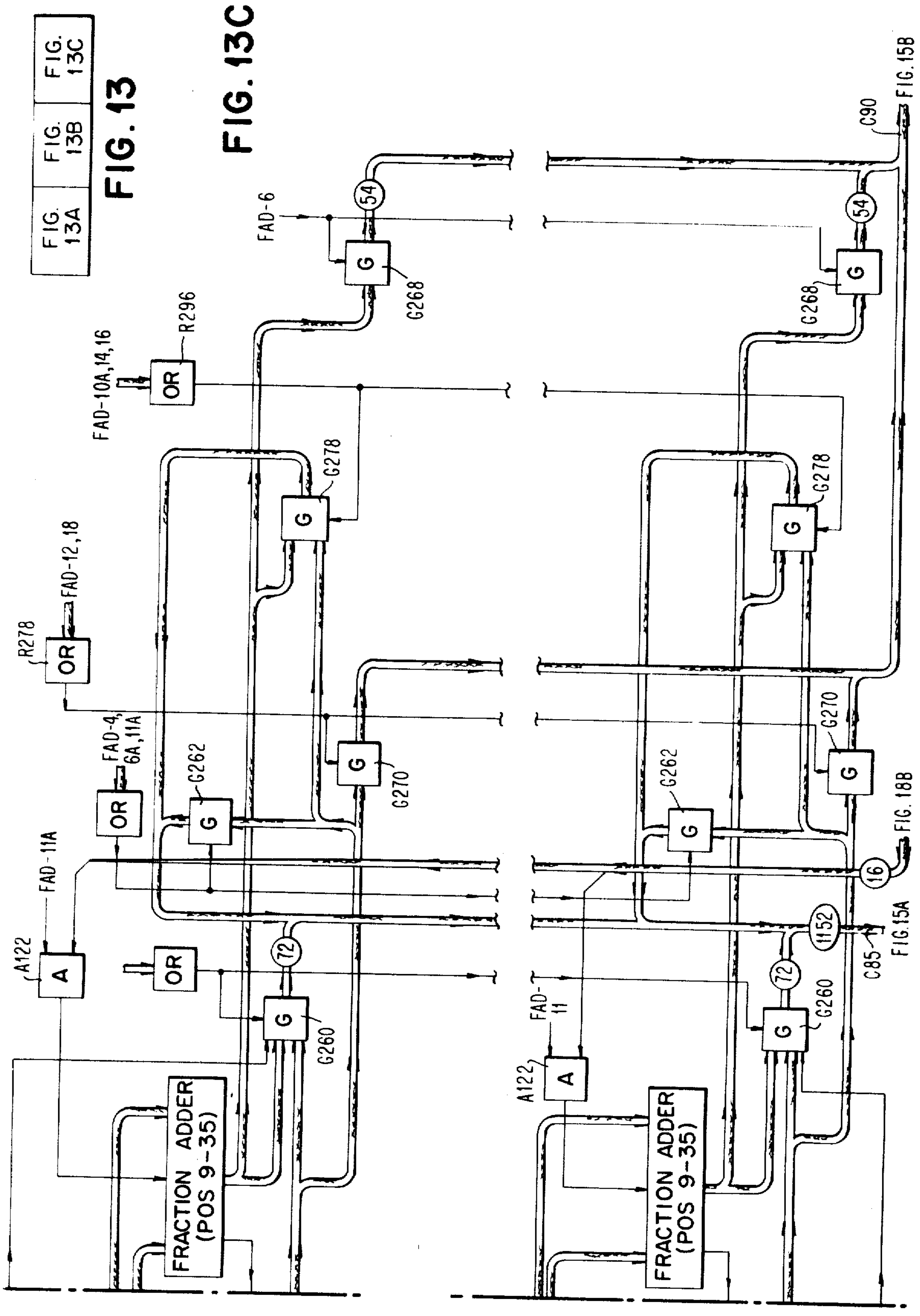

FIGS. 13 through 13C comprise a logical schematic diagram of the Floating Point Add section of the Arithmetic Units of the present invention.

Figure 14A:
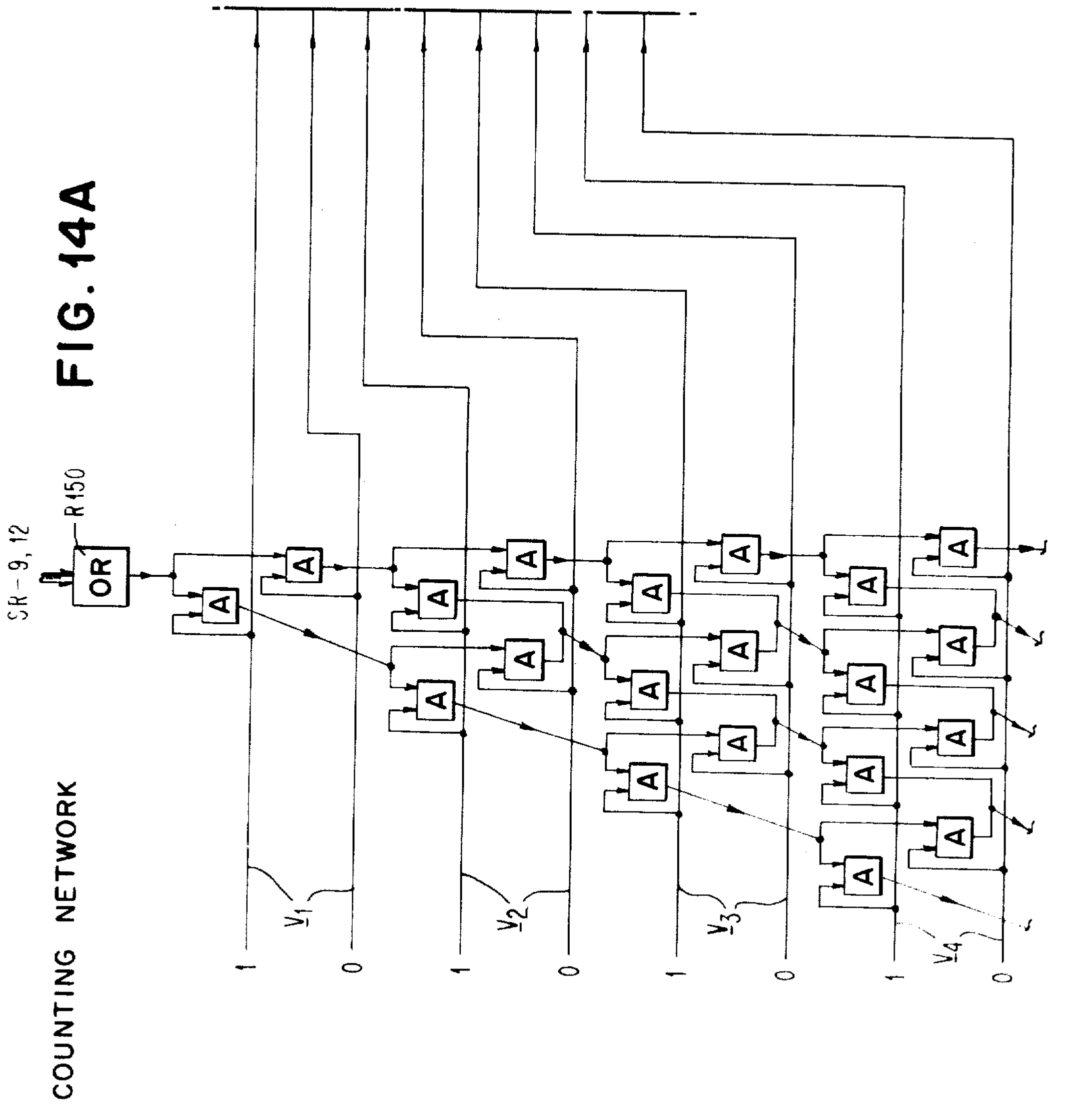
Figure 14:
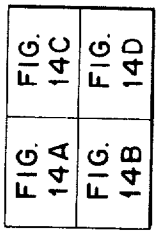
Figure 14B:
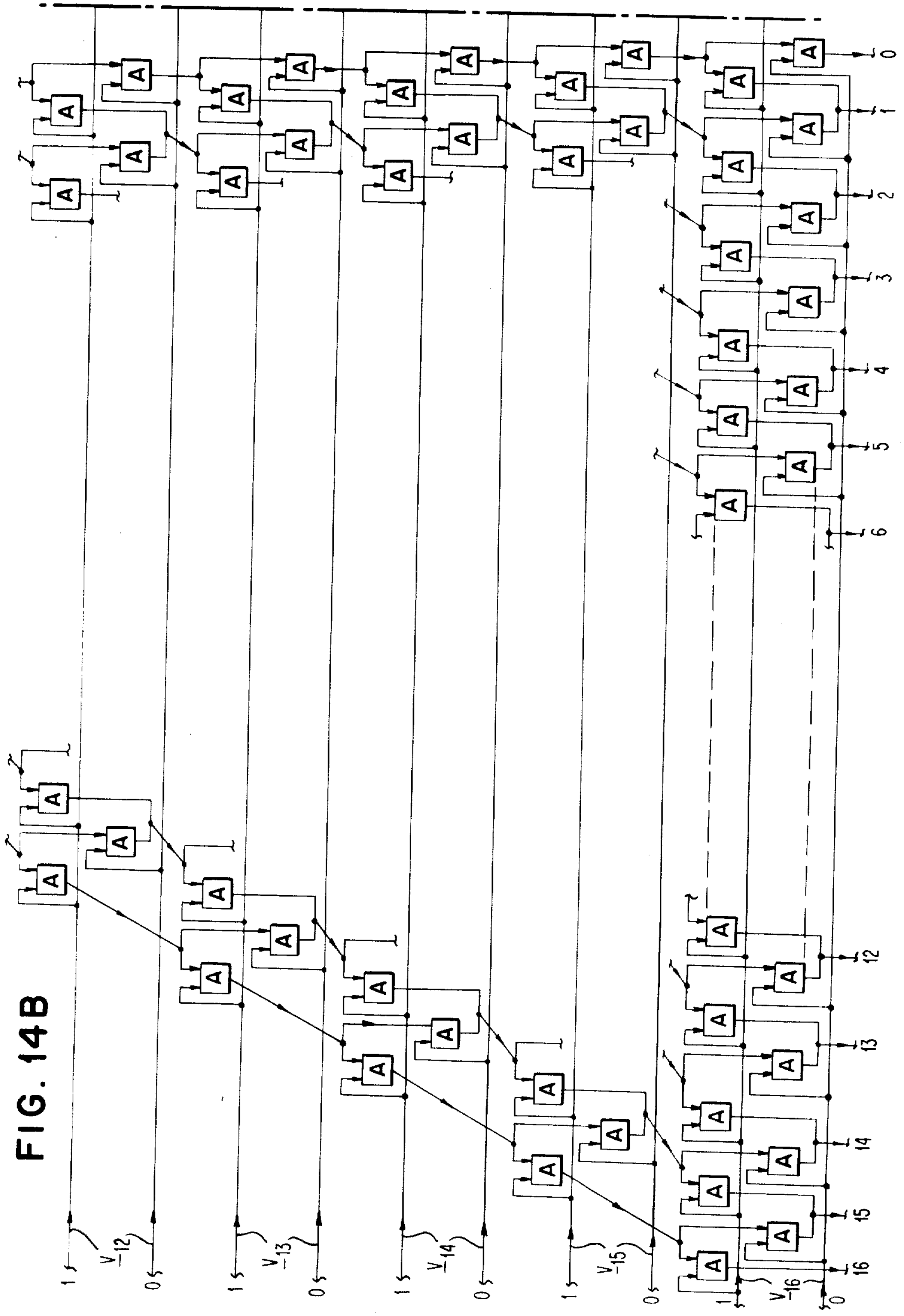
Figure 14C:
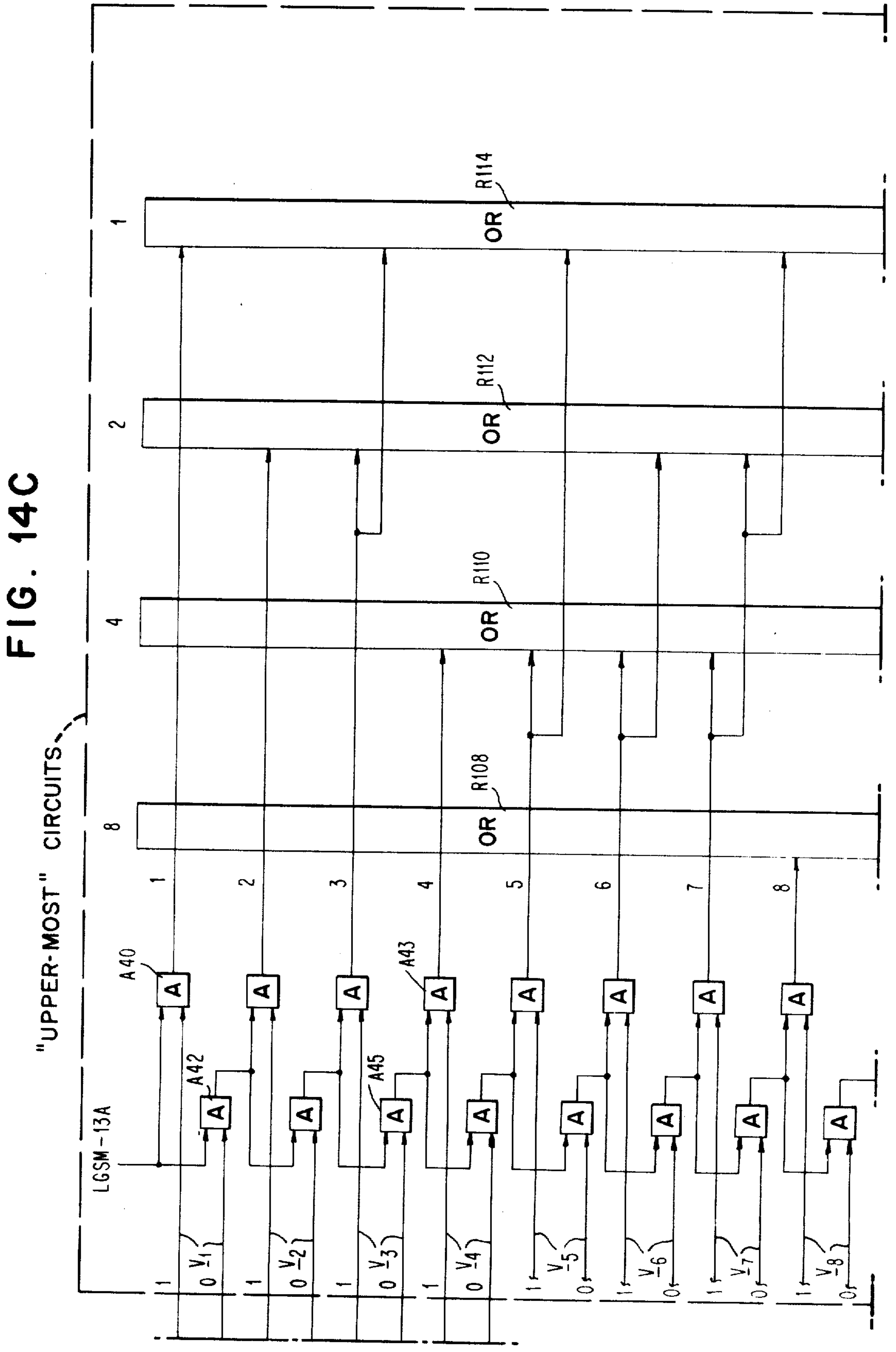

FIGS. 14 through 14C comprise a logical schematic diagram of the Counting Network and the Uppermost Circuits shown in block form on FIG. 11.

Figures 15, 15A:
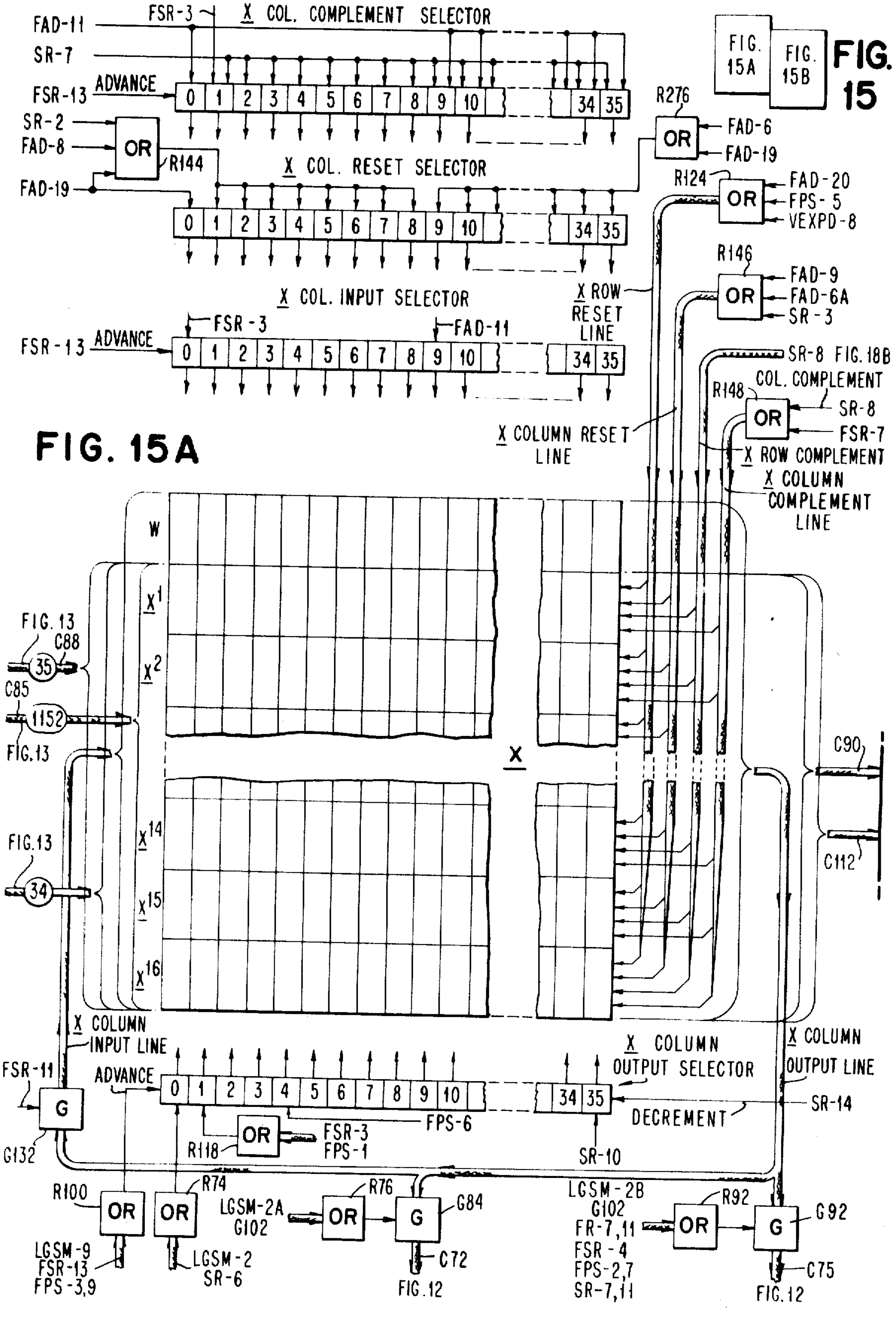
Figure 15B:
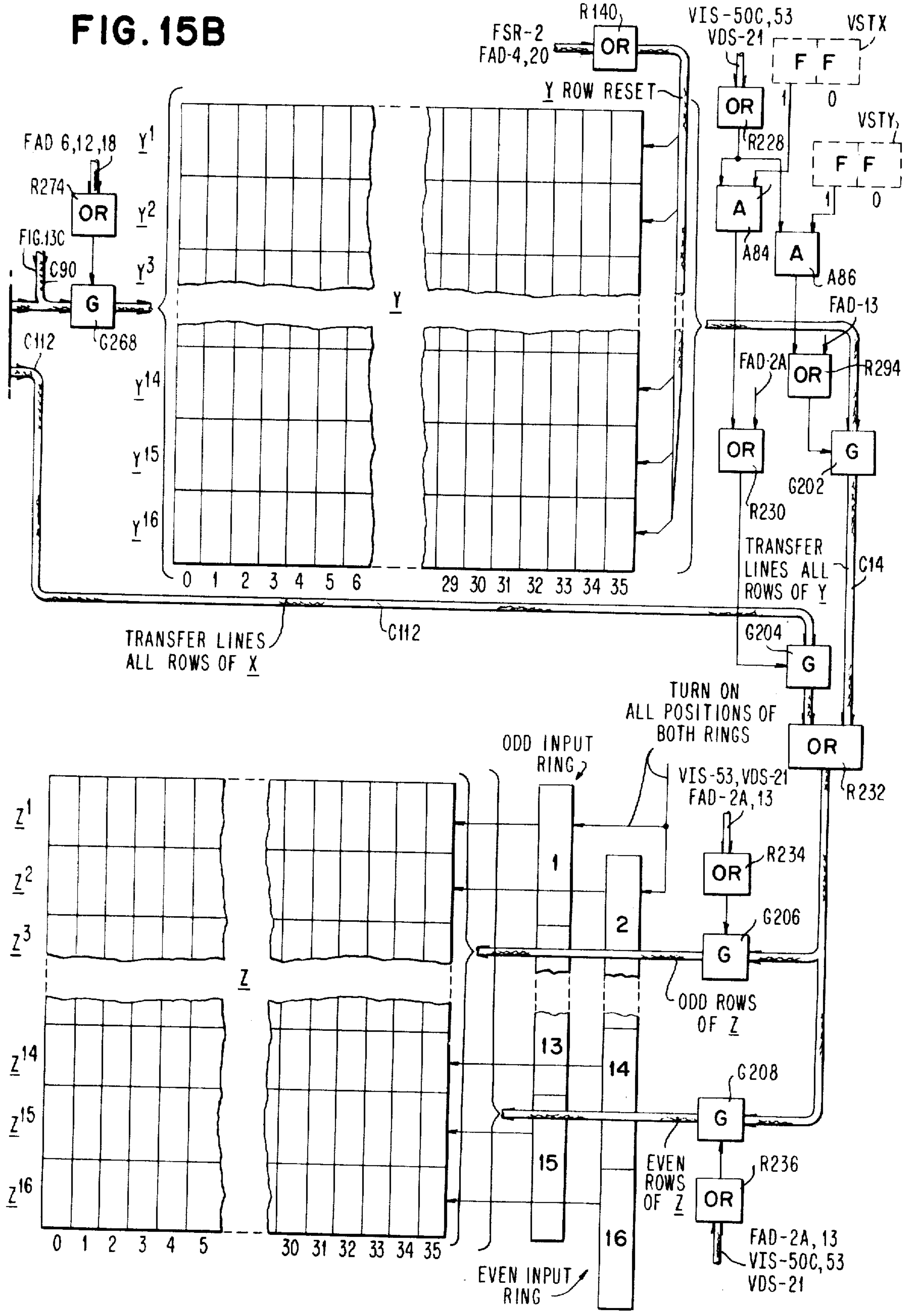

FIGS. 15 through 15B comprise a logical schematic diagram illustrating the interconnections between the X, Y and Z Registers and also showing the various X Register special purpose controls.

Figure 16:
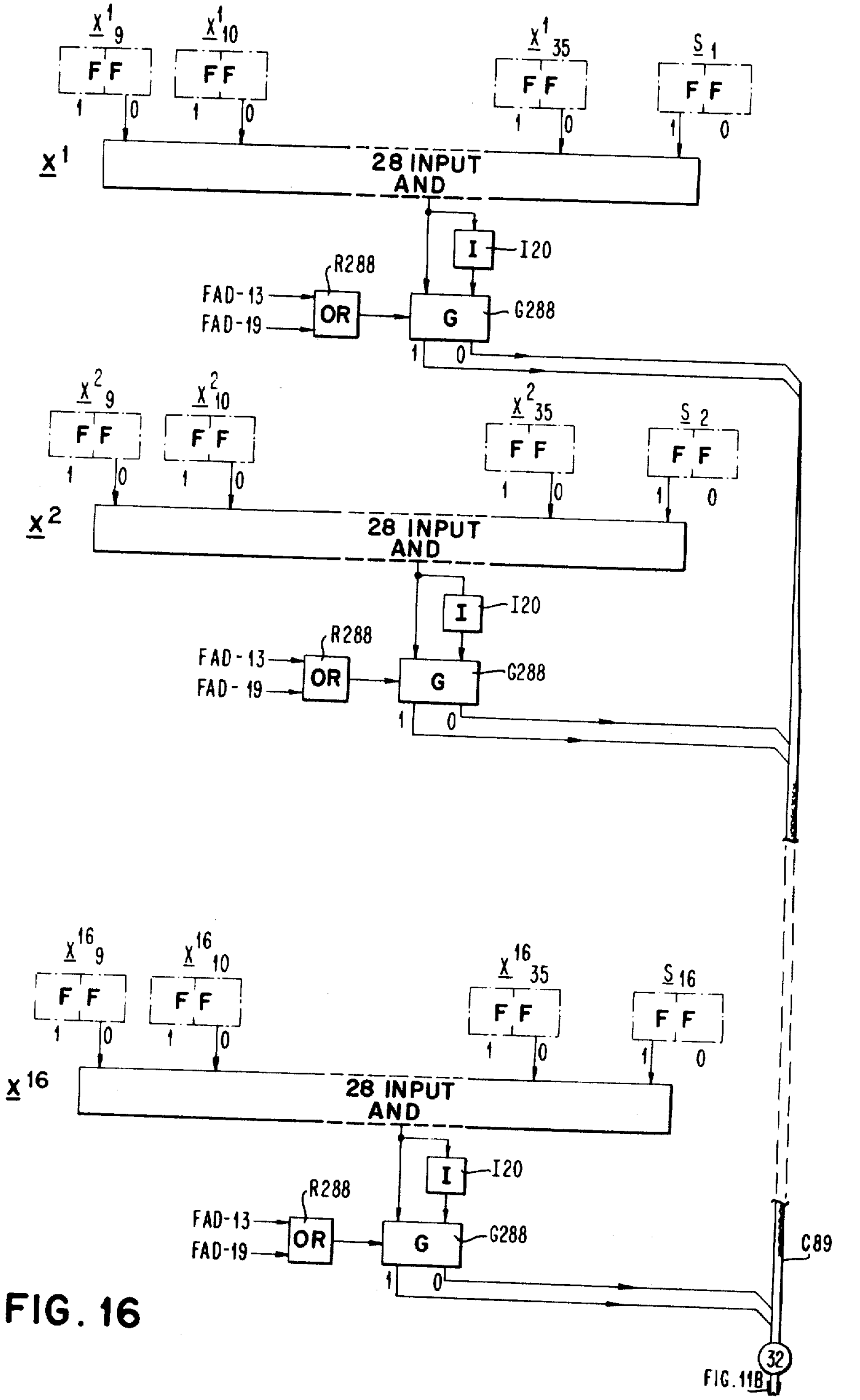

FIG. 16 is a logical schematic diagram showing the details of the 28 Input AND Units utilized during certain Floating Point Add operations.

Figures 17, 17B:
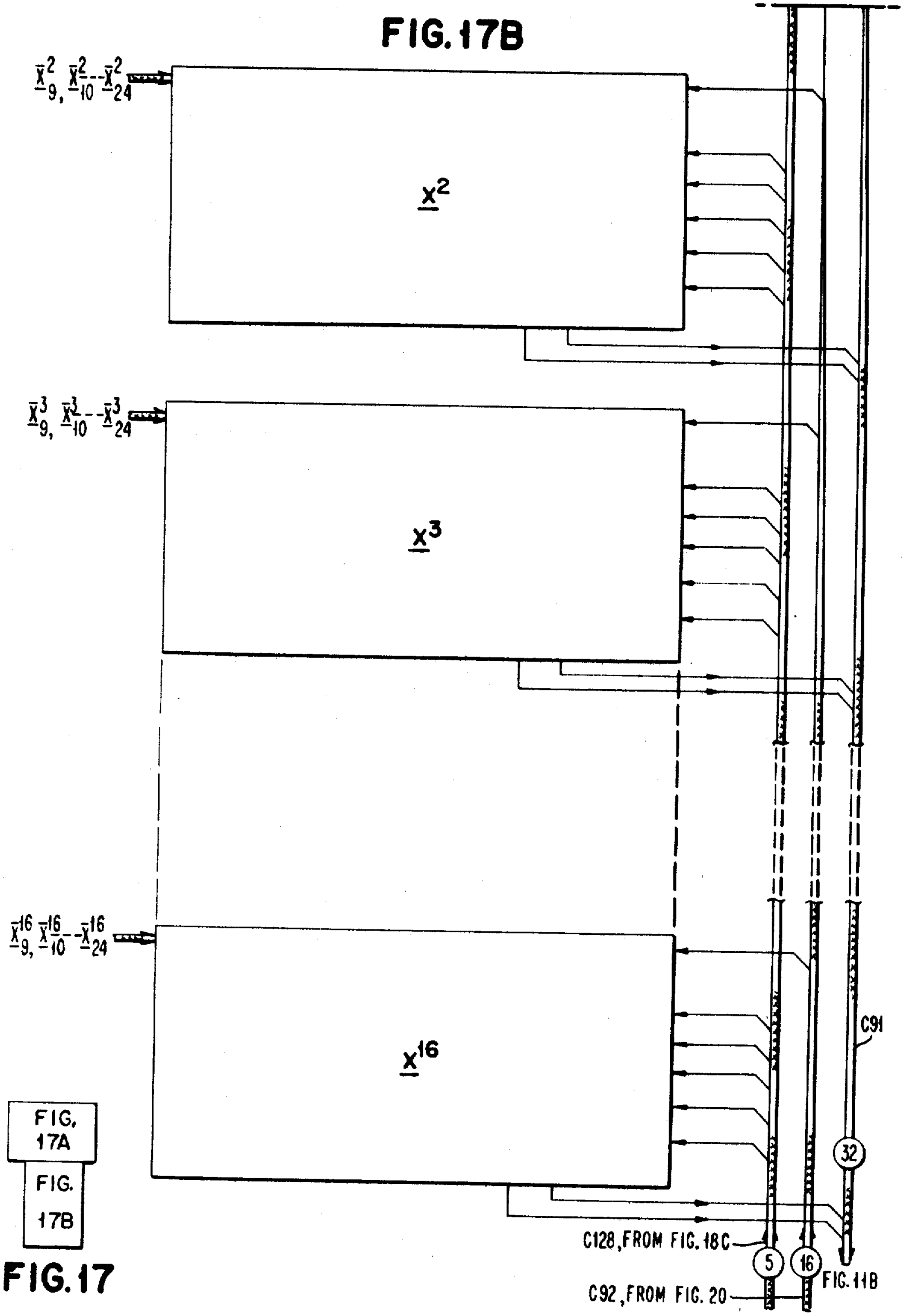

FIGS. 17 through 17B comprise a logical schematic diagram indicating both in block form and in detail (17A) the logic circuitry for performing Normalizing operations.

Figures 18, 18B:
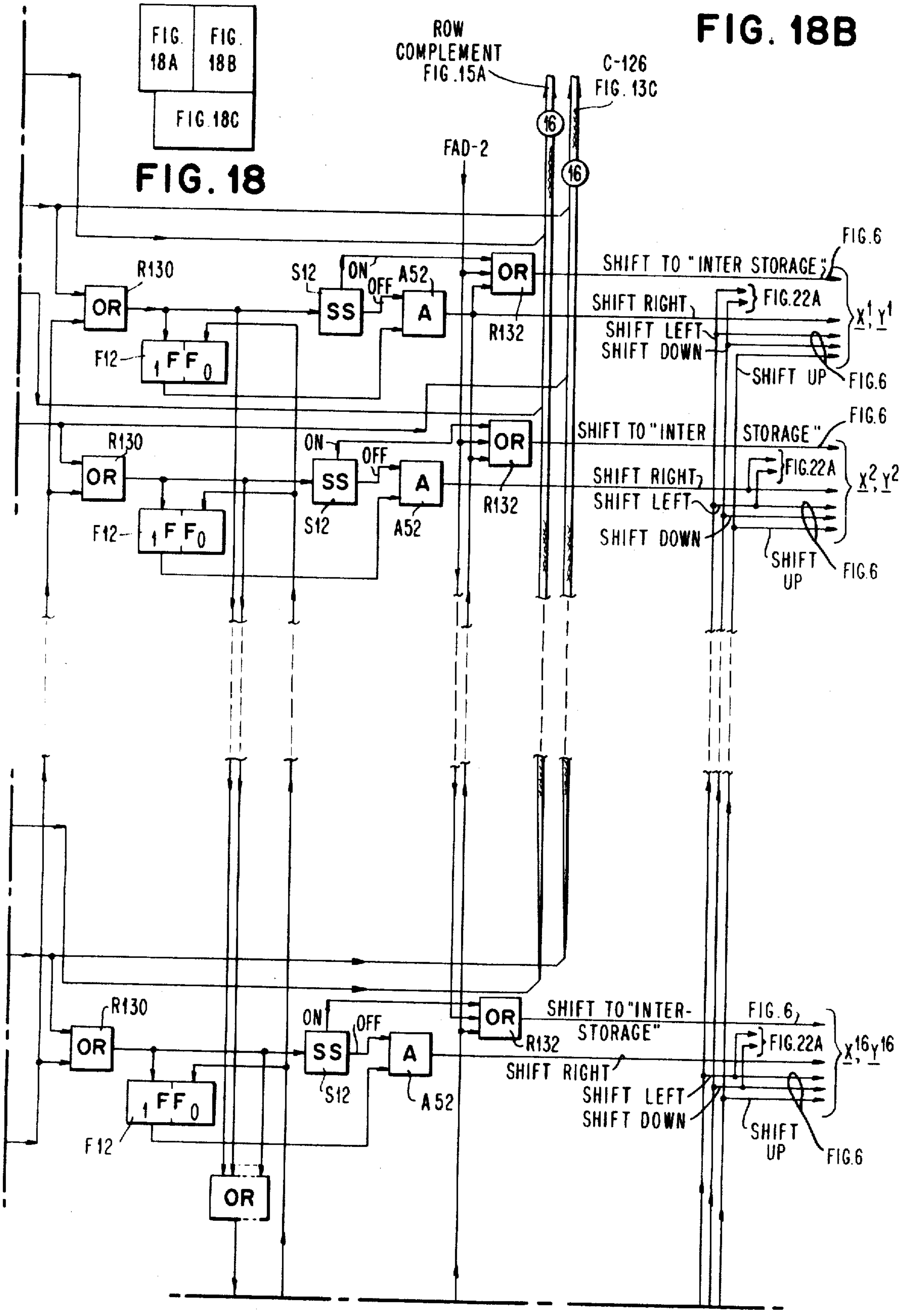
Figure 18A:
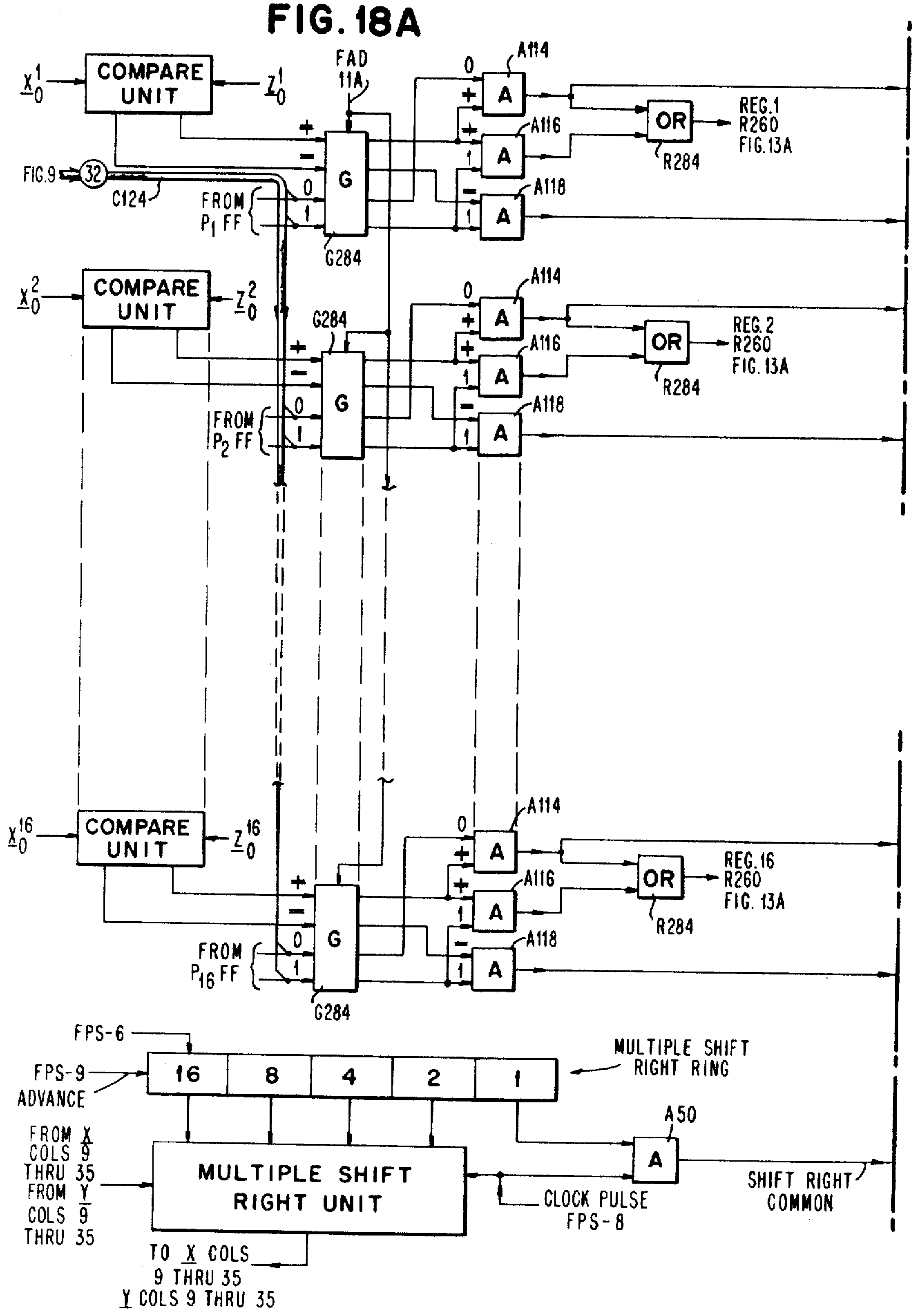
Figure 18C:
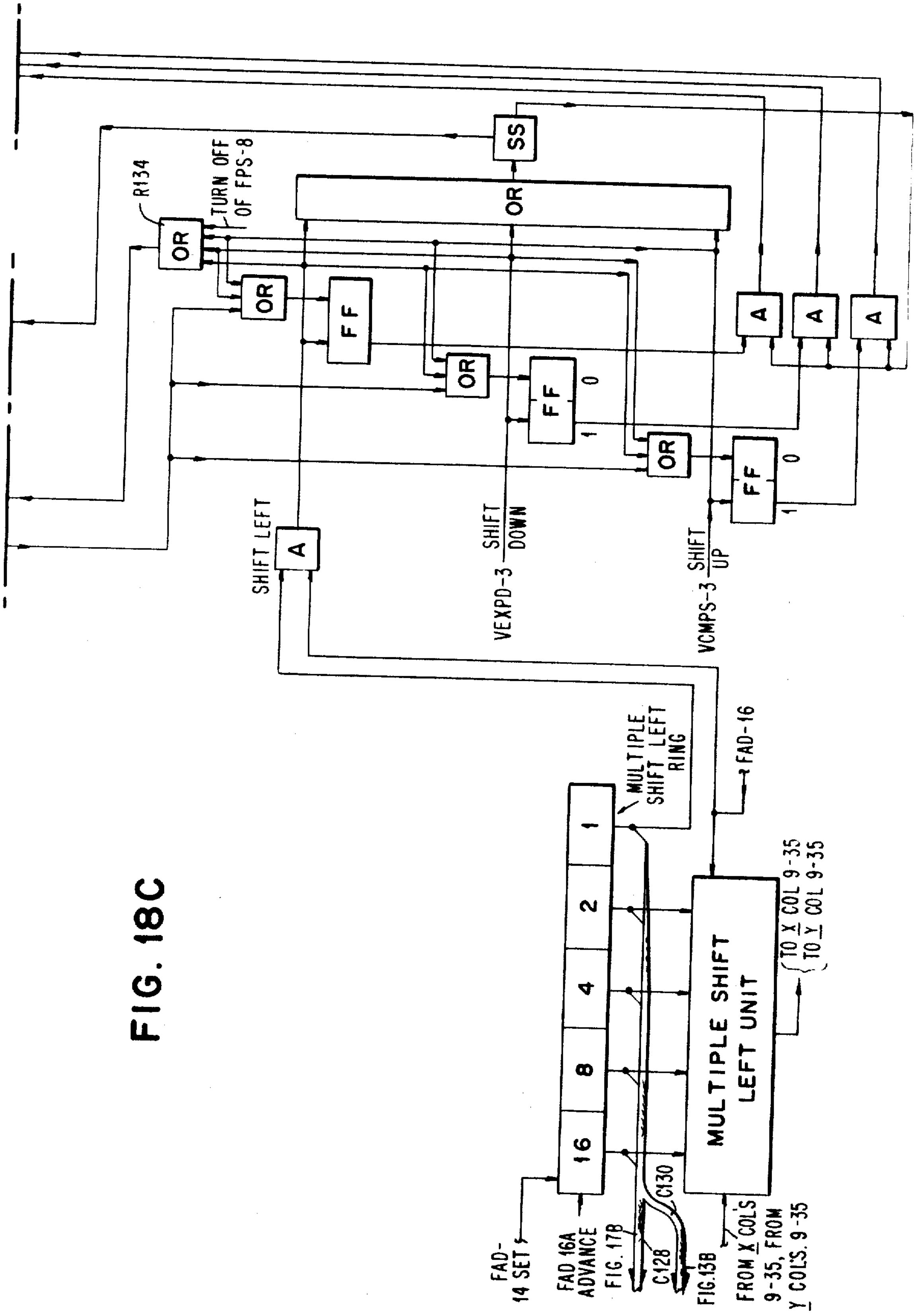

FIGS. 18 through 18C comprise a logical schematic diagram showing the details of the Shift Left and Shift Right controls for performing shift operations during Floating Point Add and Floating Sum Reduction operations.

Figure 19:
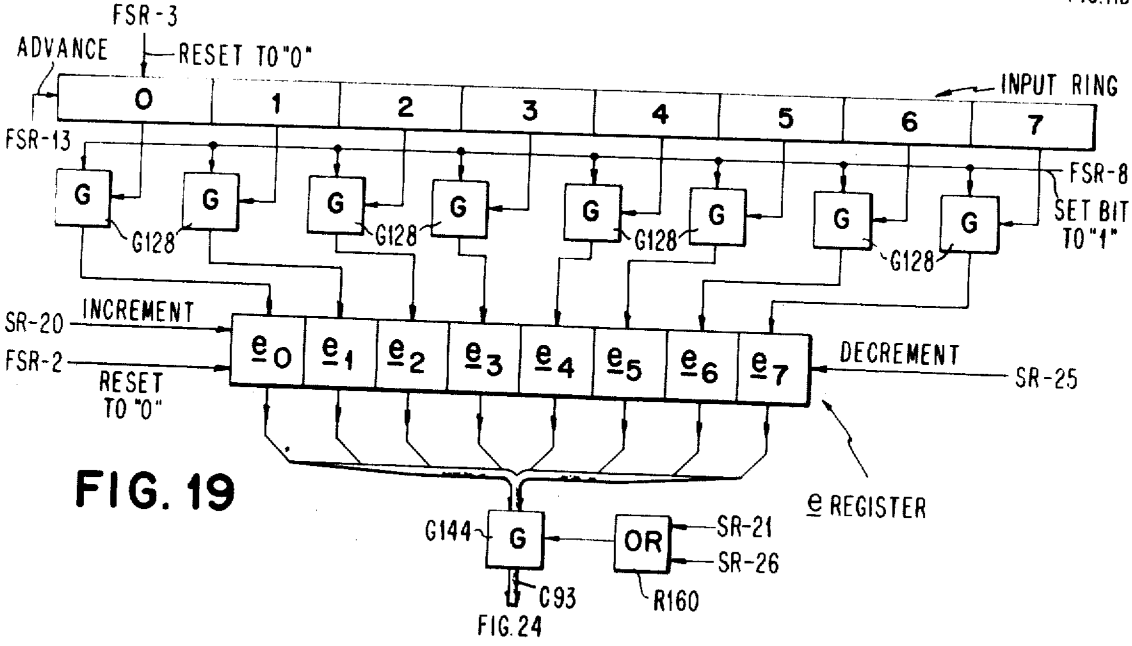

FIG. 19 is a logical schematic diagram showing the c Register and its associated controls.

Figure 20:
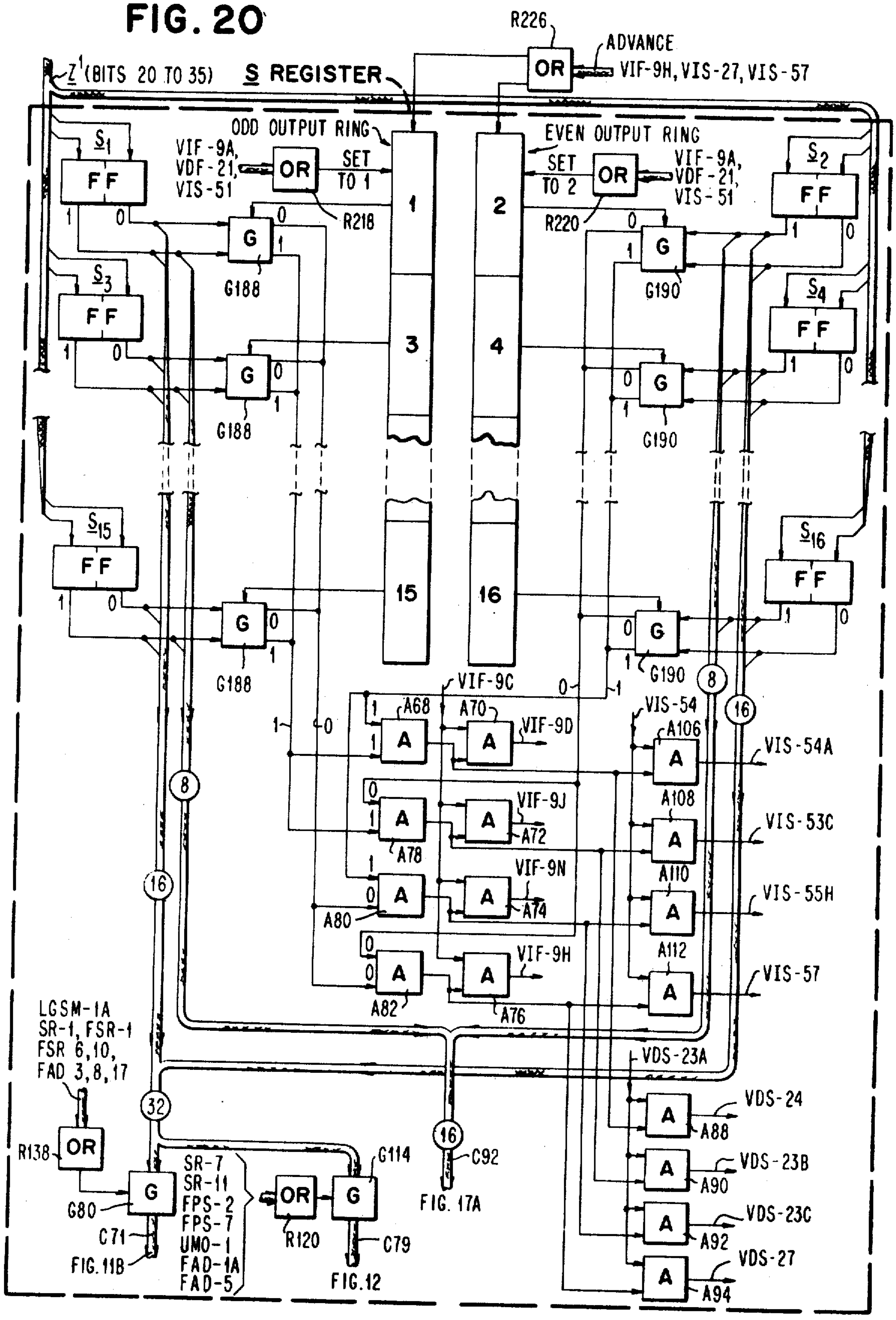

FIG. 20 is a logical schematic diagram showing the details of the s (screen) Register.

Figure 21:
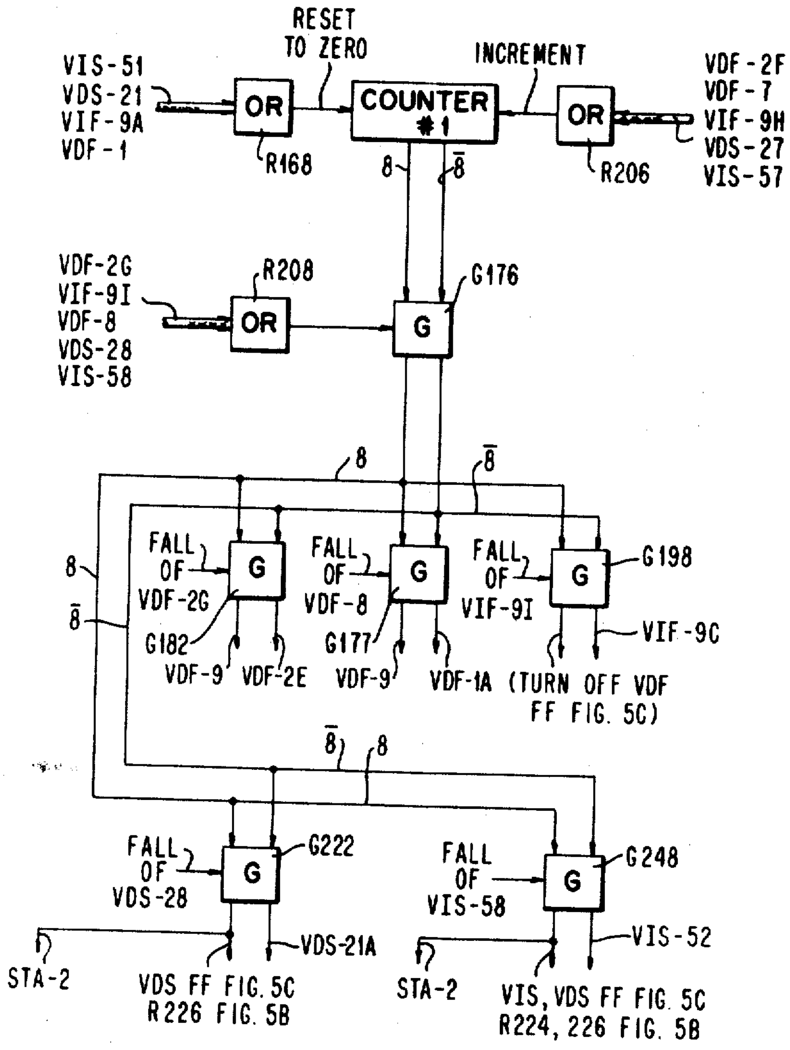

FIG. 21 is a logical schematic diagram showing the Counter #1 and its associated Input and Output controls.

Figures 22, 22A:
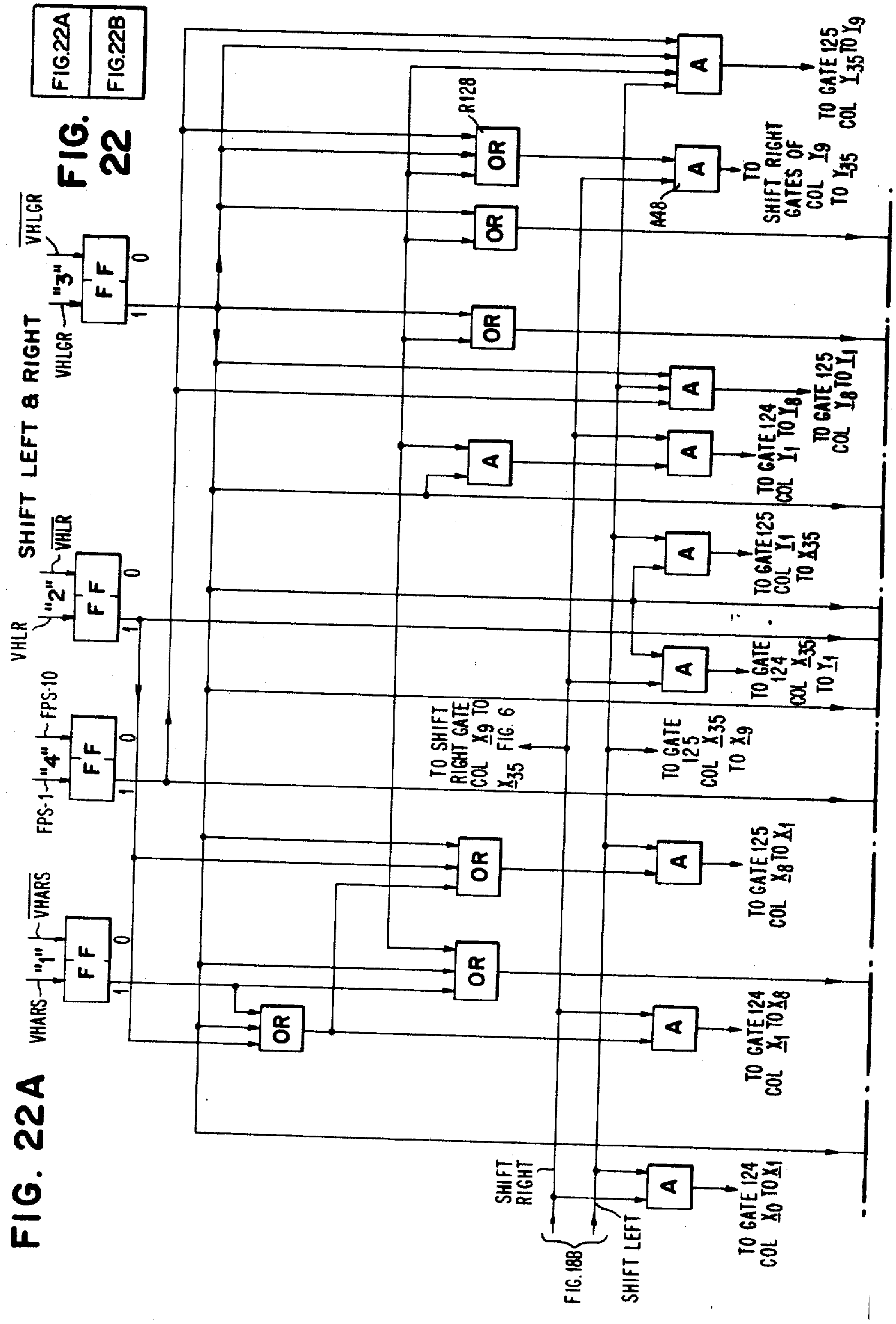
Figure 22B:
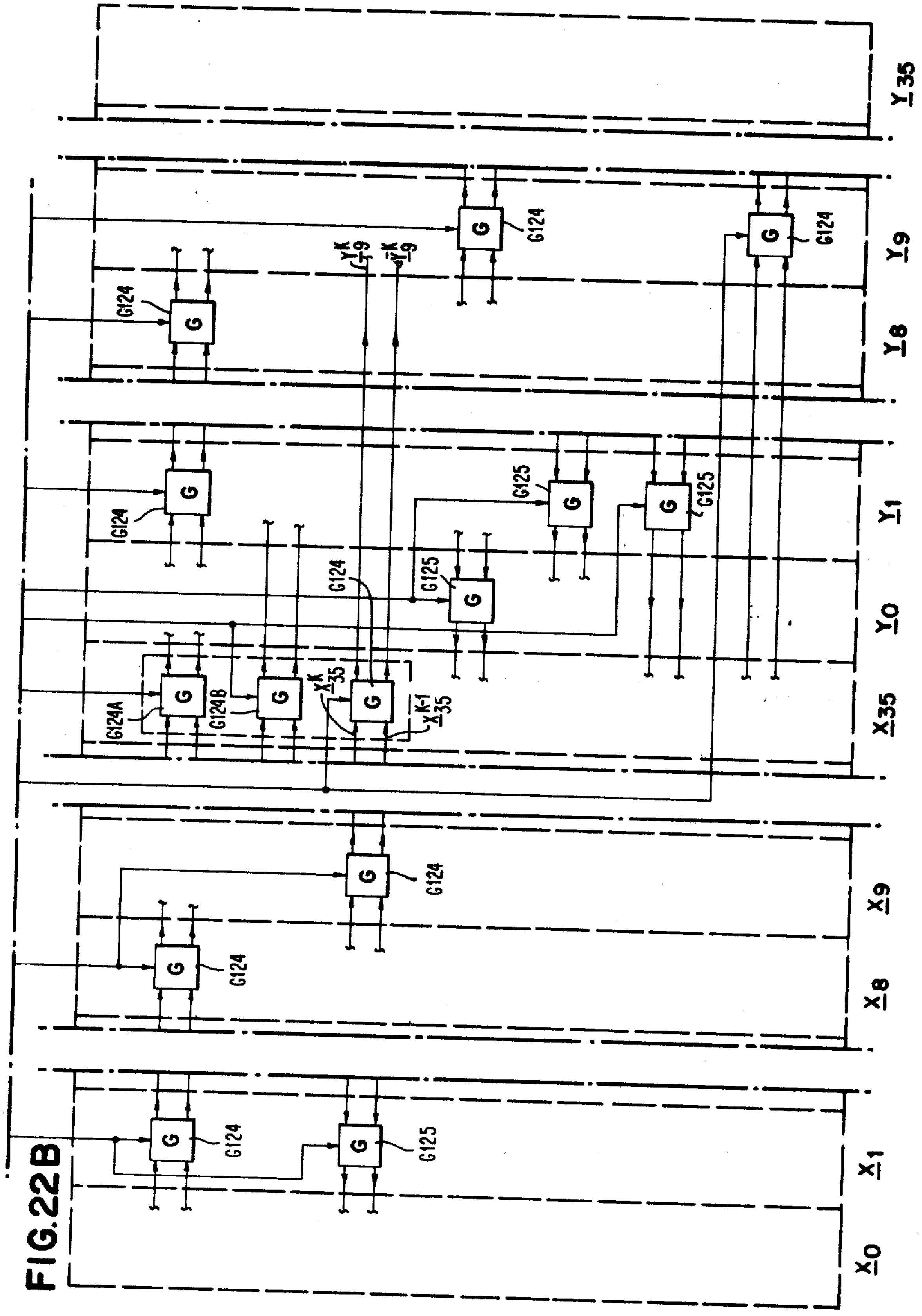

FIGS. 22 through 22B comprise a logical schematic diagram showing the interconnection of the Shift Left and Shift Right gates.

Figures 23, 23A:
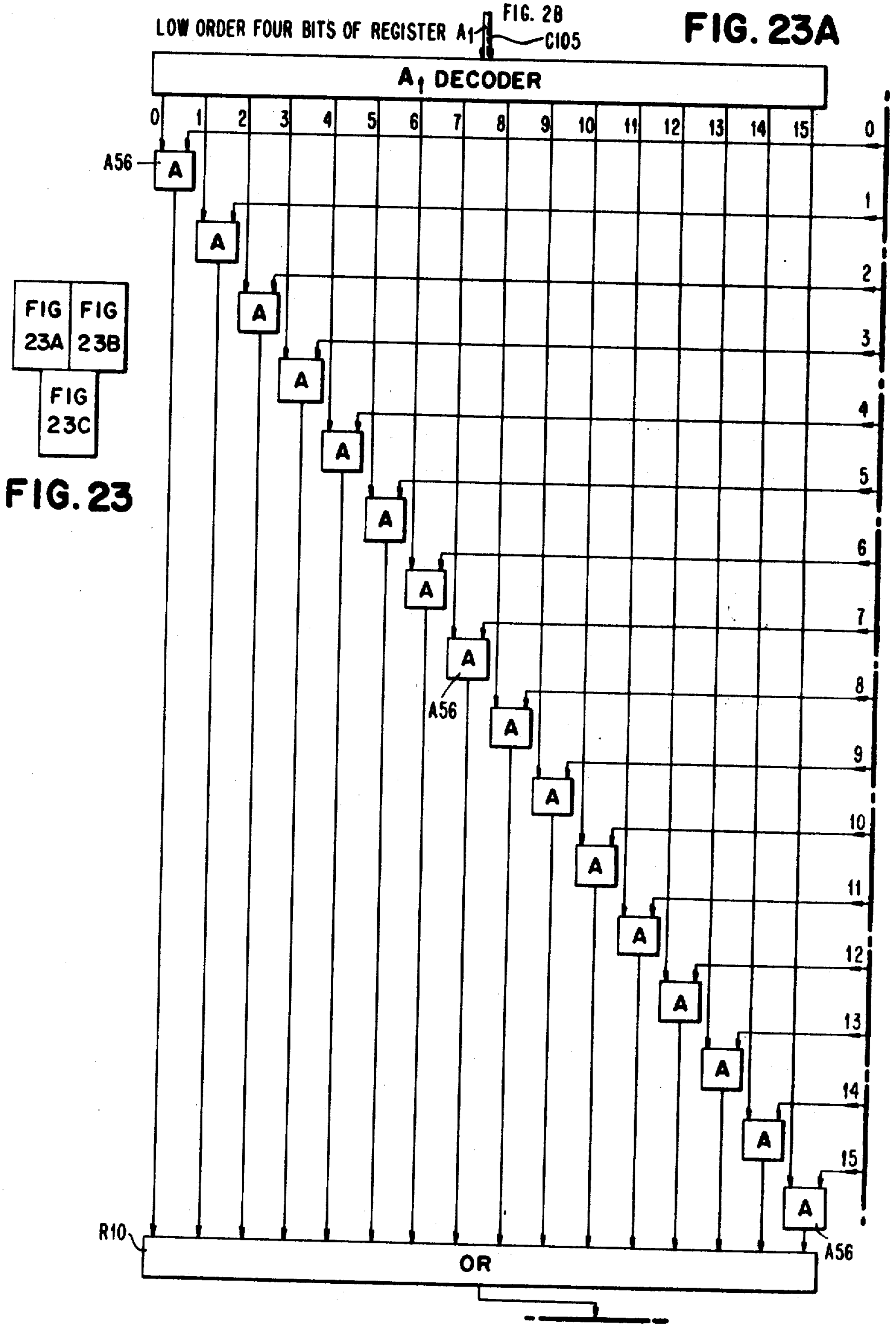
Figure 23B:
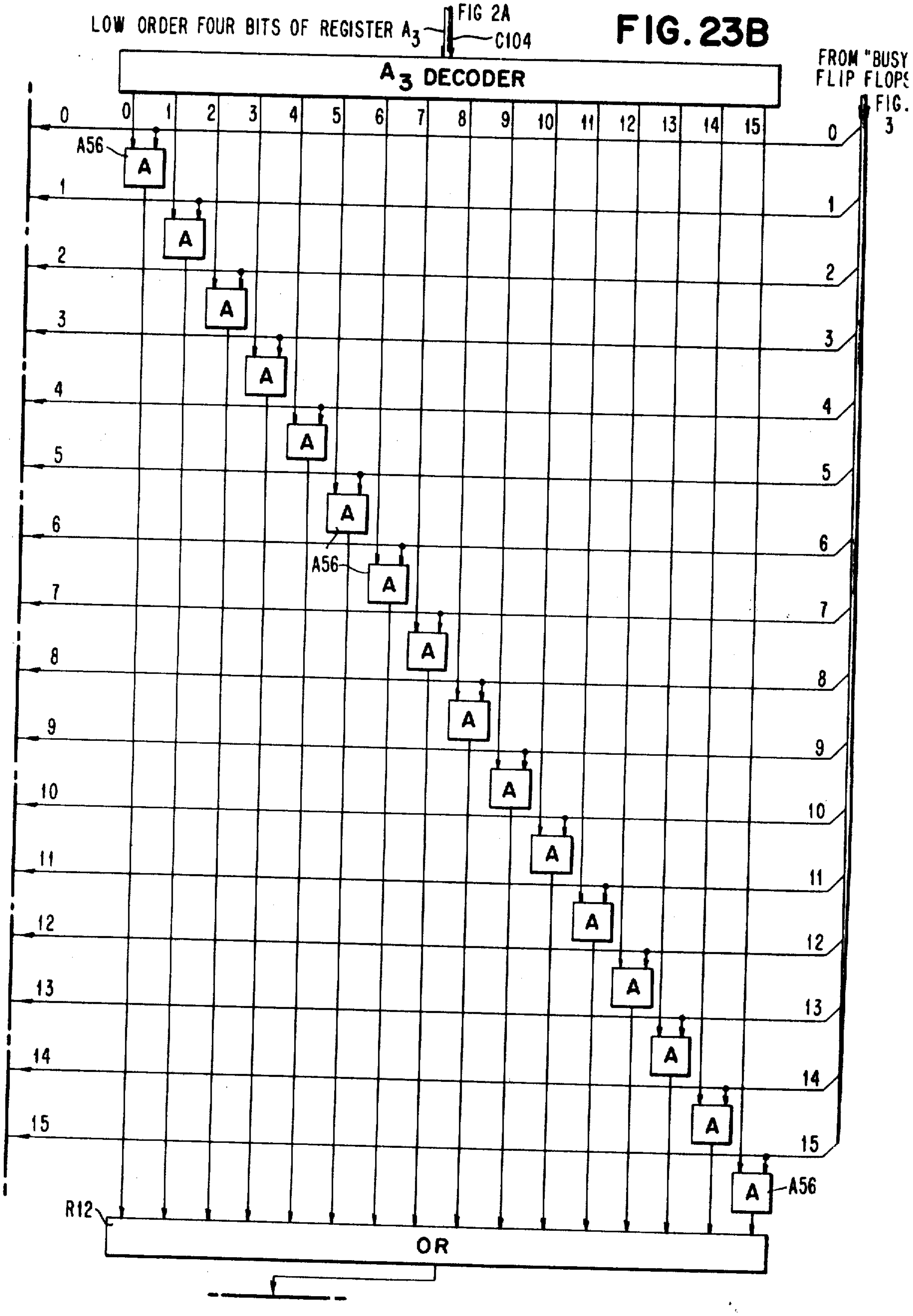
Figure 23C:
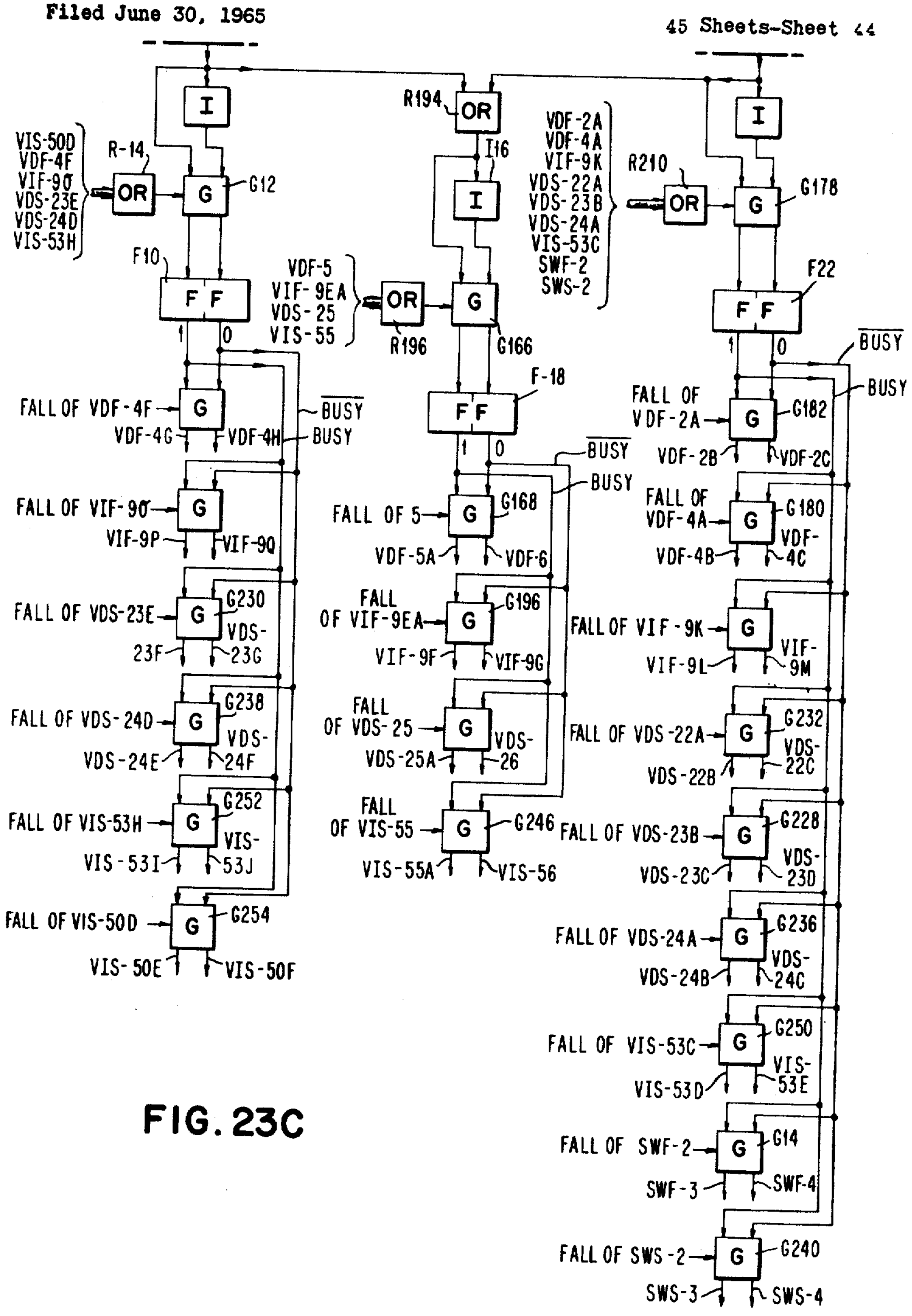

FIGS. 23 through 23C comprise a logical schematic diagram of the Test for Busy controls wherein the "busy" condition of any address Memory Box may be determined.

Figure 24:
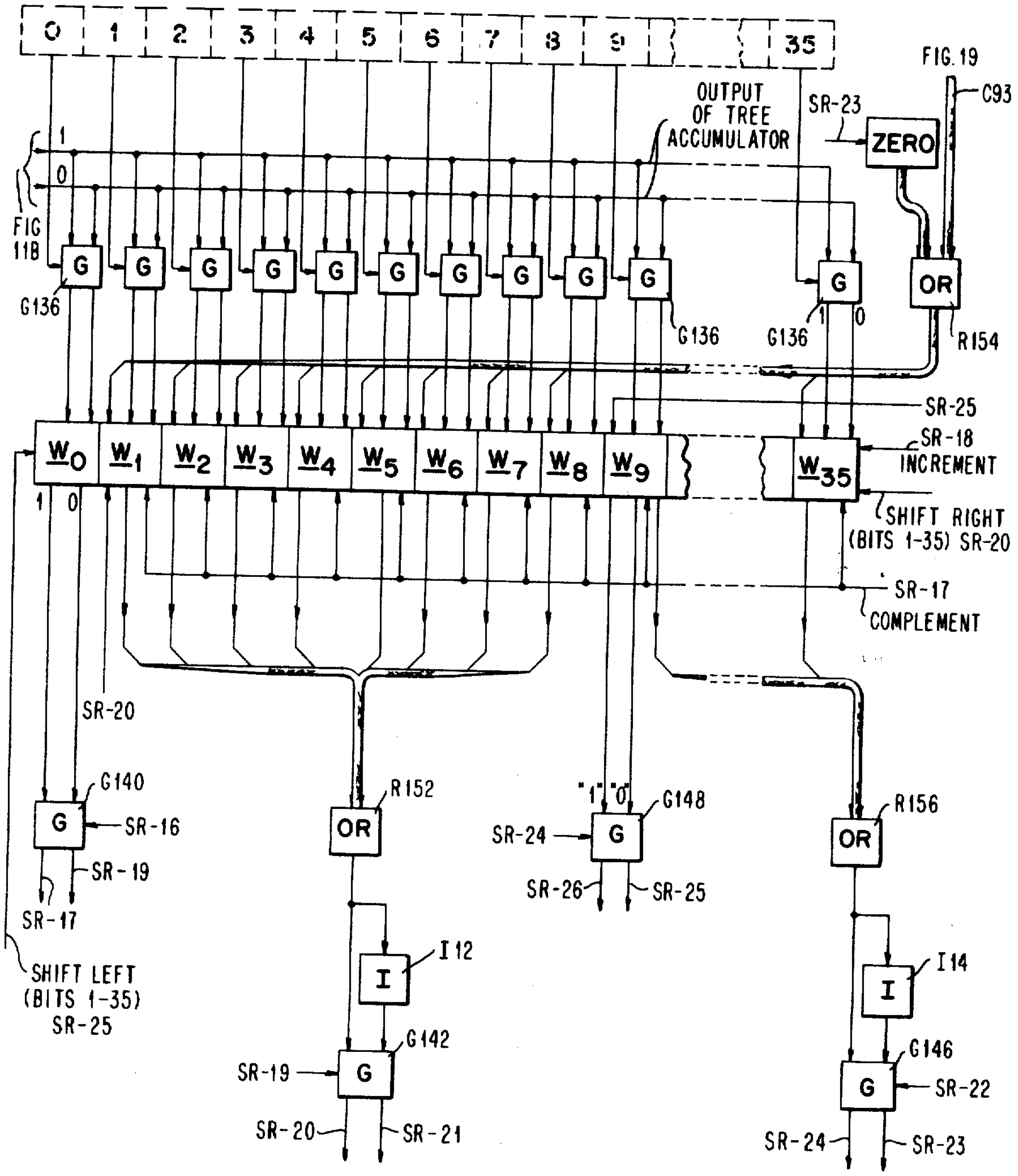

FIG. 24 is a logical schematic diagram of the w Register and its associated Input and Output controls.

The objects of the present invention are accomplished in general by a vector arithmetic multiprocessor computing system comprising a system memory capable of multiple simultaneous word accessing and storage, a plurality of arithmetic units capable of simultaneously performing the same arithmetic operation, and means for restructuring or reorganizing data stored in a plurality of said arithmetic units.

SECTION 2

Introduction to System

In spite of recent advances in computer speeds, there are still problems which make even greater demands on computer capabilities. Typical of such problems is the previously enumerated one of global weather prediction. This type of problem with its demand for increased speed in processing large arrays of data illustrates the applicability of a computer designed specifically for array or vector processing.

When arrays of data are being handled, it is necessary to perform the same calculations on each piece of data. This kind of problem is suited to a machine with multiple identical arithmetic units each executing the same instruction since each arithmetic unit can be carrying on the same task on different parts or members of the array. The industry is fast approaching the physical limit in speed for computer arithmetic units. In the present system a number of arithmetic units are operated in parallel to increase the amount of work done per unit of time. The speed and number of these units is selected to suit the economics of the case and the logical characteristics of the problem. Since the paralleled arithmetic units are all doing the same task, a single control unit suffices. For example, one load instruction causes all arithmetic units to load their separate accumulators each from a different part of the array. Control is provided to inhibit some of the arithmetic units when exceptional conditions are being handled by the others, or when the number of pieces of data to be processed is smaller than the total number of arithmetic units available. A suitable paralleling of separate memory units is also provided to yield data at the rate required by the arithmetic units.

The cost and speed of the presently disclosed array processing computer depends on the speed of the memories and the circuitry used, and also on the number of arithmetic units provided. Speed can be characterized by the maximum rate at which bits can be brought from the memories and processed. It is presently believed that higher bit rates at proportionately lower costs are possible with given types of hardware by using the array processing approach rather than the conventional types of organization.

The system of the present invention is primarily designed to be capable of performing the specific class of problems encountered when performing vector arithmetic. As stated previously, with such problems a plurality of computations must be performed on a plurality of numbers simultaneously wherein the numbers themselves may or may not be different but in which the particular mathematical operation performed is always the same in the vector. Additionally, the results of such multiple computations must be capable of being restructured. A number of these operations will be enumerated subsequently, however, a very common type of operation is to sum all of the results of the individual computations.

The instant system comprises a powerful and versatile multiprocessor capable of the programmed solution of mathematical problems, specifically of a vector or closely related type. These problems have conventionally required many orders of magnitude longer for solution in currently existing systems. It should be understood that while the present system is specifically designed and suited for the solving of vector arithmetic problems it is obviously not limited to such an area and other general types of problems capable of parallel performance can equally well be solved in an optimized manner by the present system providing data is stored in the system in an organization to take advantage of the multiaccessing and multiprocessing characteristics of such system.

While it is obviously not possible to describe in detail every operation performable by the present system which takes advantage of the particular system configuration, a fairly representative number of operations will be described in detail which are considered fully representative of the type of operations of which the system is capable. The following brief description of the significant types of system operations will serve as an introduction to the more detailed description of the operations contained in Sections 3, 4 and 5 and the detailed description of the system operation contained in Section 9.

The system instructions and the method of handling these instructions are largely conventional and would be the same as used with any other large scale computer such as the I.B.M. 7090. That is to say, instruction words are accessed on command from a designated portion of memory, placed in the Instruction Register and decoded. Obviously, the specific instructions will be somewhat different due to the character of the novel operations capable of performance in the present system. Some typical examples of system instructions envisioned by the present system will be included in Section 6 entitled, Instruction Word Format. However, other than the use of specific instructions and specific information included with these instructions, as is necessitated by the present system operations, the instruction sequencing and control is conventional.

The Addressing scheme for the present system is conventional insofar as obtaining single pieces of data from memory such as instruction words is concerned. In this case a specific address will either be given or derived directly from the Instruction Counter and the data placed in the Instruction Register from which the particular system command will be decoded. However the Addressing scheme for obtaining data from the memory for actual processing of an array in the plurality of Arithmetic Units is quite unconventional. According to the specifically disclosed embodiment, provision is made for generating addresses two at a time until sixteen addresses are automatically generated from which sixteen memory areas may be addressed and the data withdrawn whereby all sixteen of the separate Arithmetic Units will be rapidly provided with operands. Also in the disclosed embodiment, sixteen separate Memory Boxes are disclosed and in the preferred mode of operation of the system data would be organized in memory so that there would be no address conflicts and, thus, the system would be allowed to operate at maximum speed. However, provision is made in the controls for the situation where memory conflicts do occur and where necessary, the accessing of data at the first address of any given Memory Box will be completed before the addressing of data at a second memory location in the same Memory Box is started. It will be apparent that this Addressing scheme may be modified so that 4, 8 or even 16 addresses could be generated essentially simultaneously if it were desired to provide the necessary circuitry and controls to achieve this operation. It should be clearly understood that the present system may apply to any number N Arithmetic Units and the present embodiment utilizes the condition $N=16$ for purposes of example only.

Control is also provided for an indirect mode of addressing wherein data stored in memory at the addresses indicated by the previously described Addressing operations are themselves addresses rather than data and these addresses will be in turn used to access the actual data stored at some other position in memory. Thus, it will be seen that the Addressing scheme of the present system is extremely flexible and versatile.

Conventional arithmetic operations are possible with the system. These include both Floating Point and Fixed Point Addition. Also obviously extended from these are Subtraction, Multiplication, and Division which may be suitably obtained by providing proper instructions for the Adder Complementing and Carry circuitry. The significant feature of the disclosed embodiment of the system is that any given operation may be performed simultaneously with different operands in all sixteen of the Arithmetic Units provided. Additionally, control is provided for inhibiting desired members of the Arithmetic Units where it is either not necessary to perform a particular operation or not desirable. By providing a separate mask or screen, operation of individual units may be so prevented.

The type of operation which is considered quite unique to the present system comprises the Vector Restructuring operations. These include Compress, Expand, Search for Largest, Search for Smallest, Sum Reduction and Mask.

The Compress operation comprises an actual compression of the data wherein certain members of a data vector will be deleted and the remaining members compressed consecutively into a smaller sequential area of the Storage Registers.

The Expand operation comprises the physical expansion of the data by spreading a relatively few members of a vector of data across a relatively large section of the Storage Registers by inserting zeros in the storage register positions between those containing the data.

The Search for Smallest comprises a search of up to seventeen numbers in a vector stored at any one time in the Storage Registers for the smallest number. And once found, this number is transferred into a special Holding Register.

The Search for Largest operation is substantially the same as the Search for Smallest except that in the vector of up to seventeen numbers or data words, this time the largest number is to be selected and subsequently transferred into the Holding Register.

The Sum Reduction operation is one wherein up to seventeen numbers stored in the Storage Registers may be concurrently added together to produce a single sum, which sum may conveniently be transferred to the above mentioned Holding Register.

It should also be noted at this point that the Search for Smallest operation, the Search for Largest operation, and the Sum Reduction operation may all be performed under control of a screen or mask word whereby only selected members of the up to seventeen numbers currently set in the Storage Registers will be considered in the operation being performed. Thus, if the numbers 1, 5, 15 and 20 were currently stored in the Storage Registers, it would be possible to merely compare between the numbers 1 and 5 to select the largest or smallest rather than look at all four. Similarly, if it were desired to sum certain of these numbers, again the numbers 1 and 5 could be summed and by appropriate control, the numbers 10 and 15 would not be considered in the operation. Again, this control feature will be apparent from the following general description of these operations and also, in the detailed description of the operation of the system in Section 9.

The Mask operation is one wherein up to sixteen individual data words stored in two separate vector Storage Registers may be interchanged under control of a mask word. What this operation does, in effect, is to modify the contents of one register by the contents of the second register under control of said mask. Thus, for example, the third, sixth, ninth, eleventh and fifteenth data words in the first set of registers may be exchanged for the third, sixth, ninth, eleventh and fifteenth data words in the second Storage Registers. This operation, as will be apparent, allows considerable flexibility in the system and the manner in which data may be rearranged for certain problems.

SECTION 3

Addressing Operations

The following is a general description of the method by which addresses are generated in the present system, and while it is not intended that this description be a detailed description of the process, this being done in the description of the appropriate Timing Sequence Chart, reference will be made to the drawings and especially to FIG. 2 (2A–2D) to aid in the description of the disclosed embodiment.

The memory accessing and addressing is a very important part of the present system since essentially the success of the Vector machine depends on the ability to simultaneously access as many memory words as there are Arithmetic Units in the system or sixteen memory sectors for the presently disclosed embodiment. As will be apparent from subsequent descriptions depending upon the type of vector operations desired and on the way in which the data is loaded into these memories, the addresses may be generated from the command or the locations in the memory where the addresses may be found is generated from the command. This latter operation is referred to herein as Indirect Addressing for Fetch or Store.

For the most general requirement it is assumed to want to transfer 16 words to or from the $\underline{Z}$ Registers to memory. The words go into memory location $\alpha$, $\underline{\alpha}+\delta$, $\alpha+2\delta$ . . . $\underline{\alpha}+15\delta$. Using zero indexing, location $\underline{\alpha}$ is connected to $\underline{Z}_1$, $\underline{\alpha}+\delta$ to $\underline{Z}_2$ . . . $\alpha+15\delta$ to $\underline{Z}_{16}$. $\alpha$ and $\delta$ are specified grammer.)

The memory is composed of 16 boxes with box $i$, $0 \leq i \leq 15$, containing address $i$ Mod 16. In other words, assuming an 18 bit address ($2^{18}$ words of memory), the low order four bits give the Memory Box number. The high order 14 bits give the specific address of the word in the box.

In the present description, MDR and MAR are used for Memory Data Register and Memory Address Register, respectively. The present description covers the disclosed embodiment of the invention which illustrates the generation of addresses two at a time, the handling of address conflicts (two requests to the same box), Memory Read, Memory Write, Indirect Address and a general description of a means of extending the Address Generation to four addresses at a time.

Memory Address calculation.—The addresses are sent to the memory as pairs (assuming $\delta \neq 0$). The generation and transmission is shown below. (The base address $\alpha$ and the increment $\delta$ are assumed to be given by the programmer).

| | Compute— | | Send to Memory | |
|---|---|---|---|---|
| Cycle | Adder A | Adder B | Transfer Line MAR A | Transfer Line MAR B |
| 1 | $\alpha+2\delta$ | $\alpha+\delta$ | | |
| 2 | $(\alpha+2\delta)+2\delta$ | $(\alpha+2\delta)+\delta$ | $\alpha$ | $\alpha+\delta$. |
| 3 | $(\alpha+4\delta)+2\delta$ | $(\alpha+4\delta)+\delta$ | $\alpha+2\delta$ | $\alpha+3\delta$. |
| 4 | $(\alpha+6\delta)+2\delta$ | $(\alpha+6\delta)+\delta$ | $\alpha+4\delta$ | $\alpha+5\delta$. |
| 5 | $(\alpha+8\delta)+2\delta$ | $(\alpha+8\delta)+\delta$ | $\alpha+6\delta$ | $\alpha+7\delta$. |
| 6 | $(\alpha+10\delta)+2\delta$ | $(\alpha+10\delta)+\delta$ | $\alpha+8\delta$ | $\alpha+9\delta$. |
| 7 | $(\alpha+12\delta)+2\delta$ | $(\alpha+12\delta)+\delta$ | $\alpha+10\delta$ | $\alpha+11\delta$. |
| 8 | | $(\alpha+14\delta)+\delta$ | $\alpha+12\delta$ | $\alpha+13\delta$. |
| 9 | | | $\alpha+14\delta$ | $\alpha+15\delta$. |

The output of Adder A is used as one input to both Adder A and Adder B on the next cycle. The second input to Adder A is $2\delta$. This is obtained simply by shifting $\delta$ one bit left. The second input to Adder B is $\delta$.

An exception to the above occurs if $\delta=0$. In this case we send the address $\alpha$ down the MAR A and MAR B lines once. More will be said on this special case in the sections on Memory Read and Write.

Address conflicts

Under certain conditions (such as Indirect Addressing) it is possible to request two or more addresses from the same Memory Box. The conflict is resolved as follows.

Each Memory Box has an associated *busy flip-flop*. Each request for an access to a Memory Box first checks this flip-flop. If it is in the not busy state, it is set to busy and the access proceeds. If the request for access is to a box with the flip-flop set to busy, the address generation halts and waits until the flip-flop is set to not busy by the Memory Box completing its task. In the case where both MAR A and MAR B lines request the same box, the A line is given priority since, logically, it is generated first.

Memory read

All memory addresses that are sent down the MAR A line result in transfer of the corresponding word to the $\underline{Z}$ Register by the MDR A line. The MDR A line is used to transfer data to register position $\underline{Z}_1$, $\underline{Z}_3$ . . . $\underline{Z}_{15}$. Similarly, addresses on the MAR B line result in transfers on the MDR B line to register positions $\underline{Z}_2$, $\underline{Z}_4$ . . . $\underline{Z}_{16}$.

Since the indirect address is limited to one level, the access proceeds normally.

A faster generation and transfer scheme

It is very likely that generating two addresses and then transferring two words to and from memory in parallel will not be adequate. In this case the general method can be speeded up by generating four addresses in parallel and transmitting four words to and from memory MDR's. The generation scheme is shown in the following table. Again, the base address and the increment $\delta$ are assumed to be given by the system instruction.

TABLE.—SIMULTANEOUS GENERATION OF FOUR ADDRESSES

| Cycle | Generate A | Generate B | Generate C | Generate D | Send A | Send B | Send C | Send D |
|---|---|---|---|---|---|---|---|---|
| 1 | | | $(\alpha)+\delta$ | | | | | |
| 2 | $(\alpha+\delta)-\delta$ | $(\alpha+\delta)+4\delta$ | $(\alpha+\delta)+\delta$ | $(\alpha+\delta)+2\delta$ | | | | |
| 3 | $(\alpha+5\delta)-\delta$ | $(\alpha+5\delta)+2\delta$ | $(\alpha+5\delta)+\delta$ | $(\alpha+5\delta)+2\delta$ | $\alpha$ | $\alpha+\delta$ | $\alpha+2\delta$ | $\alpha+3\delta$. |
| 4 | $(\alpha+9\delta)-\delta$ | $(\alpha+9\delta)+4\delta$ | $(\alpha+9\delta)+\delta$ | $(\alpha+9\delta)+2\delta$ | $\alpha+4\delta$ | $\alpha+5\delta$ | $\alpha+6\delta$ | $\alpha+7\delta$. |
| 5 | $(\alpha+13\delta)-\delta$ | | $(\alpha+13\delta)+\delta$ | $(\alpha+13\delta)+2\delta$ | $\alpha+8\delta$ | $\alpha+9\delta$ | $\alpha+10\delta$ | $\alpha+11\delta$. |
| 6 | | | | | $\alpha+12\delta$ | $\alpha+13\delta$ | $\alpha+14\delta$ | $\alpha+15\delta$. |

As mentioned above, the contents of memory location $\alpha$ are transferred to register position $\underline{Z}_1$, location $\alpha+\delta$ to $\underline{Z}_2$, etc. This transfer is done serial-parallel in 8 cycles. On cycle 1, $\underline{Z}_1$ and $\underline{Z}_2$ are loaded . . . on cycle 8, $\underline{Z}_{15}$ and $\underline{Z}_{16}$ are loaded.

To keep the order of transfer, two banks of 8 registers each are used. Each register is 4 bits. These registers are shown as the A Matrix and B Matrix. The first register of the A Matrix is called $A_1$, and thence $A_2$, etc. $A_1$ is set from the last 4 bits of address $\alpha$ (the box number). The $A_2$ Register is set from the last 4 bits of $\alpha+2\delta$. The remaining 6 registers of the A Matrix are set from the remaining 6 addresses that are transferred over the MAR A line. The 8 addresses that come of the MAR B are likewise used to set the 8 registers of the B Matrix.

When the data is available at the MDR's, the A and B Matrix Registers are used to route the appropriate MDR to the correct Transfer line at the correct time. On cycle 1, $A_1$ and $B_1$ are used to connect the boxes specified by $\alpha$ and $\alpha+\delta$ to the MDR A and MDR B Transfer line . . . on cycle 8, $A_8$ and $B_8$ are used to connect the boxes specified by $\alpha+14\delta$ and $\alpha+15\delta$ to the MDR A and MDR B lines.

In the case where $\delta=0$, i.e., we want 16 copies of the same word, we simply copy the last 4 bits of the address $\alpha$ into the 8 registers of both the A and B Matrices overriding the busy flip-flop. This results in gating the desired MDR to both the MDR A and MDR B Transfer lines 8 times.

Memory write

Assuming that it is desired to transfer the contents of the $\underline{Z}$ Register to 16 memory locations, i.e., $\underline{Z}_1$ to $\alpha$, $\underline{Z}_2$ to $\alpha+\delta$ . . . $\underline{Z}_{16}$ to $\alpha+15\delta$, the Address Generation proceeds as above. If the transfer from the $\underline{Z}$ to memory is done at the time the addresses are generated, the A and B Matrix Registers need not be set. However, it appears more reasonable to assume that the addresses will be computed and transferred before the contents of the $\underline{Z}$ Register are available. Then the A and B Matrices must be used as on the Read cycle.

If $\delta=0$ on the Write cycle, the contents of $\underline{Z}_{16}$ are stored in location $\alpha$.

Indirect addressing

In this case, 16 addresses are generated and the results received in the $\underline{Z}$ Register as for Memory Read. The low order 18 bits of each $\underline{Z}$ Register are used as addresses for the Read or Write operation. The contents of the $\underline{Z}$ Register are transferred to the Address Arithmetic Unit in pairs and then transferred down the MAR A and MAR B lines as if they had been generated in the Address Unit.

Although the generation is speeded up only by a factor of 9:6 over the two addresses in parallel scheme, it should be remembered that the address computation is normally overlapped. It is transfer time between the $\underline{Z}$ Register and the memories that must be reduced. This may, in fact, result in generating two addresses in parallel and transferring four addresses in parallel.

Whatever the method of generating addresses, the busy flip-flops are handled as described in the section on conflicts. However, the number of Control Registers, $\underline{A}$, $\underline{B}$, etc., must be the same as the number of words transferred in parallel between $\underline{Z}$ and the memories. When four words are transferred in parallel, four Control Registers, $\underline{A}$, $\underline{B}$, $\underline{C}$, and $\underline{D}$ are required. Each contain four registers of 4 bits. $\underline{A}$, $\underline{B}$, $\underline{C}$, and $\underline{D}$ hold the 4 box numbers that come down the MAR A, MAR B, MAR C, and MAR D lines, respectively. The MDR A line is now connected successively to $\underline{Z}_1$, $\underline{Z}_5$, $\underline{Z}_9$, $\underline{Z}_{13}$. The MDR B line is connected to the $\underline{Z}_2$, $\underline{Z}_6$, $\underline{Z}_{10}$, $\underline{Z}_{14}$ register positions. The MDR C, and MDR D lines are connected similarly.

SECTION 4

Arithmetic Operations

Floating Point Add is one of the most complex and powerful operations of which the present system is capable. It should be particularly noted that provision is made for automatically performing the Floating Point Add between two oeprands in a given Arithmetic Unit including the required radix point alignment. Subsequent normalization of the results may also be specified and automatically performed simultaneously in all sixteen of the disclosed Arithmetic Units.

Although Floating Point Add operations are known in the art, the particular manner of performing these operations in parallel and the apparatus utilized to perform same in the present system is thought to be unusual.

First it should be noted that the basic operations performed in the Floating Point Add are performed in the present system utilizing the usual normalized numbers expressed on a binary or radix 2 system. That is to say that instead of powers of 10 and significant figures expressed in terms of decimals, the numbers are expressed in powers of 2 and the significant figures in essentially binary representations of such radix 10. It will further be noted that in the significant figure or fraction portion of the number, it is assumed in the normalized version that the radix point is immediately to the left of the fraction and that the exponent number itself correctly places this radix point to give proper weight to the number. Further, the fraction is always expressed as a number between one-half and one, or zero. In other words, if nonzero, a "1" will always appear in the leftmost portion of the fractional part of a normalized number at the storage location or register position 9 in the following tables and also in the registers utilized in the present system. This, as is well known, is equivalent to a normalized decimal number wherein the first number to the rght of the decimal point is always between .1 and 1.

It should be noted that descriptions of Floating Point Add operations per se are contained in any of a wide variety of reference sources treating mathematical operations in digital computers. Specific reference is made to the I.B.M. 7094 Customer Engineering Manual, specifically pages 32 and 33 where descriptions of Floating Point Add operations in a 7094 are set forth.

The following brief and generalized description of a Floating Point Add operation within a single Arithmetic Unit will now be given to aid in an over-all understanding of what is involved in Floating Point Add operations and decimal point alignment, shifting, etc.

Before proceeding with a description of the particular subsequent example, the structure of the registers utilized in the present system and illustrated in Table VII should be generally explained. Referring to Table VII, it will be noted that each of the numbers ultimately appears in the column noted as the Operand Registers and actually containing eight blocks with a plurality of positions. It will be noted that the first position in the box is marked with an "*s*" and indicated as the 0 position. This is the portion which contains the sign of the particular number, that is, positive (+) or negative (−). A binary "0" indicates the sign of the number is (+) and a "1" indicates it is (−). Storage locations 1 through 8 are utilized to contain the exponent (exp.) in binary representation. However, the system, as is the case with many such computers, assumes that with all zeros appearing in the exponent box, the exponent is −128. Therefore, assuming, for example, that an exponent 0 were desired for two particular normalized numbers, the leftmost binary position would have to contain a 1 thereby indicating the number 128, which when added to the norm of −128 obviously will give an actual exponent value of 0.

Register positions 9 through 35 indicated in Table VII are those utilized to represent the actual fractional quantity and as will be apparent, 27 positions are so available. Further, as will be noted, all of the positions are not actually filled in due to space requirements as the contents where the dotted portions appear are assumed to be all zeros unless otherwise noted to make a total of 27 bit positions in this section of the register.

This 36 bit register form is utilized in all of the registers of the present system and as stated previously, it is not intended to be any way limiting upon the system, but, however, represents a typical register size for large scale scientific computers. Such registers include the $\underline{X}$, $\underline{Y}$ and $\underline{Z}$ Registers in the Arithmetic Units. The $\underline{w}$ Register and various other Holding and Storage Registers such as the individual Arithmetic Unit Buffer Registers.

Referring now to a specific very simplified example, it will be assumed that the numbers ⅛ and 8 are to be added together. These numbers are used primarily for simplicity since they are powers of 2 and may be easily expressed. Referring first now to line (a) of Table VII, it will be noted that the number ⅛ may be expressed as a fraction times the power of 2 which is shown as $\frac{1}{2}\times2^{-2}$. Alternatively, this binary fraction may be expressed in binary form as shown in Table VII which is $.1\times2^{-2}$. Still referring to the same line, this normalized number as stored in the $\underline{Z}$ Register shows a "0" in the 0 bit position which indicates that the sign of the number is positive. In the exponent portion (exp.) the binary number 01111110 appears which actually is the number 126 which indicates that the exponent is −2. The binary fraction is stored in positions 9 through 35 and appears as a 1000 . . . 0 (for a total of 27 bit positions). As indicated, this would be the contents of one of the $\underline{Z}$ Registers in the present system.

Concurrently, there would be stored in the $\underline{X}$ Register after a Memory Fetch operation the number 8 which appears in line (b) of Table VII. As above, the number 8 is expressed as a fraction as $\frac{1}{2}\times2^4$ which in turn is equal to $.1\times2^4$ when expressed as a binary times the power of 2. This number appears in normalized form in the $\underline{X}$ Register as indicated in Table VII.

The next operation which must occur is a subtraction of the smaller exponent from the larger which in this case means the exponent portion of the $\underline{Z}$ Register from the exponent portion of an $\underline{X}$ Register. The results of this subtraction are shown in line (c) of Table VII which as will be recognized is equal to 6. This indicates that the number in the $\underline{Z}$ Register must be shifted to the right six positions in order for the two exponents and thus decimal points to a line. The results of this shift are shown in line (d) of Table VII where it will be noted that there are now six zeros to the left of the 1. Finally, the results of the addition of the fractional portions of the $\underline{X}$ and $\underline{Z}$ Registers is shown in line (e) of Table VII which, as will be appreciated, would translate back to a value of 8 and ⅛ in the original fractional representation.

While the above operation provided the result directly in normalized form, that is, a 1 in the rightmost position of the fractional portion of the $\underline{X}$ Register, this might not have been the case and subsequent shifts would have been performed with appropriate adjustment of the number in the exponent portion of the register to again provide a normalized number as said result. Also, as stated previously, these two numbers were extremely simple numbers and ones which also provided complete representation of their numerical value in only bit position of the fractional part of the register. However, with many more complicated numbers, far more bit positions would be necessary to express same accurately which numbers would be rounded off at, for example, the eighth bit position. Thus, as with all such Floating Point systems, the programmer or machine operator must be aware of the limitations of the particular Arithmetic Units of the computer system with which he is working.

In the situation where it is desired to align decimal points for all of the Arithmetic Units concurrently so that there will be a single common exponent for certain operations such as Sum Reduction. The following machine steps would be necessary. First, assuming that all of the numbers are stored in the individual $\underline{X}$ Registers for each Arithmetic Unit, the system must search for the largest exponent. When this is found, the individual exponents stored in each of the individual $\underline{X}$ Registers must be paired with said largest exponent and a different or shift number reduced from said comparison. Once this has been done for each number stored in each different Arithmetic Unit, the amount of shifting necessary to align all the decimal points is known. It will be noted that since one of the sixteen numbers is the largest, that particular number will obviously not have to be shifted.

In the present system means are provided for shifting all of these numbers concurrently so that the maximum time required for such a shift will be determined by the largest single shift necessary in any one of the individual Arithmetic Units. The particular apparatus for performing this multishifting operation and the manner in which it operates will be described subsequently with reference to the Timing Sequence Charts for the Floating Point Add operations.

Once the Shifting operation has been completed and all of the fractions aligned, the summation of the numbers may begin in accordance with the mask stored in the appropriate $\underline{s}$ Register as described in the description of the Sum Reduction operation. The individual summations may obviously be simultaneous to reduce total computation time as will be understood and described in the subsequent specific description of the operation of the system.

the completion of the addition, $\underline{X}^i$ positions 9–35 and $\underline{Y}^i$ positions 9–35 are shifted two bit positions to the right.

TABLE VII

TYPICAL FLOATING POINT ADD OPERATION

| Line | Number | Fraction Times Power of 2 | Binary Form Times Power of 2 | REGISTER CONTENTS — Register Bit Position 0; Function: SIGN | 1 → 8; EXPONENT | 9 → 35; FRACTION | | Register |
|---|---|---|---|---|---|---|---|---|
| (a) | 1/8 | $= 1/2 \times 2^{-2}$ | $= .1 \times 2^{-2}$ | 0 | 01111110 | 1000--------- | ---0 | $\underline{X}$ |
| (b) | 8 | $= 1/2 \times 2^{4}$ | $= .1 \times 2^{4}$ | 0 | 10000100 | 1000--------- | ---0 | $\underline{Z}$ |
| (c) | Result of Subtraction of Exponents $Z - X = 00000110 = 6$ | | | | | | | |
| (d) | $\underline{X}$ Register after Shift | | | 0 | 10000100 | 000000100---- | ---0 | $\underline{X}$ |
| (e) | Result of Adding $X + Z$ | | | 0 | 10000100 | 1000001000--- | ---0 | $\underline{X}$ |

A Subtract operation is performed in substantially the same way as an Add operation except that the number in the $\underline{Z}^i$ Register (subtrahend) has its sign complemented and the operation proceeds as an addition.

A Multiplication is essentially a repeated addition and a Division is a repeated subtraction.

The specific manipulation of data in the system registers is described in the subsequent description of Multiply and Divide operations. These descriptions apply, of course, to only one Arithmetic Unit wherein the various operators are stored in the $\underline{X}^i$, $\underline{Y}^i$ or $\underline{Z}^i$ Registers wherein these are the $i^{th}$ row of said registers. Thus, $\underline{X}^i$ means the data word or operator stored in the $\underline{X}^i$ Register associated with the $i^{th}$ Arithmetic Unit.

If the contents of $\underline{Y}^i$ positions 34 and 35 are "1, 1," the 2's complement of the contents of bit positions 9–35 of $\underline{Z}^i$ is added to the contents of bit positions 9–35 of $\underline{X}^i$. The sum and contents of bit positions 9–35 of $\underline{Y}^i$ are shifted right two bit positions. A "1" bit is automatically added to the multiplier before the next iteration.

Each of the Arithmetic Units in the present system operate in step but each contains sufficient local control to test bit positions 34 and 35 of $\underline{Y}^i$ and execute the appropriate operation.

Example

The number $27_8$ is to be multiplied by $33_8$. Six bit positions will be used in the example rather than the normal 36 bit positions.

| | $\underline{X}^i$ | $\underline{Y}^i$ | $\underline{Z}^i$ | Iteration | Comments | Multiply activity | Bit positions 34 and 35 |
|---|---|---|---|---|---|---|---|
| | 000000 | 010111 | 011011 | 1 | Initial contents of Registers $Y^i_{34,35}$ ready to be tested | −1X | "1, 1" |
| | 100100 | 010111 | | | $\underline{Z}^i$ complemented and sent to $\underline{X}^i$ | | |
| | *1 | | | | One added to low-order bit position | | |
| | 100101 | 010111 | | | Add to $\underline{X}^i$ | | |
| | 111001 | 010101 | | | Combined $\underline{X}^i$ and $\underline{Y}^i$ shifted two bit positions to the right. Insert ones in vacated positions at the left. This is first partial product | | |
| | 110110 | 010101 | | 2 | $\underline{Z}^i$ shifted left one bit position on way to $\underline{X}^i$ | 2X | "1, 0" |
| carry ← | 101111 | | | | Add $\underline{Z}^i$ into $\underline{X}^i$ | | |
| | 001011 | 110101 | | | Combined $\underline{X}^i$ and $\underline{Y}^i$ shifted two bit positions to the right. Insert zeros in vacated positions at the left. This is the second partial product | | |
| | 011011 | | | 3 | $\underline{Z}^i$ to $\underline{X}^i$ | 1X | "0, 1" |
| | 100110 | 110101 | | | Add $\underline{Z}^i$ to $\underline{X}^i$ | | |
| | 001001<br>1 1 | 101101<br>5 5 | | | Combined $\underline{X}^i$ and $\underline{Y}^i$ shifted two bit positions to the right. Shift counter is now at 0. This is the answer | | |

Floating multiply

The Register $\underline{Z}^i$ contains the multiplicands. The Register $\underline{Y}^i$ contains the multipliers. All Registers $\underline{X}^i$ are set to zero and multiplication proceeds. If $\underline{Y}^i$ bit positions 34 and 35 have the bit configuration 00, $\underline{X}^i$ positions 9–35 and $\underline{Y}^i$ positions 9–35 are shifted two bit positions to the right. No addition is made.

If $\underline{Y}^i$ bit positions 34 and 35 have the bit configuration 01, the contents of $\underline{Z}^i$ are added to the contents of $\underline{X}^i$ (bits 9 to 35 only of both registers). At the completion of the addition, the $\underline{X}^i$ and $\underline{Y}^i$ Registers are shifted right two bit positions (again, bit positions 9–35 of both registers are shifted).

If bits 34 and 35 of $\underline{Y}^i$ contain the bit configuration "1, 0," the contents of bit positions 9–35 of $\underline{Z}^i$ are gated into the adder displaced one bit position to the left and added to the contents of bit positions 9–35 of $\underline{X}^i$. At Proof:

$27_8 = 23_{10}$ and $33_8 = 27_{10}$
$23_{10} \times 27_{10} = 621_{10}$
$621_{10} = 1155_8$ Ans.

Inserting ones on the left shift is used in a −1X multiply activity to signal the computer that a complement addition has been performed. The one is added to the low-order position to perform a true subtraction (addition of the 2's complement).

Simultaneously with the determination of the fraction the exponents from the $\underline{Z}^i$ and $\underline{X}^i$ (positions 1–8) are added and 128 subtracted from the sum. This is because both numbers have previously been biased by 128 and this subtraction removes the double bias. The result is then placed in bit positions 1–8 of the $\underline{X}^i$ Register. Lastly 27 is subtracted from the above exponent in $\underline{X}^i$ (positions 1–8) and placed in $\underline{Y}^i$ (positions 1–8) to retain the double precision feature.

At the completion of the operation, the correct algebraic sign is affixed: If the signs of $\underline{Y}^i$ and $\underline{Z}^i$ were the same, the signs of $\underline{X}^i$ and $\underline{Y}^i$ are made positive (0). If the signs were different, they are made negative (1). It will be noted that in the above example the numbers are given in radix 8 or actual designations which is common in the IBM 7094 system.

Description

The $\underline{X}^i$ is divided by the $\underline{Z}^i$. The quotient appears in $\underline{Y}^i$ and the remainder appears in $\underline{X}^i$. The quotient is in normal form in both the dividend and divisor are in that form. If they are, the magnitude of the ratio of the fraction in the $\underline{X}^i$ to the fractional part of $\underline{Z}^i$ is less than two but greater than one-half.

Execution (1) The $\underline{Z}^i$ is placed in the Storage Register.

(2) The $\underline{Y}^i$ is cleared.

(3) The sign $\underline{Y}^i$ is made equal to the algebraic sign of the quotient. The sign of $\underline{X}^i$ remains unchanged throughout so that the signs of the remainder and dividend always agree.

(4) If the magnitude of the fraction in $\underline{X}^i$ is greater than or equal to the magnitude of the fraction in the $\underline{Z}^i$, the $\underline{X}^i$ (positions 9–35) is shifted right one position, and the exponent in the $\underline{X}^i$ is increased by one. The bit in position 35 of $\underline{X}^i$ enters position 9 of $\underline{Y}^i$.

(5) The exponent of the $\underline{X}^i$ minus the exponent of the $\underline{Z}^i$ plus 128 in positions 1–8 of the $\underline{Y}^i$.

(6) The fractional part of the dividend, which consists of the $\underline{X}^i_{9-35}$, is divided by the fraction in the $\underline{Z}^i$ and the quotient replaces the $\underline{Y}^i_{9-35}$.

(7) The $\underline{X}^i$ and $\underline{Y}^i$ are shifted left one position, creating a zero in position 35 of $\underline{Y}^i$ (2) If the magnitude of the $\underline{Z}^i$ is less than or equal to the magnitude of $\underline{X}^i$, the magnitude of $\underline{Z}^i$ is subtracted from the magnitude of $\underline{X}^i$ and a one replaces the zero in $Y^i_{35}$. Step (1) is then repeated (3) If the magnitude of the $\underline{Z}^i$ is greater than the magnitude of the $\underline{X}^i$, the computer returns to Step (1).

(8) The 27-bit remainder resulting from the division in Step (7) replaces the $\underline{X}^i_{9-35}$.

(9) The exponent in the $\underline{X}^i$ is reduced by 27.

Example

Assume we have a four-bit machine. The problem is 66 divided by 5, and the binary numbers represent the result of the described step.

| Dividend $\underline{X}^i$ | Dividend $\underline{Y}^i$ | Divisor $\underline{Z}^i$ | |
|---|---|---|---|
| 0100 | 0010 | 0101 | Initial contents. $\underline{X}^i$ less than $\underline{Z}^i$; division will take place. |
| 1000 | 0100 | | $\underline{X}^i$ and $\underline{Y}^i$ shifted left one place; $\underline{X}^i$ greater than $\underline{Z}^i$. |
| 0011 | 0101 | | $\underline{Z}^i$ subtracted from $\underline{X}^i$ and a 1 replaces $\underline{Y}^i_{35}$. |
| 0110 | 1010 | | $\underline{X}^i$ and $\underline{Y}^i$ shifted left one place; $\underline{X}^i$ greater than $\underline{Z}^i$. |
| 0001 | 1011 | | $\underline{Z}^i$ subtracted from $\underline{X}^i$ and a 1 replaces $\underline{Y}^i_{35}$. |
| 0011 | 0110 | | $\underline{X}^i$ and $\underline{Y}^i$ shifted left one place; $\underline{X}^i$ less than $\underline{Z}^i$. |
| 0110 | 1100 | | $\underline{X}^i$ and $\underline{Y}^i$ shifted left one place; $\underline{X}^i$ greater than $\underline{Z}^i$. |
| 0001 | 1101 | | $\underline{Z}^i$ subtracted from $\underline{X}^i$ and a 1 replaces $\underline{Y}^i_{35}$. |
| RMDR | Quot. | | The quotient is now complete in $\underline{Y}^i$ with the remainder in the $\underline{X}^i$. |

SECTION 5

Vector Restructuring Operation

The following descriptions of the special machine operations which will be described subsequently utilize a number of tables which it is believed will materially aid in an understanding of the particular operation involved as well as generally describe the function of the number of the system registers.

(a) Expand

This operation is one in which it is assumed that each Arithmetic Unit has a binary number stored in one of the three Data Registers in each Arithmetic Unit. For purposes of the present embodiment, this working register in the Arithmetic Unit ($i$) is the $\underline{X}^i$ Register. The number stored in the register may be any bit combination including all zeros. Thus, in the disclosed embodiment, since there are 16 Arithmetic Units each having three registers, as will be set forth more clearly subsequently, there are 16 numbers, one associated with each Arithmetic Unit stored in the particular $\underline{X}$ Register for said Arithmetic Unit. These 16 numbers are not all shown in the subsequent Table as an unnecessary amount of space is required. Only 8 such numbers are shown in the table, however, it is to be understood that whether 8, 16, 24 or any other number of Arithmetic Units utilized in a particular system that the same number of registers would be present in the overall system as there were Arithmetic Units. These numbers are shown stored in Table I in the column marked X (initial) and for simplicity they are shown as simple one digit Arabic numerals. However, in actuality, it is to be understood that they would be stored in the system as 36 bit binary numbers. As will be explained subsequently each of the Arithmetic Unit Registers is capable of Storing such 36 bit binary numbers. The Expand command given to the present system must be accompanied by a control word comprising a binary string of "1's" and "0's," which word has as many bit positions as there are Arithmetic Units and thus, rows of the $\underline{X}$ Register.

The purpose of the Expand operation is to literally expand the current contents of the $\underline{X}$ Register. This is done by taking data sequentially from the $\underline{X}$ Register and moving it to another row position of the Register and discarding the data not needed or requested. Thus, the contents of the $\underline{X}$ Register will be spread out or expanded and rows containing no data or all "0's" will be interspersed with rows containing the retained data.

Thus, in this operation the control words in the $\underline{u}$ column of Table I determines which data are to be retained and which are to be deleted. A "0" in the control word means that the corresponding row of $\underline{X}$ Register is to contain all "0's," and a "1" means that the associated row of the $\underline{X}$ Register is to contain the next data word or number currently stored in the $\underline{X}$ Register.

The function of the Expand operation will be more clearly understood by referring to Table I which illustrates just what occurs as a result of a command to Expand. It will be noted that the Arithmetic Unit numbers are given from 1 to 8. This number also specifies the particular row of the $\underline{X}$ Register corresponding to the indicated Arithmetic Unit. This number also relates to an associated bit position of the binary control word in the $\underline{u}$ Register. It will be seen from Table I that by means of the Expand operation that data stored in the first 5 positions of the $\underline{X}$ Register (initial) are expanded to fill all 8 positions of the $\underline{X}$ Register (final). As will be apparent, that last three positions originally stored in the $\underline{X}$ Register are lost or discarded during the operation. Although they are shown as "0's" in the present example they might well be any number, but in any event would be lost in the system with such an operation. Thus, the final contents of the $\underline{X}$ Register comprise initial contents of this Register before the Expand operation with certain data words deleted.

TABLE I.—EXPAND

| Row of X Register | Register Contents | | |
|---|---|---|---|
| | X (initial) | *u* | X (final) |
| 1 | 2 | 0 | 0 |
| 2 | 3 | 1 | 2 |
| 3 | 5 | 1 | 3 |
| 4 | 6 | 0 | 0 |
| 5 | 8 | 1 | 5 |
| 6 | 0 | 1 | 6 |
| 7 | 0 | 0 | 0 |
| 8 | 0 | 1 | 8 |

(b) Compress

The Compress operation is similar to the Expand operation although, in effect, is the converse of same. This operation, in effect, starts out with the X Register loaded with (up to 16) data words and by casting out certain prescribed data words, in effect, contracts or compresses the list.

What this operation accomplishes is to select certain data words stored in the X Register (these could include zeros) and move these data words so that they appear in sequential rows of the X Register beginning with row one. Data words not selected are cast out or discarded and the remainder of the X Register is loaded with zeros or no data. The control word indicates which data words are to be saved by a "1" in the corresponding bit position and which are to be discarded by a "0" in the corresponding bit position.

An understanding of this operation will be greatly facilitated by referring to Table II wherein the contents of the X Register are against represented, for reasons of simplicity, as a single digit Arabic number although the data would in actually be a multidigit binary number. The *u* Register again contains the control word expressed as a series of binary bits, one for each row of the X Register associated with each Arithmetic Unit. As in the Expand example described previously, only 8 rows are illustrated.

Thus, as will be seen in Table II, all of the numbers initially in the X Registers having a corresponding binary "1" in the *u* Register are stored sequentially as the final contents in the X Register (final). A "1" appears next to the numbers 2, 3, 5, 6 and 8 in the X Register (initial) and these five numbers are shown in the first five positions of the X Register (final).

TABLE II.—COMPRESS

| Row of X Register | Register Contents | | |
|---|---|---|---|
| | *u* | X (initial) | X (final) |
| 1 | 0 | 1 | 2 |
| 2 | 1 | 2 | 3 |
| 3 | 1 | 3 | 5 |
| 4 | 0 | 4 | 6 |
| 5 | 1 | 5 | 8 |
| 6 | 1 | 6 | 0 |
| 7 | 0 | 7 | 0 |
| 8 | 1 | 8 | 0 |

(c) Mask

In this particular operation the system again requires that a binary control word be supplied to the *u* Register wherein a binary bit position is provided for each Arithmetic Unit number or row of the X Register. However, instead of one set of numbers, i.e., the X Register, two sets of numbers are provided. These are shown as the X and Y columns in Table III. It is the purpose of this operation to modify the contents of the X Register with the contents of the Y Register under control of the contents of the *u* Register. In this operation it will be understood that the X Register is the basic register whose contents are to be altered by the contents of the Y Register. Wherever a "0" appears in the *u* Register the coitents of the corresponding ow of the X Register are not changed. Conversely, when a "1" appears in a particular position of the *u* Register, it signifies that that particular position of the X Register (final) is to be filled with the data in the corresponding row of the Y Register. Thus it may be seen that the Mask operation, in effect, modifies the contents of one Data Register with the contents of another under control of a third register.

Referring now specifically to Table III, it will be noted that the contents of the X Register (final) reflect the above conditiois wherein the 1 and 4 and the 7 stored in the X Register accompanied by a "0" in the corresponding position of the *u* Register have been retained in the X Register (final) and the numbers 10, 11, 13, 14, and 16 which were initially stored in the Y Register and which were accompanied by a "1" in the corresponding position of the *u* Register are in turn transferred to the X (final) Register.

It will also be noted that in this Table the control word appearing as coitents of the *u* Register are binary "1's" and "0's" whereas the numbers shown in the X, Y, and *a* are indicated as one and two digit Arabic numerals which, in effect, would be multidigit binary numbers in the system.

TABLE III.—MASK

| Row of X Register | Register Contents | | | |
|---|---|---|---|---|
| | *u* | X (initial) | Y | X (final) |
| 1 | 0 | 1 | 9 | 1 |
| 2 | 1 | 2 | 10 | 10 |
| 3 | 1 | 3 | 11 | 11 |
| 4 | 0 | 4 | 12 | 4 |
| 5 | 1 | 5 | 13 | 13 |
| 6 | 1 | 6 | 14 | 14 |
| 7 | 0 | 7 | 15 | 7 |
| 8 | 1 | 8 | 16 | 16 |

The above three operations constitute the more common data Restructuring operations which will be described with the present system. By such restructuring is meant the rearranging of data in the X Register into a new arrangement of data appearing as a final content of this Register. This data may then constitute individual operands for subsequent parallel operations by all said Arithmetic Units.

The new operation which will be described briefly and which is also a type of a Restructuring operation is referred to in the present description as a Sum Reduction operation.

(d) Sum Reduction operation

A Sum Reduction operation is one wherein selected operands stored in the X Register are taken out and added together to form a single result or number which is subsequently stored in the *w* Register. Again it will bemembered that an actual binary number or data word is stored in each row of the X Register and a control word having a bit position corresponding to each row of the X Register is provided which control word comprises a binary number made up of a series of "1's" and "0's." The control word is stored in the *s* Register and this register and the contents of the X Register are illustrated in Table IV.

When the Sum Reduction operation command is given together with a binary control word to be stored in the s Register, it implies that those data words stored in the X Register are to be totalized wherever a "1" appears in the associated bit position of the s Register. Thus, in the example shown in Table IV, the binary numbers shown in the s Register indicate that the numbers 1, 3, 4, 6, and 7 are to be totalized, thus producing the number 21 which is in turn stored in the w Register.

The Sum Reduction operation completes the Restructuring Operations which will be described.

TABLE IV.—SUM REDUCTION

| Row of X Register | Register contents s | Register contents X | |
|---|---|---|---|
| 1 | 1 | 1 | |
| 2 | 0 | 2 | |
| 3 | 1 | 3 | |
| 4 | 1 | 4 | w=21 |
| 5 | 0 | 5 | |
| 6 | 1 | 6 | |
| 7 | 1 | 7 | |
| 8 | 0 | 8 | |

(e) Search for Largest

This operation while very closely related to the Restructuring operations previously described is somewhat different in that it actually requires a search by a special searching circuit for the largest member of a group of numbers, Again, the numbers or data words involved are stored in the sixteen rows of the X Register associated with each of the sixteen Arithmetic Units. Depending upon the contents of the s Register which appears as a binary control word, certain of these numbers will be compared and the largest number will be transferred to the w Register. In this operation only those numbers in the X Register whose corresponding bit position in the s Register contains a "1" are considered or compared. Thus, in Table V with the contents of the s Register and X Register as shown, the numbers 2, 3, 5, 4 and a second 3 are examined and obviously the number 5 is the largest which number will be placed in the w Register. In this example it will be noted that the numbers 1, 9, and 1 stored in the first, fourth, and eighth rows of the X Register were not included in the comparison.

TABLE V.—SEARCH FOR LARGEST

| Row of X Register | Register contents s | Register contents X | |
|---|---|---|---|
| 1 | 0 | 1 | |
| 2 | 1 | 2 | |
| 3 | 1 | 3 | |
| 4 | 0 | 9 | |
| 5 | 1 | 5 | |
| 6 | 1 | 4 | w=5 |
| 7 | 1 | 3 | |
| 8 | 0 | 1 | |

(f) Search for Smallest

This operation is almost identical to the previously described Search for Largest operation with the exception that instead of the largest number of a particular group of numbers in the X Register, the smallest number of this group is searched for. Thus, again assuming the contents of the s and X Registers to be as shown in Table VI, the number 2 would be selected by the system and placed in the w Register. Again the numbers 2, 3, 5, 4, and 3 are being examined by the system since for these number the binary number "1" appears in the corresponding control word bit position stored in the s Register.

TABLE VI.—SEARCH FOR SMALLEST

| Row of X Register | Register contents s | Register contents X | |
|---|---|---|---|
| 1 | 0 | 1 | |
| 2 | 1 | 2 | |
| 3 | 1 | 3 | |
| 4 | 0 | 9 | w=2 |
| 5 | 1 | 5 | |
| 6 | 1 | 4 | |
| 7 | 1 | 3 | |
| 8 | 0 | 1 | |

It should be reiterated here that in all of the above descriptions of the Restructuring and Searching operations possible with the present system, the number of Arithmetic Units indicated in the Tables I through VI, i.e., eight, are meant to be exemplary only and in no way limiting on the system. In actuality all of the subsequent description of the system will assume that there as sixteen Arithmetic Units and, thus, sixteen separate X Registers which when combined comprise the X Vector Register. It should further be noted that the number sixteen is merely a convenient number which was chosen to be shown with the present embodiment and is not intended to be in any way limiting on the system and that every time the number sixteen is used in the present example, the symbol N could be used to speak of the more general case.

Further, it should be remembered that the X Register as well as the w Register are actual multibit registers capable of storing, for example, a 36 binary bit number. Here again the assumed number of bits for a particular number is also arbitrary and for purposes of the present invention was considered to give a sufficient degree of accuracy for performing most scientific problems. However, it will be evident that either a greater or smaller number of bits could equally well be used without effecting the basic concepts and system design.

As stated, the individual rows of the X Register making up the X Register are utilized to store multibit numbers as is the w Register; however, the u Register and the s Register are bit registers having a binary bit position capable of storing a "1" or a "0" for each X Register row or conversely stated, for each Arithmetic Unit in the system. In the embodiment shown, these registers have sixteen bit positions (seventeen in some cases) although in the Tables I through VI only eight such positions are actually shown. The storing of the "1's" and "0's" in these registers effect the gating of information and subsequent branching in a manner that will be apparent from the following subsequent detailed description of the system with reference to the logical schematic diagrams shown in the drawings and the Timing Sequence Charts which are provided for all of these operations and which specify the specific system operations performed by various timing stages.

SECTION 6

Instruction Word Format

This section describes the data and instruction word format in terms of word length, and content wherein the number of Arithmetic Units and Memory Boxes is assured to be 16.

The word length is 36 bits. The number presentation is the same as the IBM 7090 General Purpose Computer; fixed pointed is binary sign and magnitude; the floating point fraction is binary, sign and magnitude; the exponent is excess 128. (−1.0, 0, 1.0 are represented in octal by 601400000000, 000 000 000 000, and 201400 000 000 respectively.

The instructions are basically 1 address although a number of index modify instructions refer to two Index Registers. The data and instruction formats are shown in the diagram below.

DATA FORMAT

| | | | | | |
|---|---|---|---|---|---|
| 0, 1 | | 8.9 | | 35 | Bit positions |
| SGN | Exponent | Fraction | | | Floating point word. |
| SGN | | | | | Fixed point word. |
| | | | | | Index/address. |
| | | | | | Logical. |
| → 1 | —8 ——→ | 9 → | 2 | →16 → | No. of bits. |

INSTRUCTION FORMATS

| | | | | | | |
|---|---|---|---|---|---|---|
| 0 | OP | 11, | F | 14, 17, I1 | 18 35 Address | Bit positions. Scalar. |
| | OP | I2 | F | I1 | Address | Vector. |
| OP | I3 | I2 | F | I1 | Address | Index/transfer. |
| →4 → | →4 → | →4 → | 2 | →4 → | → 18 → | No. of bits. |

The described embodiment has 15 Index Registers. The I1, I2 and I3 fields of the instruction formats refer to one of these registers or, if the field is 0000, to an implicit register that contains an unmodifiable zero. The bit combination in the field $\underline{I1}$ selects the Index Register to be used in modifying the *Address* field. The instruction is then executed as if its address field contained the stated address *plus* the contents of the Index Register.

Address modification is extended to include *base address indirect* addressing. Base address indirect is specified by a "1" bit position I3 of the instruction (the right-most bit of the flag F field). An address is computed by adding the contents of the Index Register specified by I1 to the address part of the instruction to form a memory address. Bits I3–35 at this base indirect address replace 13–35 of the Instruction Register. The process then repeats—a new memory address which is computed from I1 and the address field Bit I3 is examined for another level of base indirect address. The address that comes out at the end of the chain of indirect addresses is called the *effective base address.*

Vector instructions, i.e., those that do 16 operations simultaneously, use the effective base address as the address of the first operand. The address of the second operand is determined by adding the contents of the Index Register specified by field I2 to the effective base address. Lettering $\underline{a}_0$ represent the effective base address and $i_2$ the contents of the Index Register address by I2, the *address vector, a,* is of dimension 16 and the components are ($\underline{a}_0$, $\underline{a}_0+i_2$ . . . $\underline{a}_0+15*i_2$). All values 0, $i_2$, $2^{18}$ are valid.

There is another form of indirect addressing known as *vector indirect addressing.* In this mode the address vector is used, not to address the operands directly, but to address an address vector. This mode is indicated by a "1" in bit position 12 of the vector instruction format. Vector indirect addressing does not proceed beyond 1 level; i.e., the address vector fetched from memory is used as the operand address vector without further modification. (When modification of the address vector is required it can be fetched into the $\underline{X}$ Register and treated like data.)

To facilitate programming of loops, where one is processing 16 elements at a time, two loop closing instructions, VTCU and VTCD, are provided. These instructions combine stepping an index, testing the index, and conditional branching. They are made more powerful by having them set to the "do not execute" state the screen bit of Arithmetic Units which will not participate on the last iteration when there are less than 16 items to process.

The instructtion set for VAMP has been designed for the processing of vectors in memory, including rows and columns of matrices. These will normally have considerably more components than the number of Arithmetic Units. Many operations such as Compress, Search for the Largest and Sum Reduction (sum of all components) must operate over the entire vector even though only 16 are handled at any one time. The instruction set is designed around the concept.

The instruction set for more common system positions is given below. The following Iverson Notation is used in the definitions:

| | |
|---|---|
| $\underline{X}$ | Accumulator array. |
| $\underline{x}$ | The vector of 16 numbers stored in x. |
| $\underline{X}^i$ | Row (register) i of array X. The same notation can be applied to all 2 dimension arrays. |
| $x_i = \perp \underline{X}^i$ | Number stored in acc. register i. |
| $\underline{X}_j$ | Column j of array X. |
| $\underline{Y}$ | M-Q array. |
| $\underline{Z}$ | Buffer between memory and the X and Y arrays. |
| $\underline{a}_0$ | Effective base address. |
| $\perp \underline{M}_{a_0}$ | Memory. |
| $\underline{M}$ | Word $a_0$ of memory as a bit vector. |
| $\underline{M}^a = \underline{b}$ | Words stored at locations $a_0$, $a_1$, . . . , $a_{15}$ in the memory. |
| $\underline{u}$ | Logical accumulator. |
| $\underline{s}$ | Screen. |
| $\underline{m}$ | Bit Mask. |
| $\underline{I}$ | Index register array. |
| $i_1$, $i_2$, $i_3$ | Base 2 value of the contents of index registers I1, I2 and I3 respectively. |
| $\underline{a}_0 \uparrow \underline{X}$, $\underline{a}_0 \downarrow$ $a_0 \downarrow \underline{X}$ | X, $a_0 \uparrow$ X, Shift the array $\underline{X}$ left, right, up, down $\underline{a}_0$ bits. |
| $\top a_0$ | The effective base address as a bit vector. |
| $\underline{w}^{16}/(\top \underline{a}_0)$ | The right-most 16 bits of the bit vector. |
| $\bar{a}^1/\underline{X}$, $\bar{a}'/\underline{w}$ | All except the first bit of each register of $\underline{X}$ or $\underline{w}$. |

When an instruction has an X in the *screen* column of the table which follows, it indicates that the contents of $\underline{X}^i$ or $\underline{Y}^i$ are modified only if $\underline{s}=1$.

VAMP INSTRUCTION SET

| | | Instruction Word | | | |
|---|---|---|---|---|---|
| Vector indirect addr. | Screened | OP Code | Other significant fields | Operation (All fixed point) | |
| X | X | V A D D | A, I1, F, I2 | $\underline{x} \leftarrow \underline{x}+\underline{b}$ | Add. |
| X | X | V A D M | A, I1, F, I2 | $\underline{x} \leftarrow \underline{x}+\lvert\underline{b}\rvert$ | Add magnitude. |
| X | X | V S U B | A, I1, F, I2 | $\underline{x} \leftarrow \underline{x}-\underline{b}$ | Subtract. |
| X | X | V S B M | A, I1, F, I2 | $\underline{x} \leftarrow \underline{x}-\lvert\underline{b}\rvert$ | Subtract magnitude. |
| X | X | V M P Y | A, I1, F, I2 | $\underline{x},\underline{y} \leftarrow \underline{y}*\underline{b}$ | Multiply. |
| X | X | V D V P | A, I1, F, I2 | $\underline{y} \leftarrow \underline{x}+\underline{b}$ (remainder in $\underline{x}$) | Divide. |
| | X | V A D Y | ............ | $\underline{x} \leftarrow \underline{x}+\underline{y}$ | Add. y |
| | X | V S U Y | ............ | $\underline{x} \leftarrow \underline{x}-\underline{y}$ | Subtract Y. |
| | X | V M Y Y | ............ | $\underline{x},\underline{y} \rightarrow \underline{x}*\underline{y}$ | Multiply Y. |
| | X | V D V Y I | ............ | $\underline{y} \leftarrow \underline{x}+\underline{y}$ (remainder in $\underline{x}$) | Integer divide. |
| | X | V D V T F | ............ | $\underline{y} \leftarrow \underline{x}+\underline{y}$ (remainder in $\underline{x}$) | Fractional divide. |
| | X | V R N D | ............ | Round $\underline{x}$ | |
| | X | V R N D D | ............ | Round down $\underline{x}$ | |
| | X | V R N D U | ............ | Round up $\underline{x}$ | |

VAMP INSTRUCTION SET—Continued

| Vector indirect addr. | Screened | Instruction Word: OP Code | Instruction Word: Other significant fields | Operation (All fixed point) | |
|---|---|---|---|---|---|
| | | | | Operation (All normalized floating point) | |
| X | X | V F A D | A, I1, F, I2 | $\underline{x}\leftarrow\underline{x}+\underline{b}$ | Floating add. |
| X | X | V F A M | A, I1, F, I2 | $\underline{x}\leftarrow\underline{x}+\lvert\underline{b}\rvert$ | Floating add magnitude. |
| X | X | V F S B | A, I1, F, I2 | $\underline{x}\leftarrow\underline{x}-\underline{b}$ | Floating subtract. |
| X | X | V F S M | A, I1, F, I2 | $\underline{x}\leftarrow\underline{x}-\lvert\underline{b}\rvert$ | Floating subtract magnitude. |
| X | X | V F M P | A, I1, F, I2 | $\underline{x}\leftarrow\underline{y}\times\underline{b}$ | Floating multiply. |
| X | X | V F D P | A, I1, F, I2 | $\underline{y}\leftarrow\underline{x}\div\underline{b}$ (remainder in $\underline{x}$) | Floating divide. |
| | X | V F R N | ---------- | Floating round $\underline{x}$ | |
| | X | V F R N D | ---------- | Floating round down $\underline{x}$ | |
| | X | V F R N U | ---------- | Floating round up $\underline{x}$ | |
| X | X | V F R D V | A, I1, F, I2 | $\underline{y}\leftarrow\underline{z}\div\underline{b}$ | Floating reverse divide. |
| | X | V F A L N | ---------- | Floating align $\underline{x}$ to largest exponent in $\underline{x}$. | |
| | | | | Operation (All unnormalized floating point) | |
| X | X | V U F A | A, I1, F, I2 | $\underline{x}\leftarrow\underline{x}+\underline{b}$ | Unnormalized floating add. |
| X | X | V U A M | A, I1, F, I2 | $\underline{x}\leftarrow\underline{x}+\lvert\underline{b}\rvert$ | Unnormalized floating add magnitude. |
| X | X | V U S M | A, I1, F, I2 | $\underline{x}\leftarrow\underline{x}-\lvert\underline{b}\rvert$ | Unnormalized floating subtract magnitude. |
| X | X | V U F M | A, I1, F, I2 | $\underline{x}\leftarrow\underline{y}\times\underline{b}$ | Unnormalized floating multiply. |
| X | X | V U F S | A, I1, F, I2 | $\underline{x}\leftarrow\underline{x}-\underline{b}$ | Unnormalized floating subtract. |

SECTION 7

General Description of Drawings

In the following description where a plurality of individual sheets make up a single figure only a single number will be used in referring to this figure. Thus, FIGS. 2 through 2D comprises a single logical schematic diagram will be referred to simply as FIG. 2.

FIG. 1

This figure is a logical schematic diagram showing the $\underline{Z}$ Register. It will be noted referring to the figure that this register is broken into 16 different storage positions, each of which is capable of storing a complete array word. This Register is used primarily as an input and output buffer store for Store and Fetch operations from the 16 separate Memory Boxes. The $\underline{Z}$ Register is divided into two sections indicated as the Odd Numbered and the Even Numbered section. Each section has its own Input Ring and Output Ring which are controllable separately. The $\underline{Z}$ Register is broken into the two indicated sections in order that the Memory Boxes may be accessed two at a time, said access including Storage and Readout operations. This particular organization of the $\underline{Z}$ Registers is closely related with the Address Generating system for the present disclosure, since addresses are generated two at a time and provision made for addressing memory two Memory Boxes at a time. The various OR gates and other gates perform in a completely conventional manner. The operation of each is specifically set forth in the subsequent description of the Timing Sequence Charts.

FIG. 1A

This figure is a basic block diagram setting forth the primary functional components of the present system. Referring to the figure it will be noted that there are four primary boxes. The box labeled Memory refers to that portion of the system including the 16 separate Memory Boxes and the associated controls immediately associated with each Memory Box such as is illustrated in FIG. 3.

Closely associated with the Memory is the block labeled Index and Address Unit. This block in essence performs the function of generating 16 addresses where such instruction is called for from a base address and increment ($\delta$). This section does control the addressing of the Memory Boxes on Direct Addressing operations, Indirect operations, Signal Word operations as well as the accessing of new instruction words. The majority of controls indicated in this particular block are shown in FIG. 2 which includes FIGS. 2A through 2D.

The block marked Mill represents the 16 separate Arithmetic Units and their associated controls for actually performing desired arithmetic operations such as add and multiply, divide, etc. It further includes the controls for performing the relatively complex Floating Point operations.

The block designated Data Restructuring Arithmetic Unit Control includes those controls necessary for performing the various Data Restructuring operations such as Expand, Compress, Search for Largest and Smallest, Sum Reduction and the Multiple Shift of the vector of up to 17 numbers which may be stored at any time in the $\underline{X}$, $\underline{Y}$ and $\underline{W}$ Registers. As will be explained subsequently, the $\underline{Y}$ Register is included since this register would be utilized for double precision work.

FIG. 1B

This figure represents the functional units for a single section of the Mill. As will be noted, an Adder and a single row position of each of the $\underline{X}$, $\underline{Y}$ and $\underline{Z}$ Registers are shown. This section of these registers indicates the particular row of said registers related with the particular Arithmetic Unit of the Mill. Thus, for example, if a particular Adder were that of the 8th Arithmetic Unit, this Arithmetic Unit is automatically connected to the eighth row of the $\underline{X}$, $\underline{Y}$ and $\underline{Z}$ Registers.

Figure 1:
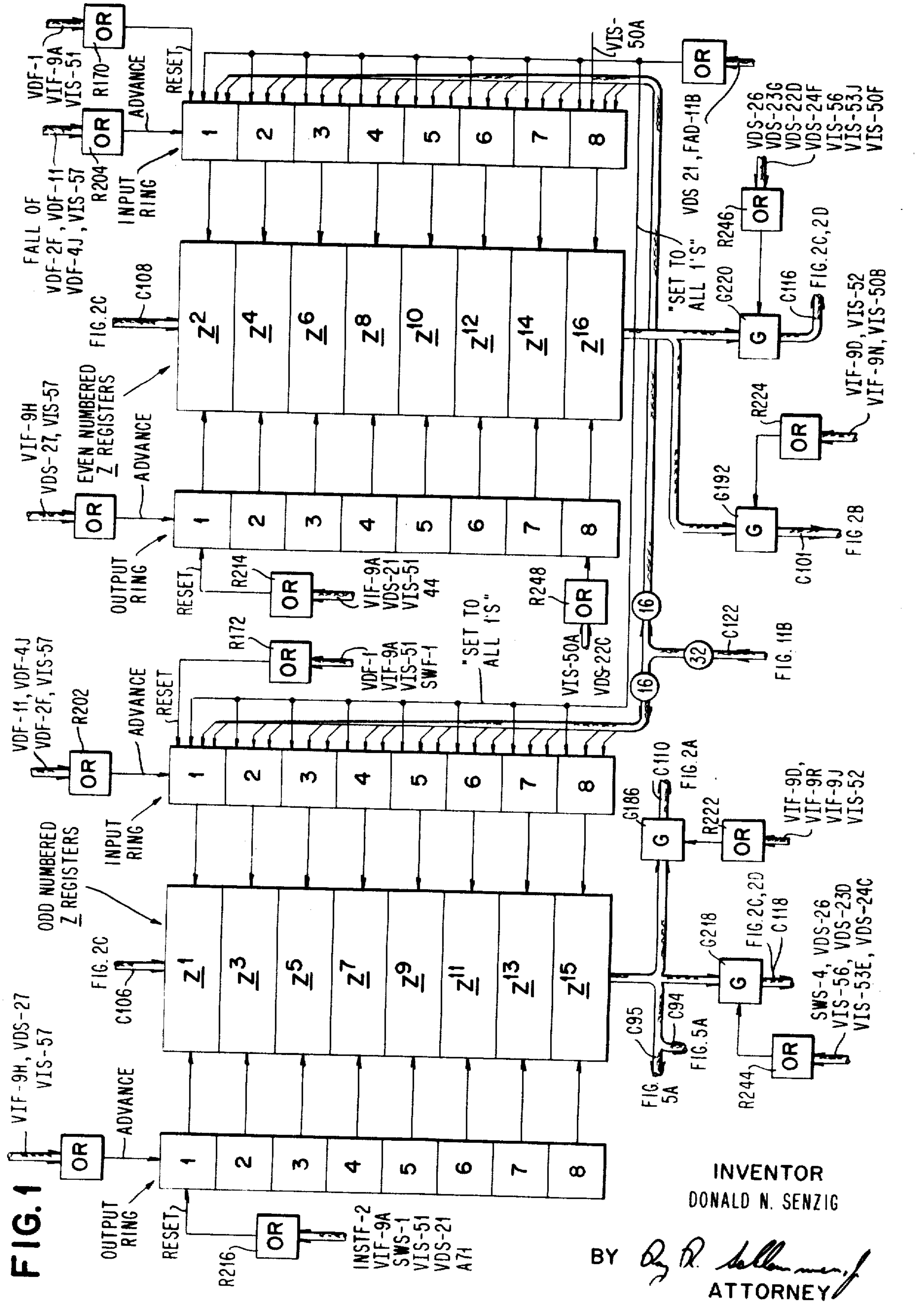
FIG. 1 is a logical schematic diagram of the Z Register and its associated Input and Output controls.
Figure 1A:
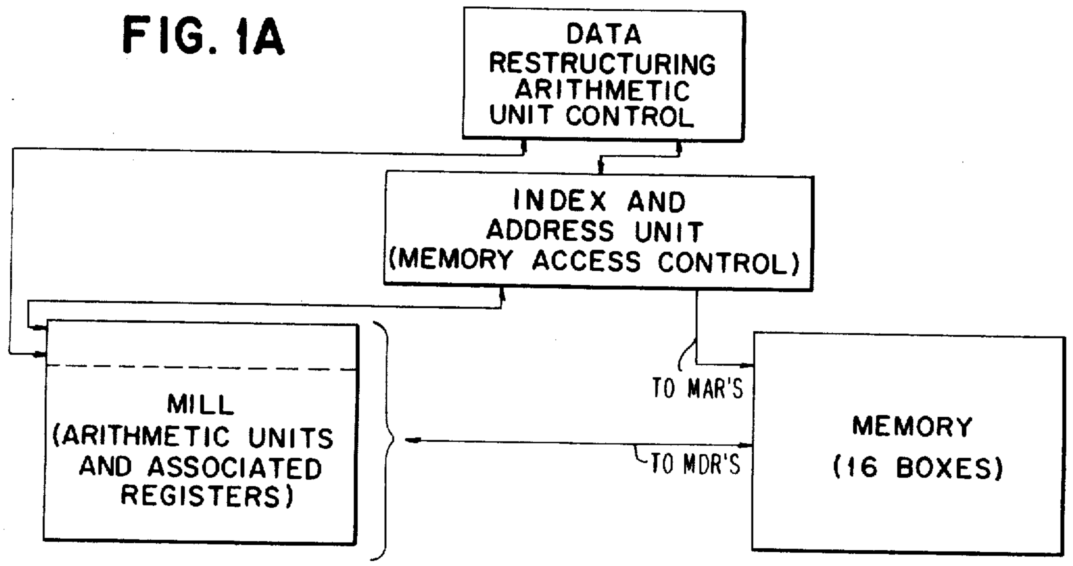
FIG. 1A is a basic block diagram illustrating the overall machine organization.
Figure 1B:
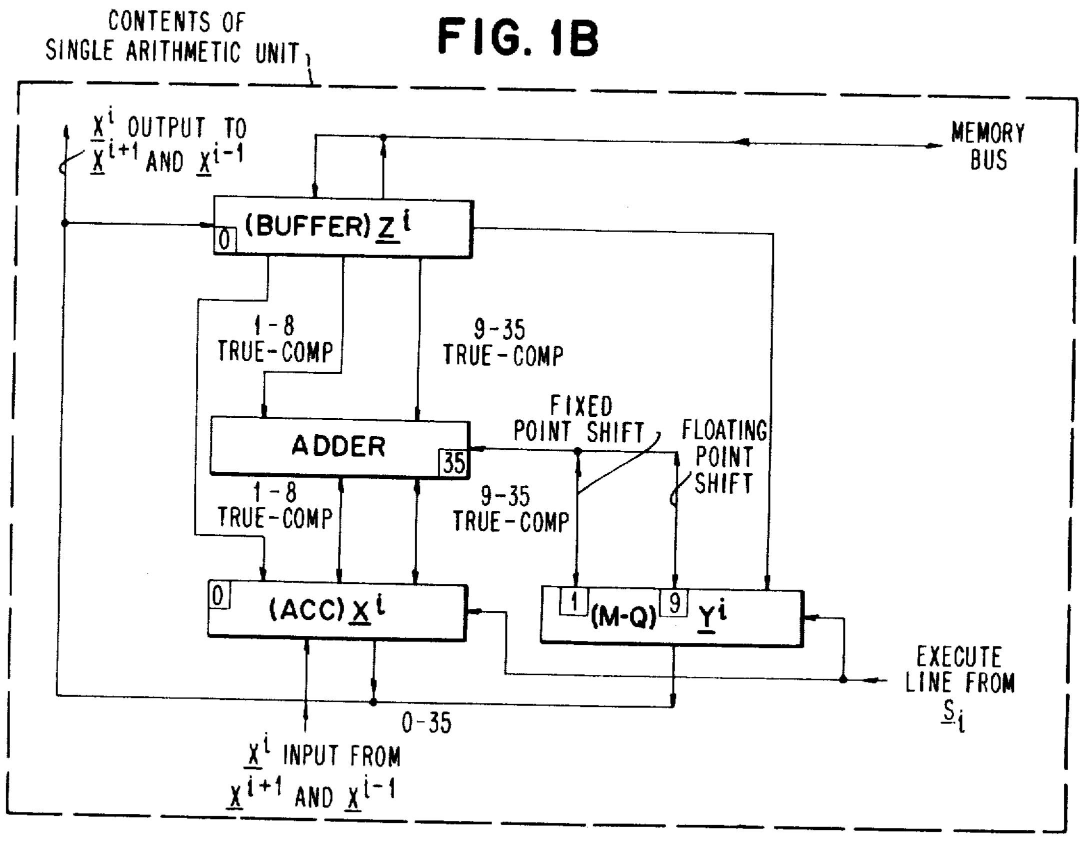
FIG. 1B is a block diagram of an individual Arithmetic Unit illustrating how certain Shifting operations are performed.

The flow chart in FIG. 1B is intended to generally illustrate the manner in which a Floating Point Addition is carried out. Referring to the figure, the three Registers $\underline{X}$, $\underline{Y}$ and $\underline{Z}$ perform the approximate functions of an Accumulator, Multiplier-Quotient, and Storage Register respectively. Within each Arithmetic Unit the actual processing is done in parallel in all bits in the registers. The number of bits per word is immaterial to the present discussion but a typical number utilized in the present embodiment is 36 bits. The $\underline{X}$ Register as the Accumulator receives the results of most arithmetic operations, i.e., from the Adder. The $\underline{Y}$ Register serves as a Multiplier-Quotient Register and holds the multiplier in multiplication and the quotient in division. The $\underline{Z}$ Register in the present embodiment is not program addressable and serves mainly as a buffer between Memory and the X and Y Registers. The first word position of the Z Register, i.e., $Z^1$ also serves as a buffer between Memory and the p, v, s and u Registers whose function will likewise be described subsequently. An instruction for loading the X or Y Registers normally transfers words from memory into the Z Registers. The words are then transferred into the X or Y Registers from the Z Registers.

In arithmetic instructions using operands from memory, the instruction results in $n$ operands being fetched into the Z Register. For an add instruction the numbers in the Z and X Registers are added and the sum placed back in X Register. For a multiply, the number placed in Z Register is the multiplicand, the multiplier is in the Y Register as a result of the previous operation. The double length product is formed and placed in the combination of the X and Y Registers with the most significant half in the X Register.

Referring specifically to FIG. 1B, it will be noted that there are certain Transfer lines shown between the X, Y and Z Registers and the Adder. It will be noted that these are marked 1 through 8 true-complement and 9 through 35 true-complement. This indicates that the various bit positions of the registers may be handled separately. The bit positions 1–8 are those positions containing the exponent and bit positions 9–35 contain the fraction. It being noted that the bit position zero, i.e, $X_0^1$ determines the sign of the number. This is the well known normalized binary format. It should be further noted that the Transfer lines are indicated as being capable of transferring a true or a complement number from the Register to the Adder. This is in order that addition, subtraction, multiplication and division may be more readily performed by the Unit. To this end a true or a complement will be transferred upon certain instructions depending on the particular type of Arithmetic operation being performed.

It will be noted referring to the Transfer lines shown adjacent to the Y Register that the lines are denoted as the Fixed Point Shift and the Floating Point Shift. It will be noted that the Fixed Point Shift enters the Y Register at bit position 1. This is because with the Fixed Point operation it is not necessary to utilize positions 1 through 8 for exponent information as will be apparent from subsequent descriptions of the certain Floating Point operations and also the general description of arithmetic operations with the present system. The output lines shown as $X^i$ Output and Input indicate that the entire contents of the X Register for any $i^{th}$ position may be transferred to the next adjacent row of the register on command.

Figure 1C:
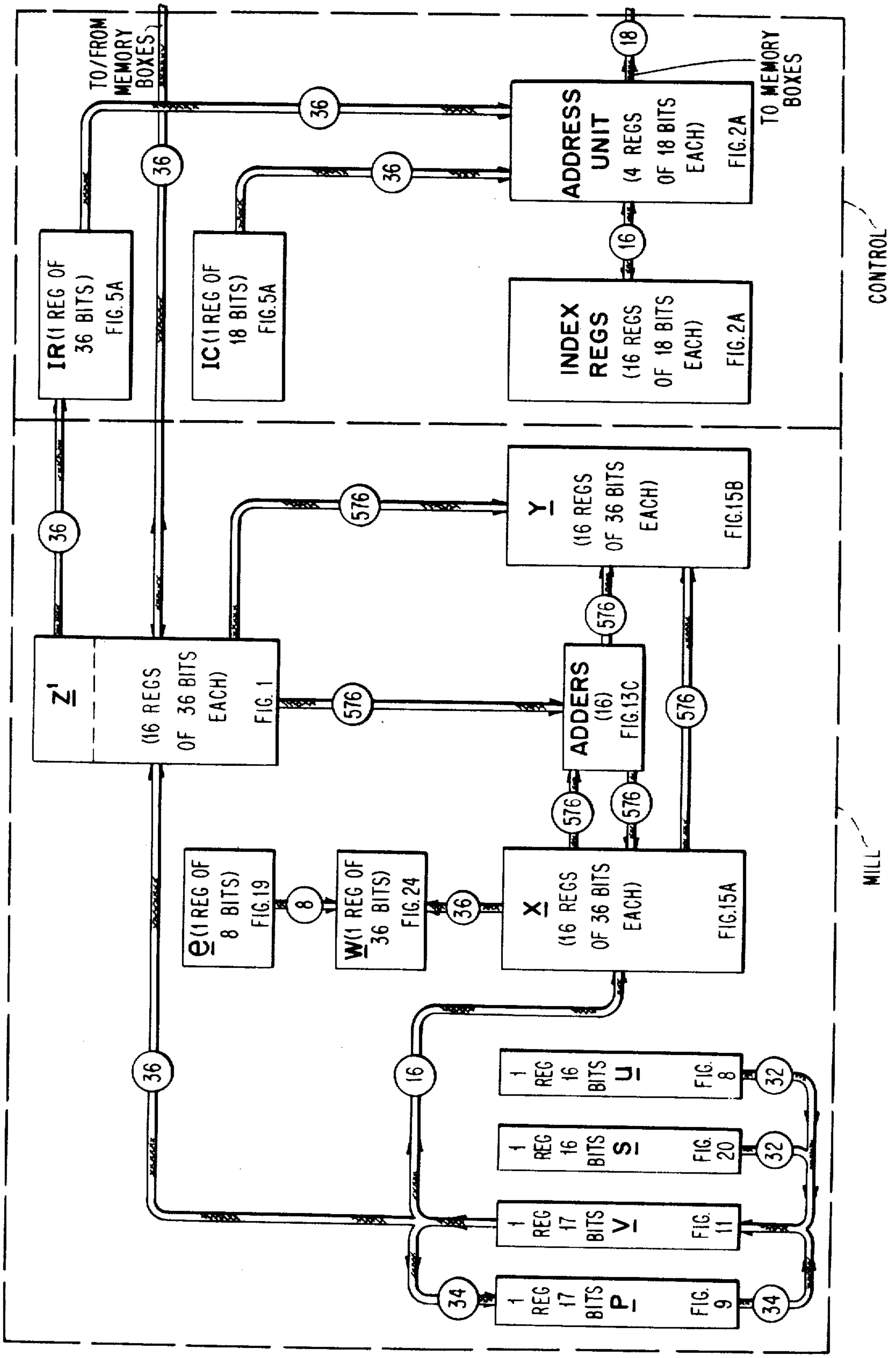
FIG. 1C is a block diagram illustrating the principal working Data Registers and Control Registers of the instant system.

It will also be noted that FIG. 1B illustrates an Arithmetic Unit and the Register word storage locations for only a single Arithmetic Unit of the Mill. It must be remembered that there are 16 of these units in the disclosed embodiment and that the memories are arranged so that all 16 rows of the X, Y and Z Registers are actually located physically adjacent one another as indicated more accurately in FIG. 1C. However, all 16 of the individual Arithmetic Units and their associated X, Y and Z Register word storage locations operate and are associated in substantially the manner set forth above.

FIG. 1C

This figure is a block diagram showing the functional inter-relationship of the Storage Registers other than the Main Memory utilized in the system both for the temporary storage of data per se and also for controlling certain system functions. Referring to the figure it will be noted that the X, Y and Z Registers are shown. These registers are the primary working Data Storage Registers in the system and serve, in essence, as the system working registers. As indicated in the drawing each of these three registers is capable of storing 16 complete data words of 36 bits each. The Adders block indicates the 16 Arithmetic Units described previously. The blocks marked Index Registers and Address Unit are essentially Storage Registers shown on FIG. 2 (2A through 2D). The Address Unit consists of the four A Registers which are utilized during the Address Generation routines.

The Index Registers are primarily utilized as will be described subsequently in the specification to modify instruction addresses.

The block marked IR and IC refer to the Instruction Register and Instruction Counter shown in FIG. 5 (5A through 5C). These registers are quite conventional in large computing systems and are utilized to temporarily store an instruction and keep track of the location in memory of the instructions which is being executed at any given time. The operation of such Instruction Registers and Instruction Counters is well known and essentially conventional in the present system.

The w Register is a single 36 bit Data Register capable of storing one data word. It is used in a number of system functions such, for example, as Sum Reduction which will be described in detail subsequently where the result of the operation is a single number or piece of data and wherein it is not practicable to store same in either of the other three primary storage registers, i.e., X, Y and Z Registers.

The p v, s and u Registers are single registers having N or $N+1$ bit storage locations wherein it will be remembered that N is the number of Arithmetic Units. In the presently disclosed embodiment, the number $N=16$ is utilized in describing the invention.

These four registers perform a number of control functions in the present system and depending upon how they are loaded, i.e., the binary bit pattern stored therein and control a number of specified operations which will be described in detail subsequently. The following is a general description of the function of these four registers insofar as it broadly describes how they are used. It should first be noted that these four registers are loaded through $Z^1$ Register word position from memory upon appropriate instruction from the given instruction in the Instruction Register.

The Registers s and u contain 16 bits each. Referring briefly back to the description of FIG. 1D, it will be remembered that for the $i^{th}$ Arithmetic Unit, word locations $X^i$, $Y^i$ and $Z^i$ correspond to the $i^{th}$ bit position of both the s and u Registers.

The btis of the s Register serve to inhibit the operation of its corresponding Arithmetic Unit. The Mill is designed to, and generally will simultaneoulsy execute the common instruction in all the Arithmetic Units. However, the screen control, i.e. the contents of s Register is provided to give the Arithmetic Unit the capability of not executing a given instruction. For example, if the given instruction specifies addition, those Arithmetic Units whose screen bit is a "1" perform the addition, those whose screen bit is "0" do not.

The Logical Accumulator, or u, Register serves to hold the results of certain logical operations and acts as a control vector in certain vector operations on the X Register. The conventional logical operations AND, OR, etc., are performed with a single word from memory and the contents of the u Register serving as operants. The result has been placed back in the u Register. Controls are also provided for testing various bit positions on the u Register. For example, tests of various bit positions of the u Register may be compared with a particular row or word location of the X Register.

The u Register also serves to control the Compress, Expand and Mask operations which were described generally in a previous section. These operations enable the user to restructure arrays of data by inserting and removing words from the X Registers.

The s and u Registers are registers whose functions are essentially visible to the programmer or from the input of the machine and words of a program may be assigned for filling these specific registers. Conversely, the p and v Registers are buried within the system and are utilized by the system as either Control Registers which are loaded from the s or u or Holding Registers which may be utilized to temporarily store and hold the contents of a previous comparison between the s, u and some other register or the like.

The v Register has seventeen bit positions, one for each row or individual word storage register of the X Register and one for the w Register. Referring briefly to FIG. 6, it will be noted that an output from v is fed into the gate circuit G60. A v Register position feeds into each bit position storage location of the entire X Register and, thus, it may been seen that unless a "1" is stored in the appropriate position of the v Register, operations will be inhibited. It will thus be seen that the v Register forms the most important single control function within the X Register. It should be noted that although the Y Register is not specifically explained in FIGS. 6 and 6A that the same controls exist for this register, i.e., a v Register bit position wil lbe fed into an appropriate gate such as G60 in each storage bit location in the Y Register.

The p Register is primarily a Holding Register. Its contents may be alternately gated directly to the v Register or into the shift control circuitry shown on FIGS. 18A and 18C. As shown in the present embodiment, the p Register may be loaded directly from the v Register, from the AND Unit shown on FIG. 12, or from the Arithmetic Units the major functional portions are shown on FIGS. 13A–13C.

FIG. 2

FIG. 2 is a composite of FIGS. 2A–2D and is shown to illustrate the way in which this functional schematic diagram is organized.

FIGS. 2A, 2B, 2C, and 2D comprise a logical schematic diagram such as is well known in the art of the Address Generation and Memory Accessing circuitry.

Starting with the left-hand portion of this drawing, an Index Register with an associated Decoder and various conventional control gates in the input and output lines to the Index Register. The use of Index Registers is conventional in the computing systems primarily for modifying the address portion of instructions and to control branching among instructions. The present Index Register operates in the same manner; that is, it is initially loaded from memory upon appropriate initializing of the system such as when the Memory Boxes are filled. Subsequently during the operation of the system the Index Registers will be addressed to obtain the address in Memory of desired data. Certain operations of the Index Registers are described subsequently in the detailed description of the Timing Sequence Charts.

The portion of the drawings appearing on the right-hand portion of FIGS. 2A and on 2B comprise the Address Generating Circuitry and include the Registers $A_0$–$A_3$ together with a number of special units such as the Address and the $\delta$ Register and the Shift block. The operation of these devices is explained in detail in the description of certain of the Memory Access cycles. The circuitry shown provides for the generation of addresses two at a time from a base address $\alpha_0$ and an address increment $\delta$. The philosophy of the Address Generation is set forth clearly in the section of the specification relating thereto.

Referring to FIG. 2C, there are shown the A Matrix and B Matrix together with their associated Input and Output Rings. The A and B Matrices and this associated circuitry including the A and B Data Decoders are for the purpose of keeping track of the sequence is which various Memory Boxes are accessed and allow for a certain amount of overlap between the generation of addresses and the transferring of data into and out of the Memory Boxes. Thus, the output of the A and B Data Decoders will select the proper gates within individual Memory Boxes to allow data to be transferred into and out of the individual memory storage locations. It will be obvious that for a given four bit address the same output or Memory Box will be selected by both, for example, the A Data Decoder and A Address Decoder.

FIG. 3

FIG. 3 is a logical schematic diagram showing the major control gates for a particular Memory Box insofar as setting up the address input and the data flow input and output paths. It will be noted that the Memory Box MAR may be loaded from either MAR–A Transfer line or from the MAR–B Transfer line. Similarly, the MDR (Memory Data Register) may be loaded from either the MDR–A Transfer line or MDR–B Transfer line. As will be explained subsequently, with reference to the specific description of the Timing Sequence Charts the provision of plural input and output lines into Memory Box is for the purpose of simultaneous Address Generation and Memory Accessing. With the system described two such Transfer lines are required. For a Four-Address Generation system, obviously, four such address and Data Transfer lines would be required. This is explained in detail in the general description of the memory addressing scheme. The additional logic in the nature of AND gates in the gate circuits would be apparent to a person skilled in the art in going from a Two to a Four-Address Generating scheme in view of the current description of the present embodiment.

The "read access," "write access," and "busy" flip-flops are shown as they are considered more important functional controls which would be utilized by the rest of the system, especially the "busy" flip-flop whose output is supplied to the circuitry shown in FIG. 23. It is, of course, apparent that the actual memory and related circuitry is a conventional three-dimensional magnetic memory containing conventional addressing circuitry, driving circuitry, sense circuitry and inhibit circuitry as is well-known in the art. Memory Boxes utilized in the present system are conventional with the exception of the controls illustrated in FIG. 3.

FIG. 4

The figure illustrates the manner in which addresses are generated by the present system. It will be noted that in the upper block entitled, Logic to Compute $n$ Addresses, two inputs are shown. These are $\alpha_0$ and $\delta$. The $\alpha_0$ is the base address and $\delta$ is the address increment from which additional addresses may be generated from the base address $\alpha_0$. The $n$ in the present embodiment is equal to the number of Memory Boxes which is also equal to or greater than the number of Arithmetic Units. This number is 16 in the present embodiment. Thus, the output from the uppermost block in the figure is 16 separate addresses which are utilized to address the Memory Boxes. The addressing of these memories is shown in the box marked Routing to MAR's. It will be noted that there is as output line from this box to each of the Memory Address Registers for each Memory Box. This situation applies to both the direct and indirect modes of addressing in the present system. The lower box marked "Routing to Z Register" indicates the switching that is necessary in routing data from an individual Memory Box through its associated Memory Data Register into a particular location of the Z Register. As will be apparent, the routing can either be to or from a given Memory Box depending upon whether a "write" or "read" operation is being performed. It will further be noted that there are $n$ lines to the Z Register which contains $n$ Word Storage Registers.

Referring again to the box marked, Routing to MAR's, it will be noted that provision is made for an input from the Z Register (vector indirect mode). This describes the Memory Addressing operations during the Indirect Addressing Scheme. The Direct and Indirect modes are described is detail in the subsequent description of the Timing Sequence Charts. However, what is involved briefly in the Direct mode is that the 16 memory addresses are generated directly from the base address $\alpha_0$ and the address increment $\delta$. In the Direct mode of operation these generated addresses are utilized directly to obtain data from memory. That is to say, data will be stored at the location specified by the generated addresses. In the Indirect mode, however, the information stored in memory at the addresses obtained from the Address Generation circuitry are in turn addresses which are subseqently utilized by the system to obtain the actual data. Thus, in the Indirect mode of operation 16 addresses are first generated and these addresses utilized to obtain words from memory which words are then routed to the $\underline{Z}$ Register upon the termination of the initial Addressing cycle; and subsequently, the addresses are routed from the $\underline{Z}$ Register to the individual Memory Box Memory Address Registers and the data obtained therefrom routed back into the $\underline{Z}$ Registers.

Another common Addressing routine utilized in the present system is the single-word operation wherein a single address is utilized to address the bank of memories to obtain only a single word, such for example, as an instruction word which is to be placed in the Instruction Register. Again, the specific details of this routine will be completely described subsequently in the description of the Timing Sequence Charts.

FIG. 5

This figure comprises the logical circuitry closely associated with the Instruction Register, its associated Instruction Decoder Register and various closely related logic circuitry which is utilized for the purpose of initiating various control sequences in the present system. Referring specifically to the drawing it will be noted that FIG. 5 is a composite showing the arrangement of the drawings of FIGS. 5A through 5C. As stated previously, the primary individual function of the unit on this particular figure is the Instruction Register and its associated Instruction Decoder Register. It will be noted that there are multiple outputs from the Instruction Register Decoder. The nature of these outputs is shown in the following table:

VSTY—Store $\underline{Y}$.
VSTX—Store $\underline{X}$.
VSSM—Search for the smallest number of a vector.
VSLG—Search for the largest number of a vector.
VRFSM—Perform a Floating Point-Sum Reduction upon a vector of numbers.
VCMPS—Perform a Compress operation upon a vector.
VEXPD—Perform an Expand operation upon a vector of numbers.
VUSM—Subtract the magnitude (absolute value) of the vector in memory for the $\underline{X}$ Register. The result is not normalized.
VFSM—Same as VUSM except the result is normalized.
VUAM—Add the absolute value of the vector element in memory to the contents of $\underline{X}$. The result is not normalized.
VFAM—Same as VUAM except normalize the result.
VUFS—Algebraically subtract the vector in memory from the contents of $\underline{X}$. The results are not normalized.
VFSB—Same as VUFS except that the result is to be normalized.
VFAD—Algebraically add the vector in memory to the content of $\underline{X}$. The result is normalized.
VUFA—Performs a Floating Point Add operation as above wherein the result is not normalized.
VUMO—Performs a search for the Uppermost (position with smallest index) One in a given bit position in the vector $\underline{u}$.

The Instruction Counter Register shown in the upper left hand corner of FIG. 5A is a conventional Counter and is used primarily to keep track of the main instruction program as is conventional and well-known in the art. Its input and output are indicated generally in the figure.

The remainder of the functional units of FIGS. 5A through 5C comprise various logical functional blocks such as AND, OR and gate circuits, whose function is clearly implied from the inputs and outputs shown on the drawing. The various flip-flops (FF) are Control flip-flops which are set to their "1" or "0" state by various control conditions, whether it be the detection of a particular operation detected by the Instruction Decoder Register or the setting of such a flip-flop from a particular clock sequence. Thus certain of these flip-flops represent the entering of common subroutines necessitated by various enumerated operations such as specified by the output of the Instruction Decoder Register, said operations being listed in the above table. An example of such a subroutine flip-flop is the Floating Point Shift flip-flop shown in the right hand portion of FIG. 5B. The setting of this flip-flop to a "1" causes entry into the FPS Clock which is necessary for performing Floating Point operations as will be understood. Most of the flip-flops shown on FIG. 5C are of a similar nature. That is, the setting of one of these flip-flops to a "1" causes entry into a system subroutine. The particular clock sequences of the subroutines are listed in the Timing Sequence Charts and the specific operation of the system in performing these subroutines is set forth in detail in the description of the Timing Sequence Charts subsequently in the specification.

FIG. 6

This figure illustrates a specific bit storage cell or location for the $\underline{X}$ Register. It should, thus, be noted that the entire $\underline{X}$ Register would be made up of sixteen rows wherein each row would be composed of 36 individual storage cells and associated logic circuitry of the type shown in FIG. 6. Further, the $\underline{Y}$ Register would be constructed in substantially the same manner.

Referring now specifically to FIG. 6, the primary storage element is the flip-flop denoted $\underline{X}_i^k$. It will further be noted that this flip-flop has three possible inputs, a "set to '1'," a "set to '0' " and a complementing input, any one of which may be energized upon demand from the gate circuit G60. The "Intermediate Storage" flip-flop shown beneath the main Storage flip-flop is for the purpose of performing Shifting operations and holds a particular piece of information for a short period of time during such operations as will be understood. The various other logic circuitry illustrated is quite conventional and the specific operation is cletrly set forth in the subsequent description of the Timing Sequence Charts where a number of operations are described.

It should be noted as is stated subsequently, that the present configuration shows the circuitry only for shift left and shift right for (1 bit). There would be similar direct connection lines for shifting both left and right 2 bits, 4 bits and 8 bits. However, these are not specifically shown as they would merely complicate the drawing and would be apparent to one that is skilled in the art. They would differ only in that the particultr lines would connect to storage positions 2, 4 and 8 positions removed rather than one storage position.

FIG. 6A

This figure is an organizational drawing showing a plurality of bit storage locations in the $\underline{X}$ Register. Each of the large blocks represents that portion of a bit storage location shown in the dotted portion of FIG. 6. This figure illustrates in a general way the controls for a shift-up, a shift-down and a one-bit shift to the right or to the left. The bit storage position shown in the center of the drawing represents the bit in row K and column $i$. Thus the upper row is $k-1$ and the lower row is $k+1$, and similarly, the column to the left is $i-1$, the column to the right is $i+1$. It will further be noted that each of the individual discharge locations illustrated has four gate circuits and two OR circuits. These are for the general function, as follows:

Gate circuit G125 is energized when it is desired to effect a shift to the left of 1 bit position. Gate circuit G124 is energized if it is desired to shift to the right by 1 bit position. Similarly Gate circuit G74 is energized if it is desired to shift up by one row and Gate circuit G75 is energized to shift down one row. OR circuit 54 is the input to set the particular Storage flip-flop to a "1" and OR circuit R56 is utilized as the input to set the storage flip-flop to a "0." As stated previously, only one gate circuit each of G125 and G124 is shown for a shift left or shift right of one bit position. It will be understood that an additional gate circuit and lines would be needed for effecting the needed multiple shifts, i.e., 2, 4 and 8 bits such as would be necessary for shifts of greater than one bit. However, the circuitry for accomplishing this would be obvious in that it would comprise a gate circuit and direct connecting lines to the left or to the right the appropriate number of bit positions.

FIG. 7

This figure is a logical schematic digram of a control element used with the present system referred as to the Counter J. This Counter is merely used to keep track of certain operations being performed by the system and for example in a given loop type of operation such, for example, as Search for Largest or Smallest, Floating Sum Reduction, Floating Point Shift, Vector Expand, Vector Compress, and Floating Point Add operations. The Counter is incremented each time a loop is entered and usually at the end of the loop the current setting of the Counter is tested such as by means of the gate circuits shown immediately below the Decoder and the setting of the Counter J will determine whether a particular sequence has been completed or whether the loop must be re-entered. Again the description of the manner in which this Counter is used will be very clearly described in the description of the Timing Sequence Chart.

FIG. 8

This figure is a logical schematic diagram showing the details of the $\underline{u}$ Register which is utilized in a number of the system operations. A sixteen bit number may be stored in the Register flip-flops $\underline{u}_1$ through $\underline{u}_{16}$. It will be noted that the controls include the $\underline{u}$ Output Ring which is setable to a "1" and may be advanced in accordance with the input pulses applied to the "Advance" line. By examining this figure it will noted that the contents of this register may be gated out one bit position at a time through either the gate circuit G68 or G56 or it may be gated out the entire register at a time through the gate circuits G64 or G150 under control of the indicated system clock pulses. Again the specific details of the operation of the $\underline{u}$ Register and its associated controls are set forth in the subsequent description of the Timing Sequence Charts.

FIG. 9

This figure is a logical schematic of the $\underline{p}$ Register and its associated controls. Like the $\underline{u}$ Register, the $\underline{p}$ Register comprises a series of Storage flip-flops, i.e., 17 in this case, indicated in this case $\underline{p}_0$ through $\underline{p}_{16}$. It will be noted that the Storage flip-flops may be loaded or set from a plurality of sources and that similarly the outputs may be taken off and routed to a number of different points. It will be noted particularly in the bottom of the figure that logical control circuitry is shown for the existence of a "1" in any of the register storage locations at any given time. This is done by bringing the "1" side only of each of the flip-flops into a cable and routing them into the OR circuit 96. Subsequent tests are made on the output of this OR circuit as clearly indicated in the drawing and as is described subsequently.

FIG. 10

This figure is an exemplary logical schematic diagram of one of the System Blocks. Each of the blocks comprises a single-shot multivibrator having a distinct turnon pulse and a turnoff pulse spaced therefrom. Referring to the drawing of FIG. 10 it will be noted that a listing is included of all the circuit components in the various figures to which the various illustrated pulses are routed. The arrow coming out of the top of each of these single shot boxes represent the turnon pulse and the arrow coming out of the side of the box represents the turnoff pulse. It will be noted that certain of the turnoff pulses proceed directly to the next box whereas others go elsewhere. In the latter case, the turnoff pulse is usually applied to some sort of gate circuit or the like, which tests the setting of a particular flip-flop or other condition indicating block and, thus, the clock sequence can be branched appropriately. For clock stages SWF–3 or SWF–4 may be initiated depending upon the input to G14 on FIG. 23C at the time SWF–2 is applied thereto.

FIG. 10, the Single Word Fetch Clock, is the only one of the system clocks which is shown in detail as it is believed that this figure together with the Timing Sequence Charts in which each system of clock stage operation is shown and described in the greatest detail together with the actual description of the Timing Sequence Charts makes the operation of the present system very clear and unambiguous and the showing of a separate figure for each clock of the nature of FIG. 10 would not add materially to the present specification.

For example, in the Timing Sequence Charts the functions that must be performed by each and every clock stage are clearly set forth and also it is indicated whether the turnon or the turnoff pulse of a particular clock stage is to perform the particular operation. Subsequently, in the description of the operations referring to the Timing Sequence Charts, a specific reference is made to the particular circuit element in the drawings to which a given clock pulse must be applied in order to perform a particular specified operation.

FIG. 10A

This figure is a functional block diagram illustrating all of the individual clock sequences which are specifically described in the Timing Sequence Charts. The abbreviations used in this figure are explained in the List of Abbreviations immediately preceding the Timing Sequence Charts. A block is shown in the figure for each of the individual clock sequences and the drawing is separated by means of the dotted lines to indicate the different types of control operations performed by the different clock sequences. For example the STA, INSTF and EA Clock sequences are part of the Instruction Accessing and Control sequence of events in which the system operations are initiated and instructions obtained in accordance with program control. The block marked Instruction Register and Controls is shown since this integral part of the system obviously decodes various instruction words and initiates particular clock sequences. The section marked System Operations indicates the actual arithmetic operations and Data Restructuring operations which involve the performance of arithmetic operations or the moving of data around within the system to, in effect, restructure or reorganize same for some subsequent type of operation.

The section marked Memory Operations are those involving Memory Store and Fetch sequences and include operations necessary to generate addresses in memory and routing of data to and from memory.

Interconnection lines have not been shown on the drawing as it would be sufficiently interwoven to render the drawing unclear. It is obvious however, that a memory operation or more than one memory operation will be necessary in performing Instruction Accessing operations and most of the System operations specified.

Similarly, the Floating Point Shift Clock sequence (FPS) is a necessary step in most of the vector arithmetic operations such as Floating Point Add, Floating Sum Reduction, Compress and Expand, etc. It should further be noted that a specific clock sequence is not necessarily provided for all of the operations illustrated in FIG. 5 as an output from the Instruction Register Decoder since the individual clock sequences shown, such as FAD, make tests to determine whether or not a normalized or unnormalized result is necessary for a particular operation, etc. Again the specific tests of all such conditions is described in detail in the description of the Timing Sequence Charts.

FIG. 11

FIG. 11 is a composite showing the arrangement of FIGS. 11A and 11B. FIGS. 11A and 11B are a logical schematic diagram illustrating the major components of the $\underline{v}$ Register and showing the Counting Network and the Uppermost Circuit in block form and illustrating this relationship to the $\underline{v}$ Register. The $\underline{v}$ Register as with the other special purpose registers previously described, comprises a series of individual bit storage flip-flops, in this case 17, $\underline{v}_0$ to $\underline{v}_{16}$. Various logic for inputing information into the register 17 bits, at a time, is shown as well as logic including the $\underline{v}$ Input Ring for storing information in this register a single bit at a time. More detail of the Counting Network and Uppermost Circuit is shown in FIG. 14. It will be noted that the $\underline{v}$ Register has a great many inputs and outputs since this register is utilized in a great many of the system functions the more important of which is the control $\underline{X}$ Register which must have an input to every bit storage location from the $\underline{v}$ Register for any of the register functions such as shifting, transfer, etc., to occur.

FIG. 12

This figure is a logical schematic diagram of the AND Unit. This circuitry performs the functions of ANDing or ORing up to 17 pairs of bits. This unit is utilized in a wide variety of system operations as may be readily ascertained from the clock pulse inputs to the various control gates such as the OR circuits R80 and R82. For example in a Floating Point Shift operation for any given segment of data, if it were desired to know whether or not a particular piece of data stored, for example, in one of the rows of the $\underline{X}$ Register would require shifting, a mask bit would have to be examined to determine whether or not it is desired to utilize this particular piece of data in an operation and then subsequently determine whether or not the radix point and exponent for the data were such that a shift is required. Thus, if a "1" is ascribed to each of these two positive conditions, an output from the particular position of the AND Unit would indicate that the data is to be used in a subsequent operation and that is does require shifting. This output may be appropriately stored in the $\underline{v}$ Register, where, as will be described subsequently, it will be used to control Shifting operations. A similar type function is obtained from the OR gates included in each of the bit positions of the AND Unit, again, as will be described subsequently.

FIG. 13

FIG. 13 is a composite showing the arrangement of FIGS. 13A through 13C. This figure, i.e., 13A through 13C is a logical schematic diagram of the actual Floating Point Add Unit of the present system that shows the first and 16th Arithmetic Units, it being understood, of course, that numbers 2 through 15 are identical to the two shown in the drawing. Each of the Arithmetic Units consist essentially of the following major sections. The first is the Sign Compare Block wherein the sign bits with two numbers to be added are compared to determine whether a true addition or subtraction by means of addition of a complement is to occur and an appropriate Carry Control flip-flop may be set to control the subsequent operation. Next is a series of gates on FIG. 13A, marked True $\underline{Z}$ Sign, True $\underline{Z}$ 1–8, True $\underline{Z}$ 9–35, etc., to True $\underline{X}$ 9–35.

As is clearly indicated in the drawings, these gates are connected to various bit positions of the $\underline{Z}$ and $\underline{X}$ Registers and are, thus, capable of transferring the particular bit positions through their respective output cables to the Exponent and Fraction Adders. The box marked Zero's is for the purpose of specifically introducing Zeros as a desired addend or augend as an input to the Exponent Adder as will be explained subsequently. All of the other OR circuits, AND circuits, gate circuits (G), flip-flops (FF) etc., are well known functional blocks whose specific operations are specifically described in the subsequent description of the Timing Statements Charts.

Referring specifically now to FIG. 13B, a section including the AND circuits A142, A144, A146, A148, A150, the gate circuits G266, G284, G296, G298, G300, G302 and the blocks indicated as the digit 2's complement the binary numbers, the digits 1, 2, 4, 8, 16 and 27 are shown. This section of the circuitry is not repeated for each of the 16 Arithmetic Units but is a single unit whose output feeds in parallel into all 16 of the Exponent Adders. Whether all 16 of the Adders utilize these inputs to modify exponents will, of course, be under control of the system and additions will or will not be performed in accordance with other information placed in the system as will be clear from the subsequent descriptions. Generally, however, it will be remembered that arithmetic operations occur simultaneously in all 16 Arithmetic Units and also in the registers insofar as shifting is concerned. The shifting operations are performed in accordance with tests made on a particular order of the exponent binary bits. That is, shifting will occur, for example, in all numbers wherein a shift of, for example, 4 is required.

The circuitry shown in FIG. 13 is capable of performing all of the Floating Point Addition described with the present system and necessary in accordance with the clock requirement as specific in the Timing Sequence Charts. It is of course, apparent that multiplication and division may be performed by the same logical circuitry shown in FIG. 13 with the provision of appropriate system clocks for performing these operations. The additional functional circuitry i.e., AND circuits, OR circuits and gate circuits necessary to perform these operations is considered trivial and within the knowledge of one skilled in the art and is not shown and explained specifically as it would needlessly complicate the disclosure of the present system. The principal factors, of course, are the fact that all such operations may be performed in parallel, i.e., 16 at a time wherein the data is gated in parallel to the Arithmetic Units and the results are gated out of the Arithmetic Units in parallel and back into the registers.

FIG. 14

FIG. 14 is a composite showing the arrangement of FIGS. 14A–14D. This set of figures is a logical schematic diagram showing the details of the Counting Network and the Uppermost Circuits.

The Counting Network as will be explained subsequently is used in the Sum Reduction operation where it is desired to add the 16 numbers appearing in the $\underline{X}$ Register together concurrently. The way in which the operation is performed is that all of the numbers to be added are brought in the Counting Network a column at a time, that is, the equivalent word bit position such, for example, as the 4th bit in all numbers is brought in the horizontal lines from a $\underline{Z}$ Register where such column is temporarily stored on the transfer from the $\underline{X}$ Register. As each column is added an output on one of the lines marked Zero to 17 at the bottom of FIG. 14B will occur depending on how many "1's" appeared in a particular column. Thus, it may be seen that the Counting Network merely comprises a Counting Tree having up to 17 binary inputs and Zero through 17 possible outputs. The output lines are brought in the Uniary to Binary Encoder shown on FIG. 11B and in turn is transferred into the Tree Accumulator. Then as the operation is continued, that is, through all 27 bit positions of the fraction portion of the numbers to be added, each of the results from each column will be detected and accumulated in the Accumulator and at the end of the operation an output will be obtained from same and the results shifted into the *w* Register which is shown in block form on FIG. 11B and in detail in FIG. 24.

The Counting Network as may be seen merely comprises an interconnected array of AND circuits wherein the occurrence of a "one" or a "zero" appearing on the horizontal input lines routes a signal appearing at the input of the OR circuit R150 down through the Tree Network and, thus, brings up the appropriate output line. The actual operation of such Tree Circuits is thought to be well known and quite apparent from the logical schematic diagram shown.

Figure 14D:
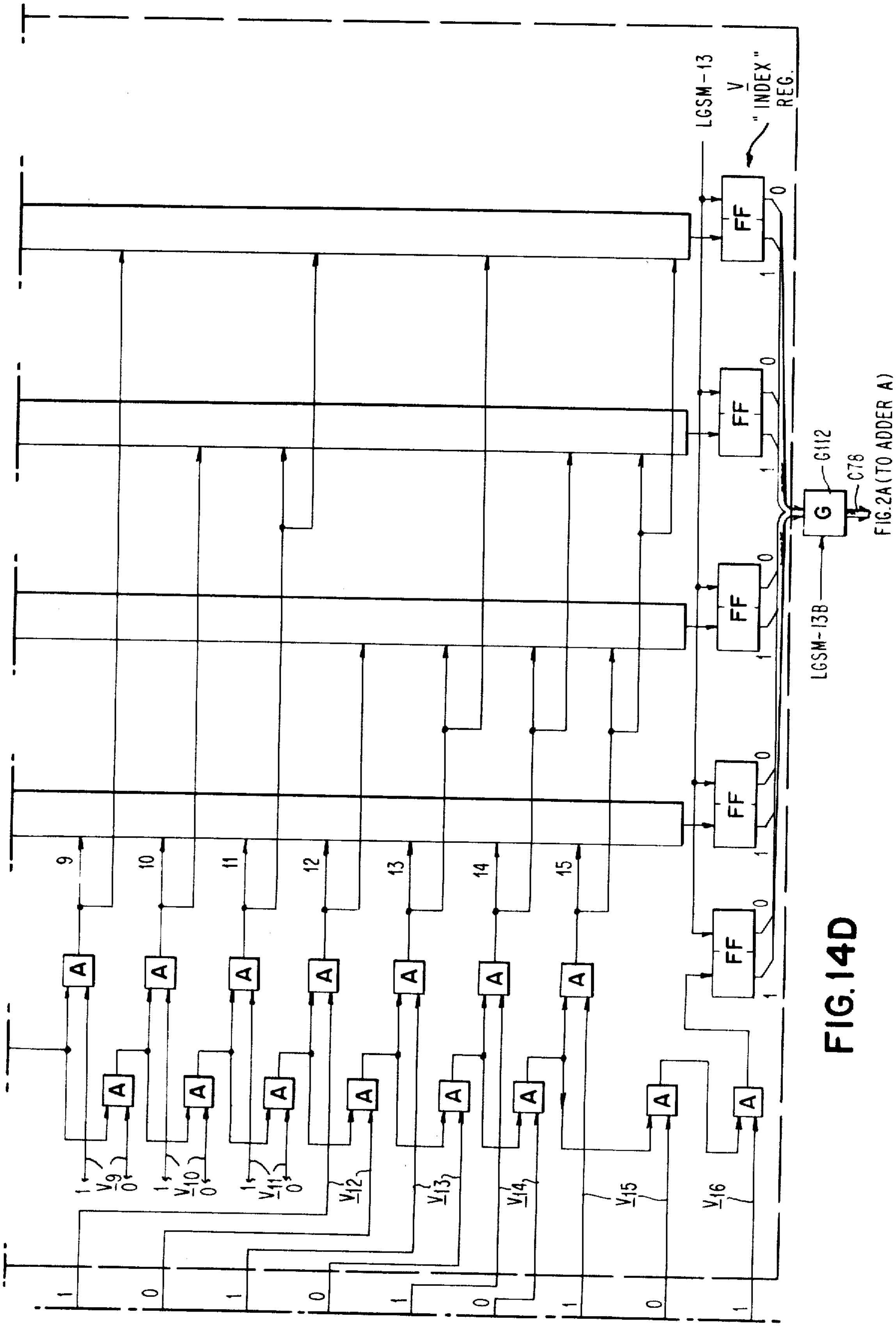

The Uppermost Circuits shown in FIGS. 14C and 14D comprise a decoding network used in the Search for Largest-Smallest operation when it is desired to locate that bit position of the Z Register having a first "1" going from the $V_1$ bit position. If for example zeros were stored in bit positions $V_1$–$V_3$ and a one were stored in a $V_4$, the "1" signal appearing on the appropriate line would be applied as one input to the AND circuit A43 the other input to which would be received from the AND circuit A45 whose output is energized by the occurrence of the previously mentioned "zeros" stored in the preceding bit positions. The output from A43, thus, provides an input to the OR R110 whose output is connected to set the associated flip-flop to a "1." Thus it may be seen that a binary number will appear in the *v* Index Register representative of the numbered position, i.e., $V_1$ through $V_{16}$ in which the first "one" is stored. It will be apparent by studying the circuitry of the Uppermost Circuits drawing that the occurrence of the first "one" prevents the energization of any of the subsequent lines going into the OR circuits R108, R110, R112 or R114.

FIGS. 15 through 15B

FIG. 15 is a composite showing the relative location of FIGS. 15A and 15B for purposes of assembly. This drawing is a logical schematic diagram illustrating the interconnections of the X, Y aid Z Registers. In these drawings the registers themselves are shown in functional block form and the various columns and rows of these registers are clearly indicated. Also the major peripheral control units for the X Register are shown such as the X Column Complement Selector which selects which column of the X Register is to be gated out to other sections of the system in complement form. The X Column Reset Selector selects the particular column of the X Register which is to be reset to "0's" upon command. The X Column Input Selector selects which column of the X Register is to have new data inserted therein. The X Column Output Selector which is also shown on FIG. 24 controls the selection of a particular column of the X Register which is to be gated out to, for example, the *v* Register where it is to be used in various machines operations. Also Input Control lines corresponding to the above enumerated control units for the X Register are shown such as the X Column Reset line, X Row Reset line, X Row Complement line, X Column Complement line and X Column Output line.

As stated previously, the present systems will operate by providing such a high degree of control for only the X Register, however, it will be understood that such controls may similarly be provided for the Y Register to extend the versatility of the present system within the teachings of the present invention.

Various AND, OR and gate circuits shown operate in a completely conventional manner and the control pulses applied to these various logical circuit elements are clearly set forth in the figures and described in detail in the subsequent description of the Timing Sequence Charts wherein the specific operation of the system is described.

It should be noted that only those sections of the Z Register are shown in this drawing necessary to generally describe data transfer between the X, Y and Z Registers. The additional details of the Z Register are shown in FIG. 1 and the logical circuitry included therein completely described in the section relating to various memory operations.

FIG. 16

This figure is a logical schematic diagram of the 28 Input AND Unit. As will be noted, there are 16 of these units marked $X^1$ through $X^{16}$.

As is explained in detail in the Floating Point Add operation description subsequently, these units are utilized during certain operations when it is desired to normalize a result and are utilized to test the fraction bits of the X Register to determine if a true zero is stored therein. As will be appreciated, if a true zero is stored therein it will not be possible to normalize such a number and the result of this test prevents the system from attempting to normalize same. A test is made by gating all of the "0" positions of the various rows of the X Registers into the digits 28 Input AND Units together with the "1" posiion of the appropriate bit position of the *s* Register. If an output is obtained it indicates that all zeros are stored in the X Register and further that this is an active position in the particular computation being made. The function of all of the logic circuits shown in the figure is quite conventional.

FIGS. 17 through 17B

Figure 17A:
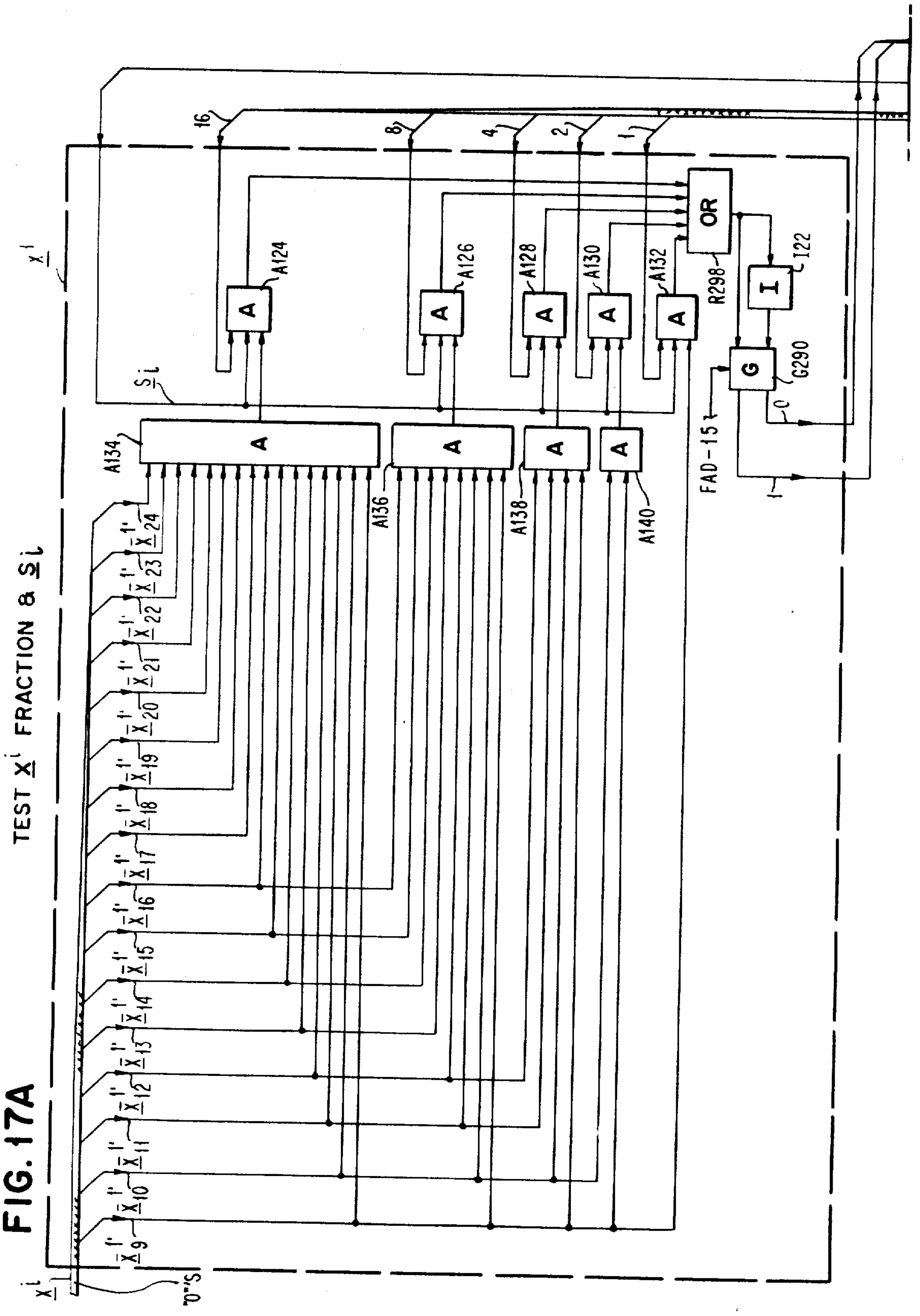

FIG. 17 is a composite drawing showing the relationship of FIGS. 17A and 17B. FIGS. 17A and 17B comprise a logical schematic diagram of a major segment of the shift testing and control circuitry utilized in Normalizing operations performed on the present system. The circuitry is somewhat similar to that of FIG. 16 in that it comprises a plurality of AND circuits for testing for "0" bit positions in the left hand fraction bits of the numbers stored in the X Register. FIG. 17A shows the logical detail circuitry for testing one row of the X Register. The circuitry shown within the dotted portion of FIG. 17A is replicated in each of the large boxes shown in FIG. 17B. As will be appreciated from the description of the Floating Point Add operations requiring normalization, all of the zeros in any number may be removed by successively testing the number for "0's," shifting the contents of the register appropriately and appropriately adjusting the exponent bits.

FIG. 18

FIG. 18 is composite drawing illustrating the organization of FIGS. 18A through 18C. These figures represent a logical schematic diagram of that portion of the system utilized primarily for effecting the Shifting operations. As will be noted, there is a separate section for each row of the X Register. This includes a Compare Unit, a gate G284, AND circuits A114, R116 and A118, OR circuits R–284, R–130, R–132, flip-flop F–12, single shot S–2, etc. There are 16 such sections as indicated in the drawing, particularly FIG. 18A, each having an input from the "0" bit position of each row of the X Register. Thus the first Compare Unit has an input from the $X_0{}^1$ bit position, and so forth.

Referring now to the bottom of FIG. 18A and to FIG. 18C there are shown two blocks labelled Multiple Shift Right Unit and Multiple Shift Left Unit. These units are shown in partial detail in FIGS. 22A and 22B. They actually comprise the shifting gate which are utilized to connect the various bit storage locations of said X and Y Registers to effect the various shifts specified. The amount or degree of the shift is specified by the Multiple Shift Right Ring and the Multiple Shift Left Ring. In other words, if the 8 position of the Multiple Shift Left Ring of the Multiple Shift Left Unit were energized, a shift left of 8 bit positions would be effected by the unit.

It will also be noted that the "shift down" and "shift up" signals will originate from the logical circuit as shown in FIG. 18C, specifically the two flip-flops shown adjacent the "shift up" and "shift down" lines.

The circuitry shown in FIG. 18 further controls the accessing of complements rather than true outputs from certain of the registers for arithmetic operations when sign bits for two numbers to be added differ, thus, requiring, in effect, a Subtraction operation as will be well understood.

FIG. 19

This figure is a logical schematic diagram of the $\underline{e}$ Register. This register is used to keep track of exponent bits Floating Sum Reduction operation. It may be reset to a "0" and incremented and decremented accordingly, or individual bit positions thereof may be selectively set to a "1" under control of its associated Input Ring. Again the specific operation and relationship of this particular segment to the system during the abovementioned operations will be clearly specified in the detailed description of the Timing Sequence Charts appearing subsequently herein.

FIG. 20

This figure is a logical schematic diagram of the $\underline{s}$ Register. It will be noted that this register is broken up into odd and even segments having Odd and Even Output Rings. This register is used primarily during various memory operations which include the Vector Direct Store, Vector Direct Fetch, Vector Indirect Store and Vector Indirect Fetch. This register is organized in the odd and even numbered fashion illustrated since it will be remembered that the addresses are generated in odd and even multiples and that the Z Register is also organized in odd and even numbered row positions. The logic circuitry associated with this register serves the purpose of gating information both into and out of same and also for the purpose of making a number of branching tests for determining which clock sequences will be enabled at a certain test point. Note for example, directly below the Odd and Even Output Rings the AND circuits designated as A68, A70, A78, A72, A80, A74, A82 and A76. It will be noted that upon the application of clock pulse VIF–9C, the system will be conditioned to branch selectively to VIF–9D, VIF–9J, VIF–9N or VIF–9H. The exact test being made by the input clock pulse will be clearly apparent by an inspection of the Timing Sequence Charts and the specific detailed description of same, which follows subsequently.

FIG. 21

This figure is the logical schematic of the Counter 1 which is used in a manner similar to the Counter J illustrated in FIG. 7. This Counter is selectively resetable to "0" or may be incremented by a suitable pulse applied thereto as is well known in the art. As will be apparent from the two output lines from the Counter, this Counter is used to test for the occurrence of an 8 or not 8 condition and as will be apparent from this subsequent description, determines when 8 cycles of the associated control clocks have been completed and the Counter will thus signal when a particular operation is done. In this case an Address Generation routine will indicate when 16 addresses have been generated by the system. It will be noted that on a given Address Generation cycle two addresses will be generated, thus, in eight cycles, sixteen addresses are generated. The various gate circuits illustrated are for the purpose of making the Test for condition of this Counter 1.

FIG. 22

FIG. 22 is a composite drawing illustrating the organization of FIGS. 22A and 22B. FIGS. 22A and 22B comprise a logical schematic of the details of the Multiple Shift Left and Multiple Shift Right Units shown on FIG. 18 in block form. The gate circuits shown in the FIG. 22B are the shifting gates also shown in the detail of the bit storage location on FIG. 6. All of these gate circuits have been shown as number G124 or G125 depending on whether or not they are involved with a Shift Right or a Shift Left operation. Referring specifically to the indicated bit position $\underline{X}_{35}$, it will be noted that there are two additional gate circuits illustrated, i.e., gate circuits G124A and G124B. These are used when the shift from the 35th bit position of the $\underline{X}$ Register is to proceed other than to the 9th bit position of the $\underline{Y}$ Register. Thus, gate circuit G124A is energized when it is desired to shift directly from the 35th bit position of the $\underline{X}$ Register to the "0" bit position of the $\underline{Y}$ Register. Similarly, gate circuit G124B is energized when it is desired to shift directly from the 35th bit position of the $\underline{X}$ Register to the first bit position ($\underline{Y}_1$) of the $\underline{Y}$ Register. These alternate shift patterns are utilized as will be understood when different instructions are detected in the Instruction Register and as will be appreciated, allow the use of more register storage bit positions in order to maintain desired precision for certain operations.

Referring to the top of FIG. 22A, the four flip-flops illustrated as F.F. "1," F.F. "2," F.F. "3" and F.F. "4" are set by various inputs from the Instruction Register. It will be noted that the flip-flop F.F. "4" is set from the indicated clock stages of the Timing Sequence Chart. The other three flip-flops are set as indicated from various clock sequences which have not been specifically set forth in the description of the present system as it was not felt that they added materially to the overall system description, however, the power of obtaining these shifts is described in order to illustrate the versatility of the present system organization. For example, an instruction labelled VHLGR is anticipated by the system which stands for Vector Horizontal Logical Right Shift. This means that a specific row position of the $\underline{X}$ and $\underline{Y}$ Registers will be treated as a single 72 bit Storage Register having neither sign nor exponent. As will be noted, this flip-flop causes direct connection between bit positions $\underline{X}_0$ and $\underline{X}_1$, $\underline{X}_8$ and $\underline{X}_9$, $\underline{X}_{35}$ and $\underline{Y}_0$ and $\underline{Y}_1$, and $\underline{Y}_8$ and $\underline{Y}_9$.

Flip-flop F.F. "2" as is indicated is actuated by an instruction designated as VHLRS which stands for the instruction Vector Horizontal Long Right Shift. The operation this flip-flop sets up is a 70 bit signed register by combining appropriate bit positions of the X and Y Registers. Specifically, it now connects $\underline{X}_1$ and $\underline{X}_8$, $\underline{X}_8$ and $\underline{X}_9$, $\underline{X}_{35}$ and $\underline{Y}_1$, and finally, $\underline{Y}_8$ and $\underline{Y}_9$.

The flip-flop "1" is energized by the instruction designated as VHARS which stands for the instruction Vector Horizontal Arithmetic Right Shift. This operation requires the use of a single 35 bit signed register, and thus, affects only the $\underline{X}$ Register. It will be noted that the output from the flip-flop F.F. "1" connects only bit positions $\underline{X}_8$ and $\underline{X}_9$, thus providing 35 bit storage locations in positions $\underline{X}_1$ through position $\underline{X}_{35}$ and provides for a sign bit in location $\underline{X}_0$. It will again be noted that nothing in the $\underline{Y}$ Register is modified by the above instruction.

FIG. 23

FIG. 23 is a composite drawing illustrating the organization of FIGS. 23A through 23C. This composite figure represents the logical schematic drawing of the "Test for Busy" circuitry of this system. The function of this circuitry is to test the two memories whose addresses are specified in the $A_1$ Address Register and the $A_3$ Address Register. The particular memory is determined from the low order four bits of this address and decoded by the two Decoders shown in FIGS. 23A and 23B. The specific output of these Decoders is supplied to the AND circuits A56 and if an output is concurrently obtained from the individual Memory Box busy flip-flops and from one of the OR circuits R10 or R12, this will indicate that the specific Memory Box to be addressed is busy. The occurrence of a signal from the OR circuits R10 and R12 will cause one of the flip-flops F10, F18, or F22 to be set to a "1" thus indicating that the particular Memory Box which it is desired to address is currently busy. Subsequent tests made by the indicated gate circuits connected to the output of the "busy" flip-flops, said gate circuits being actuated by various clock pulses as indicated by FIG. 23C, will cause the individual clock sequences currently being performed to delay until the not busy line out of the pertinent flip-flop becomes active at which point the clock sequence continues with the particular operation. Again, the specific detailed description of the various system clock sequences will clearly describe the operation of this circuitry. As will be appreciated, this circuitry is active and utilized during the various Memory Accessing operations which include the Vector Direct Fetch, Vector Direct, Fetch, Vector Indirect Store, Vector Indirect Fetch, Single Word Fetch and the Single Word Store operations.

FIG. 24

This figure is a logical schematic diagram of the $\underline{w}$ Register and its associated logic circuitry. This register is used primarily to receive the results of a Sum Reduction operation wherein all selected members of a vector of numbers up to 16 stored in the $\underline{X}$ Register are all added together. As will be remembered from the description of the Counting Tree shown in FIG. 11B, the contents of FIG. 24 would be within the box marked $\underline{w}$ Register also shown on FIG. 11B. As will be remembered a column of up to 17 bits at a time will be added one at a time by the Counting Network. The particular column of the $\underline{X}$ Register is selected by the $\underline{X}$ Column Output Selector shown in dotted lines at the top of FIG. 24. This Output Selector selects the particular bit position of $\underline{w}$ Register into which a particular output of the Accumulator will be stored. The function of the various other logical blocks illustrated is set forth in detail in the descrciption of the Sum Reduction Clock and its operation, which is set forth subsequently.

SECTION 8

Timing Sequence Charts

The following is a detailed list of the specific operating sequences of the disclosed system. These operations are performed by the System Clock as described generally previously and specifically with regard to FIG. 10. As is apparent from the previous description, various timing sequences will be initiated by direct instructions as determined by the Instruction Decoder which sets various Control flip-flops. Subsequent sub-sequences are determined by tests made during various clock sequences.

The following list of abbreviations is used in the Timing Sequence Charts for simplicity on both the charts and also the drawings where the various clock pulses are shown applied to perform the specified control functions.

LIST OF ABBREVIATIONS

Start Clock—STA
Instruction Fetch—INSTF
Effective Address—EA
Vector Expand—VEXPD
Vector Compress—VCMPS
Search for Largest-Smallest—LGSM
Single Word Fetch—SWF
Vector Direct Fetch—VDF
Zero δ Fetch
Vector Indirect Fetch—VIF
Single Word Store—SWS
Vector Direct Store—VDS
Vector Indirect Store—VIS
Sum Reduction—SR
Floating Sum Reduction—FSR
Floating Point Shift—FPS
Uppermost One—UMO
Floating Point Add—FAD Start Clock—No F.F. associated with this Clock

STA–1
Initiated manually (pushbutton) resets all Control flip-flops
→STA–2
STA–2
Test for "on" condition of Instruction Clock flip-flops
If any one is on, →STA–3
If all are off, →INSTF–1
STA–3
Delay only →STA–2

Note that at the end of all instruction routines (FAD, VEXPD, VCMPS, VRFSM, VSLG, VSSM, VSTX and VSTY) the control is returned to STA–2.

Instruction Fetch (INSTF)—No F.F. associated with this Clock

INSTF–1
Gate Instruction Counter Register to $A_2$
→INSTF–2
INSTF–2
Start Single Word Fetch Clock
Set SWF F.F. to "1"
Set Odd Numbered $\underline{Z}$ Output Ring to one
Increment Instruction Counter Register
→INSTF–2A
INSTF–2A
Test SWF F.F.
If on "1," →INSTF–2B
If on "0," →INSTF–3
INSTF–2B
Delay only →INSTF–2A
INSTF–3
Gate $\underline{Z}^1$ to IR (Instruction Register)
→INSTF–4
INSTF–4
Test the left hand bits of the OP code
If "01," →INSTF–5
If "001," →INSTF–5A
INSTF–5
Start Effective Address Clock
Set EA F.F. to "1"
→INSTF–5B
INSTF–5A
Test output of IR Decoder for instructions VEXPD, VCMPS, VRFSM, etc., and branch accordingly
INSTF–5B
Test output of IR Decoder
If VSLG or VSSM, →LGSM Clock
If UMO →UMO Clock
If not VSLG, VSSM or UMO, →INSTF–5C
INSTF–5C
Test EA F.F.
If on "1," →INSTF–5D
If on "0," →INSTF–6
INSTF–5D
Delay only →INSTF–5C
INSTF–6
Gate $I_2$ field (4 bits) from Instruction Register to Index Address Register
Set IR W F.F. to "Read"
→INSTF–7
INSTF–7
Gate selected Index Register to δ
→INSTF–8
INSTF–8
Test "Vector Fetch" output lines of IR Decoder and Vector Indirect bit
If "vector fetch," →INSTF–8A
If "direct store," →Vector Direct Store Clock (VDS)

INSTF–8A
Start VDF Clock
→INSTF–8B
INSTF–8B
Test VDF F.F.
If on "1," →INSTF–8C
If on "0," →INSTF–9
INSTF–8C
Delay only →INSTF–8B
INSTF–9
Test Instruction Decoder
If VUFA, →FAD–1
If VFAD, →FAD–1
If VFSB or VUFS, invert sign bits of $\underline{Z}$, →FAD–1
If VFAM or VUAM, set sign bits of $\underline{Z}$ to zero, →FAD–1
If VFSM or VUSM, set sign bits of $\underline{Z}$ to one, →FAD–1

Effective Address Clock (EA)

EA–1
Gate $I_1$ field (4 bits) from Instruction Register to Index Address Register (This selects Index Register)
Set IR W F.F. to "Read"
→EA–2
EA–2
Gate Index Register to Adder A
Gate low order 18 bits of Instruction Register to Adder A Sum will appear in Register $A_2$
If 13th bit is a "1," →SWF Clock
Note that SWF–5 returns control back to EA–3
If 13th bit is a "0," →END (Turn off EA F.F.)
EA–3
Gate low order 23 bits of $\underline{Z}^1$ to right hand end of Instruction Register
→EA–1

Expand Clock (VEXPD)—(Turned on after INSTF–5A, if VEXPD detected)

VEXPD–1
Set $\underline{v}$ Input Ring to one
Set $\underline{u}$ Output Ring to one
Set Counter J to one
Set $\underline{v}$ to all ones except $\underline{v}_0$
→VEXPD–2
VEXPD–2
Test $\underline{u}_j$
If $\underline{u}_j$ equals one, →VEXPD–4
If $\underline{u}_j$ equals zero, →VEXPD–3
VEXPD–3
Shift $\underline{X}$ down (under control of $\underline{v}$) (note: $\underline{w}$ does not shift down)
→VEXPD–4
VEXPD–4
Gate to zero to $\underline{v}$ (under control of $\underline{v}$ Input Ring)
→VEXPD–5
VEXPD–5
Advance $\underline{u}$ Output Ring
Advance $\underline{v}$ Input Ring
Increment Counter J
→VEXPD–6
VEXPD–6
Test Counter J
If not equal to 17, →VEXPD–2
If equal to 17, →VEXPD–7
VEXPD–7
Gate inverted output of $\underline{u}$ to $\underline{v}$
→VEXPD–8
VEXPD–8
Set $\underline{X}$ to zero (under control of $\underline{v}$)
Turn off VEXPD–8
Turn off VEXPD F.F.
→STA–2

Compress Clock (VCMPS)—Turned on after INSTF–5A if VCMPS in OP Register

VCMPS–1
Set $\underline{v}$ Input Ring to zero
Set $\underline{u}$ Output Ring to one
Set Counter J to one
Set $\underline{v}$ to all ones except $\underline{v}_0$
Set $\underline{v}_0$ to zero
→VCMPS–2
VCMPS–2
Test $\underline{u}_j$
If $\underline{u}_j$ equals one, →VCMPS–4
If $\underline{u}_j$ equals zero, →VCMPS–3
Transfer $\underline{X}$ to $\underline{X}$ Intermediate Storage F.F.
VCMPS–3
Shift $\underline{X}$ up
In this operation zeros are shifted into $\underline{X}^{16}$
→VCMPS–5
VCMPS–4
Gate a zero to $\underline{v}$ under control of $\underline{v}$ Ring
→VCMPS–4A
VCMPS–4A
Advance $\underline{v}$ Input Ring
→VCMPS–5
VCMPS–5
Advance $\underline{u}$ Output Ring
Increment Counter J
→VCMPS–6
VCMPS–6
Test Counter J
If not equal to 17, →VCMPS–2
If equal to 17, turn off VCMPS, F.F., and →STA–2
is started Search for Largest or Smallest Clock (LGSM)—This Clock is started when either a VSLG or VSSM instruction is found after step INSTF–5B LSGM–1
Set $\underline{v}$ Input Ring to zero
→LSGM–1A
Gate a one to $\underline{v}_0$
Gate $\underline{s}$ to remaining 16 $\underline{v}$'s
→LGSM–2
LGSM–2
Set #0 position of $\underline{X}$ Output Column Selector
If VSLG, →LGSM–2A
If VSSM, →LGSM–2B
LGSM–2A
Gate inverted $\underline{X}$ Register Column Output to AND Unit (Note: $\underline{X}$ Column Output includes $\underline{w}$)
Gate $\underline{v}$ to AND Unit
Gate AND Unit to $\underline{p}$
→LGSM–3
LGSM–2B
Gate $\underline{X}$ Column Output to AND Unit
Gate $\underline{v}$ to AND Unit
Gate AND Unit to $\underline{p}$
→LGSM–3
LGSM–3
Gat ORed output of $\underline{p}$ to "$\underline{i}$" F.F.
If all bits of $\underline{p}$ are "0," "$\underline{i}$" will be set to "0"
If any bit of $\underline{p}$ is a "1," "$\underline{i}$" will be set to "1"
→LGSM–4
LGSM–4
If "$\underline{i}$" F.F. is "1," gate $\underline{p}$ into $\underline{v}$
If "$\underline{i}$" F.F. is "0," do nothing
→LGSM–5
LGSM–5
Set Counter J to zero
→LGSM–9
→LGSM–6

LGSM–6
If "$\underline{i}$" F.F. is "1," gate $\underline{X}$ Column Output to AND Unit
Gate $\underline{v}$ to AND Unit
Gate output of AND circuit to $\underline{p}$
If "$\underline{i}$" F.F. is "0," gate inverted output of $\underline{X}$ Column Output to AND Unit
Gate $\underline{v}$ to AND Unit
Gate output of AND Unit to $\underline{p}$
→LGSM–7

LGSM–7
If any bit of $\underline{p}$ is "1," →LGSM–8
If all bits of $\underline{p}$ are "0," →LGSM–9

LGSM–8
Gate $\underline{p}$ to $\underline{v}$
→LGSM–9

LGSM–9
Advance $\underline{X}$ Output Column Selector
→LGSM–10

LGSM–10
Increment Counter J
→LGSM–11

LGSM–11
Test Counter J
If J does not equal 36, →LGSM–6
If J equals 36, →LGSM–12

LGSM–12
Test for "off" condition of EA F.F.
If "1," →LGSM–12A
If "0," →LGSM–12B

LGSM–12A
Delay only →LGSM–12

LGSM–12B
Gate $I_1$ to Index Address Register
Set IR W F.F. to "Write"
→LGSM–12C LGSM–12C
Gate $A_2$ to Index Register
Test $\underline{v}_0$
If one, →LGSM–13D
If zero, →LGSM–13

LGSM–13
Set IR W F. F. to "Read"
Reset $\underline{v}$ Index Register to zero
→LGSM–13A LGSM–13A
Set $\underline{v}$ Index Register to locate index of uppermost one in $\underline{v}$
→LGSM–13B LGSM–13B
Gate $\underline{v}$ Index Register to Adder A
Gate Index Registers to Adder A (Sum will appear in Register $A_2$)
→LGSM–13C LGSM–13C
Gate $I_2$ to Index Address Register
Set IR W F. F. to "Write"
→LGSM–13D LGSM–13D
Gate $A_2$ to Index Registers
Reset VSLG and VSSM F. F. $s$ to "0"
→STA–2

Single Word Fetch (SWF)—Address in $A_2$. Data goes to $Z^1$

SWF–1
Set A Matrix Input Ring to one
Set A Matrix Output Ring to one
Set Odd Numbered Z Input Ring to one
→SWF–1A SWF–1A
Gate Register $A_2$ to Register $A_3$
→SWF–2

SWF–2
Test for busy ($A_3$ only)
If busy, →SWF–3
If not busy, →SWF–4

SWF–3
Delay only →SWF–2

SWF–4
Gate Register $A_3$ to MAR A Transfer line
If EA F. F. is "on," reset Odd Numbered $\underline{Z}$ Output Ring to one
Set Read Access F. F.
→SWF–5

SWF–5
→END
Turn off SWF F. F.
If EA F. F. is on "1," also →EA–3

Vector Direct Fetch (VDF)

VDF–1
($\delta$ Register and base address in $A_2$)
Reset Counter #1 to zero
Reset A and B Input and Output Rings
Reset $\underline{Z}$ Input Rings to one
→VDF–1A VDF–1A
Gate $A_2$ to $A_0$ and to $A_3$
→VDF–2

VDF–2
Test for $\delta$ equal to zero
If not zero, →VDF–3
If zero, →VDF–2A

VDF–3
Generate $A_2$ and $A_1$
($A_2$ equals $A_1$ plus $2\delta$, $A_1$ equals $A_0$ plus $\delta$)
→VDF–4

VDF–4
Test to see if last four bits of $A_3$ and $A_1$ are equal
If equal, →VDF–4A
If not equal, →VDF–5

VDF–5
Test for busy ($A_1$ and $A_3$)
If not busy, →VDF–6
If busy, →VDF–5A

VDF–5A
Delay only →VDF–5

VDF–6
Transfer to Memory
→VDF–7
→VDF–10

VDF–7
Advance A Matrix and B Matrix Input Rings and increment
Counter #1
→VDF–8

VDF–8
Test Counter #1 for eight
If not eight, →VDF–1A
If eight, →VDF–9

VDF–9
(Test for Direct or Indirect)
Set DF, IF, and IS flip-flops
If DF is on, →turn off VDF F. F.
If IF is on, →VIF–9A
If IS is on, →VIS–50

VDF–10
(Allows time for memory words to be read into MDR's)
→VDF–11

VDF–11
Gate A and B Decoders to MDR Register gates (this puts contents of MDR's on MDR Transfer lines)
Advance A Matrix and B Matrix Output Rings
Advance $\underline{Z}$ Register Input Rings Zero δ Fetch VDF–2A
Test for busy ($A_3$ only because we are concerned only with the base address)
If busy, →VDF–2B
If not busy, →VDF–2C
VDF–2B
Delay only →VDF–2A
VDF–2C
Gate $A_3$ to both MAR A and MAR B Transfer lines (This loads proper MAR and initiates Read cycle of Memory Box) (Both A and B lines are used in order to load both A and B Registers)
→VDF–2D
VDF–2D
(Allows time for memory word to appear in proper MDR)
→VDF–2E
VDF–2E
Gate A and B Data Decoders to MDR Register gates (This puts contents of MDR on MDR A and B Transfer lines)
→VDF–2F
VDF–2F
Advance Counter #1
Advance $\underline{Z}$ Input Rings
→VDF–2G
VDF–2G
Test Counter #1 for eight
If not eight, →VDF–2E
If eight, →VDF–9

(Fetch Subroutine—if both words are in the same box)

VDF–4A
Test for busy ($A_3$ only)
If busy, →VDF–4B
If not busy, →VDF–4C
VDF–4B
Delay only →VDF–4A
VDF–4C
Gate $A_3$ to MAR Transfer line (this loads proper MAR and initiates Read cycle of Memory Box)
→VDF–4D
VDF–4D
(Allows time for memory word to appear in proper MDR)
→VDF–4E
VDF–4E
Gate A Matrix Decoder to MDR Register gates (this puts contents of MDR on MDR A Transfer line)
→VDF–4F
VDF–4F
(Test for busy ($A_1$ only)
If busy, →VDF–4G
If not busy, →VDF–4H
VDF–4G
Delay only →VDF–4F
VDF–4H
Gate $A_1$ to MAR Tarnsfer line (this loads proper MAR and initiates Read cycle of Memory Box)
→VDF–4I
If VIF F.F. is cut off ("0"). →VDF–7
If VIF F.F. is on ("1"), →VIF–9H
VDF–4I
(Allows time for memory word to appear in proper MDR)
→VDF–4J
VDF–4J
Gate B Matrix Decoder to MDR Register gates (this puts contents of MDR on MDR B Transfer line)
Advance A Matrix and B Matrix Output Rings
Advance $\underline{Z}$ Register Input Rings
(VDF–4J initiates no new clock stage)

Vector Indirect Fetch (VIF)

VIF–9A
Reset A and B Matrix Input and Output Rings to one
Reset $\underline{Z}$ Register Input and Output Rings to one
Reset $\underline{s}$ Register Odd Output Ring to one
Reset $\underline{s}$ Register Even Output Ring to two
Reset Counter #1 to zero
→VIF–9B
VIF–9B
Test for δ equals zero
If not equal to zero, →VIF–9C
If equal to zero, →VIF–9R
VIF–9C
Test $\underline{s}$ Register
If $\underline{s}$ odd and $\underline{s}$ even are both ones →VIF–9D
If $\underline{s}$ odd equals one and $\underline{s}$ even equals zero, →VIF–9J
If $\underline{s}$ odd equals zero and $\underline{s}$ even equals one, →VIF–9N
If $\underline{s}$ odd equals zero and $\underline{s}$ even equals zero, →VIF–9H
VIF–9D
Gate Odd $\underline{Z}$ Register to $A_3$
Gate Even $\underline{Z}$ Register to $A_1$
→VIF–9E
VIF–9E
Test to see if last four bits of $A_3$ and $A_1$ are equal
If equal, →VDF–4A
If not equal, →VIF–9EA
VIF–9EA
Test for busy $A_1$ and $A_3$
If busy, →VIF–9F
If not busy, →VIF–9G
VIF–9F
Delay only →VIF–EA
VIF–9G
Transfer to MAR A and B lines
→VDF–10
→VIF–9H
VIF–9H
Advance A and B Matrix Input Rings
Advance Z Register Output Rings
Advance $s$ Register Output Rings
Increment Counter #1
→VIF–9I
VIF–9I
Test Counter #1 for eight
If not eight, →VIF–9C
If eight, fall of VIF–9I turns off VDF F.F.
VIF–9J
Gate Odd Numbered $\underline{Z}$ Register to $A_3$
→VIF–9K
VIF–9K
Test for busy ($A_3$ only)
If busy, →VIF–9I
If not busy, →VIF–9M
VIF–9L
Delay only →VIF–9K
VIF–9M
Gate $A_3$ to MAR A Transfer line
→VDF–10
→VDF–9H
VIF–9N
Gate Even Numbered $\underline{Z}$ Register to $A_1$
→VIF–9O
VIF–9O
Test for busy ($A_1$ only)
If busy, →VIF–9P
If not busy, →VIF–9Q
VIF–9P
Delay only →VIF–9O
VIF–9Q
Gate $A_1$ to MAR B Transfer line
→VDF–10
→VIF–9H VIF–9R
Gate Odd Z Register to $A_3$
Set bit 12 of Instruction Register to "0"
→VDF–2A Single Word Store (SWS)—Assume address in $A_3$.

Assume data in $Z^1$

SWS–1
Set Odd Numbered Z Output Ring to one
SWS–2
Test for busy ($A_3$ only)
If busy, →SWS–3
If not busy, →SWF–4
SWS–3
Delay only →SWS–2
SWS–4
Gate $A_3$ to MAR A Transfer line
Gate Odd Numbered Z Registers to MDR A line
Turn off SWS F.F.

Vector Direct Store (VDS)

VDS–21
(δ in δ Register and base address in $A_2$)
Reset Counter #1 to zero
Reset Z Output Rings to one
Reset s Register Output Rings to one
Set Z Input Rings to all ones
If VSTX, transfer X to Z
If VSTY, transfer Y to Z
→VDS–21A
VDS–21A
Gate $A_2$ to $A_0$
Gate $A_2$ to $A_3$
→VDS–22
VDS–22
Test for δ equals zero
If not zero, →VDS–23
If zero, →VDS–22A
VDS–23
Generate $A_2$ and $A_1$
→VDS–23A
VDS–23A
Test s Register
If s odd and s even are both ones, →VDS–24
If s odd equals one and s even equals zero, →VDS–23B
If s odd equals zero and s even equals one, →VDS–23E
If s odd equals zero and s even equals zero, →VDS–27
VDS–24
Test to see if last four bits of $A_3$ and $A_1$ are equal
If equal, →VDS–24A
If not equal, →VDS–25
VDS–25
Test $A_1$ and $A_3$ for busy
If not busy, →VDS–26
If busy, →VDS–25A
VDS–25A
Delay only →VDS–25
VDS–26
Transfer to Memory—MAR's and MDR's
→VDS–27
VDS–27
Advance Z Output Rings
Increment Counter #1
Advance s Output Rings
→VDS–28
VDS–28
Test Counter #1 for eight
If not eight, →VDS–21A
If eight, turn off VDS F.F., turn off VSTXY, VSTY and
→STA–2

VDS–23B
Test for busy ($A_3$ only)
If busy, →VDS–23C
If not busy, →VDS–23D
VDS–23D
Delay only →VDS–23B
VDS–23D
Gate $A_3$ to MAR A Transfer line
Gate Odd Numbered Z Register to MDR Transfer line
→VDS–27
VDS–23E
Test for busy ($A_1$ only)
If busy, →VDS–23F
If not busy, →VDS–23G
VDS–23F
Delay only →VDS–23F
VDS–23G
Gate $A_1$ to MAR B Transfer line
Gate Even Numbered Z Register to MDR line
→VDS–27

Zero δ Store

VDS–22A
Test for busy ($A_3$ only)
If busy, →VDS–22B
If not busy, →VDS–22C
VDS–22B
Delay only →VDS–22A
VDS–22C
Set Even Numbered Z Output Ring to eight
→VDS–22D
VDS–22D
Gate Even Numbered Z Register to MDR B Transfer line
Gate $A_3$ to MAR B Transfer line
($Z^{16}$ will be stored at location of base address)
Turn off VDS, VSTX, VSTY, F.F. s
→STA–2

Vector Store—(When last four bits of the two addresses generated are equal)

VDS–24A
Test for busy ($A_3$ only)
If busy, →VDS–24B
If not busy, →VDS–24C
VDS–24B
Delay only →VDS–24A
VDS–24C
Gate $A_3$ to MAR A Transfer line
Gate Odd Numbered Z Registers to MDR A Transfer line
→VDS–24D
VDS–24D
Test for busy ($A_1$ only)
If busy, →VDS–24E
If not busy, →VDS–24F
VSD–24E
Delay only →VDS–24D
VDS–24F
Gate $A_1$ to MAR B Transfer line
Gate Even Numbered Z Registers to MDR B Transfer line
If VIS F.F. is on, →VIS–57
If VDS F.F. is on, →VDS–27

Vector Indirect Store (VIS)

VIS–50
Test for δ equals zero
If not equal to zero, →VIS–51
If equal to zero, →VIS–50A
VIS–51
Reset Z Register Input and Output Rings to one
Reset s Register Odd Output Ring to one
Reset s Register Even Output Ring to two
Reset Counter #1 to zero
→VIS–52

VIS–52
Gate Odd Numbered $\underline{Z}$ Register to $A_3$
Gate Even Numbered $\underline{Z}$ Register to $A_1$
→VIS–53

VIS–53
Gate $\underline{X}$ or $\underline{Y}$ Register to $\underline{Z}$ Register (selected by Instruction)
→VIS–54

VIS–54
Test $\underline{s}$ Register
If $\underline{s}$ odd and $\underline{s}$ even are both ones, →VIS–54A
If $\underline{s}$ odd equals one and $\underline{s}$ even equals zero, →VIS–53C
If $\underline{s}$ odd equals zero and $\underline{s}$ even equals one, →VIS–53H
If $\underline{s}$ odd equals zero and $\underline{s}$ even equals zero, →VIS–57

VIS–54A
Test to see if last four bits of $A_3$ and $A_1$ are equal
If equal, →VDS–24A
If not equal, →VIS–55

VIS–55
Test for busy $A_1$ tnd $A_3$
If busy, →VIS–55A
If not busy, →VIS–56

VIS–55A
Delay only →VIS–55

VIS–56
Gate $A_1$ and $A_3$ to MAR lines
Gate Odd and Even $\underline{Z}$ Registers to MDR lines
→VIS–57

VIS–57
Advance $\underline{Z}$ Register Input and Output Rings
Advance $\underline{s}$ Register Output Rings
Increment Counter #1
→VIS–58

VIS–58
Test Counter #1 for zero
If not zero, →VIS–52
If zero, turn off VIS F.F. and VDF F.F., turn off VSTX F.F., turn off VSTY F.F. and →STA–2

VIS–53C
Test for busy ($A_3$ only)
If busy, →VIS–53D
If not busy, →VIS–53E

VIS–53D
Delay only →VIS–53C

VIS–53E
Gate $A_3$ to MAR A Transfer line
Gate odd $\underline{Z}$ Register to MDR Transfer line
VIS–57

VIS–53H
Test for busy ($A_1$ only)
If busy, →VIS–53I
If not busy, →VIS–53J

VIS–53I
Delay only →VIS–53H

VIS–53J
Gate $A_1$ to MAR B Transfer line
Gate Even $\underline{Z}$ Register to MDR line
→VIS–57

Vector Indirect Store—(When δ equals zero)

VIS–50A
Reset Even $\underline{Z}$ Register Input and Output Rings to eight
→VIS–50B VIS–50B
Gate Even $\underline{Z}$ Rgeister to $A_1$
→VIS–50C VIS–50C
Gate Even $\underline{X}$ or $\underline{Y}$ to Even $\underline{Z}$
→VIS–50D VIS–50D
Test for busy ($A_1$ only)
If busy, →VIS–50E
If not busy, →VIS–50F VIS–50E
Delay only →VIS–50D VIS–50F
Gate $A_1$ to MAR B
Gate Even $\underline{Z}$ Register to MDR B
Turn off VIS, VSTX, and VSTY F.F.
→STA–2

Sum Reduction (SR)—(Entered from FPS–10)

SR–1
Gate $\underline{s}$ to $\underline{v}$
Set $\underline{v}_0$ to one
→SR–2
Set $\underline{X}$ Column Reset Selector bits 1–8
→SR–3

SR–3
$\underline{X}$ Column Reset
→SR–6

SR–6
Set $\underline{X}$ Column Output Selector on zero
→SR–7

SR–7
Gate $\underline{s}$ to AND Unit
Gate "1" to 0 position of AND Unit
Gate $\underline{X}$ Column Output to AND Unit
Gate AND Unit to $\underline{v}$
Set bits 1–35 of $\underline{X}$ Column Complement Selector to "1"

SR–8
Complement $\underline{X}$ array
(Positions will be complemented where $\underline{v}$ contains "1's" (negative numbers) and $\underline{X}$ Column Complement Selector contains "1's"
(Positions 1–35)
Set Tree Accumulator to zero
→SR–9

SR–9
Pulse the Counting Network associated with $\underline{v}$ (this will place the sum of the sign bits ("1") of the negative numbers in the Tree Accumulator at the bottom of the Counting Network (FIG. 11)
→SR–10

SR–10
Set $\underline{X}$ Column Output Selector to 35
Set Counter J to 35
→SR–11

SR–11
Gate $\underline{s}$ to AND Unit
Gate a "1" to 0 position of AND Unit
Gate Column Output of $\underline{X}$ to AND Unit
Gate AND Unit to $\underline{v}$
→SR–12

SR–12
Pulse Counting Network associated with $\underline{v}$
Add output of Counting Network to contents of Tree Accumulator
→SR–13

SR–13
Gate the right hand end of the Tree Accumulator into the $\underline{j}$ position of $\underline{w}$
→SR–14

SR–14
Decrement Counter J
Decrement $\underline{X}$ Column Output Selector
→SR–15

SR–15
Test Counter J
If negative, →SR–16
If zero or greater, →SR–11

SR-16
Test $\underline{w}_0$ bit
If a "1" (which indicates negative numbers), →SR-17
If a "0" (which indicates positive numbers), →SR-19
SR-17
Complement $\underline{w}$ except sign bit ($\underline{w}_0$)
→SR-18
SR-18
Increment $\underline{w}$ (add 1 to $\underline{w}$)
→SR-19
SR-19
Test output of OR circuit across bits 1 through 8 of $\underline{w}$
If OR circuit has output, →SR-20
If OR circuit does not have output, →SR-21
SR-20
Shift bits 1 through 35 of $\underline{w}$ one position to the right
Increment $\underline{e}$ Register
→SR-19
SR-21
Gate e Register to bits 1 through 8 of $\underline{w}$
→SR-22
SR-22
Test output of OR circuit across bits 9 through 35 of $\underline{w}$ (fraction portion)
If output is "0," →SR-23
If output is not "0," →SR-24
SR-23
Set bits 1 through 8 of $\underline{w}$ (exponent field) to zero
Turn off VRFSM and SR F.F. $s$
→STA-2
SR-24
Test bit 9 of $\underline{w}$ Register
If "1,"
→SR-26
If "0,"
→SR-25
SR-25
Shift bits 1 through 35 (fraction portion) of $\underline{w}$ one position to the left
Decrement $\underline{e}$ Register
→SR-24
SR-26
Gate $\underline{s}$ Register to bits 1 to 8 of $\underline{w}$
Turn off VRFSM and SR F.F. $s$
→STA-2

Floating Sum Reduction (FSR)—Turn on when VRFSM instruction detected after INSTF-5A executed FSR-1
Gate $\underline{s}$ to $\underline{v}$
Gate a "1" to $\underline{v}_0$
→FSR-2
FSR-2
Set $\underline{e}$ Register to zero
Set $\underline{Y}_1$ to 0
If $\underline{v}_1$ equals 1, set $\underline{Y}^1$ to 0
If $\underline{v}_1$ equals 0, do nothing
→FSR-3
FSR-3
Set $\underline{X}$ Column Input Selector to zero
Set $\underline{X}$ Column Complement Selector to one
Set $\underline{e}$ Register Input Ring to zero
Set Counter J to one
Set $\underline{X}$ Column Output Selector to one
→FSR-4
FSR-4
Gate $\underline{X}$ Column Output to AND Unit
Gate $\underline{v}$ to AND Unit
Gate output of AND Unit to $\underline{p}$
→FSR-5
FSR-5
Test $\underline{p}$
If $\underline{p}$ contains a "1," →FSR-6
If there are no "1's" in $\underline{p}$, →FSR-9
FSR-6
Gate $\underline{s}$ to $\underline{v}$
Set $\underline{v}_0$ to one
→FSR-7
FSR-7
Complement Column $\underline{X}_j$
→FSR-8
FSR-8
Set $j-1$ bit of $\underline{e}$ to one
(Note: $\underline{e}$ Register Input Ring starts at zero)
→FSR-9
FSR-9
Gate $\underline{v}$ to $\underline{p}$
→FSR-10
FSR-10
Gate $\underline{s}$ to $\underline{v}$
Set $\underline{v}_0$ to one
→FSR-11
FSR-11
Gate $\underline{X}$ Column Output to $\underline{X}$ Column Input
(Note: Bits #1 through #8 of each row of $\underline{X}$ constitute a Counter which can be decremented by the injection of a "1" in any position. The input to each Counter is under the control of the $\underline{v}$ bit as usual.)
→FSR-12
FSR-12
Gate $\underline{p}$ to $\underline{v}$
→FSR-13
FSR-13
Increment Counter J
Advance $\underline{X}$ Column Output Selector
Advance $\underline{X}$ Column Input Selector
Advance $\underline{X}$ Column Complement Selector
Advance $\underline{e}$ Register Input Ring
→FSR-14
FSR-14
Test Counter J
If $j=9$, turn off FSRFF
→FPS-1
If $j$ is not equal to 9, →FSR-4

Floating Point Shift (FPS)—The value of shifts are in bits 1 through 8 of $\underline{X}$ FPS-1
Set Counter J to zero
Set F.F. "4" (FIG. 22) "1"
Set $\underline{X}$ Column Output Selector to one
→FPS-2
FPS-2
Gate $\underline{s}$ to AND Unit
Gate a "1" to 0 position of AND Unit
Gate $\underline{X}$ Column Output to AND Unit
Gate AND Unit to $\underline{v}$
→FPS-3
FPS-3
Advance $\underline{X}$ Column Output Selector
Increment Counter J
→FPS-4
FPS-4
Test Counter J
If on 3, →FPS-5
If not on 3, →FPS-2
FPS-5
Reset $\underline{X}$ array (Rows will be reset where $\underline{v}$ bits are "1") →FPS-6
FPS-6
Set Counter J to one
Set Multiple Shift Right Ring to 16
Set $\underline{X}$ Column Output Selector to 4
→FPS-7

FPS–7
Gate $\underline{X}$ Column Output to AND Unit
Gate a "1" to 0 position of AND Unit
Gate $\underline{s}$ to AND Unit
Gate AND Unit to $\underline{v}$
→FPS–8

FPS–8
Apply pulse to Multiple Shift Right Unit
→FPS–9

FPS–9
Increment Counter J
Advance $\underline{X}$ Column Output Selector
Advance Multiple Shift Right Ring
→FPS–10

FPS–10
Test Counter J
If $J=6$ and VRFSM F.F. is on "1," set FPS F.F. to "0," set SRFF to "1," and →SR–1
If $J=6$ and FAD F.F. is "1," turn off FPS F.F.
(Note: If FAD is running, it checks FPS for completion.)
If J is not equal to 6, →FPS–7
If J=6, turn off F.F. "4" (FIG. 22)

Uppermost One Clock (UMO)

UMO–1
Gate $\underline{u}$ to AND Unit
Gate a "0" to 0 position of AND Unit
Gate $\underline{s}$ to AND Unit
Gate AND Unit to $\underline{v}$
→LGSM–12

Floating Add Clock (FAD)

FAD–1
Set Carry Control F.F. #1 to "0" (there are 16 F.F.'s)
Set Carry Control F.F. #2 to "1"
→FAD–1A FAD–1A
Gate the "1's" complement of the exponent bits of $\underline{X}$ to Exponent Adders
Gate the exponent bits of $\underline{Z}$ to Exponent Adders
Gate $\underline{s}$ to AND Unit
Gate a "0" to top of AND Unit (this will cause $\underline{v}_0$ to be set to zero)
Gate inverted carry out of the Adder to AND Unit (because the Carry Control F.F. #2 is set to "1," the inverted carry out of the exponent portion of the Adder will go to the AND Unit. Also, only if exponent of $\underline{X}^k$ is smaller than $\underline{Z}^k$ will a carry out result)
Gate AND Unit to $\underline{v}$
Gate AND Unit to $\underline{Z}$ Input Ring
→FAD–2

FAD–2
Gate $\underline{X}$ to $\underline{X}$ Intermediate Storage F.F.
Gate $\underline{Z}$ to $\underline{X}$ (Note: $\underline{v}_k$ must equal 1 for operation to take place)

→FAD–2A

FAD–2A
Gate $\underline{X}$ Intermediate Storage F.F. to $\underline{Z}$ (this is done under control of $\underline{Z}$ Input Ring. Steps FAD–2 and FAD–2A will result in the number with the smaller exponent in $\underline{X}^k$)
→FAD–3

FAD–3
Set Carry F.F. #2 to "0"
Gate $\underline{s}$ to $\underline{v}$ ($\underline{v}_0$ stays at zero)
→FAD–4

FAD–4
Gate the "1's" complement of the exponent bits of $\underline{X}^k$ to the Adder
Gate $\underline{Z}^k$ exponent to the Adder
Gate a "1" to the low order position (position 8) of the Exponent Adder (this can be considered a "carry in" to this order)
Gate exponent portion of Adder to $\underline{X}^i$ exponent
Set $\underline{Y}^k$ to zero, if $\underline{v}_k$ equals 1
→FAD–5

FAD–5
Gate the $\underline{X}^i$ exponent to the Compare Unit
Gate Compare Unit to the AND Unit
Gate 2's complement of 27(11100101) to the Exponent Adder
Gate carry out of Exponent Adder to AND Unit (Exponent Adder will have carry out if exponent difference contents of X exponent or greater than 27)
Gate $\underline{s}$ to AND Unit
Gate AND Unit to $\underline{v}$
→FAD–6

FAD–6
Gate the fraction portion $\underline{X}^k$ to $\underline{Y}^k$ (this is done under control of $\underline{v}_k$ and the fractions of $\underline{X}^k$ that will be read into $\underline{Y}^k$ will be the ones where $\underline{v}_k$ equals 1)
Set $\underline{X}$ Column Reset Selector Nos. 9–35 to one
→FAD–6A FAD–6A
Set $\underline{X}^k$ fraction to zero if $\underline{v}_k$ equals 1 (this is done by pulsing the Column Reset for the $\underline{X}$ fraction portions simultaneously. If $\underline{v}_k$ equals 1, the $\underline{X}^k$ fraction will be set to zero)
Gate 2's complement of 27 to Adder
Gate $\underline{X}^k$ to Adder (exponent only)
Gate Adder sum (exponent only) to $\underline{X}^k$ under control of $\underline{v}_k$
→FAD–7

FAD–7
Set F.F. (9–35 F.F.) to establish connection between $\underline{X}_{35}^k$ and $\underline{Y}_9^k$
Start Floating Point Shift Clock (FPS)
Set FPS F.F. to "1"
→FAD–7A FAD–7A
Test FPS F.F.
If on "1," →FAD–7B
If on "0," →FAD–8

FAD–7B
Delay only →FAD–7A

FAD–8
Gate $\underline{s}$ to $\underline{v}$ ($\underline{v}_0$ stays at zero)
Set $\underline{X}$ Column Reset Selector positions 1–8 to one
→FAD–9

FAD–9
Pulse $\underline{X}$ Column Reset (the columns 1 through 8) inclusive will be reset where $\underline{v}_k$ equals 1)
→FAD–10

FAD–10
Set "Carry to $\underline{p}$" F.F. to "1" (pulse gates on output of Compare Units between $\underline{X}_0$ and $\underline{Z}_0$. As a result, if signs are equal, Carry Control F.F. #1 will be set to "1" and to "0" if signs are not equal. There are 16 F.F.'s)
Set $\underline{p}$ Register to zero
→FAD–10A FAD–10A
Gate the output of Carry Control F.F. #1 to the gates from $\underline{Z}^k$ to the Adder
If Carry Control F.F. is on "1," bits 9–35 in true form will be gated from $\underline{Z}^k$ to the Adder If F.F. is on "0," bits 9–35 in inverted form will be gated from $\underline{Z}^k$ to the Adder Gate $\underline{X}^k$ (bits 1 through 35) to the Adder If Fraction Adder has carry out, set $\underline{p}_k$ equals 1

If signs equal and Fraction Adder has output, add 1 to exponent

Gate output of Adders to $\underline{X}$

→FAD–11

FAD–11

Set $\underline{X}$ Column Complement Selector on positions corresponding to $\underline{X}_0^k$, $\underline{X}_9^k$, $\underline{X}_{10}^k$ . . . $\underline{X}_{35}^k$ Set $\underline{X}$ Column Input Selector (position $\underline{X}_9$) to one

→FAD–11A

FAD–11A

Gate the output of the Compare Unit and the output of $\underline{p}$ to G284 (FIG. 18A) (in effect, this selects one and only one of the four following operations for each register where $\underline{v}_i$ equals 1.)

(1) If$[(\underline{X}_0^k \neq \underline{Z}_0^k) \wedge \bar{\underline{p}}_k]=1$, complement $\underline{X}_0^k$, $\underline{X}_9^k$, $\underline{X}_{10}^k$ . . . $\underline{X}_{35}^k$, transfer exponent of $\underline{Z}_0k$ to $\underline{X}_0^k$ (2) If $[(\underline{X}_0^i \neq \underline{Z}_0^i) \wedge \underline{p}_i]=1$, transfer exponent of $\underline{Z}_0^i$ to $\underline{X}_0^i$ (3) If $[(\underline{X}_0^i = \underline{Z}_0^i) \wedge \underline{p}_i]=1$, shift $\underline{X}^i$, $\underline{Y}^i$ fraction one bit right, Set $\underline{X}_9$ equal to 1

(4) If $[(\underline{X}_0^i = \underline{Z}_0^i) \wedge \bar{\underline{p}}]=1$, do nothing

→FAD–11B

FAD–11B

Test for Unnormalized or Normalized instructions

Reset "Carry to $\underline{p}$" F.F.

Set $\underline{Z}$ Input Ring to all ones

If VUFA, VUFS, VUAM, or VUSM, →FAD–12

If VFAD, VFSB, VFAM, or VFSM, →FAD–13

FAD–12

Gate $\underline{X}^i$ exponent to Exponent Adder

Gate 2's complement of 27 to the other side of the Exponent Adder

Gate exponent portion of Adder to $\underline{Y}^k$ (this is under control of $\underline{v}_k$)

Gate $\underline{X}_0^i$ (sign bits) to $\underline{Y}_0^i$ (this is also under control of $\underline{v}$)

Turn off Floating Add F.F.

→STA–2

FAD–13

Gate the output of the 28 input AND circuit associated with each $\underline{X}^k$ fraction and its corresponding $\underline{s}_k$ bit in order to set $\underline{v}_k$ (FIG. 16) ($\underline{v}_0$ remains zero)

Gate $\underline{Y}$ to $\underline{Z}$

→FAD–14

FAD–14

Set Carry Control F.F. #1 to "0" (there are 16 F.F.'s)

Set Carry Control F.F. #2 to "0"

Gate $\underline{Z}^k$ to $\underline{X}^k$ (fraction portion only)

Gate 2's complement of 27 to exponent portion of Adder

Gate $\underline{X}^k$ exponent to Adder

Gate Exponent Adder to bits 1–8 of $\underline{X}^k$ ($\underline{X}^k$ is reset only if $\underline{v}_k$ equals 1)

Set Multiple Shift Left Ring to 16

Set Counter J to zero

→FAD–15

FAD–15

Test left hand bits of $\underline{X}^k$ fraction for "0" and $\underline{s}_k$ for a "1" in order to set $\underline{v}_k$

→FAD–16

FAD–16

Multiple Shift Left (The Shift Left Unit is similar to the Multiple Shift Right Unit. In any row that $\underline{v}_k$ is "1," the 54 bit fraction $\underline{X}^k$, $\underline{Y}^k$ will be shifted left the number of bits that the ring is on)

Gate 2's complement of shift value to Adder (FIG. 13)

Gate $\underline{X}^k$ exponent to Adder

Gate Exponent Adder to $\underline{X}^k$

Increment Counter J

→FAD–16A

FAD–16A

Advance Multiple Shift Left Unit

Test Counter J

If not on five, →FAD–15

If on five, →FAD–17

FAD–17

Gate $\underline{s}$ to $\underline{v}$

→FAD–18

FAD–18

Set $\underline{Y}$ exponents equal $\underline{X}$ exponents −27

Set $\underline{Y}$ signs equal $\underline{X}$ signs

→FAD–19

FAD–19

Set $\underline{X}$ Column Reset Selector to all ones

Gate output of 28 input AND (fraction of $\underline{X}^k$ and $\underline{s}_k$) to $\underline{v}_k$

→FAD–20

FAD–20

Reset $\underline{X}^k$ and $\underline{Y}^k$ arrays under control of $\underline{v}_k$ If $\underline{v}_k=1$, set to 0

If $\underline{v}_k=0$, $\underline{X}^k$ and $\underline{Y}^k$ remain as is

Turn off FAD F.F.

→STA–2

SECTION 9

Detailed Description of System Operation

The following detailed description of the system operations is organized in the same sequence as the Timing Sequence Charts. It should be clearly understood that this sequence is not critical other than the first three; the Start (STA), Effective Address (EA) and Instruction Fetch (INSTF). These are, of course, necessary to initiate operation of the system once data and programs or instructions have been appropriately supplied to the system in a conventional manner.

It will be apparent that there are many branch points in the system controls depending on the particular operation being performed at any given time. All of the branches and the tests made to ascertain the ultimate control direction are clearly explained subsequently, it being noted that branch points are quite obvious from the Timing Sequence Charts above.

Also, a number of the clock routines are used in several different operation cycles such as the Floating Point Shift (FPS). This clock operation will only be explained once and branching back will be indicated where appropriate. Similarly, other often used clock cycles will be specifically described once and subsequent branch backs will be indicated.

In the subsequent description wherever reference numbers are used, an indication of the drawing or figure number on which the referred to element is shown is set forth. However, when a number of reference characters are on the same figure, only the first of such group will be specifically related to such figure.

Start Clock (STA)

The operation of this clock sequence, in effect, initiates operation of the present system. Under control of the Start Clock, all the Control flip-flops are reset to "0." These include all of the flip-flops shown on FIG. 5 shown connected to the gate circuits G40 and G42 including the VEXPD, VCMPS, VRFSM, VSLG, VSSM, VSTX, VSTY, and also the FAD. In addition, the clock sequence initiating flip-flops the Single Word Fetch flip-flop, the Effective Address flip-flop and the Vector Fetch flip-flop. As will be noticed, the Start Clock is initiated by a manual means, such for example, as a push button. This control could obviously be some sort of conventional signal at the end of the tape input for the system wherein instructions and data are loaded into the system.

The clock stage STA–1 performs the operations just stated, i.e., resetting all of the Control flip-flops and on turnoff, initiates clock stage STA–2. STA–2 tests for the on condition of the Instruction Clock flip-flops which were just enumerated above whose inputs are shown connected to the gate circuits G40 and G42. If any of these flip-flops are on or set to a "1" condition, an output will appear on the output line from OR circuit R52 which output is inverted and supplied to gate circuit G54 together with the noninverted output from said OR circuit to initiate either clock stage STA–3 (if one of the clocks is still in its "1" state or to INSTF–1 if all are in their "0" state). Clock stage STA–3 is merely a time delay stage which has no output pulse as such but which on turning off reinitiates clock stage STA–2 to allow time for the particular Instruction Clock sequences which have been previously initiated to be completed. Once all such stages have been completed, the system returns to the clock sequence INSTF–1 or the Instruction Fetch sequence which accesses a new series of instructions from memory and continues the operation of the system.

Instruction Fetch

This operation is largely conventional in nature in that it specifies the means by which the specific system instructions are brought out of memory, placed in the instruction Register and subsequently executed.

The description of this system will follow the format of the description of the previous clock sequences in that it should be read with reference to that portion of the Timing Sequence Chart entitled Instruction Fetch (INSTF).

Clock step INSTF–1 is initiated by the turnoff of STA–2 (Start Clock). The turnon of this stage is applied to gate G32 which gates the contents of the 18 bit Instruction Counter shown in FIG. 5 to the Register A2 shown in FIG. 2. The turnoff INSTF–1 initiates INSTF–2. The turnon of INSTF–2 is applied to OR circuit R28 which sets the Single Word Fetch flip-flop to a 1. This initiates the Single Word Fetch Clock as shown on FIG. 5. It also sets the Odd Numbered Z Output Ring to 1, FIG. 1. The last operation is an incrementing of the Instruction Counter Register by 1 which, in effect, places the address of the next instruction word in this register for such time as it is necessary to access same. The turnoff of clock stage INSTF–2 initiates clock stage INSTF–2A. The turnon of INSTF–2A is applied to gate G34 which tests to see if the Single Word Fetch flip-flop is still set to 1. If it is, it initiates clock stage INSTF–2B which is merely a delay stage which returns to INSTF–2A. What this clock stage does is to give the Single Word Fetch Clock time to complete itself at which time the Single Word Fetch flip-flop will be reset to 0. At this time clock stage INSTF–3 will be initiated. The turnon of INSTF–3 gates the contents of Register $\underline{Z}_1$, FIG. 1, to the Instruction Register (this is because the Odd Numbered Z Output Ring had been set to a 1 in clock stage INSTF–2). The contents of the Z Register are gated out through gate G36 on FIG. 5. The turnoff of INSTF–3 initiates INSTF–4.

INSTF–4 is applied to gate circuit G38 which tests the left-hand bit positions of the operation code. An output from AND circuit A18 indicates that the first two bit positions are "01" thus branching this system to clock stage INSTF–5. An output from AND circuit A20 indicates that the numbers "001" appear in these bit positions and branches the system to clock stage INSTF–5A all shown on FIG. 5.

The turnon of INSTF–5 initiates the Effective Address Clock by setting the Effective Address flip-flop to a "1." The turnoff of INSTF–5 initiates INSTF–5B.

The turnon of clock stage INSTF–5A is applied to gate circuit G40 which tests for certain outputs from the Decoder as indicated on FIG. 5. If one of the tested lines is up, the appropriate flip-flop shown also on this figure connected to each of the output lines of gate G40 is set to a 1. The setting of these various flip-flops to a "1" will initiate their respective clock stage sequences as will be apparent from referring to this Timing Sequence Chart for the indicated clock sequence and also from the subsequent description of these particular clock sequences. As indicated, the system is branched depending upon the tests made by this clock stage, therefore, there is no turnoff pulse as such.

The next clock stage is INSTF–5B which, as will be remembered, was initiated during clock stage INSTF–5. The turnon of this clock stage is applied to gate circuit G42 and tests the output of the Decoder of FIG. 5 for the occurrence of the Search for Largest (VSLG) or Search for Smallest (VSSM), either of which output is applied to OR circuit R34, an output from which is effective to initiate the Search for Largest and Search for Smallest Clock (LGSM). The application of the turnon pulse of INSTF–5B to G34 also tests for the occurrence of an output on the VUMO line from the Decoder on FIG. 5 which is the test for uppermost one. If this line is up, clock sequence Search for Uppermost One (VUMO) Clock sequence is initiated. If neither of these three lines, i.e., VSSM, VSLG, or VUMO is active, the system will branch to clock stage INSTF–5C. The turnon pulse of INSTF–5B is also applied to gate G42 which sets the appropriate flip-flops, i.e., VSLG, VSSM, or VSTX or VSTY, to their "1" states thus initiating the approriate clock sequences.

The turnon of clock stage INSTF–5C is applied to gate circuit G46 which tests the setting of the Effective Address flip-flop. If this flip-flop is set to a "1," INSTF–5D is initiated which enters a delay loop to enable the Effective Address Clock sequence to be completed which completion will result in the setting of the Effective Address flip-flop back to a "0." The occurrence of this latter condition causes the output of G46 to initiate clock stage INSTF–6.

The turnon of INSTF–6 is applied to gate G48 which gates the 4 bit binary number in the 12 field of the Instruction Register as indicated in FIG. 5 to the Index Register shown on FIG. 2. This clock pulse also sets the Index Register Right flip-flop to a "0" (Read) also on FIG. 2. The turnoff of INSTF–6 initiates INSTF–7, is applied to gate G50 which gates the contents of the Index Register selected by its associated Decoder to the $\delta$ Register also on FIG. 2.

The turnoff of INSTF–7 initiates INSTF–8.

It is the function of this clock stage to test to see if a Vector-Fetch operation is to be performed, i.e., a plurality or 16 numbers to be fetched from or stored in memory. Additionally, this stage tests to see if the addressing is going to be direct or indirect. It will be noted that all of the operations coming out of the Instruction Register Decoder which require a Vector-Fetch are ORed together in OR circuit R36, the output of which is ANDed in the two AND gates A22 and A24, the other inputs to which come from the 12th bit position of the Instruction Register which is set in accordance with whether an address for an operation is to be direct or indirect. As will be apparent, the Direct Fetch Output is from A24 and the Indirect Fetch Output from A22. The same applies to the Vector Store operation which is applied to OR circuit R38 and in turn ANDed in AND circuits A26 and A28, which determine first whether a Vector Store operation is to occur and if so, if it is to be performed as a direct or indirect address. The outputs of the AND circuits A22, A24, A26, and A28 are in turn ANDed with the turnon pulse of INSTF–8. If the operation called for is an Indirect Fetch, Direct Fetch, or Indirect Store, an output from OR circuit R140 initiates the Vector Fetch Clock (VF). If an output from AND circuit A36 had occurred, indicating a Direct Store operation, the system branches to the Store Clock (VDS).

Assuming that clock stage INSTF–8A is initiated, the turnon of this stage sets the Vector Fetch flip-flop to a "1" which initiates the first stage of the Vector Fetch Clock. The turnoff of INSTF–8 initiates INSTF–8B which in turn tests for the completion of the Vector Fetch Clock sequence which will reset the Vector Fetch flip-flop to a "0." The turnon of INSTF–8B branches to INSTF–8C if the Vector Fetch flip-flop is still in the "1" condition. Stage INSTF–8C as with the previously described time delay sequences merely allows time for the Vector Fetch Clock sequence to be completed. As soon as this operation is completed and the Vector Fetch flip-flop is reset to a "0," the initiation of clock stage INSTF–8B will cause the system to branch to clock stage INSTF–9.

The turnon of INSTF–9 tests the Decoder for the Instruction Register. It will be noticed that this pulse is applied to gate circuit G52 which tests for the indicated outputs of the Instruction Register Decoder. If the operation called for is an Unnormalized Floating Add (VUFA) or a Normalized Floating Add (VFAD), OR circuit R42 produces an output which branches the system directly to the Floating Add Clock sequence or FAD–1. If a Normalized or Unnormalized Floating Point Subtract (VFSB, VUSF) is called for, an output from OR circuit R44 occurs which causes the sign bits of all the Z Registers to be inverted and the system then branches to the Floating Add Clock. If the operation called for is a Normalized Floating Add Magnitude or Unnormalized Floating Add Magnitude (VFAM, VUAM), a pulse appears on line R46 which causes the sign bits of the Z Register to be set to a 0 and the system then branches to the Floating Add Clock. And finally, if the operation called for is a Normalized or Unnormalized Subtract Magnitude operation (VFSM, VUSM), an output appears from OR circuit R48 which causes the sign bits of the Z Register to be set to ones and the system then branches to the Floating Add Clock. It will be noted that the outputs of OR gates R42, R44, R46, and R48 are in turn ORed in OR gate R50 to initiate the Floating Add Clock sequence. The output from R50 also causes the FAD flip-flop to be set to a "1" (all on FIG. 5).

Effective Address Clock

The purpose of this clock sequence is to develop an address from information provided in the instruction. It will be noted from the description of the Instruction Fetch Operation, the Effective Address Clock is initiated by the said Instruction Fetch Operation. The turnon of clock stage EA–1 gates the $I_1$ field (4 bits) from the Instruction Register on FIG. 5 to the Index Address Register of FIG. 2. This is done by applying the turnon pulse of clock EA–1 to gate G24 on FIG. 2. Since on FIG. 2, the turnon pulse of the EA–1 is applied to OR circuit R26, the output of which sets the Index Register Write flip-flop to a "0." This setting indicates that there is to be a recycle in the Index Register. The turnoff of EA–1 initiates clock stage EA–2, the turnon of which gates the contents of the selected position of the Index Register through gate circuit G26 into Adder A. Also, gate the low order 18 bits of the Instruction Register indicated on FIG. 5 through gate circuit G28 of FIG. 2 into Adder A. The two inputs to Adder A will automatically be added and the sum will appear in the Register $A_2$ on FIG. 2. The fall of EA–2 is applied to gate G30 to test the contents of the 13th bit position of the Instruction Register (counting from the left) and if this bit position contains a 1, the control branches through OR circuit R28 and sets the Single Word Fetch flip-flop to a 1 which, as is indicated, initiates clock step SWF–1. If the 13th bit position of the Instruction Register had been set to a 0, an input would be supplied to OR circuit R30, the output of which sets the Effective Address flip-flop to a 0.

Assuming that the 13th bit position contained a 1 and the system branches to the Single Word Fetch Operation, upon the end of this operation clock stage EA–3 is turned on. The turnon pulse from this clock stage is supplied to gate 23 which gates the low order 23 bits from the Odd Numbered Z Register. The fall of EA–3 returns control to EA–1. As will be apparent, this clock sequence will recirculate until a 0 finally appears in said 13th bit position. It will be noted that on each cycle, however, a new number is transferred into the low order 23 bit positions from the odd numbered Z Registers and ultimately, a 0 will, in fact, appear in the particular bit position which will stop the recirculating of this particular clock sequence.

Vector Expand Clock (VEXPD)

This clock sequence performs the previously described Expand operation wherein a vector of numbers stored in the X Registers is modified in accordance with the contents of the Logical Accumulator Register or $u$ Register as was previously described. This operation thus is essentially a restructuring of the data and as will be remembered, wherever a 1 appears in the Logical Accumulator, the next number stored in an adjacent position of the X Register will be placed in the associated position the X Register. Similarly, where a "0" appears, there will be nothing or a 0 contents in the appropriate member of the X Register. Proceeding now with the description of this particular clock sequence, it will be noted that the first clock stage or VEXPD–1 is initiated by the setting of the VEXPD flip-flop on FIG. 5 whose output emanates from gate circuit G40 at the end of the clock stage INSTF–5A. The initiation of clock stage VEXPD–1 sets the $v$ Input Ring on FIG. 11 to 1. It sets the $u$ Output Ring on FIG. 8 to a 1 and sets the Counter J on FIG. 7 to 1. Set the $v$ Register on FIG. 11 to all "1's" with the exception of the $v_0$ which is set to a "0." The turnoff of VEXPD–1 initiates VEXPD–2.

VEXPD–2 tests the contents of a particular position $j$ of the $u$ Register. This is done, referring to FIG. 8, by applying the VEXPD–2 pulse to gate circuit G56. It will be noticed referring to this figure that an output from only one of the register positions is able to appear at this gate circuit since the contents of the Output Ring allow only one register position to appear a the gate circuit as will be readily understood. Referring now to the output of gate circuit G56, it will be noted that if the particular position of the $u$ Register being interrogated is set to a "1," the system will branch to clock position VEXPD–4. Alternatively, if the particular register position is set to a "0," the system branches to VEXPD–3.

The turnon of VEXPD–3 causes the contents of the entire X Register to be shifted down one position, i.e., contents of the first X Register will be shifted into the second register position, contents of the second register position will be shifted into contents of the third register position, etc. The controls showing the application of the VEXPD–3 pulse to the appropriate register rings and shifting position is shown in FIG. 6. It should now be noted that a number will be shifted into a position of the X Register only if the associated bit position of the $v$ Register is set to a "1." In the present instance, it will be remembered that all positions of the $v$ Register were set to a 1 except the 0 position on the clock step VEXPD–1. Referring now specifically to FIG. 6, it will be noted that the turnon pulse of VEXPD–3 is applied to gate circuit G58, an output from which is applied to either OR circuit R54 or R56, depending upon whether the upper bit position flip-flop $X_1^{k-1}$ is set to a "1" or a "0" (refer to the just previously mentioned flip-flop as the Temporary Storage flip-flop as indicated). It will be noted that the output of the OR circuits R54 and R56 are applied to gate circuit G60 which is controlled by the setting of the associated $v$ Register ($v_k$) to a "1." Thus, if a 0 had been stored in this position, the shifting of the number stored in the upper bit position of the X Register would not be shifted down into this register. The result of this operation is the shifting of the number stored in the $k-1$ Register of the X Register down to the $k$ position of the X Register. Although only one bit position is actually shown in FIG. 6, it will be understood that there are 36 such bit positions since a 36 bit binary code is utilized with this system, all of which 36 positions are shifted during this operation. The turnoff of VEXPD–3 initiates VEXPD–4.

The turnon of VEXPD–4 gates a 0 to the particular position of the $\underline{v}$ Register currently called for by the setting of the $\underline{v}$ Input Ring. The turnoff of VEXPD–4 turns on VEXPD–5.

The initiation of VEXPD–5 causes the Output Ring of the $\underline{u}$ Register of FIG. 8 to be advanced. It also advances the Input Ring of the $\underline{v}$ Register on FIG. 11. It further increments Counter J on FIG. 7 and on turning off initiates VEXPD–6.

The turnon of VEXPD–6 tests the current setting of the Counter J to see if it is on its 17th position which would indicate that this phase of the Expand operation is complete. The result of this test will be noted on FIG. 7 as the output from gate 62. If the output is a not 17, the system will branch to VEXPD–2. If the number is equal to 17, the system will branch to VEXPD–7.

The turnon of VEXPD–7 causes the contents of the $\underline{u}$ Register to be inverted and transferred to the $\underline{v}$ Register. By this inversion is meant every place a 1 was stored in the $\underline{u}$ Register, a 0 is to be stored in the $\underline{v}$ Register and vice versa. The VEXPD–7 turnon pulse is applied to gate circuit G64 on FIG. 8 which applies the inverted output from the $\underline{u}$ Register to said $\underline{v}$ Register. As is understood, to obtain the inverted output, the 0 position of the, for example, $\underline{u}_1$ is connected to the transfer cable so that it will connect with the "1" setting in the associated bit position of the $\underline{v}$ Register. It will be noted that this latter transfer occurs via cable C70 from FIG. 8 to FIG. 11.

The turnoff of VEXPD–7 initiates VEXPD–8 whose turnon sets the storage registers throughout the $\underline{X}$ Register array to a "0" for every register position containing a "1" in the associated bit position in the $\underline{v}$ Register. The manner in which this is accomplished is illustrated again in FIG. 6 wherein it will be noted that the VEXPD–8 pulse is applied to the OR circuit R56 which will develop an output which will be transmitted to the gate circuit G60 to reset the flip-flop $\underline{X}_i^k$ to a 0 if a "1" is applied to said gate circuit G60. Again, in this operation it will be noted that FIG. 6 illustrates only one bit position of one register and that this operation is parallel in all 36 bit positions of all 16 registers depending, of course, on whether a "1" appears in the associated bit position of the $\underline{v}$ Register as mentioned previously.

The turnoff of VEXPD–8 results in the setting of the VEXPD flip-flop on FIG. 5 to a 0 which, as will be understood, means that this operation has now been completed. The turnoff of VEXPD–8 also turns on STA–2.

Compress Clock (VCMPS)

The operation to be described with reference to this section is the Compress operation wherein a vector or 1 dimension array of numbers is compressed in accordance with a preselected pattern which is stored in the $\underline{u}$ Register.

The Compress Clock is initiated by the VCMPS output from an Instruction Register Decoder on FIG. 5 which also sets the VCMPS flip-flop to a "1." The turnon of clock VCMPS–1 (referring now to FIG. 11) sets the $\underline{v}$ Input Ring to a 0 and sets the $\underline{v}_0$ to a "0" and $\underline{v}_1$ to $\underline{v}_{16}$ to "1's." This is done by applying the VCMPS–1 pulse through gate circuit G66 and OR circuit R58 to reset the flip-flop in the $\underline{v}_0$ stage of the $\underline{v}$ Register. The other stages of this register are set to a "1" by applying the pulse VCMPS–1 through the OR circuits such as R60 in stage $\underline{v}_1$ to set said flip-flops to the "1" state. Referring now to FIG. 8, the VCMPS–1 turnon pulse also sets the $\underline{u}$ Register Output Ring to a 1 and on FIG. 7, sets the Counter J through OR circuit R62 to a 1. The turnoff of this stage initiates VCMPS–2. This clock stage tests for the setting of the particular active stage of the $\underline{u}$ Register currently selected by the setting of its Output Ring to determine whether that stage contains a "1" or a "0." This is done in, for example, position 1 of the $\underline{u}$ Register by applying the turnon pulse of VCMPS–2 to gate circuit G68 on FIG. 8. The output of this gate circuit will branch the system either to VCMPS–3 if the particular flip-flop were set to a "0" or to VCMPS–4 if the particular stage being interrogated were set to a "1." Referring again to stage 1 of the $\underline{u}$ Register, the particular stage being interrogated is determined by the setting of the Output Ring which, in the case of position 1, would initiate gate circuit G70. VCMPS–2 also causes the information stored in $\underline{X}_i^k$ (which is a particular $i$ bit position in the $k$ row of the $\underline{X}$ array to be transferred to the Intermediate Storage flip-flop associated with that position by applying the pulse to gate circuit G72. The turnoff of VCMPS–2 will now be assumed to initiate VCMPS–3 as a result of a "0" setting of the current bit position of the $\underline{u}$ Register.

The turnon of VCMPS–3 causes the contents of the Intermediate Storage flip-flops on FIG. 6 to be transmitted through gate circuit G74, OR circuit R64, or R66 into the gate G76. This gate is enabled by a "1" setting of the appropriate position of the $\underline{v}$ Register. The output of this gate circuit is then transmitted into the register position $\underline{X}_i^{k-1}$. This arrangement is shown in FIG. 6A wherein it will be understood that each of the large $\underline{X}$ Register boxes duplicates the logical circuit shown within the dotted portion of FIG. 6. VCMPS–3 also sets all of the bit positions of the $k=16$ position $\underline{X}$ Register to all "0's." The turnoff of VCMPS–3 initiates VCMPS–5.

Assuming that on clock stage VCMPS–2 that the interrogated $i$ position of the $\underline{u}$ Register had been set to a "1," VCMPS–4 would be initiated. The turnon of VCMPS–4 causes a pulse to be gated through gate circuit G66 and OR circuit R58 to set the 0 position of the $\underline{v}$ Register or $\underline{v}_0$ to a "0." The turnoff of VCMPS–4 turns on VCMPS–4A which causes the Input Ring of the $\underline{v}$ Register to be advanced one position and on the turnoff of this stage, clock stage VCMPS–5 is initiated.

The turnon of VCMPS–5 causes the Output Ring of the $\underline{u}$ Register to be advanced one position (see FIG. 8). The VCMPS–5 pulse is also applied to OR circuit R68 on FIG. 7 to increment the counter J. The turnoff of VCMPS–5 initiates clock stage VCMPS–6 whose turnon tests the current setting of the Counter J. This is done by applying pulse VCMPS–6 to gate circuit G78. Referring to FIG. 7 it will be noted from the output of gate circuit G78 that if the Counter J is not 17, the system will branch to VCMPS–2 which will continue with the Compress Clock loop or cycle. If on the other hand the Counter J is set to a 17, the Compress Clock cycle will be completed which will cause the VCMPS flip-flop on FIG. 5 to be applied to OR circuit R70 and thus set the flip-flop back to a "0," thus indicating that the Compress operation is completed. A successful test for 17 during VCMPS–6 also causes clock sequence STA–2 to be initiated which allows the instruction program to be continued.

Search for largest-smallest clock

This clock sequence performs the search for the largest or smallest number in any 17 member or less vector. The actual clock sequences listed in the Timing Sequence Chart are combined for these two operations since if all of the numbers of a particular sequence happen to be negative, the one with the smallest absolute value would, for example, be the largest number, and the one with the largest absolute value would be the smallest number. Therefore, the actual clock sequence is the same for both operations, although, as will be noted in the subsequent description of this clock sequence, the Instruction Register Decoder puts out a separate signal on the indicated output lines on FIG. 5 which are VSLG (Search for Largest) and VSSM (Search for Smallest) which output lines set the VSLG or VSSM flip-flops to a "1," either of which setting initiates clock stage LGSM–1.

The initiation of LGSM–1 sets the $\underline{v}$ Register Input Ring on FIG. 11 to a 0 and on turning off, initiates clock stage LGSM–1A. This stage causes a pulse to be gated through gate circuit G66 and OR circuit R72 to set the $\underline{v}_0$ position of the $\underline{v}$ Register still on FIG. 11 to a "1." The LGSM–1A pulse is also applied to gate circuit G80 on FIG. 20 to gate the contents of the $\underline{s}$ Register through cable C71 to the $\underline{v}$ Register on FIG. 11. What this does is transfer the contents of the $\underline{s}$ (screen) Register to the $\underline{v}$ Register in positions $\underline{v}_1$ through $\underline{v}_{16}$. This binary combination, in effect, indicates which of the numbers of a particular 17 member vector, which will be subsequently found stored in the $\underline{X}$ Registers, will actually be considered during the comparison operation as was indicated in the previous general description of the Search for Smallest and Search for Largest operations. As will be remembered in this previous description, a 0 in the screen number indicates that a particular member is not to be considered in the search.

Clock stage LGSM–1A on turning off initiates clock stage LGSM–2. The turnon of LGSM–2 is applied to OR circuit R74 on FIG. 15, the output of this OR gate sets the 0 position of the $\underline{X}$ Register Output Column Selector. The pulse from LGSM–2 is also applied to gate circuit G82 on FIG. 5 to determine whether the VSLG or VSSM flip-flops are set to a "1." If VSLG flip-flop is set, the system branches to clock stage LGSM–2A, and if the flip-flop VSSM is set to a "1," the system branches to clock stage LGSM–2B. Assuming the former condition and LGSM–2A is initiated, the turnon of this stage is applied to OR circuit R76 which gates the $\underline{X}$ Register Column on FIG. 15, said column being selected by the setting of the Column Output Selector through the gate circuit G84 and thence over cable C72 to the AND Unit on FIG. 12. As will be understood, the registers shown on FIG. 15 are necessarily schematic in nature. Referring momentarily to FIG. 6, it will be seen that the output from the Column Output Selector is applied to gate G86, the output of which is placed on the Column Output line which is shown both on FIG. 6 and also on FIG. 15. Next, LGSM–2A is applied to OR circuit R78 which applies a pulse to G88 on FIG. 11 to gate the contents of the $\underline{v}$ Register over cable C73 to the AND Unit on FIG. 12. It will be noted referring to FIG. 12 and specifically to cable C73 that the "0" lines of this cable are supplied to the OR circuit R80 and the "1" lines are applied to OR circuit R82. The outputs of both of these OR circuits R80 and R82 are applied to the AND Unit. It should be noted that the output of the $\underline{X}$ Register Column Output lines are inverted by applying the "0" lines to the AND circuits, i.e., A38 of the AND Unit. The other input to these AND gates comes from the OR circuit R82. It should also be noted that the "1" lines of the $\underline{X}$ Column Output Line C72 are applied to the OR circuits, i.e., R84 of the AND Unit still on FIG. 12. The other input to these OR circuits comes from OR circuit R80. LGSM–2A is also applied to OR circuit R86 which gates the contents of the AND Unit through gate circuit G90 and over cable C74 to the $\underline{p}$ Register on FIG. 9. It will be noted still referring to FIG. 9, that the output of cable C74 is applied to, for example. OR circuits R88 and R90 to set either the "1" or the "0" side of the individual register stages of the $\underline{p}$ Register in accordance with the signals appearing on the output from the AND Unit on FIG. 15. The turnoff of LGSM–2A initiates clock stage LGSM–3.

Assume now that clock step LGSM–2B had been initiated on clock stage LGSM–2, the turnon of this stage is applied to OR circuit R92, whose output is in turn applied to gate circuit G92, which gates an $\underline{X}$ Register column over line C75 to the OR circuit R94 and thence to the AND Unit on FIG. 12. It should perhaps be noted at this time that the function of the gate circuits G84 and G92 and the OR circuit R94 allows, in effect, an inverted output of the $\underline{X}$ Register Output Column to be transferred to the AND Unit when a Search for Largest operation is being initiated and the non-inverted contents of said $\underline{X}$ Register Column to be transmitted to said AND Unit when a Search for Smallest operation is being initiated. The pulse from LGSM–2B is also supplied to OR circuit R78, thence to gate G88 to gate the contents of the $\underline{v}$ Register to the AND Unit on FIG. 12, and next, the LGSM–2B is supplied to OR circuit R86 and thence to gate G90 to gate the contents of the AND Unit to the $\underline{p}$ Register on FIG. 9. The turnoff of LGSM–2B initiates LGSM–3. The turnon pulse of LGSM–3 is supplied to gate G94. It will be noted that the other two inputs to this gate circuit come from OR circuit R96 and also inverter I10 which, as will be apparent from FIG. 9, provides an output if any position of the $\underline{p}$ Register contains a "1." If a "1" is present in the $\underline{p}$ Register, the "$i$" flip-flop on FIG. 9 will be set to a "1." If on the other hand all of the bits of the $\underline{p}$ Register are 0, the "$i$" flip-flop will be set to a "0." The turnoff of LGSM–3 initiates clock stage LGSM–4. The turnon of LGSM–4 is applied to gate G96 which is connected to the "1" side of the "$i$" flip-flop. If the "$i$" flip-flop is set to a "1," the output from gate G96 is applied to OR circuit R98 and thence to gate G98 which gates the entire contents of the $\underline{p}$ Register over cable C77 to the $\underline{v}$ Register on FIG. 11. Thus, the contents of the $\underline{p}$ Register are copied or transmitted to the $\underline{v}$ Register. It should be noted at this point that if the "$i$" flip-flop had been set to a "0," there would have been no output from gate circuit G96 and at this point the contents of the $\underline{p}$ Register would not have been transferred to the $\underline{v}$ Register. The turnoff of LGSM–4 initiates clock stage LGSM–5.

The turnon of LGSM–5 sets the Counter J on FIG. 7 to a zero and on turning off, initiates clock stage LGSM–9. The turnon of LGSM–9 is applied to OR circuit R100 which advances the $\underline{X}$ Column Output Selector by one position. The turnoff of LGSM–9 turns on LGSM–10.

The turnon of LGSM–10 is applied to OR circuit R68 to increment the Counter J and on turnoff, initiates clock stage LGSM–11. LGSM–11 is applied to gate circuit G100 which tests whether or not the Counter J contains a 36 or not. If the number is not 36, the system branches to LGSM–6. If the number equals 36, the system branches to LGSM–12.

Assuming that the system at this particular point branches to clock stage LGSM–6. This state in turning on supplies a pulse to gate circuit G102 which tests the setting of the "$i$" flip-flop. If this flip-flop is set to a "1," the output from gate G102 is fed to OR circuit R92 and the selected column of the $\underline{X}$ Register is transferred to the AND Unit in its true form as in step LGSM–2B. If on the other hand the "$i$" flip-flop is in its "0" state, the selected column of the $\underline{X}$ Register is transferred to the AND Unit in its inverted form as in step LGSM–2A. In either of the above instances after the transfer of the selected column of the $\underline{X}$ Register is transferred, the contents of the $\underline{v}$ Register are transferred to the AND Unit and the output of the AND Unit is transferred to the $\underline{p}$ Register as in both steps LGSM–2A and LGSM–2B. The turnoff of LGSM–6 initiates clock stage LGSM–7.

The turnon of LGSM–7 is applied to gate circuit G104. This step tests for the existence of a "1" in the output of OR circuit R96 as was described previously with respect to clock stage LGSM–3. If a "1" is present in this output from OR Circuit 96, which, as will be remembered, tests the setting of the $\underline{p}$ Register, the system branches to clock step LGSM–8. If there is no output from OR circuit R96, the system will branch to clock step LGSM–9.

Assuming that the system now branches to clock stage LGSM–8, this clock pulse is applied to OR circuit R98 and thence to gate circuit G98 which gates the contents of the $\underline{p}$ Register over cable C77 on FIG. 9 to the $\underline{v}$ Register on FIG. 11. The turnoff of clock stage LGSM–8 also branches to clock stage LGSM–9 as did the turnoff of clock stage LGSM–5.

Going back now to the test made in clock stage LGSM–11, it will now be assumed that the Counter J is set to 36 and the output from gate circuit G100 branches the system to clock stage LGSM–12. Clock stage LGSM–12 tests the condition of the Effective Address flip-flop on FIG. 5. LGSM-12 is applied to gate circuit G106. If the Effective Address flip-flop is set to a "1," the system branches to LGSM-12A. If the Effective Address flip-flop is set to a "0," the system branches to LSGM-12B. If the Effective Address flip-flop is set to a "1," this means that the Effective Address Clock is currently running and attempting to extract an address which requires that the current clock sequence be held up until the Effective Address sequence is completed. Therefore, LGSM-12A is inserted for the purposes of delay only and upon turning off, reinitiates clock stage LGSM-12 wherein the condition of the Effective Address flip-flop is again tested and this process repeated until a "0" condition of the flip-flop occurs. At this point the system branches to clock stage LGSM-12B. This clock stage pulse is applied to OR circuit R102 and thence to gate circuit G24 all on FIG. 2 to gate the contents of the $I_1$ field of the Instruction Register on FIG. 5 into the Index Address Register on FIG. 2 through said gate circuit G24. Pulse LGSM-12B is also applied to set the Index Register Right flip-flop to a "1" which, as will be apparent from the drawing (FIG. 2), provides a write instruction to the Index Register. The turnoff of LGSM-12B initiates clock stage LGSM-12C.

The turnon of LGSM-12C causes the contents of the $A_2$ Register on FIG. 2 to be gated into the appropriate position of the Index Register through gate circuit G108. The register position into which this latter number will be entered is determined by the address just gated into the Index Address Register during clock stage LGSM-12B.

Referring now to FIG. 11, the clock pulse LGSM-12C is applied to gate circuit G110 which will test the position $\underline{v}_0$ to determine the setting thereof. If the $\underline{v}_0$ position of the $v$ Register is set to a "1," an output pulse is applied from the gate circuit G110 on FIG. 11 to OR circuits R104 and R106 on FIG. 5 to set the VSLG and VSSM flip-flops to a "0" depending upon which of these flip-flops was previously on. If on, the other hand, the $\underline{v}_0$ flip-flop is set to a 0, the output of gate circuit G110 causes the system to branch to clock stage LGSM-13.

The turnon of LGSM-13 is applied to OR circuit R26 on FIG. 2 which sets the Index Register Right flip-flop to a "0" or its read state LGSM-13 also sets the $\underline{v}$ Index Register on FIG. 14 to 0. The turnoff of clock stage LGSM-13 initiates clock stage LGSM-13A.

The turnon of clock stage LGSM-13A is applied directly to AND circuits A40 and A42 which initiate a test for the uppermost "1" stored in the $\underline{v}$ Register. It will be noted that the $v$ Register is shown on FIG. 11 and in block form a block is shown labeled "Upper Most Circuits." This block is shown in FIG. 14 in the right-hand section thereof which contains the two AND circuits A40 and A42. It will be apparent to a person skilled in the art that depending upon the first of the horizontal lines feeding the AND circuits directly below AND circuit A40, and A42, which receives a "1" pulse from the associated position of the $\underline{v}$ Register, will cause a series of pulses to be applied to the large vertical OR gates R108 through A114 to receive a series of pulses which will set the flip-flops in the $\underline{v}$ Index Register at the bottom of the right-hand portion of FIG. 14 automatically store the address of the position of the $\underline{v}$ Register which contains said "1."

The turnoff of clock stage LGSM-13A initiates clock stage LGSM-13B. The turnon of LGSM-13B is applied to gate circuit G112 which gates the contens of the $\underline{v}$ Index Register on FIG. 14 to cable C78 to Adder A on FIG. 2. Still referring to FIG. 2, clock pulse LGSM-13B is also applied to gate circuit G26 which gates the currently selected position of the Index Register and transfers same to the Adder A still on FIG. 2. It should be noted this time that the sum of these two numbers will appear in the Register $A_2$. The turnoff of LGSM-13B initiates clock stage LGSM-13C.

The turnon of LGSM-13C causes the contents of the I2 field of the Instruction Register shown on FIG. 5 to be transmitted through gate circuit G48 on FIG. 2 to the Index Address Register on FIG. 2. Clock stage LGSM-13C is also applied to the Instruction Register write flip-flop on FIG. 2 to set same to a "1" or Write command. The turnoff of LGSM-13C initiates clock stage LGSM-13D.

Clock stage LGSM-13D gates the contents of Register $A_2$ to be gated to the Index Register on FIG. 2 specified by the address currently stored in the Index Address Register. The turnoff of clock stage LGSM-13D is applied to OR circuits R104 and R106 to reset the VSSG and VSSM flip-flops to a "0." The turnoff of these flip-flops, whichever one was previously set to a "1," will subsequently cause the system to branch back into the Start Clock, and more specifically, to Start Clock stage STA-2, which clock stage will cause the system in turn to branch to the Instruction Fetch Clock INSTF-1.

The logic circuitry for performing these tests is shown on FIG. 5 and was described previously with reference to the description of both the Start Clock sequences and also the Instruction Fetch Clock sequences (STA and INSTF).

Operation of Memory Bus Control Unit

The description of this portion of the clock system describes the manner in which data is obtained from and stored in the system memory. This description will include a description of the manner in which addresses are generated and data is placed in memory and also brought from memory and placed in the Arithmetic Unit working registers. Separate clocks are provided for the Fetch and Store operations for four enumerated Fetching operations. It will be noted from the Table of Abbreviations preceding the detailed Timing Sequence Chart that each clock series has a separate characteristic name which is used in the present specification merely for purposes of clarity and to aid in describing the operation of the system.

The Instruction Fetch is a special Fetching operation which includes the Single Word Fetch whereby, instead of a conventional address being supplied to the A Registers, the content of the Instruction Counter is utilized to develop the desired instruction address and the particular word is transferred from memory temporarily into the $\underline{Z}$ Register, and then is subsequently transferred into the Instruction Register, from which point the actual instruction will be carried out or performed by the system. The Vector Direct Fetch is perhaps the most important Memory Accessing operation characterized by the present system wherein a plurality of addresses are developed by the Index and Address Units from a single address supplied to each separate Memory Box whereby a vector or plurality of data segments will be extracted from memory and supplied to all of the $\underline{Z}$ Registers associated with each Arithmetic Unit. The Zero Fetch is a special case wherein a single word is fetched from memory but instead of being placed in a single $\underline{Z}$ Register in a single Arithmetic Unit, this same piece of data is placed in all of the $\underline{Z}$ Registers of each Arithmetic Unit.

It will of course be assumed in the subsequent description that the Start Clock operation or sequence has been completed before entering into this particular operation.

It will be assumed that the address of the desired data is in Register $A_2$ of the FIG. 2. It will be remembered that in this operation it is desired to ultimately transfer the data whose address is in Register $A_2$ into Register $\underline{Z}_1$ of FIG. 1.

The first of the operations to be described will be the Single Word Fetch wherein it is desired to extract a single word from memory utilizing a single address provided from the instruction.

Single Word Fetch Clock (SWF)

Referring now to the Timing Sequence Chart indicated as the Single Word Fetch, it will be noted that all of the clock steps have the prefix SWF. The turnon of stage clock SWF–1 sets the A Input Ring on FIG. 2 to a 1 at the indicated reset point, sets the A Output Ring to a 1, and it also sets the Odd Numbered Z Input Ring on FIG. 1 to a 1 again by the indicated input line. The turnoff of SWF–1 initiates SWF–1A. The turnon of this clock stage causes the transfer of the contents of Register $A_2$ to Register $A_3$ through the gate circuit G10. The turnoff of this clock stage proceeds to SWF–2.

This next clock stage tests whether or not the particular Memory Box from which the desired data is to be extracted is currently busy, i.e., performing an operation from some other portion of the program. This is done by means of testing a busy flip-flop one of which is associated with every Memory Box of which the Memory Box shown in FIG. 3 is exemplary. The busy flip-flop is labelled as such on this figure and the output line from the one side thereof is shown entering the top line of the series of AND gates on FIG. 23, which figure is labelled "test for busy." It will be noted that there is a line from each busy flip-flop on each Memory Box proceeding into this series of AND circuits as indicated. It will be noted that there is a series of two AND circuit matrices at the top of FIG. 23, one of which proceeds from Register $A_3$ and the other from $A_1$. The reason for having such series of circuits is that during certain operations, i.e., Vector Fetch or Store addresses are generated two at a time and the provision of these two AND circuit matrices allow a test for busy to be made two at a time. The particular way in which the test for busy is made is that one of the 16 lines coming out of the $A_1$ or $A_3$ Registers is actuated depending upon the particular Memory Box in which a desired piece of information is stored. Thus, if a particular Memory Box is called for, producing an input to one of the AND gates and concurrently therewith an input is received from the particular busy flip-flop line, a signal will be produced from one of the OR circuits R10 or R12. Thus, no output from either of these OR circuits indicates that the particularly addressed memory is not currently busy and a Fetch operation may proceed.

It should also be noted that in the Addressing scheme used with the present system that the last four bits of any address indicate the particular Memory Box in which the desired segment of data is stored, and the first 14 bits of any address represent the actual *x–y* coordinate storage location in the particular Memory Box.

Continuing now with the description of the SWF Clock, on clock stage SWF–2 the turnon of SWF–2 is applied to OR circuit R14 and gate circuit G12 on FIG. 23 which, depending upon whether or not there is an output from R10, flip-flop F10 will be set to a "1" or a "0." The fall of SWF–2 is applied to gate circuit G14 which branches the system to SWF–3 if the Memory Box were busy and SWF–4 if the Memory Box were not busy. Assuming that the Memory Box was busy and the system branches to SWF–3, this clock stage is merely for purposes of delay and does not have an actuating turnon pulse, but merely after a predetermined period of time produces a pulse on turnoff which is again applied to SWF–2. This cycle will continue until it is determined that the desired memory location is not busy thus actuating the "0" side of F10 to initiate clock stage SWF–4. The turnon of SWF–4 is applied to OR circuit R16 and gate circuit G16 which gates all 18 bits in the Register $A_3$ of FIG. 2 onto the MAR–A Transfer line. The low four bit portion indicated in FIG. 2 is transferred into the particular position of the A Matrix specified by the setting of the A Input Ring.

In this particular instance it will be remembered that this Input Ring was previously set to a 1. Concurrently, these four bits are placed in the A Address Decoder which selects the particular Memory Box to which the particular address specified by the high 14 bits of the address are to be gated. The A Matrix and the Transfer lines are all shown on FIG. 2. Referring now to FIG. 3, the turnon pulse of SWF–4 is applied to OR circuit R18 which in turn causes one input to AND circuit A10. The other input to AND circuit A10 comes from the particular output from the A Address Decoder which is applied to single shot S10, the output of which provides a second input to A10 upon turnon of the single shot. It will be noticed that a second output from the single shot S10 is shown. The function of this is to maintain this line active throughout the memory cycle which as will be seen subsequently allows the various memory operations to be performed. It will be noted that this line is applied to OR circuit 20, one output of which is applied to the busy flip-flop to set same to a "1." This, as will be remembered from the previous description, indicates that this particular Memory Box is now being utilized and any subsequent operations on same must be held up until such operation ceases. Referring back to AND circuit A10, it will be noted that the output is applied to gate G18 which now gates the 14 bit address from the MAR–A Transfer line to the MAR (Memory Address Register) for the memory. The turnon pulse of SWF–4 is also supplied to OR circuit R22, the output of which is supplied to AND circuit A122 whose output is supplied to the Read Access Input to the memory thus indicating that the present cycle is a Read cycle. Still another output of OR circuit R22 is supplied through AND gate A14 which is ANDed with the appropriate line from the A Data Decoder in FIG. 2 the appropriate output line of which is determined by the address in the first storage location of the A Matrix wherein the address has just been stored. It will be noted that the A Output Ring is sitting on the 1 position to which it was set at the beginning of this Clock, thus gating the particular address stored in the position A1 of the A Input Ring. The contents are gated into the A Data Decoder through gate circuit G20 as the turnon pulse from SWF–4 is also applied to this gate. The output of A14 is applied to gate G22 which opens a path for transferring data from the MDR to the MDR–A Transfer line, which line will subsequently be connected to the Z Register to which it is desired to transfer the data.

Referring now to FIG. 5, the "1" output of the Effective Address flip-flop is ANDed in AND circuit A71 with the turnon pulse of SWF–4. The output of this AND circuit sets the Odd Numbered Z Output Ring to 1. The setting of the Effective Address flip-flop is described in the description of the Effective Address Clock sequence. It will be noted that if the Effective Address flip-flop had been set to a "0," the Odd Numbered Z Output Ring would not have been reset to a "1."

SWF–4 on turning off initiates SWF–5. It should be noted that data was actually transferred during the latter portion of SWF–4 and is placed in the Z Register at the position indicated by the Odd Numbered Input Ring which was set during clock step SWF–1. The fall of SWF–5 goes to OR circuit R24 which resets the Single Word Fetch flip-flop to a 0. This pulse is also ANDed with the "1" setting of the Effective Address flip-flop in AND gate A16, the output of which initiates clock pulse EA–3.

Vector Direct Fetch Clock (VDF)

This series of clock sequences relate to the previous section of the specification wherein the optration of the Address Generation and the Memory Bus Control Units is explained. Generally, this section indicates the manner in which 16 addresses will be generated using the base address $\alpha$ and a $\delta$ from which these addresses will be generated taking the form $\alpha$, $\alpha+\delta$, $\alpha+2\delta$ . . . $\alpha+15\delta$. This section further illustrates how the generated addresses are then transferred to the Memory Address Registers of the 16 disclosed memories and how the data is appropriately gated from memory back into the Z Register.

If the instruction program calls for a Vector Fetch at this point, it will have been detected during the Instruction Fetch (INSTF) operation and the turnon of the INSTF–8A will set the Vector Fetch flip-flop to a "1" to initiate clock stage VDF–1. This flip-flop is shown on FIG. 5. At this point, it should be noted that the $\delta$ or increment number to be used in the Address Generation was transferred from the Instruction Register on FIG. 5 and stored in the δ Register on FIG. 2 during clock sequence INSTF–7. Similarly, the base address α was stored in the Address Register $A_2$ on FIG. 2 during clock step EA–2. The turnon of VDF–1 is applied to OR circuit R168 to reset Counter #1 to "0" on FIG. 21. VDF–1 is also applied to OR circuits R170 and R172 to reset the Odd Numbered and Even Numbered Z Register Input Rings to 1. VDF–1 are applied to OR circuit R174, R176, R178 and R180. The A Matrix and B Matrix Input and Output Rings are set to 1. The turnoff of VDF–1 initiates VDF–1A.

The turnon of VDF–1A is applied to OR circuit R182 and thence to gate circuit G10 on FIG. 2 to gate the contents of Register $A_2$ into Register $A_3$ and Register $A_0$. The turnoff of clock stage VDF–1A initiates clock stage VDF–2.

The turnon of VDF–2 is applied to OR circuit R186 and thence to gate circuit G152 all on FIG. 2 to gate the contents of the δ Register into the δ Decoder whose output brings up the 0 or not 0 line. VDF–2 is also applied to OR circuit R184 and gate circuit G154 to set the flip-flop F14 to a "1" if δ is 0 and to a "0" if the δ is not 0. The fall of VDF–2 is applied to gate circuit G156, the output of which branches to clock stage VDF–2A if 0 or to VDF–3 if not 0.

Assuming the condition where δ is not 0, i.e., wherein 16 different addresses will be derived as was explained in the above mentioned operation of the Address Generation Unit, the system proceeds as follows. The turnon of VDF–3 is applied to OR circuit R186 and OR circuit R188, the outputs of which are applied to gate circuits G152 and G158, respectively, to gate the δ into the Adder B. VDF–3 is also applied to OR circuit R190 and thence to gate circuit G160 to gate the contents of Register $A_0$ also into the Adder B. The sum is automatically transferred into Register $A_1$. Concurrently, the δ is passed through the Shift Block wherein the binary bit representation is shifted to the left by one bit position and placed in Adder A. It should be noted at this point that the shift to the left is equivalent to multiplying this number by 2, which results in the quantity 2δ being placed in Adder A. Also concurrently with the gating of the number in Register $A_0$ into the Adder B this number is also gated into the Adder A through the gate circuit G160. This sum appears in Register $A_2$.

Still referring to FIG. 2, the next operation is to test the last 4 bit positions of the Register $A_3$ and Register $A_1$ to to see if they are equal. If they are equal this means that there is a memory conflict or in other words, that these two addresses lie in the same Memory Box. In this event, the system must be halted and the contents of the address specified by Register $A_3$ is fetched.

Assume now that the turnoff of VDF–3 initiates VDF–4. The turnon of VDF–4 is applied to OR circuit R192 and thence to gate G162 which gates the results of the Compare Register adjacent the Register $A_1$ to set the flip-flop F16 to a "1" in the case of a no compare or to a "0" in the case of a compare. The fall of VDF–4 is applied to gate circuit G164 to branch the system to VDF–5 if the numbers do not compare or to clock sequence VDF–4A if they do compare.

Assuming the first condition, i.e., the numbers do not compare, the system branches to clock stage VDF–5, which tests the condition of flip-flop F18. At this point it will be noted that the lower four bits of Register $A_3$ are directly connected over cable C104 on FIG. 2 to the $A_3$ Decoder on FIG. 23. This Decoder converts this four bit binary code into a 1 out of 16 code which will bring up 1 of the 16 lines coming from the bottom thereof. The line brought up will be indicative of the particular memory cell which the 4 bit code applied to the Decoder is requesting. Therefore, 1 bit to the, for example, AND circuit A56, will come from the Decoder and the other input to the AND circuits will come from the "busy" flip-flop which is associated with each Memory Box as illustrated in FIG. 3. The signals are obtained from the "busy" flip-flops only if the particular requested memory is busy. If a requested memory is busy, an output will be transmitted to OR circuit R12 and thence to OR circuit R194.

Concurrent with the operation described in the above paragraph, the low order 4 bits of the Register $A_1$ are directly connected over calbe C105 on FIG. 2 to the $A_1$ Decoder on FIG. 23 where the same operation occurs as for the $A_3$ Decoder. In other words, if the requested Memory Box is busy, an output will be transmitted to OR circuit R10 and thence to OR circuit R194.

It may, therefore, be seen that if either of the desired Memory Boxes is busy, an output will be obtained from OR circuit R194 or if it is not busy, an output will be obtained from inverter I16. Therefore, upon the application of clock pulse VDF–5 to OR circuit R196 and gate circuit G166, flip-flop F18 is set to "0" if both Memory Boxes are free or set to a "1" if either or both of the Memory Boxes is busy. The fall of VDF–5 is applied to gate circuit G168 if the flip-flop F18 indicates that one of the memories is busy, the system branches to clock stage VDF–5A, and if the flip-flop F18 indicates that neither memory is busy, the system branches to clock stage VDF–6.

Assuming that the Memory Box is busy, the system branches to clock stage VDF–5A which is merely a delay stage which performs no function other than to allow operations to be completed and on turning off, reinitiates clock stage VDF–5. Assuming now that neither Memory Box is busy and clock sequence VDF–6 is initiated, the turnon of VDF–6 is applied to OR circuits R198 and R200 and gate circuits G16 and G170 to transfer the contents of the Registers $A_3$ and $A_1$ respectively over the MAR–A Transfer line and the MAR–B Transfer lines on FIG. 2 to the Memory Box section in the right hand portion of FIG. 2. It will be noted that the low order four bits of both the MAR–A and MAR–B Transfer lines go to the A Matrix and the B Matrix, respectively, into the storage position selected by the A Input Ring and the B Input Ring. These addresses will be used later for Outputing operations as will be explained. Concurrently with this operation, the lower four bits from the MAR–A and MAR–B Transfer lines into the A Address Decoder and the B Address Decoder where they go from four bit binary code to a 1 out of 16. In other words, these Decoders select a particular memory into which the associated high order 14 bits are to be transferred. Thus, it will be seen that the two MAR Transfer lines are divided into a lower order four bits and a high order 14 bits, the low order bits being used to designate a Memory Box and the high order 14 bits being used to designate a particular word location in said Memory Box.

Referring now to FIG. 3 which is a detail of one of the Memory Boxes shown in FIG. 2, the output of a particular line from the A Address Decoder is supplied to the single shot S10 and the output from the B Address Decoder would be supplied to the single shot S14. Assuming that the address to the particular Memory Box shown in FIG. 3 came down the MAR–A line, single shot S10 would provide an output and thus, one input to the AND circuit A10, the other input thereto being provided by the setting of the VDF flip-flop and through OR circuit R22 and R18. The output of A10 is applied to gate circuit G18 to gate the 14 bits appearing on MAR–A to the Memory Address Register (MAR) of the Memory Box. If the signal had appeared on the MAR–B line, the single shot S14 would have been actuated, thus, providing $S_1$ input to AND circuit A58. The other input to A58 similarly comes from OR circuit R18, thus, energizing gate circuit G172 to gate the 14 bit address into the Memory Address Register for this particular Memory Box. Simultaneously, the outputs of F10 and S14 are ORed in OR circuit R20 whose output provides one output to AND circuit A12, the other input of which comes from the energized OR circuit R22 which is energized by the VDF flip-flop. The output of AND circuit A12 is used to start a Memory Read cycle and to set the Memory Read flip-flop F20 to a "1." The output of OR circuit R20 is also used to set the "busy" flip-flop to "1." The turnoff of VDF–6 initiates VDF–7 and VDF–10 which will proceed to operate in parallel.

As stated above, clock sequences VDF–7 and VDF–10 occur in parallel. The sequence beginning with VDF–10 will be described first for reasons of simplicity. The turnon of VDF–10 is merely a delay stage and performs no specific function other than to allow time for the Memory words to be read into the associated Memory Data Registers (MDR), see FIG. 3. The turnoff of VDF–10 initiates clock stage VDF–11. VDF–11 is applied to gate circuit G20 which accesses the address stored in the A Matrix and transfers same to the A Data Decoder which decodes this address and selects the particular Memory Box indicated by the address stored in the selected location of the A Matrix Output Ring. Referring now to FIG. 3, one of the 16 lines coming out of the A Data Decoder is applied to a particular Memory Box and specifically, on FIG. 3, to AND circuit A14. The other input to this AND circuit comes from OR gate R22 which is energized by the VDF flip-flop. The output from AND circuit A14 is applied to gate G22 which gates the contents of the MDR onto the MDR–A Transfer line (36 bits). Referring now to FIG. 2 and the MDR–A Transfer line, it will be noticed that VDF–11 is also applied to gate circuit G174 which transfers the data over cable C106 to a selected stage of the Odd Numbered Z Register shown on FIG. 1. The particular Z Register storage position is selected by the Odd Numbered Z Register Input Ring.

The contents of the B Matrix is placed in the B Data Decoder by applying pulse VDF–11 to gate circuit G21 on FIG. 2 and the output of the B Data Decoder selects 1 of 16 output lines to select the desired Memory Box and set up the desired data transfer path in substantially the same manner as for the just described operation of the A Data Decoder. Referring briefly to FIG. 3, the output of the B Data Decoder is applied to AND circuit A15 and the gate circuit G23 is energized to set up a flow path to the MDR–B Transfer line. Thus, the data is transferred along the MDR–B Transfer line and passes through gate circuit G175 also energized by clock step VDF–11 and thus, into the Even Numbered Z Register over cable C108 into the particular register position of the Z Register selected by the Even Numbered Z Register Input Ring. The fall of VDF–11 is applied to OR circuit R202 and R204 to advance both the Even Numbered and Odd Numbered Z Register Input Rings. The fall of VDF–11 is also applied directly to advance the Output Rings of both the A Matrix and the B Matrix.

Referring to FIG. 3, as a Read cycle is completed, a pulse will be produced on the Done line coming out of the Memory Box which will reset the Read Access flip-flop F20 and the "busy" flip-flop to "0."

Referring now back to clock stage VDF–7, which it will be remembered is initiated in parallel with VDF–10, this pulse is applied to advance the A Matrix and B Matrix Input Rings on FIG. 2 and also increments the Counter #1 on FIG. 21 through OR circuit R206. The turnoff of VDF–7 initiates clock stage VDF–8.

The turnon of VDF–8 is applied to OR circuit R208 on FIG. 21 and gate circuit G176 which tests the Counter #1 for an 8 or not an 8. The turnoff of VDF–8 is applied to gate circuit G177. If the Counter is set to an 8, the system branches to clock sequence VDF–1A and if not an 8, it branches to VDF–9, the branching being determined by the output of G177. Clock stage VDF–9 tests to determine whether the operation is a Direct or Indirect Fetch or Store. This is tested for by examining the 12th bit position of the Instruction Register on FIG. 5 as will be remembered from the general discussion of instruction programs, this 12th bit position is set to a "0" if a Direct Fetch or Store is required and to a "0" if an Indirect operation is to occur. Assuming first that the bit is set to a "0," AND circuit A24 will be enabled obtaining a 1 input from the "0" side of the flip-flop and the other input from the Instruction Register Decoder and OR gate R36. The output of A24 is ANDed with VDF–9 at AND circuit A60 still on FIG. 5. The output of A60 is ANDed with the fall of VDF–9 and AND circuit A62, the output of which resets the Vector Direct Fetch flip-flop to a "0." This indicates that the Fetch operation is completed since the numbers in the Z Register are actually the data desired and not addresses of data which must still be obtained as is the case with a Indirect operation.

Assuming now that the operation desired is an Indirect Fetch, the 12th position of the Instruction Register would be set to a "1." This condition produces an output AND circuit A22 which is ANDed with VDF–9 to bring up AND circuit A64. The output of A64 in turn sets the Indirect Fetch flip-flop to a "1." The fall of VDF–9 is ANDed with the output of the "1" side of the Indirect Fetch flip-flop at AND circuit A66 to initiate the timing sequence clock VIF–9A.

Assuming the operation called for were an Indirect Store, a "1" would have appeared in the 12th bit position of the Instruction Register and a pulse would have been produced from OR circuit R38 coming from the Instruction Register Decoder. These two signals would have caused AND circuit A26 to be energized, thus, producing an output which together with the VDF–9 pulse causes AND circuit A68 to set the Indirect Store flip-flop to a "1." The "1" setting of the Indirect Store flip-flop together with the fall of VDF–9 sets AND circuit A70, the output of which initiates the clock sequence VIS–50, which is the first stage of the Vector Indirect Store Clock sequence.

At this point we will return to the clock step VDF–4 where a test was made to see if the last 4 bit positions in the Register $A_1$ and Register $A_3$ were equal, which equality indicates that the two addresses are in the same Memory Box, thus, indicating a memory conflict. Assuming this condition now exists, the system branches to the clock sequence VDF–4A.

At this point the manner in which the system operates is to first obtain the data indicated by the address stored in the Register $A_3$ and place said in the appropriate Z Register position and then obtain the data at the address indicated in Register $A_1$ and likewise, appropriately store it in the Z Register. The reason for the separate operations is obviously that the two addresses in these two registers are in the same Memory Box. The manner in which this is done is as follows. The turnon of VDF–4A is applied to OR circuit R210 which is applied to gate circuit G178. This gate circuit is connected to the output of OR circuit R12 associated with the $A_3$ Decoder all on FIG. 23. As will be remembered, an output from the OR circuit R12 will mean that the requested Memory Box is "busy." Thus, if the desired Memory Box is busy, the flip-flop F22 will be set to a "1," and conversely, if it is not busy, the flip-flop will be set to a "0." The fall of clock stage VDF–4A is applied to gate circuit G180 which tests the setting of flip-flop F22. If F22 is busy, the system goes to clock stage VDF–4B which is merely a delay to allow completion of the current memory cycle which causes the requested Memory Box to indicate as busy. If the flip-flop F22 is not busy, the system wil branch to clock stage VDF–4C.

VDF–4C is applied to OR gate R198 which energizes gate circuit G16 to transfer the lower order 4 bits of the address in Register $A_3$ into the A Matrix at the position selected by its associated Input Ring. These 4 bits are concurrently transferrred to the A Address Decoder (all on FIG. 2) which selects the proper Memory Box to which the remaining 14 bits of the address are to be gated. The remainder of clock step VDF–4C operates in an identical fashion to VDF–10. In other words, it loads the proper MAR with an address and initiates a Read cycle of the Memory Box and sets the appropriate Read Access flip-flop and "busy" flip-flop. The turnoff of VDF–4C initiates VDF–4D. Clock stage VDF–4D again is only for the purpose of allowing a memory cycle to be completed and on turning off, initiates clock stage VDF–4E.

The turnon of VDF–4E is supplied to gate G20 which gates the output of the appropriate position of the A Matrix to the A Data Decoder which selects the proper MDR to put on the MDR–A Transfer line also similar to the operation described above. VDF–4E is applied to gate G174 to place the data on the MDR–A Transfer line over cable C106 (all on FIG. 2) to the Odd Numbered Z Register on FIG. 1 to the position selected by the associated Input Ring. The turnoff of VDF–4E initiates VDF–4F.

The turnon of VDF–4F initiates a sequence of operations wherein the data stored at the address indicated in the Register $A_1$ will now be brought out of memory and stored in the appropriate position of the Z Register. The VDF–4F sequence going through VDF–4G, VDF–4H and VDF–4I operate in substantially the same manner as clock stages VDF–4A through VDF–4E and it is not considered necessary to completely repeat the detailed description of this clock sequence as it believed that the operations will be largely apparent. However, the general philosophy is that the Memory Box address is transferred from the Register $A_1$ which selects the proper Memory Box and subsequently the actual address portion is gated into this proper Memory Box and a Read cycle initiated and the data placed in the MDR and subsequently transferred to the appropriate position of the Z Register.

VDF–4H makes a test for a branch by applying the fall of VDF–4H to gate circuit G200 associated with the Vector Indirect Fetch flip-flop on FIG. 5. If this flip-flop is set to a "1," the branch goes to VIF–9H. If this flip-flop is set to a "0," the system branches to VDF–7. However, on clock stage VDF–4H, the clock sequence VDF–7 is initiated in parallel with VDF–4I. As will be remembered, clock sequence VDF–7 causes the A Matrix and B Matrix Input Rings to be advanced and increments the Counter #1 makes such tests as are necessary to see if a complete Address Generation cycle is completed and then branches to the end of the cycle or back into the cycle if it still necessary to generate further addresses.

Returning now to the turnoff of VDF–4I, this initiates VDF–4J.

The turnon of VDF–4J is applied to gate G21 which selects the proper Memory Box and transfers the data from the MDR into the appropriate register position of the Even Numbered Z Registers as described just previously. On the fall of VDF–4J the A Matrix and B Matrix Output Rings are advanced by applying this pulse directly to these rings on FIG. 2. The fall of VDF–4J is also applied to OR circuits R202 and R204 to advance both Input Rings of the X Register. The turnoff of VDF–4J initiates no new clock stages as this is done by the other branch beginning with VDF–7.

Zero δ Fetch

This sequence of operations is entered when it is determined that the δ or address increment to be added to the base address is 0. As stated previously in the description of the Addressing Unit, this occurs where it is desired to use the same address 16 times. The test for this Address Generation condition is made, as will be remembered, under clock step VDF–2. The actual test was made on FIG. 2 in the δ Decoder which fed into gate G154 which set flip-flop F14 appropriately. The fall of VDF–2 is applied to gate circuit G156, the output of which branched the system to the present clock stage VDF–2A. The turnon of VDF–2A is applied to OR circuit R210 where a test is made to see if the Memory Box indicated by the address in Register $A_3$ is busy. In this sequence, only the address in Register $A_3$ will be used since this is the base adress and this is the only address which will be used in the present system. If the chosen Memory Box is busy, the system branches out of gate circuit G182 to VDF–2B which is merely a delay stage which we cycled back to VDF–2A. As soon as the not busy line comes up out of flip-flop F22, the clock stage VDF–2C is initiated.

The turnon of VDF–2C is applied to OR circuit R189 and R212 to gate the contents of the Register $A_3$ along both the MAR–A and MAR–B Transfer lines to the A and B Matrices, to the A and B Address Decoders and thence into the selected Memory Box. It should be noted that since the address sent along both the MAR–A and MAR–B Transfer lines is the same, that when this address is stored in the Memory Box it will, in effect, becoming into the MAR on the line passing through both gate circuit G18 and G172 simultaneously. However, since these are the same address, no conflict is caused by this operation. The manner in which the particular gate circuits are energized is identical to the previously described Memory Read operations. The turnoff of VDF–2C initiates VDF–2D which again is a delay stage to allow completion of the Memory Read cycle. The turnoff of VDF–2D initiates clock stage VDF–2E.

The turnon of VDF–2E is applied to gates G20 and G21 to put the contents of the MDR on FIG. 3 on both the MDR–A and B transfer line and through gate G174 and G175, both actuated by VDF–2E to gate the contents of the MDR into both the Odd Numbered Z Register and the Even Numbered Z Register simultaneously. The turnoff of VDF–2E turns on VDF–2F.

The turnon of VDF–2F is applied to advance Counter #1 on FIG. 21 through OR circuit R206. The VDF–2F pulse also is applied to advance both Input Rings of the Z Register on FIG. 1. The turnoff of VDF–2F initiates VDF–2G.

The turnon of VDF–2G tests the Counter #1 to see if it is set on 8. This is done as described previously by applying a pulse to OR circuit R208 and gate G176 on FIG. 21, the output of said latter gate being applied to gate G182 which is actuated by the fall of VDF–2G. If not on 8, the system branches back to clock stage VDF–2E. This will result in continually filling the Z Register until all 16 positions thereof are filled with the data stored in the selected address of the Memory Box. If the Counter #1 is on 8, the system branches to clock sequence VDF–9. As will be remembered, on clock stage 9 the system tests whether the current operation is an Indirect or Direct Addressing operation. If the Vector Indirect Fetch flip-flop is set to a "1," the fall of VDF–9 is ANDed in AND circuit A66 on FIG. 5 with the "1" side of said flip-flop and the output of A66 branches the system to VIF–9A, the beginning of the Vector Indirect Fetch Clock.

Vector Indirect Fetch Clock

The general philosophy of the Indirect Addressing operation is as follows. The previous VDF Clock sequence has loaded the Z Register both Odd and Even with the 16 numbers obtained from the Memory Boxes. If the operation is Direct, these numbers are the actual data desired for subsequent operations and if Indirect, as in the present case, these numbers are further addresses in memory which must in turn be accesed to get the ultimate data desired. Thus, it is necessary to gate the contents of the Z Register into the Register $A_3$ and the Register $A_1$ in sequential fashion so that the Z Register positions may be filled with the actual data under control of the addresses. The Vector Indirect Fetch Clock sequence accomplishes this operation.

The turn on of VIF–9A is applied to OR circuit R170 and R172 to reset both the Even and Odd Numbered Z Register Input Rings on FIG. 1 to 1. Still on FIG. 1, clock pulse VIF–9A is applied to OR circuits R214 and R216 to set both the Odd and Even Numbered Output Rings for the Z Register to 1. VIF–9A is also applied to OR circuits R174, R176, R178 and R180 to reset both the Input Rings and Output Rings for the A Matrix and B Matrix to a 1 in each case. (On FIG. 2) VIF–9A is applied to OR circuit R218 on FIG. 20 to set the Odd Output Ring for the $\underline{s}$ Register to 1. The pulse is also applied to OR circuit R220 on FIG. 20 to set the Even Output Ring for the $\underline{s}$ Register to 2. It will be noted referring to FIG. 20 that the Odd Output Ring for the $\underline{s}$ Register is numbered in its adjacent positions 1, 3, 4 . . . to 15 and the Even Output Ring is labeled in adjacent positions 2, 4 . . . to 16. This it will be noted matches the positions of the $\underline{Z}$ Register. VIF–9A is also applied to OR circuit R168 to reset the Counter #1 on FIG. 21 to 0. Thus, VIF–9A has initialized the system to begin with the VIF Clock sequence and on turning off, initiates VIF–9B.

The turnon of VIF–9B is applied to OR circuit R184 and thence to gate circuit G154 to, in effect, test whether or not the $\delta$ is 0. The fall of VIF–9B is applied to gate circuit G184 which branches the system in accordance with the above test to VIF–9C if the $\delta$ is not equal to 0 or to VIF–9R if the $\delta$ is equal to 0. Assuming first that the $\delta$ is equal to 0 and the system has branched to clock sequence VIF–9R, the turnon of this stage is applied to OR circuit R222 and thus, to gate circuit G186 which gates the contents of the selected position of the Odd Numbered $\underline{Z}$ Registers (low order 18 bits since this is an address only) over cable C110 on FIG. 1 to Register $A_3$ on FIG. 2. VIF–9R is also applied to the 12th position of the Instruction Register on FIG. 5 to reset this position to a "0." It will be remembered that since an Indirect operation was called for, this position was previously set to a "1." The turnoff of VIF–9R turns on VDF–2A.

Now returning to the test made at VIF–9B, it will be assumed that the $\delta$ is not 0 and the system branches to to clock stage VIF–9C.

The turnon of VIF–9C is applied to the four AND gates A70, A72, A74, and A76. This pulse is ANDed in these gates with the output of the four gate circuits A68, A78, A80 and A82, one of which respectively will have an output if the combination of "1's" and "0's" is such that if $\underline{s}$ Odd and $\underline{s}$ Even are both "1's," AND circuit A68 is enabled and the system branches to clock stage VIF–9D. If $\underline{s}$ Odd is "1" and $\underline{s}$ Even is "0," AND gate A78 is enabled and the system branches to clock sequence VIF–9J. If $\underline{s}$ Odd is "0" and $\underline{s}$ Even is "1," the system branches to clock stage VIF–9N. If $\underline{s}$ Odd is "0" and $\underline{s}$ Even is "0," the system branches to clock stage VIF–9H. The particular position of $\underline{s}$ Odd or $\underline{s}$ Even is selected by the current setting of the particular associated Output Rings as gated out by the gate circuits G188 and G190.

Assuming that the system is branched to VIF–9D, the turnon of VIF–9D is applied to OR circuit R222 and gate G186 to gate the low order 18 bits of the selected Odd Numbered $\underline{Z}$ Register position on FIG. 1 over cable C110 to Register $A_3$ on FIG. 2. VIF–9D is also applied to OR circuit R224 and thence to gate circuit G192 to gate the low order 18 bits of the Even Numbered $\underline{Z}$ Register over cable C101 into Register $A_1$ on FIG. 2. The turnoff of VIF–9D is also applied to OR circuit R224 and thence to gate circuit G192 to gate the low order 18 bits of the Even Numbered $\underline{Z}$ Register over cable C101 into Register $A_1$ on FIG. 2. The turnoff of VIF–9D initiates VIF–9E.

The turnon of VIF–9E is applied to OR circuit R192 and thence to gate circuit G162. Depending on whether or not the last four bits of the addresses in Register $A_3$ and Register $A_1$ are equal, the flip-flop F16 will be set to a "0" (equal) or a "1" (not equal). Then, the fall of clock stage VIF–9E is applied to gate circuit G194. If the addresses are not equal, the system branches to clock sequence VIF–9EA. If the addresses are equal, the system branches back to clock sequence VDF–4A.

Assuming that the addresses were not equal and the system continues in the VIF Clock sequence, the operation proceeds as follows. The turnon of clock stage VIF–9EA performs a "test for busy" of the indicated memories by the addresses stored in Registers $A_1$ and $A_3$. This is done by applying the VIF–9EA pulse to OR circuit R196 and thence to gate circuit G196. As explained previously, the test for busy is made by applying the bits from the output of the $A_1$ and $A_3$ Decoders which pass through OR circuits R10 and R12 and thence through OR circuit R194 since it is desired to have both Memory Boxes free for this particular operation. The result of this operation is that the flip-flop F18 is set to a "1" if either of the Memory Boxes is busy and set to a "0" if both are free. The fall of VIF–9EA is applied to gate G196 to branch the system to VIF–9F if busy or to VIF–9G if not busy. Briefly assuming that the flip-flop F18 is set to a "1," the clock stage VIF–9F is for the purpose of delay only and branches back into clock sequence VIF–9EA. Thus, this loop will be repeated until all previously called for memory operations have been completed and the two desired Memory Boxes are available.

Assuming now that the appropriate signal is obtained indicating that both Memory Boxes are free and clock stage VIF–9G is initiated, the turnon of this clock stage is applied to OR circuits R198 and R200 and thence to gate circuits G16 and G170 respectively to gate the contents of the $A_3$ and $A_1$ Registers across the MAR–A and MAR–B Transfer lines into the A and B Matrices and the A and B Address Decoders. At this stage the addresses are gated into the proper MAR's and the data brought out of the MDR's and transferred into the $\underline{Z}$ Registers over the MDR Transfer lines in the same manner as in the clock sequence beginning with VDF–6. As in VDF–6, the system makes a double branch, one to VDF–10 and the other to VIF–9H. As will be remembered, the clock sequence beginning with VDF–10 completes and discontinues whereas the other branch of this particular system goes to VIF–9H.

The turnon of VIF–9H is applied directly to advance the Input Rings for both the A and B matrices on FIG. 2. The pulse is similarly applied to the Advance line for the Output Rings from both the Old Numbered and Even Numbered $\underline{Z}$ Register positions. The pulse is also applied to the OR circuit R226 on FIG. 20 to advance both the Odd and Even Output Rings for the $\underline{s}$ Register. VIF–9H is also applied to OR circuit R206 to increment the Counter #1 on FIG. 21. The turnoff of VIF–9H initiates VIF–9I.

The turnon of VIF–9I tests the Counter #1 on FIG. 21 for an 8. This is accomplished by applying the VIF–9I pulse to OR circuit R208 and thence to gate circuit G176. The fall of VIF–9I is applied to gate circuit G198, the output of this gate circuit branches the system back to VIF–9C if the Counter was in the "not 8" state or if the Counter were in the "8" state, the output from G198 (on FIG. 21) is applied to reset the Vector Direct Fetch flip-flop on FIG. 2 to a "0." This clock sequence completes the end of this branch and the turnoff of the VDF flip-flop will allow the INSTF Clock sequence to again become active in controlling the operation of the system.

Going back temporarily to clock stage VIF–9C, assume this time that the Odd Output was "1" and the Even Output was "0." This time AND circuit A72 would have an output which would branch the system to VIF–9J.

The turnon of VIF–9J is applied to OR circuit R222 and to gate circuit G186 on FIG. 1 to gate the contents of the Odd Numbered $\underline{Z}$ Register over cable C110 to the $A_3$ Register on FIG. 2 (lower order 18 bits). The turnoff of VIF–9J initiates VIF–9K. At this point the clock stage VIF–9K tests for "busy" for the Memory Box specified by the address in Register $A_3$. This test is made on FIG. 23 by taking the output of the $A_3$ Decoder and setting the flip-flop F22 to a "1" or a "0" depending on whether or not the desired Memory Box is busy or not busy. If busy, the system branches to clock VIF–9L which again is merely a delay to allow the particular Memory Box to complete a previous operation and become available. The turnon of VIF–9L loops back to VIF–9K. When the flip-flop F22 is finally set to a "0," the system then branches to clock stage VIF–9M. The turnon of VIF–9M gates the contents of the Register $A_3$ on FIG. 2 by applying a pulse to OR circuit R198 and gate circuit G16 to transfer the contents of Register $A_3$ over the MAR–A Transfer line to the appropriate A Matrix and A Address Decoder. The remainder of VIF–9M causes the particular address specified in the particular Memory Box to be gated to the appropriate MAR Register and the contents of this Memory Box read out into its associated MDR which in turn is gated into the appropriate stage of the Odd Numbered Z Register. As will be noted again, this operation takes the dual paths of VDF–10 and VIF–9H. VDF–10 was a loop which ends itself and VIF–9H is the advance step which was explained previously.

Referring now again to clock sequence VIF–9C, this time it will be assumed that the Odd Output is a "0" and the Even Output is a "1." This produces an output from AND circuit A74 which branches the system to clock sequence VIF–9N. This signifies that only the address in Register $A_1$ is to be considered in the current operation and proceeds as follows. The turnon of VIF–9N is applied to OR circuit R224 and gate circuit G192 to gate the contents of the Even Numbered Z Register on FIG. 1 over cable C101 to Register $A_1$ on FIG. 2 (low ordered 18 bits). The turnoff of VIF–9N initiates VIF–9O.

VIF–9O performs a "test for busy" of the Register $A_1$. This is done by applying the pulse VIF–9O to OR circuit R14 and gate circuit G12 which causes the flip-flop F10 to be set to a "1" or a "0" depending on whether the Memory Box specified by the address in the Register $A_1$ is "busy" or "free." If the specified Memory Box is "busy," the fall of VIF–9O branches to VIF–9P which again is a delay stage which allows time for completion of a current memory cycle and on turning off, reverts back to VIF–9O. When flip-flop F10 is set to a "0," the system then branches to VIF–9Q.

The turnon of VIF–9Q initiates a memory cycle as previously described in the clock sequence beginning with VDF–6. As in this previous clock sequence, the contents of the Register $A_1$ is transfererd over the MAR–B Transfer line (FIG. 2) to the appropriate B Matrix and B Address Decoder wherein a specified address and a specified Memory Box is accessed and the contents read out into the associated MDR and thence gated back into a specified Even Numbered Z Register position. As indicated in the Timing Sequence Chart for VIF–9Q, this clock sequence is again a parallel branch wherein clock sequence VDF–10 ends and the other branch goes back into VIF–9H which was previously explained in detail.

Referring again to VIF–9C, the last condition tested for is that wherein both the Odd Output and Even Output are "0." In this case, AND circuit A76 is actuated, branching the system directly to VIF–9H. The occurrence of this test indicates that due to the contents of the *s* Register, the system has found that neither of the numbers specified by the addresses currently in the Z Registers are to be utilized in current operations and therefore, the system may skip over these particular addresses and the next set of possible data accessed.

This completes the Vector Indirect Fetch Clock sequence description.

Single Word Store Clock (SWS)

This clock sequence is not one which is utilized directly in any of those operations described for the present system. However, it is exemplary of the type of operation which can be, in effect, microprogrammed utilizing the system of interconnected flip-flops described previously to effect various system operations. Such a clock sequence as this might conveniently be used to set Index Registers, Instruction Counters, as well as the *w* Register, *s* Register, and the *u* Register. Before beginning this clock, it is assumed that a specific address is stored in Register $A_3$ and specific data stored in the Odd Numbered Z Register position $Z^1$. These two register positions could have been loaded by a previous operation or directly from an Instruction Register or some other convenient well known source. Assuming now that the Instruction Register Decoder has an output capable of initiating this clock stage, the turnon of SWS–1 is applied to OR circuit R216 to set the Odd Numbered Z Register Output Ring to 1. The turnoff of SWS–1 initiates SWS–2.

The turnon of SWS–2 is applied to OR circuit R210 and gate G178 to set the flip-flop F22 to a "1" or a "0" depending upon whether or not the Memory Box specified by the address currently stored in the Register $A_3$ as detected by the $A_3$ Decoder is busy or not busy. The fall of SWS–2 is applied to gate circuit G240 which branches the system to SWS–3 if F22 is set to a "1" or to SWS–4 if F22 is set to a "0." Assuming that F22 is set to a "1," the system branches to SWS–3 which is a delay stage and loops back to SWS–2. As explained previously, this loop continues until F22 is reset to a "0," at which point the system branches to SWS–4.

The initiation of SWS–4 is applied to OR circuit R198 and gate circuit G16 to gate the contents of the Register $A_3$ over the MAR–A Transfer line (all on FIG. 2) to the A Address Decoder which selects the Memory Box specified by the low order four bits of this address and thus, transfers the high order 14 bits into the selected MAR. Concurrently, SWS–4 is applied to OR circuit R244 and gate circuit G218 on FIG. 1 to gate the contents of the selected Odd Numbered Z Register (which is $Z^1$ in the present instance) over cable C118 to the MDR–A Transfer line on FIG. 2 into the MDR of the Memory Box selected by the A Address Decoder. The fall of SWS–4 completes this cycle and would be utilized, for example, to turn off the SWS flip-flop (not shown). At this point the system would continue or branch back into, for example, the Start Clock (STA).

Vector Direct Store Clock (VDS)

This particular clock sequence is entered during the INSTF clock sequence and specifically, INSTF–8. On this clock sequence the INSTF–8 pulse is ANDed in AND gate A36 with the output from AND circuit A28 to set the Vector Direct Store flip-flop to a "1" which branches the system to VDS–21. As with the beginning of the Direct Fetch Clock sequence, it will be remembered that the value for the $\delta$ has been placed in the $\delta$ Register on FIG. 2 and the vector base address $\alpha$ as in the Register $A_2$ also on FIG. 2.

It should perhaps be noted at this point that it is a function of this clock to store the contents of the Z Register of up to 16 words in the plurality of Memory Boxes. What must be done then is to generate the appropriate addresses in the Addressing Unit and gate the contents of the Z Registers into Memory at the designated addresses.

VDS–21 is applied on FIG. 1 to the "Set to all '1's' " line on both the Odd and Even Numbered Z Register Input Rings. By doing this the complete contents of the X or Y Registers may be gated into the Z Register in one step.

The turnon of VDS–21 is applied to OR circuit R168 to reset the Counter #1 on FIG. 21 to 0. This pulse is also applied to OR circuits R214 and R216 to set the Z Register Even and Odd Numbered Output Rings to 1. It is similarly applied to OR circuits R218 and R220 on FIG. 20 to set the Odd and Even Output Rings for the *s* Register to 1. The last operation performed by this pulse is depending upon whether the VSTX flip-flop or the VSTY flip-flop is set to a "1," the contents of the X Register or the contents of the Y Register will be transferred to the Z Register. These flip-flops are shown on FIG. 5 as being connected to the output of the Instruction Register Decoder coming out of the gate circuit G42. For reasons of simplicity, these flip-flops are also shown in FIG. 15 in dotted lines and are actually the same flip-flops but here the logic by which they control the data transfers may more readily be seen.

It should further be noted that under control of the VSTX or VSTY operation the entire contents, i.e., all 16 rows of the X or Y Registers are transferred in parallel to the Z Register. The line for transferring data from the X to the Z Registers is indicated on the drawing as cable C112. The equivalent cable for transferring all rows of the Y Register to the Z Register is shown as cable C114. Referring now to FIG. 15, the clock pulse VDS–21 is applied to OR circuit R228 and thence to AND circuits A84 and A86. The other input to AND circuit A84 is the "1" side of the VSTX flip-flop. This setting obviously means that the data from the Z Register is to be transferred to the Z register. The output of AND circuit A84 passes through OR circuit R230 to energize gate circuit G204 and thus, transfer the contents of the X Register over cable C112 and to the OR circuit R232. Alternately, if the VSTY flip-flop had been set to a "1," its output would have constituted the second input to AND circuit A86 which would have energized gate circuits G202 to transfer all rows of the Y Register to the OR circuit R232. The clock pulse VDS–21 is also applied to OR circuits R234 and R236 and gate circuits G206 and G208 respectively to gate the output of OR circuit R232 into the Odd and Even Numbered Z Register positions. The turnoff of VDS–21 initiates VDS–21A.

The turnon of VDS–21A is applied to OR circuit R182 and gate circuit G10 to gate the contents of Register $A_2$ and to Register $A_0$ and also, into Register $A_3$. The turnoff of VDS–21A initiates VDS–22.

The turnon of VDS–22 is applied to OR circuit R186 and thence to gate circuit G152 to gate the contents of the δ Register on FIG. 2 to the δ Decoder. The VDS–22 pulse is also applied to OR circuit R184 and gate circuit G154 whereby flip-flop F14 is set to a "1" if the δ is 0 and to a "0" if the δ is not 0. The fall of VDS–22 is applied to gate G210 which branches the system to VDS–23 if the δ is not 0 and to VDS–22A if the δ is 0.

Assuming first that the δ is not 0, the system will branch to VDS–23. The turnon of this stage is applied to OR circuits R186 and R188 to pass the δ through gates G152 and G158. Out of gate G158 the δ is applied directly to Adder B concurrently with the contents of the Register $A_0$ which is gated out of gate G160 by applying pulse VDS–23 to OR circuit R190. The sum of this operation appears in Register $A_1$. The output of gate G158 is also applied to the Shift Block which shifts the δ to the left by 1 bit which is equivalent to a multiplication by 2 and is then applied to Adder A whose other input comes from the Register $A_0$ through gate circuit G160 under control of pulse VDS–23 applied to OR circuit R190. The output Adder A is applied to Register $A_2$. At this point in the operation in Register $A_2$ there is contained a quantity $A_0$ plus 2δ and in the Register $A_1$ there is contained the quantity $A_0$ plus δ. The turnoff of VDS–23 initiates VDS–23A.

The turnon of VDS–23A is applied to test the contents of the *s* Register on FIG. 20. This test is made to test the four possible conditions of the Odd Output Ring and the Even Output Ring in much the same way as was previously described in clock step VIF–9C. Thus, the clock pulse VDS–23A is applied to each of the AND circuits A88, A90, A92, and A94. One of the other inputs to these four AND circuits will be energized in accordance with the following conditions. If both the Odd Output and the Even Output are "1," the AND circuit A68 will be energized, thus, providing the second input to AND circuit A88 and thus, branching the system to VDS–24. If the Odd Output is 1 and the Even Output is 0, AND circuit A78 is energized, thus, providing a second input to AND circuit A90 which branches the system to VDS–23B. If the Odd Output is "0" and the Even Output is "1," AND circuit A80 is energized, thus, providing a second input to AND circuit A92 with the resultant branching to VDS–23E, and lastly, if both the Odd Output and the Even Output are "0," AND circuit A82 will be energized, producing a second input to AND circuit A94, thus, branching the system to VDS–27.

Assuming first the condition wherein both the Odd Output and the Even Output are "1," the system will branch to VDS–24. What this branch actually means is that both of the numbers whose address currently appears in the Registers $A_3$ and $A_1$ are to be used in later operations and thus, to be transferred into memory at the addresses specified in said Registers $A_3$ and $A_1$. Thus, the address is generated and transferred from the Registers $A_3$ and $A_1$ to the appropriate Memory MARs and the data is transferred from the Z Registers into the appropriate MDR's and thence into memory. Proceeding now with the operation of the system, the turnon of VDS–24 is applied to OR circuit R192 and gate circuit G162 which will set the flip-flop F16 to a "1" if the addresses specified by the Registers $A_3$ and $A_1$ lie in different Memory Boxes (made by testing lowest order four bits). The flip-flop F16 to set to a "0" if the two addresses do lie in the same Memory Box. The fall of VDS–24 is applied to gate circuit G212 which branches the system to VDS–25 if the addresses lie in different Memory Boxes and branches the system to VDS–24A if the addresses lie in the same Memory Box.

Assuming first that the addresses lie in different Memory Boxes, the system branches to clock step VDS–25. VDS–25 is applied on FIG. 23 to OR circuit R196 and gate circuit G166 to test the output of the $A_1$ and $A_3$ Decoders. Wherein as explained previously, the flip-flop F18 will be set to a "1" if either of the Memory Boxes specified by the $A_1$ and $A_3$ Addresses is "busy." If neither of these Memory Boxes is busy, the flip-flop will be set to a "0." If busy, the system branches to VDS–25A which is a delay stage to allow the memories to clear themselves and branches back into clock stage VDS–25. Assuming now that the flip-flop F18 is set to a "0," the system now branches to clock stage VDS–26. The turnon of VDS–26 is applied to OR circuits R198 and R200 and thence to gate circuits G16 and G170 to transfer the contents of the Registers $A_3$ and $A_1$ over the MAR–A and MAR–B Transfer Line. The low order four bits of both the MAR–A and MAR–B Transfer lines is supplied to the A Address Decoder and the B Address Decoder, the output of which selects the desired Memory Boxes and sets up circuit paths for the gating of the most significant 14 bits into the proper MAR for the selective Memory Boxes. Referring briefly to FIG. 3, which as will be remembered is a logical diagram for a single Memory Box, the output from the A Address Decoder is applied to the single shot S10. The turnon of this single shot is applied to AND circuit A96 whose other input is supplied from OR circuit R238 which was activated by the "1" output of the Vector Direct Store flip-flop on FIG. 5. The output of AND circuit A96 is supplied to OR circuit R240 and thence to gate G214. This gate circuit gates the information on the MDR–A Transfer line into the Memory Data Register (MDR). The output from S10 is concurrently applied to OR circuit R20 and thence to AND circuit A100. The other input to AND circuit A100 comes from the Vector Direct Store flip-flop on FIG. 5 through OR circuit R238 which was activated by the "1" output of the Vector Direct Store flip-flop on FIG. 5. The output of AND circuit A96 is supplied to OR circuit R240 and thence to gate G214. This gate circuit gates the information on the MDR–A Transfer line into the Memory Data Register (MDR). The output from S10 is concurrently applied to OR circuit R20 and thence to AND circuit A100. The other input to AND circuit A100 comes from the Vector Direct Store flip-flop on FIG. 5 through OR circuit R238. The output of AND circuit A100 is applied to OR circuit R242 whose output sets the Write Access flip-flop to a "1" and energizes the Write line into the Memory Box to initiate a Write cycle.

The Memory Address Register for the Memory Box is set or loaded through gate G18, for example, by applying one output from single shot S10 to AND circuit A10, the other input to which comes from OR circuit R18 which was provided with an appropriate input by the output of the Vector Direct Store flip-flop and through OR circuit R238. When AND circuit A10 is brought up, it is applied to gate circuit G18, thus, gating the most significant 14 bits from the appropriate MAR–A Transfer line into the MAR.

It is believed that the operation whereby both addresses and data are transmitted into a Memory Box over the MAR–B and MDR–B lines respectively will be quite apparent from the above explanation. It will be noted that the address would come in through the gate G172 appropriately actuated by AND circuit A58 into the MAR and the data would come into the MDR through the gate circuit G216 which is actuated by AND circuit A98. The Write cycle is initiated and the Write Access flip-flop energized in an obvious manner.

It should be noted now referring to FIG. 1 that the clock pulse VSD–26 is applied to OR circuits R244 and R246 and thence to gates G128 and G220 to gate the selected position of the Odd Numbered $\underline{Z}$ Register and the Even Numbered $\underline{Z}$ Register over cables C118 and C116 respectively, to the MDR–A and MDR–B Transfer lines. It is this latter step which places particular data on these MDR–A and MDR–B Transfer lines which permits the gating of said data into the appropriate MDR of a particular Memory Box.

It should be noted that once the MAR and MDR are loaded and a Write operation begun, the system is allowed to proceed until the data is actually written into the Memory and the Done line becomes active to reset the Write Access flip-flop and the "busy" flip-flop back to a "0." The turnoff of VDS–26 initiates VDS–27.

VDS–27 is applied to advance both the Odd and Even Output Rings of the $\underline{Z}$ Registers on FIG. 1. The VDS–27 pulse is also applied to OR circuit R206 to increment the Counter #1 on FIG. 21. VDS–27 is also applied to advance the Odd and Even Output Rings for the $\underline{s}$ Register on FIG. 20 through OR circuit R226. The turnoff of VDS–27 initiates VDS–28. The turnon of VDS–28 is applied to OR circuit R208 and thence to gate circuit G176. The output of G176 is applied to gate circuit G222 which, in effect, tests the output of the Counter #1 on FIG. 21. If the Counter is on not 8, the system will branch to clock step VDS–21A and if on 8, the output of gate circuit G22 is applied to reset the Vector Direct Store flip-flop on FIG. 5 to a "0." This output from gate Circuit G222 is also applied to OR circuit R224 to reset the VSTX flip-flop to a "0" and also to OR circuit R226 to reset the VSTY flip-flop to a "0." The equal to 8 output of gate G222 is also applied directly to initiate clock stage STA–2. Thus, with a setting of Counter #1 on FIG. 21 to an 8, it signifies that the current Vector Store Direct operation is complete and the system proceeds back into a more basic Control Clock, sequence, i.e., STA–2.

Turning now to clock stage VDS–23A wherein the contents of the $\underline{s}$ Register is tested, this time it will be assumed that the Odd Output is "1" and the Even Output is "0." This condition energizes AND circuit A78 which produces an output to initiate clock stage VDS–23B. The turnon of VDS–23B is applied to OR circuit R210 on FIG. 23 which it will be remembered is a portion of the $A_1$ and $A_3$ Decoders. This time it is desired only to know if the Memory specified by the address in the $A_3$ Decoder is busy, therefore, the condition of flip-flop F22 is tested by the fall of VDS–23B. This pulse is applied to gate circuit G228 and if the flip-flop F22 is on "1," the system branches to clock stage VDS–23C.

The turnon of VDS–23C is for the purpose of delay only and upon termination, reinitiates clock stage VDS–23B which loop is continued until the system controls cause the flip-flop F22 to be reset to a "0" at which time clock stage VDS–23D will be initiated. The turnon of VDS–23D is applied to OR circuit R198 and gate circuit G16 to gate the contents of the Register $A_3$ over the MAR–A Transfer line such that the Memory Box selected by the low order four bits of the address is selected and the high order 14 bits transmitted into its MAR of the selected Memory Box. Concurrently, the VDS–23D pulse is applied to OR circuit R244 and gate circuit G218 which places the contents of the Odd Numbered $\underline{z}$ Register on cable C118 over which it is transmitted into the MDR of the selected Memory Box. Since these latter two operations have been described in detail in the previous step, they will not be repeated again. The turnoff of VDS–23D initiates VDS–27 which was described previously.

Returning again to clock stage VDS–23A, this time the situation will be considered wherein the Odd Output of the $\underline{s}$ Register is "0" and the Even Output is "1." In this case, the AND circuit A80 will be energized, thus, branching the system to clock step VDS–23E. The turnon of VDS–23E is applied to OR circuit R14 through gate G12 which causes flip-flop F10 to appropriately be set to a "1" or "0" depending upon whether or not the Memory Box specified by the address currently in the Register $A_1$ is "busy" or "not busy." The fall of VDS–23D is applied to gate circuit G230 whereby the setting of flip-flop F10 is tested and the system branched accordingly. If this flip-flop is set to a "0," the system branches to clock stage VDS–23F, which stage is merely for the purposes of delay as described previously and upon turnoff, branches back to close stage VDS–23E. When the flip-flop F10 is found to be set to "0," the system branches to clock stage VDS–23G.

The initiation of clock stage VDS–23G is applied to OR circuit R200 and gate G170 to gate the contents of the Register $A_1$ over the MAR–B Transfer line on FIG. 2 to the B Address Decoder (lower order four bits) which causes the accompanying higher order 14 bits to be transmitted into the MAR of the Memory Box specified by the lower order four bits. VDS–23G is also applied to OR circuit R246 and gate circuit G220 to gate the contents of the selected Even Numbered $\underline{Z}$ Register position over cable C116 which is the MDR–B Transfer line to the MDR of the Memory Box specified by the address which was transmitted over the MAR–A Transfer line just described. In this manner the data in the $\underline{Z}$ Register is transmitted to and written in a designated address in a selected Memory Box. The turnoff of VDS–23G returns the system to clock stage VDS–27.

*Returning again to clock step VDS–23A, this sequence is initiated by the condition wherein both the Odd and Even Outputs of the $\underline{s}$ Register are "0" wherein AND circuit A82 is energized.* The output of AND circuit A82 together with clock pulse VDS–23A produces an output from AND circuit A94 which in turn initiates clock stage VDS–27 directly. Returning now to clock sequence VDS–22, assume now that the output of the gate circuit G210 had branched the system to clock stage VDS–22A ($\delta$ equal to 0). The turnon of VDS–22A is applied to OR circuit R210 on FIG. 23 to test the output of the $A_3$ Decoder to see if the indicated Memory Box is busy. If busy, flip-flop F22 is set to a "1" and if not busy, to a "0." The fall of clock stage VDS–22A is applied to gate circuit G232 and the output of this gate circuit branches the clock to VDS–22B if flip-flop F22 is set to a "1." This stage is for purposes of delay and on turning off, reinitiates clock stage VDS–22A. Once the flip-flop F22 is reset to a "0," the system proceeds to clock stage VDS–22C.

The turnon of VDS–22C is applied to OR circuit R248 on FIG. 1 to set the Even Numbered $\underline{Z}$ Register Output Ring to 8. The turnoff of VDS–22C initiates clock stage VDS–22D.

VDS–2D is applied to OR circuit R212 and gate circuit G234 which gates the contents of the Register $A_3$ to the MAR–B Transfer line. This address is used to select the Memory Box and store an address in the associated MAR and further, set up the data flow path into the appropriate MDR. The VDS–22D pulse is also applied to OR circuit R246 and gate circuit G220 to transfer the contents of the position $z_{16}$ over the cable C116 to the selected MDR and a designated Memory Box. The turnoff of VDS–22D is applied to OR circuits R224 and R226 to turn off the VSTX and VSTY flip-flops, it is also applied to reset the Vector Direct Store flip-flop to a "0" and finally, branches the system back to the control stage STA–2.

Returning now to clock stage VDS–24 wherein the last four bits of Register $A_3$ and Register $A_1$ were tested for equality. Assume now that these four bits were equal, thus, indicating that both addresses lay in the same Memory Box. In this case, the system branches to clock stage VDS–24A.

The turnon of VDS–24A is applied to OR circuit R210 and gate circuit G178 which sets the flip-flop F22 to a "1" if the Memory Box designated by the address in the Register $A_3$ as interrogated by the $A_3$ Decoder on FIG. 23 is busy. The flip-flop F22 is set to a "0" if the designated Memory Box is free. The fall of VDS–24A is applied to gate circuit G236. If the flip-flop F22 is set to a "1," the system branches to clock stage VDS–24B which is used for delay only to allow the memory requested to complete a current cycle and on turnoff, reverts back to clock stage VDS–24A. When it is determined that flip-flop F22 is set to a "0," the system branches to clock stage VDS–24C.

The turnon of VDS–24C is applied to OR circuit R198 and thence to gate circuit G16 to transfer the contents of the Register $A_3$ over the MAR–A Transfer line. As described previously the lower four bits of the address are decoded in the A Address Decoder and an appropriate Memory Box selected to which the higher order 14 bits representing a specific address in that memory are stored. Concurrently, clock pulse VDS–24C is applied to OR circuit R244 and thence gate circuit G218 to gate the contents from the selected position of the Odd Numbered Z Register over cable C118 (FIG. 1) over the MDR–A Transfer line on FIG. 2 to the MDR of the Memory Box selected by the aforesaid address transmitted over the MAR–A Transfer line. The turnoff of VDS–24C initiates VDS–24D.

The turnon of VDS–24D is applied to OR circuit R14 on FIG. 23 which through gate circuit G12 sets the flip-flop F10 to a "1" or a "0" depending upon whether the Memory Box designated by the address in the Register $A_1$ as tested by the $A_1$ Decoder is busy or not busy. The fall of VDS–24D is applied to gate circuit G238 whose output branches the system to clock stage VDS–24E if flip-flop F10 is set to a "1" or to VDS–24F if flip-flop F10 is set to a "0." Assuming the system branches to VDS–24E, the system is for the purpose of delay only and forms a loop with VDS–24D which continues until the flip-flop F10 is again reset to a "0" at which time the output of gate circuit G238 branches the system to clock stage VDS–24F.

The turnon of VDS–24F is applied to OR circuit R200 on FIG. 2 and thence gate circuit G170 to gate the contents of the Register $A_1$ over the MAR–B Transfer line wherein the lower order four bits are supplied to the B Address Decoder which selects the proper Memory Box and to which the higher order 14 bits constituting the memory address are to be stored. Concurrently, VDS–24 is supplied to OR circuit R246 and gate circuit G220 which gates the contents of the Even Numbered Z Register selected by the Output Ring over cable C116 on FIG. 1 to the MDR–B Transfer line into the MDR selected by the address in the B Address Decoder.

The fall of VDS–24F is applied to AND circuits A102 and A104 on FIG. 5. The other input to AND circuit A104 comes from the "1" side of the Vector Direct Store flip-flop. If this flip-flop is in the "1" state, the output of the AND circuit A104 will cause the system to branch to clock stage VDS–27. If the second input to AND circuit A102 comes from the "1" side of the Vector Indirect Store flip-flop the system will branch to clock stage VIS–57 upon the turnoff of clock stage VDS–24F.

Vector Indirect Store Clock (VIS)

What is involved in this operation, i.e., a Vector Indirect Store, is that first 16 addresses are generated by the address generating circuits previously described on the Vector Direct Store and also Vector Direct Fetch operations wherein the actual Address Generation scheme is the same and utilizing these 16 addresses, memory is accessed and at the addresses in memory, new addresses for storage locations elsewherein memory will be obtained. These addresses are transferred from memory and brought into the v Register as described in the operation entitled Vector Indirect Fetch. Assuming that the Z Register is loaded with 16 addresses at which it is desired to store 16 pieces of data which are stored in either the X or Y Register, the system proceeds generally in the following manner. The upper most two addresses are extracted from the Z Register and transferred into memory to address the two desired Memory Boxes and then data is transferred from the appropriate two register positions of either the X or Y Register into the two positions of the X Register just vacated and subsequently, this data is now transferred from these positions of the Z Register into the just addressed Memory Boxes. Thus, it may be seen that the operation is very similar to the Vector Indirect Fetch with the exception that data is being gated from the Z Register into memory rather than from memory into the Z Register.

This clock stage is entered after completion of the appropriate clock steps beginning with the first part of the Vector Direct Fetch Clock. Referring back to the Timing Sequence Chart for this clock sequence and also to the previous description, it will be remembered that on clock stage VDF–9 after the Z Register is completely loaded with addresses from memory on a Direct Address Generation cycle, the system now tests to see whether a Fetch or Store operation is desired. Upon appropriate testing of the Vector Indirect Store flip-flop clock stage VDF–9 will branch to the present clock sequence beginning with VIS–50.

The turnon of VIS–50 is applied to OR circuit R186 and gate circuit G152 to gate the δ Register to the δ Decoder. The output of this Decoder is fed through gate G154 into the flip-flop F14 and sets it to a "1" if the δ is 0 or to a "0" if the δ is not 0.

The fall of clock stage VIS–50 is applied to the gate circuit G242 on FIG. 2 and branches the system to clock stage VIS–51 if the δ is not equal to 0 or to VIS–50A if the δ is equal to 0.

Assuming that the δ is not equal to 0, the system branches to clock stage VIS–51. The turnon of this stage resets the Z Register Even and Odd Numbered Input and Output Rings to 1. This is done by applying this pulse to OR circuits R216, R172, R214 and R170. VIS–51 is also applied to reset the s Register on FIG. 20 by applying a pulse to OR circuit R218 and R220 to reset the Odd Output Ring to 1 and the Even Output Ring to 2. VIS–51 is also applied to OR circuit R168 to reset the Counter #1 on FIG. 21 to 0. The turnoff of VIS–51 initiates VIS–52. The turnon of VIS–52 is applied to OR circuit R222 and thence to gate G186 to transfer the low order 18 bits of the selected Odd Numbered Z Register over cable C110 to Register $A_3$. VIS–52 is applied to OR circuit R224 and gate circuit G192 to transfer the lower ordered 18 bits of the selected Even Numbered Z Register over cable C101 to the Register $A_1$ (FIGS. 1 and 2). The turnoff of VIS–52 initiates VIS–53. VIS–53 is applied to OR circuit R228, the output of which is applied to AND circuits A84 and A86. The other inputs to these two AND circuits come from the VSTX flip-flop and the VSTY flip-flop shown in the upper right hand corner of FIG. 15 in dotted lines. Depending on whether or not it is desired to store the numbers in the X or Y Registers, one or the other of these flip-flops will be set to a "1." Assuming for purposes of this description that it is desired to store the numbers in the X Register, the flip-flop VSTY will be set to a "1," thus, providing a second input to AND circuit A84 whose output provides an input to OR circuit R230 whose output enables gate circuit G204 to thus transfer the contents of all 16 rows of the X Register over cable C112 through OR circuit R232 and thence through the gate circuits G206 and G208 to the odd and even numbered rows of the Z Register, the particular row being selected by the Odd and Even Input Rings. Thus, although the entire contents of the X Register is transferred over the cable C112, it will actually be entered in only the two selected positions of the Z Register selected by the respective Input Rings. The turnoff of VIS–53 initiates VIS–54.

This clock step tests the contents of the selected positions of the s Register. The register stages selected by the Odd and Even Output Rings (FIG. 20) are gated into first the AND circuits A68, A78, A80 and A82. The outputs of these four AND circuits form a single input each to AND circuit A106, A108, A110, and A112. The second input to these latter four AND circuits is the clock pulse VIS–54. Thus, as may be readily traced out, if both the Odd and Even Output from the s Register are "1's," the system produces an output from AND circuit A106, thus, branching the system to clock step VIS–54A.

The turnon of VIS–54A is applied to OR circuit R192 on FIG. 2 and thence to gate circuit G162. The output of this gate circuit will set flip-flop F16 to a "1" if the last four bits of the two addresses in Registers $A_3$ and $A_1$ are not equal, and to a "0" if the said bits of these addresses are equal. The fall of VIS–54A is applied to gate circuit G244, the output of which branches the system to VIS–55 if these addresses are not equal and to VDS–24A if they are equal. The clock sequence beginning with VDS–24A was described previously. It will, therefore, be assumed that this present system now branches to clock stage VIS–55. The turnon of this clock stage is applied to OR circuit R196 and thence to gate circuit G166 on FIG. 23. This tests the busy flip-flops of the two Memory Boxes specified by the addresses in the Registers $A_1$ and $A_3$. As will be remembered from previous descriptions, the output of the $A_1$ Decoder and $A_3$ Decoder will produce outputs if the particular memories interrogated are busy. Thus, an output from OR circuit R194 indicates that one of the flip-flops is busy and the system must waist. Accordingly, the output of gate circuit G166 sets flip-flop F18 to a "1" if either of these Memory Boxes is busy or a "0" if both are free. The fall of VIS–55 is applied to gate circuit G246 which branches the system to clock stage VIS–55A if busy or to clock stage VIS–56 if free. If the system branches to VIS–55A, this stage is merely for the purpose of delay to allow either or both of the requested Memory Boxes to terminate existing operations and on turning off, VIS–55A reinitiates VIS–55 where the test is again made. Assuming that the flip-flop F18 is now set to a "0," the system branches to VIS–56.

VIS–56 is applied to OR circuits R198 and R200 and thence to gate circuits G16 and G170 to gate the addresses stored in Registers $A_3$ and $A_1$ over the MAR–A and MAR–B Transfer lines (all on FIG. 2) to the A Address and B Address Decoders which Decoders cause the low order four bits to select the appropriate Memory Box and, thus, gate the high order 14 bits constituting the actual address in the appropriate MAR's. Clock pulse VIS–56 is also applied to OR circuits R244 and R246 and thence to gate circuits G218 and G220 which gate the selected Odd and Even Numbered Z Register positions (on FIG. 1) over cables C118 and C116 to the MDR–A and MDR–B Transfer lines on FIG. 2 into the appropriate MDR's of the Memory Boxes selected by the aforementioned addresses. *This clock pulse is similarly applied to the Memory Box shown on FIG. 3 to set the appropriate "busy" flip-flop and Write Access flip-flop and also applies a Write signal to the Memory.* This latter operation has been exhaustively explained on previous steps and will not be repeated. The turnoff of VIS–56 initiates clock stage VIS–57.

The turnon of VIS–57 is applied to advance the Z Register Odd and Even Input and Output Rings. VIS–57 is also applied on FIG. 20 to the s Register through OR circuit R226 to advance both the Odd and Even Output Rings. Finally, VIS–57 is applied to OR circuit R246 on FIG. 21 to advance the Counter #1. The turnoff of VIS–57 initiates VIS–58.

This clock stage tests the Counter #1 to see if it contains the number 8. If it does contain the number 8, this means that all 16 addresses originally stored in the Z Register have been accessed and all data transferred from the X or Y Registers has been stored in memory. Accordingly, this clock sequence applies the pulse VIS–58 to OR circuit R208 and thence to gate circuit G176 which applies its output to gate circuit G248. The fall of VIS–58 is applied to the control line of this gate circuit and branches the system to VIS–52. If the Counter #1 is set on 8, the output from gate G248 is applied to reset the Vector Direct Fetch flip-flop on FIG. 2 to a "0." It resets the Vector Indirect Store flip-flop on FIG. 5 to a "0" and is supplied to OR circuits R224 and R226 to reset the VSTY and VSTX flip-flops to "0." Finally, this output of the G248 initiates clock sequence STA–2 which will start the next Instruction Fetch operation.

As will be appreciated, this latter description completes the clock sequence beginning with VIS–54A.

Returning now to clock step VIS–54, the condition will be considered wherein the Odd Output of the s Register is equal to 1 and the Even Output is equal to 0. In this case, an output is produced by AND circuit A78 which produces one of the inputs to AND circuit A108. The other input to AND circuit A108 is from the clock stage VIS–54. Accordingly, the output of AND circuit A108 branches the system to clock stage VIS–53C.

The turnon of VIS–53C is applied on FIG. 23 to the OR circuit R210. The output of OR circuit R210 initiates gate G178 which performs a test for busy on the Memory Box specified by the address in the $A_3$ Decoder. If this Memory Box is busy, the flip-flop F22 will be set to a "1" and if free, will be set to a "0." The fall of VIS–53C is applied to gate circuit G250 which branches the system to VIS–53D if flip-flop F22 is set to a "1." VIS–53D is merely a delay stage and on turning off reinitiates clock stage VIS–53C. Assuming now that the Memory Box is free and that the flip-flop F22 is set to a "0," the system branches to clock stage VIS–53E.

The turnon of VIS–53E is applied to OR circuit R198 and gate circuit G16 to gate the contents of the Register $A_3$ over the MAR–A Transfer line to the A Address Decoder which selects a particular Memory Box in accordance with the lower order four bits of this address and subsequently, causes the higher order 14 bits to be gated into the MAR of said Memory Box. VIS–53E is also applied on FIG. 1 to OR circuit R244 and gate circuit G218 to gate the contents of the Odd Numbered Z Register over cable G118 to the MDR–A Transfer line on FIG. 2 which transfers the data in this particular register position of the Z Register to the MDR of the Memory Box selected by the address in the Register $A_3$. The turnoff of VIS–53E loops back into the clock stage VIS–57.

Returning now once again to the clock sequence VIS–54, the test of the s Register will be assumed to provide an output whereby the Odd Output is "0" and the Even Output is "1." This condition results in an output from AND circuit A80 which provides one input to AND circuit A110. The other input to AND circuit A110 is the clock pulse VIS–54. Thus, the output of AND circuit A110 initiates clock sequence VIS–53H.

The turnon of VIS–53H is applied to OR circuit R14 and gate circuit G12 to test whether or not the Memory Box specified by the address in the Register $A_1$ is busy. As explained previously, the flip-flop F10 is set to a "1" if the Memory is busy and to a "0" if it is free. Accordingly, the fall of VIS–53H is applied to gate circuit G252 whose output branches the system to VIS–53I if the flip-flop F10 is set to a "1" and clock stage VIS–53J if set to a "0." Assuming that clock stage VIS–53I is energized, which means that the memory is busy, this stage is for delay only to allow the memory to clear itself and on turn off, branches back into clock stage VIS–53H.

Assuming now that the flip-flop F10 is set to a "0," the clock sequence VIS–53J is initiated.

The turnon of VIS–53J is applied to OR circuit R200 and gate circuit G170 to gate the contents of the Register $A_1$ over the MAR–B Transfer line. The B Address Decoder takes the lower four bits of this address and selects a particular Memory Box which causes the high order 14 bits to be gated into the selected MAR of said selected memory. VIS–53J is also applied to OR circuit R246 and gate G220 on FIG. 1 to gate the contents of the Even Numbered Z Register selected by the appropriate Output Ring over cable C116 to the MDR–B Transfer line on FIG. 2 and thence into the MDR of the Memory Box selected by the address in Register $A_1$. The turnoff of VIS–53J returns the system to VIS–57.

Returning once again to clock stage VIS–54, the last possibility encountered in this test on the s Register of FIG. 20 is that wherein the outputs of both the odd and even side of the Register are "0." This condition produces an output from AND circuit A82 whose output in turn produces a single input to AND circuit A112. The second input to AND circuit A112 is provided by the clock pulse VIS–54. The output of AND A112 branches the system to VIS–57.

The above paragraph completes the description of all of the possible branches the system may take as a result of the tests made during clock step VIS–54.

Returning now to clock stage VIS–50A. It will now be assumed that the test for $\delta$ equals 0 is made successfully and the output from gate circuit G242 branches the system to clock stage VIS–50A. This is the condition wherein the $\delta$ is equal to 0 and, in effect, means that the contents of the 16th word position of the X or Y Register is to be placed in the $Z^{16}$ position of the Z Register on FIG. 1 and then transferred into memory.

The turnon of VIS–50A is applied to OR circuit R248 which sets the Output Ring of the Even Numbered Z Register to 8, and is applied directly to set the Input Ring of the Even Numbered Z Register to 8. The turnoff of VIS–50A initiates clock stage VIS–50B.

The turnon of VIS–50B is applied to OR circuit R224 and thence to gate circuit G192 to gate the contents of the Even Numbered Z Register on FIG. 1 to the Register $A_1$ on FIG. 2 over cable C101. It should perhaps be noted that since the associated Output Ring is set to 8, the register position of the Z Register is the position $Z^{16}$. The turnoff of VIS–50B initiates VIS–50C.

The turnon of VIS–50C is applied to OR circuit R228 on FIG. 15 to gate the 16th position of the X or Y Registers depending upon whether flip-flop VSTX or VSTY is set to a "1" as explained previously. Assuming that the flip-flop VSTX is energized, the AND circuit A84 is energized and its output is applied to OR circuit R230 whose output is applied to gate circuit C204 to gate the contents of the X Register through gate circuit G208 which, in turn, was energized by the output of OR circuit R236 which received an energizing input from the clock stage VIS–50C. Thus, the 16th position of the Z Register is loaded with the number in the 16th position of the X Register. The turnoff of VIS–50C initiates VIS–50D.

The turnon of VIS–50E is applied to OR circuit R14 and gate circuit G12 which sets the flip-flop F10 to a "1" if the appropriate Memory Box is busy and to a "0" if this Memory Box is free. The fall of VIS–50D is applied to gate circuit G254, the output of which branches the system to VIS–50E if the memory is busy and to VIS–50F if it is free.

Assuming that the memory is busy, the system branches to VIS–50E which is merely a delay and which on turning off recycles back to VIS–50D.

Assuming now that the requested memory is free and flip-flop F10 is "0," the clock stage VIS–50F is initiated from gate circuit G254.

The turnon of VIS–50F is applied to OR circuit R200 and gate circuit G170 to gate the address in Register $A_1$ to the MAR–B Transfer line on FIG. 2 to the B Address Decoder which selects a Memory Box in accordance with the lower order four bits whereby the higher order 14 bits are transmitted into the associated MAR. VIS–50F is also applied to OR circuit R246 and gate circuit G220 which gates the contents of the 16th position of the Z Register over cable C116 to the MDR–B Transfer line on FIG. 2 and thence into the MDR of the selected Memory Box. The turnoff of VIS–50F is applied to reset the Vector Indirect Store flip-flop to "0" and is applied to OR circuits R224 and R226 to reset the VSTX and the VSTY flip-flops to "0." Finally, this pulse actuates the clock sequence STA–2 to initiate a further Instruction Fetch operation.

Sum Reduction Clock

This clock sequence is entered upon the completion of the Floating Point Shift Clock sequence and as will be remembered there are 16 numbers stored in the X Register and an additional 17th number stored in the w Register. As further will be remembered, the sign bit is stored in the first or 0 column and since all of the numbers now have a common exponent, the columns 1–8 will be ignored since this exponent is stored in the e Register. The significant figures are stored in locations 9–35 of the X Register and the w Register. It should be noted that the 17 numbers may have different sign bits, therefore, the first operation accomplished by this clock sequence is to complement all of the negative numbers so that on subsequent operations, they may be merely added with the other positive numbers without regard to sign as is well understood in the numerical theory of computers. The second portion of the operation accomplished by this clock sequence is the actual parallel addition of all 17 numbers concurrently.

Returning now to a specific description of the Sum Reduction Clock, it will be assumed that the Floating Point Shift operation has been completed and clock stage SR–1 has been initiated.

The turnon of this clock stage is applied to R–138 on FIG. 20, thence to gate G80 to shift the contents of the s Register over cable C71 to the v Register in positions 1–16. This pulse is also applied to OR circuit R72 to set position $v_0$ to a "1." The turnoff of SR–1 initiates SR–2.

The turnon of SR–2 is applied to OR circuit R144 to set positions 1–8 of the X Column Reset Selector to a "1." The turnoff of SR–2 turns on SR–3.

The turnon of SR–3 is applied to R146 (FIG. 15) to the X Column Reset line to reset those columns selected by the X Column Reset Selector to "0's." The turnoff of SR–2 turns on SR–3. Referring briefly to FIG. 6, this is done by applying the two pulses from the X Column Reset Selector and also from the X Column Reset line which are applied to AND circuit A56, the output of which is applied to OR gate R56 and thence to gate circuit G60, the other input to which comes from v Register in position $v_K$. This latter operation requires an input from the v Register since that this operation, as all of the vector operations, the v Register will contain a mask which will determine which register positions of the X Register will be utilized in the various operations.

The turnoff of clock stage SR–3 initiates clock stage SR–6, the turnon of which is applied to OR circuit R74 to set the X Column Output Selector to 0 and on turning off, initiates clock stage SR–7.

The turnon of SR–7 is applied to OR circuit R128 and thence to gate circuit G114 to transfer the contents of the s Register over cable C79 to the AND Unit on FIG. 12. On the same figure, the SR–7 pulse is applied to R–82 whose output sets the 0 position of the AND Unit to "1." SR–7 is also applied to OR circuit R92 and thence to gate circuit G92 which gates the contents of the selected column (i.e., column 0 from SR–6) over cable C75 to the AND Unit on FIG. 12 where it is ANDed with the contents of the $\underline{s}$ Register. The output of the AND Unit is now gated by applying SR–7 to R122 and gate circuit G116 to transfer the output of the AND unit to the $\underline{v}$ Register. SR–7 is applied to set positions 1–35 of the $\underline{X}$ Column Complement Selector to "1's." The turnoff of SR–7 initiates SR–8.

It will be noted at the completion of clock step SR–7, the $\underline{v}$ Register will coitain "1's" in every position where it is necessary to complement the number in the associated position of the $\underline{X}$ Register. In other words, it has tested the contents of the 0 column to determine which numbers are negative and at the same time, ANDed this with the mask or screen number stored initially in the $\underline{s}$ Register which indicates those numbers which are are to be included in the current Sum Reduction operation. The next operation necessary is the actual complementing of all of the negative numbers which have just been located. This operation is performed beginning with clock sequence SR–8.

The turnon of SR–8 is applied to the OR circuit R148 which in turn activates the $\underline{X}$ Column Complement line on FIG. 15. The detail of this operation is indicated on FIG. 6. It will be noted that the Column Complement Selector line for column $i$ is applied to AND gate A54. The other input to this AND gate is the Column Complement line indicated on the figure. The output of AND gate A54 is applied to OR circuit R142 which in turn is applied to gate circuit G60. It will now be noted that G60 is enabled from position $\underline{v}_k$ from the $\underline{v}$ Register which as will be remembered contains a 1 in all associated bit positions for those numbers of the $\underline{X}$ Registers which are to be complemented. The Complement Output line from the gate circuit G60 then causes the Storage flip-flop $\underline{X}_i^k$ to be complemented. SR–8 also sets the Accumulator to zero. It will be noted that a Complementing Input to a flip-flop means that if the flip-flop has been previously set to a "1," it will be reset to a "0" and vice versa. At the end of this operation, i.e., SR–8, all of those numbers stored in the $\underline{X}$ Register having an associated "1" bit in the $\underline{v}$ Register will have been complemented. At this point, clock stage SR–8 is terminated, thus, initiating clock step SR–9.

The turnon pulse of SR–9 is applied to OR circuit R150 which initiates the Counting Network shown on FIG. 14. The output of this Counting Network which, as will be apparent from the drawing, has its input shown on the horizontal lines from the $\underline{v}$ Register comes out the bottom of the Network shown on FIG. 14 on one of the Unary Output lines numbered from 0 to 16. Referring now to FIG. 11, these lines feed into the Unary to Binary Encoder which causes a 5 bit binary code to be transferred to the Accumulator. What clock stage SR–9 accomplishes is that it counts the number of negative numbers included in the current operation by counting "1's" as stored in the $\underline{v}$ Register and saves this number in the Accumulator Register shown at the bottom of the Counting Network which number will be used subsequently. At this point it should be noted that the Counting Network is a somewhat conventional Adding Tree wherein a multiple bit binary code is fed in along the horizontal lines as described previously, and a single line is caused to be actuated at the bottom of the Network, said line being indicative of a number of which the binary input code is representative. Such Counting Networks are well known in the computing arts.

The completion of clock step SR–9 initiates clock stage SR–10 which applies its turnon pulse to set the $\underline{X}$ Column Output Selector on FIG. 15 to 35. SR–10 also sets Counter J on FIG. 7 to 35 and on turning off, initiates clock stage SR–11.

The turnon of SR–11 is applied to OR circuit R120 and thence to gate G114 which transfers the contents of the $\underline{s}$ Register over cable C79 to positions 0–16 of the AND Unit on FIG. 12. A "1" is gated into the 0 position of the AND Unit by gating SR–11 into OR circuit R82. Clock pulse SR–11 to OR circuit R92 and thence to gate G92 which transfers the contents of the selected column of the $\underline{X}$ Register over cable C75 to the AND Unit on FIG. 12. SR–11 is also applied to R122 and thence to gate G116 to gate the output from the AND Unit on FIG. 12 to the $\underline{v}$ Register on FIG. 11. The turnoff of SR–11 initiates SR–12.

The turnon of SR–12 supplies a pulse to OR circuit R150 at the top of the Counting Network on FIG. 14, thus, initiating a Counting Cycle. As in stage SR–9 above, the output of the Counting Network is again applied to the Unary to Binary Encoder on FIG. 11 and thence to the Tree Accumulator. This effects the addition of the new number gated into the Tree Accumulator with whatever number is currently stored therein. If the number currently in the Tree Accumulator happens to be all 0's, a new number will obviously be retained and stored therein in its original form. The turnoff of clock stage SR–12 initiates clock stage SR–13.

The turnon of SR–13 is applied to the Shift Right line going into the Tree Accumulator on FIG. 11. This causes the Tree Accumulator to shift right one position and thus shift the right most bit into the $\underline{w}$ Register shown in block form on FIG. 11. Refer now to FIG. 24, wherein the $\underline{w}$ Register is shown in detail. The output of the Tree Accumulator is brought in on the two lines so indicated in FIG. 24 and the number brought in is applied to the position of the $\underline{w}$ Register selected by the $\underline{X}$ Column Output Selector which is shown on FIG. 24 in dotted lines. This is because the details of the $\underline{X}$ Column Output Selector are shown on FIG. 15. The mechanism whereby the $\underline{X}$ Column Output Selector controls the gating of the Tree Accumulator into the $\underline{w}$ Register is by means of initiating one of the gate circuits G136. At this point stage SR–13 turns off and initiates clock stage SR–14.

The turnon of SR–14 is applied directly to the Decrement line of the Counter J. At the same time an SR–14 pulse is applied to the Decrement line of the $\underline{X}$ Column Output Selector. The turnoff of SR–14 initiates SR–15.

The turnon of SR–15 is applied to gate circuit G138 which tests the contents of the Counter J on FIG. 7. If the line marked "0 Or Greater" is energized, the system will branch to clock stage SR–11. If the line marked "Negative" is energized the system will branch to clock stage SR–16. The Negative Output will appear if the Counter J has been decremented after being previously set to 0. The loop defined by clock sequences SR–11 through SR–15 constitute a loop whereby each successive column of the $\underline{X}$ Register is added and shifted from the Accumulator into the $\underline{w}$ Register under control of the $\underline{X}$ Column Output Selector.

Assuming now that the test made in clock stage SR–15 branches to clock stage SR–16, the turnon of this clock stage causes a test of the $\underline{w}$ Register in the 0 ($\underline{w}_0$) position. This is done by applying clock pulse SR–16 to gate circuit G140 on FIG. 24. If a "1" is stored in the position $\underline{w}_0$, it indicates a negative number and the system branches to clock stage SR–17. If a "0" is stored in position $\underline{w}_0$, it indicates a positive number and the system will branch to clock stage SR–19. Assuming the first condition and the initiation of clock stage SR–17, this pulse is applied to the Complement line on FIG. 24 to register positions $\underline{w}_1$ through $\underline{w}_{35}$ which complements the particular number previously stored therein, i.e., changes "1's" to "0's" and vice versa. The turnoff of clock stage SR–17 initiates clock stage SR–18.

The turnon of SR–18 is applied to the Increment line on FIG. 24 to increment the $\underline{w}$ Register. The turnoff of SR–18 initiates SR–19.

It should perhaps be noted at this point that the Sum Reduction operation is in the following status. The desired exponent is currently stored in the $\underline{e}$ Register and the sign and magnitude of the fraction are stored in the $\underline{w}$ Register. The remaining operations which must be completed in this clock sequence are the normalization of this number. There are three possible conditions which must be checked for at this point, the first is Overflow which means that there may be 1's stored in positions 1–8 of the $\underline{w}$ Register. This would require shifting $\underline{w}$ Register to the right to properly align the first 1 in the 9th bit position. The second condition would be Underflow wherein there is a 0 in the 9th bit position of the $\underline{w}$ Register. In this case it is necessary to shift 1 position to the left and re-examine this 9th bit position until a 1 is present therein. The third case is if the fraction is identical to 0, in other words, all bit positions are 0. In this case it is necessary to set the exponent to 0 and the operation is completed.

Assuming now that clock stage SR–19 has been initiated, the pulse SR–19 is applied to gate circuit G142. This gate circuit tests for an output from OR circuit R152. As will be noted in FIG. 24, OR circuit R152 is connected to bit positions $\underline{w}_1$ through $\underline{w}_8$ and tests for the occurrence of a "1" in any of these register positions. If the OR circuit has an output, the system branches to clock stage SR–20 and if it does not have an output, i.e., a pulse out of inverter I12, the system branches to clock step SR–21.

Assuming that a 1 is present in positions 1–8 of the $\underline{w}$ Register and an output from OR circuit R152, clock step SR–20 is initiated which applies a pulse to the Shift Right line on the $\underline{w}$ Register on FIG. 24. The SR–20 pulse is also applied to the Increment line associated with the $\underline{e}$ Register on FIG. 19. The turnoff of SR–20 initiates SR–19 again wherein the output of OR circuit R152 is again tested for 0's or 1's.

Assuming finally that all "1's" are transferred out of positions 1–8, the system now branches to clock sequence SR–21. The turnon of this clock applied a pulse to gate G144 on FIG. 19 which causes the contents of the $\underline{e}$ Register to be transferred over cable C93 through OR circuit R154 into the bit positions $\underline{w}_1$ through $\underline{w}_8$ of the $\underline{w}$ Register on FIG. 24. The turnoff of SR–21 initiates SR–22.

The turnon of SR–22 is applied to gate circuit G146. This gate circuit tests the output of OR circuit R156 which will produce a pulse if any of bit positions $\underline{w}_9$ through $\underline{w}_{35}$ contain a "1." If the output of the OR circuit R156 is 0, a pulse will be produced from inverter I14 to initiate clock sequence SR–23. If the output from OR circuit R156 is not 0, the clock sequence SR–24 will be initiated.

Assuming the former condition, i.e., 0 output from R156, clock stage SR–23 will be initiated. This condition will exist if all of these bit positions contain 0 which indicates that a true 0 exists in the system at this point and that the exponent bits in positions $\underline{w}_1$ through $\underline{w}_8$ must be set to 0's to indicate a correct answer in the system.

Therefore, the turnon of clock stage SR–23 applies a pulse to the Zero Register on FIG. 24 which causes a 0 to be gated through OR circuit R154 and into positions $\underline{w}_1$ through $\underline{w}_8$ of the $\underline{w}$ Register. SR–23 is also applied to OR circuit R158, the output of which resets the VRFSM to "0," and resets the SR flip-flop to "0." Finally, the turnoff of clock step SR–23 initiates a clock step STA–2.

Assuming now that clock stage SR–22 had branched to clock stage SR–24, the initiation of SR–24 tests bit position 9 of the $\underline{w}$ Register. As will be appreciated, this bit position must contain a "1" if the final result is to be in proper normalized form, therefore, as explained previously, the 9 position is tested and appropriate shifting and modification of exponent must be effected. Therefore, if position 9 is found to contain a 1 by applying SR–24 to gate circuit G148, the system branches to clock step SR–26. If the position $\underline{w}_9$ is found to contain a 0, the system branches to clock stage SR–25.

Assuming that a 0 exists in the $\underline{w}_9$ position of the $\underline{w}$ Register which means that the condition of Underflow exists, the pulse SR–25 is applied to the Shift Left line of the $\underline{w}$ Register on FIG. 24. This shifts all of the $\underline{w}$ Register bit positions to the left by one bit position. Clock pulse SR–25 is also applied to the Decrement line of the $\underline{e}$ Register on FIG. 19. The system now branches again back to clock step SR–24 where the test of bit position $\underline{w}_9$ is again made. Assuming this time that a 1 is encountered, the system branches to clock stage SR–26.

The turnon of SR–26 is applied to OR circuit R160 and thence to gate circuit G144 which causes the contents of the $\underline{e}$ Register on FIG. 19 to be transferred over cable C93 to bit positions $\underline{w}_1$ through $\underline{w}_8$ of the $\underline{w}$ Register. This last operation transferred the currently correct exponent from the $\underline{e}$ Register into the exponent position of the $\underline{w}$ Register. Clock pulse SR–26 is applied to OR circuit R162 to set the SR flip-flop to "0," is applied to OR circuit R158 which applies a pulse through OR circuit R164 to reset the VRFSM flip-flop to a "0" and finally, initiates clock stage STA–2. This completes the end of the Sum Reduction Operation and the answer or final number resulting from the Sum Reduction Operation is currently stored in the $\underline{w}$ Register and the next instruction to be found in the Instruction Register will be now performed.

Floating Sum Reduction (FSR)

This clock sequence forms a part of the system operations necessary to perform a Vector Sum Reduction as was described generally in the previous example of operations performable by the present system. This part of the clock sequence is concerned only with determining the largest exponent in a particular vector of numbers as stored in the $\underline{X}$ Register and the $\underline{w}$ Register. From this number the amount of shift necessary to align all of the exponents on the vector is determined and the result of the subtraction is stored in the exponent portion previously existing with the number in the $\underline{X}$ Register, i.e., positions 1–8 inclusive. The actual Shifting operations occur during the Floating Point Shift Clock Sequence described elsewhere in this section.

This clock sequence is initiated when a system operation code is encountered in the Instruction Register which is shown in the drawings of FIG. 5 as setting the VRFSM flip-flop. Actually the clock sequence INSTF–5A has been executed. *Thus, referring to FIG. 5, the application of clock pulse INSTF–5A to gate circuit G40 initiates clock step FSR–1 and also sets the VRFSM flip-flop to a "1."* The turnon of FSR–1 is applied to OR circuit R138 and thence to gate circuit G80 which gates the contents of the $\underline{s}$ Register to the $\underline{v}$ Register via cable C71 (all on FIG. 20). Cable C71 feeds into the vector of OR circuits R60 on FIG. 11 to set the $\underline{v}$ Register flip-flops appropriately. Register stage $\underline{v}_0$ is set to a 1 by applying FSR–1 to OR circuit R72. The turnoff of FSR–1 turns on FSR–2.

The turnon of FSR–2 is applied to the "Reset to 0" line on FIG. 19 to set the $\underline{e}$ Register to 0. FSR–2 is also applied to OR circuit R140, the output of which is entitled, "$\underline{Y}$ Row Reset" line, on FIG. 15. This pulse is ANDed with the contents of the appropriate positions $\underline{v}_i$ of the $\underline{v}$ Register in the same manner that the $\underline{X}$ Register was reset in accordance with ANDing from the $\underline{v}$ Register in the Vector Expand operation described elsewhere. The turnoff of FSR–2 initiates FSR–3.

The turnon of FSR–3 is applied to the $\underline{X}$ Column Input Selector on FIG. 15 to 0. The same pulse sets the $\underline{X}$ Column Complement Selector to a 1. The same pulse sets the $\underline{e}$ Register Ring on FIG. 19 to a 0. FSR–3 also sets the Counter J to a 1 through OR circuit R62 and finally, sets the $\underline{X}$ Column Output Selector on FIG. 15 to 1 and on turning off, initiates clock stage FSR–4.

The turnon of FSR–4 is applied to OR circuit R92 and thence to gate G92 to place the contents of the column selected by the Column Output Selector on cable C75 (all on FIG. 15). The contents of this column of the $\underline{X}$ Register are transferred over this cable to the AND unit on FIG. 12. FSR–4 is also applied to OR circuit R78 and thence gate circuit G88 to gate the contents of the $\underline{v}$ Register via cable C73 on FIG. 11 to the AND Unit on FIG. 12. FSR–4 is also applied to OR circuit R86 and gate circuit G90 to gate the output of the AND Unit to the $\underline{p}$ Register via cable C74. The turnoff of FSR–4 initiates clock stage FSR–5.

The turnon of clock stage FSR–5 is applied to gate circuit G126 which tests for the existence of a 1 in any register position of the $\underline{v}$ Register. This is done by bringing all of the "1" sides of the $\underline{p}$ Register flip-flops to OR circuit R96 and thence both directly to the gate circuit G124 and also through the inverter I10 and the system thus branches so that if the $\underline{p}$ Register contains a 1, the system branches to clock step FSR–6. If on the other hand an output is produced from the inverter I10, the system branches to clock step FSR–9.

Assuming a "1" in the $\underline{p}$ Register, clock stage FSR–6 is initiated, the turnon of which is applied to OR circuit R138 on FIG. 20 and gate circuit G80 to gate the contents of the $\underline{s}$ Register over cable C71 to the $\underline{v}$ Register on FIG. 11, again through the vector OR gates R60 and R61. FSR–6 is also applied to OR gate R72 to set $\underline{v}_0$ to a "1." The turnoff of FSR–6 initiates FSR–7. The turnon of FSR–7 is applied to the Column Complement line on FIG. 15 so that the particular column selected by the current setting of the Column Complement Selector is complemented. The Column Complement line input is detailed on FIG. 6. On this figure, the $\underline{X}$ Column Complement Selector is gated to AND circuit A54 and ANDed in this circuit with the Column Complement line. This, the output from AND circuit A54, produces a signal to OR circuit R142 which in turn is applied to the "0" side of gate circuit G60. The $\underline{X}_i^k$ flip-flop is accordingly reset to a "0" if the corresponding bit position in the $\underline{v}$ Register, i.e., position $\underline{v}_k$, is a "1." It will be noted referring to FIG. 11 that the "1" side of the $\underline{v}$ Register in positions $\underline{v}_0$ through $\underline{v}_{16}$ are all connected directly through a common line to this series of gate circuits in the corresponding rows of the $\underline{X}$ Register. The turnoff of FSR–7 initiates clock stage FSR–8.

The turnon of FSR–8 is applied to the register gate circuits G128 on FIG. 19 associated with the $\underline{e}$ Register. This gate a "1" into that stage of the $\underline{e}$ Register selected by the associated Input Ring. The turnoff of FSR–8 initiates FSR–9.

The turnon of FSR–9 is applied to gate circuit G130 on FIG. 11 which gates the contents of the $\underline{v}$ Register over cable C81 to the $\underline{p}$ Register on FIG. 9. The turnoff of FSR–9 initiates FSR–10. It should perhaps be noted that if the tests made in FSR–5 had indicated all 0's in the $\underline{p}$ Register, that the system would have branched directly into FSR–9.

The turnon of FSR–10 is applied to OR circuit R138 and thence to gate circuit G80 which gates the contents of the $\underline{s}$ Register to the $\underline{v}$ Register and also sets the $\underline{v}$ Register position $\underline{v}_0$ to a "1." The particular circuit elements actuated in this case are identical with clock sequence FSR–6 above and need not be repeated here. The turnoff of FSR–10 initiates FSR–11.

The turnon of FSR–11 is applied to gate circuit G132 which reads the selected $\underline{X}$ Register column directly into the $\underline{X}$ Column Input line on the opposite side of the $\underline{X}$ Register on FIG, 15. It should be noted at this point that the bit positions 1–8 in each row of the $\underline{X}$ Register constitute what might, in effect, be called a counter, which may be decremented by the injection of a "1" or "0" into any order. The input to each Counter is under control of the $\underline{v}$ Register bit. The turnoff of FSR–11 initiates clock stage FSR–12.

The turnon of FSR–12 is applied to OR circuit R98 and thence to gate circuit G98 which gates the contents of the $\underline{p}$ Register over cable C77 to the $\underline{v}$ Register. The turnoff of FSR–12 initiates FSR–13. The turnon of FSR–13 is applied to OR circuit R68 on FIG. 7 to increment the Counter J. This pulse is similarly applied to advance the $\underline{X}$ Column Output Selector on FIG. 15; advances the $\underline{X}$ Register Column Input Selector; advances the $\underline{X}$ Column Complement (all on FIG. 15); and finally, advances the $\underline{e}$ Register Input Ring on FIG. 19 and on turning off, initiates clock stage FSR–14.

The turnon of FSR–14 effects a test of the setting of the Counter J. This is shown on FIG. 7 wherein FSR–14 is applied to gate circuit G134. The input to G134 is indicated as 9 and not 9. If the not 9 line is up, the system branches back to clock stage FSR–4, and conversely, if the 9 line is up, the system branches to the Floating Point Shift Clock (FPS–1), resets the FSR flip-flop to a "0" and sets the FPS flip-flop to a "1." It is the turnon of the FPS flip-flop which initiates clock stage FPS–1.

At the termination of the Floating Sum Reduction Clock sequence it should be noted that the largest exponent will have been selected and placed in the $\underline{e}$ Register and the $\underline{X}$ Register positions 1–8 loaded with the numbers representative of the magnitude of the shift which their associated numerical quantities or fraction bits must be shifted to properly align the binary points during the actual Shifting operations prior to a Summing operation. It should be noted that one of these register positions will contain the number 0 since it is, in effect, the largest of the group and thus, does not need to be shifted at all. Having once completed this clock sequence, the system is ready to proceed to the actual shifting operation performed during the Floating Point Shift sequence.

Floating Point Shift Clock

Under control of the present clock up to 17 numbers in a particular vector may be shifted in a single operation to, in effect, align the radix point of the normalized numbers. Although in actuality since one of the numbers i.e., the one having the largest exponent, will control the subsequent shifts and this number itself will not be shifted, therefore, the number of actual shifts will be reduced by at least one.

It will also be noted that the largest exponent will have been previously determined by a Search for Largest operation and this number stored in a suitable register as has been explained previously whereby the actual degree of the shifts of the subsequent numbers will be controlled by the value of said largest exponent.

Proceeding now with the description of this particular clock sequence, the first stage of this clock FPS–1 is initiated either from the Floating Point Add Clock, FAD–7 or from the Floating Sum Reduction Clock, FSR–14. Either of these other sequences will initiate this particular operation since they both require such Floating Point Shift. The turnon of FPS–1 is applied to OR gate R116 and this to the Counter J to reset same to 0 (FIG. 7). This pulse is also applied to OR circuit R118 to set the $\underline{X}$ Register Column Output Selector to 1 and on turning off initiates FPS–2. The turnon of FPS–2 is applied to OR gate R120 on FIG. 20 and thence to gate G114 to gate the contents of the $\underline{s}$ Register over cable C79 to the AND Unit on FIG. 12. FPS–2 is applied to OR circuit R82 to supply a single input to the AND gate A38 in the 0 position of the AND Unit. FPS–2 is likewise applied to OR gate R92 and thence to gate G92 to gate the $\underline{X}$ Register column currently selected to the AND unit. FPS–2 is applied to OR circuit R122 and thence to gate circuit G116 to gate the output of the AND Unit over cable C80 to the $\underline{v}$ Register on FIG. 11. It will be noted that the AND Unit and its associated controls is shown on FIG. 12. The turnoff of FPS–2 initiates FPS–3.

The pulse from FPS–3 is applied to OR circuit R100 to advance the $\underline{X}$ Column Output Selector on FIG. 15 and is also applied to OR circuit R68 on FIG. 7 to increment the Counter J and on turnoff, this clock stage initiates FPS–4.

The turnon of FPS–4 is applied to gate circuit G118 which tests the Counter J to see if it is set to a 3. If the Counter is set to a 3, it will be noted that the system branches to FPS–5 and if not on a 3, it branches back to FPS–2. Again the Counter J and this associated testing circuit is shown on FIG. 7. Assuming that the Counter J is on 3, clock stage FPS–5 is initiated. The turnon of which (the previous description of FPS–1, set the Counter J to a 1 and not a 0) is applied to OR circuit R124 on FIG. 15 and thus to the Row Reset Cable for the $\underline{X}$ Register. Referring now to FIG. 6, this line comes into a particular bit position $\underline{X}_i^k$ and is applied to OR circuit R56 and then to gate circuit G60 wherein it is ANDed with the particular $k$ bit position of the $\underline{v}$ Register whereby this particular bit position will be reset only if a "1" is stored in the associated position of the $\underline{v}$ Register. The turnoff of FPS–5 initiates FPS–6. It will be noted at the completion of FPS–5 that the system has determined which of these numbers are capable of being shifted by the present system with the size registers available to save significant figures and similarly, determines which numbers it is desired to actually utilize in subsequent Floating Point operations under control of the screen number which is stored in the $\underline{v}$ Register. Thus, having made this determination, the turnon of FPS–6 sets the Counter J on FIG. 7 to a 1 by applying a pulse to OR circuit R62. FPS–6 is also applied to set the Column Output Ring to a 4. FPS–6 also sets the Multiple Shift Right Ring on FIG. 18 to 16. The turnoff of FPS–6 initiates FPS–7.

The turnon of FPS–7 is applied to OR circuit R120 and gate G114 which gate the contents of the $\underline{s}$ Register over line C79 on FIG. 20 to the AND Unit on FIG. 12. FPS–7 is also applied to OR circuit R82 which provides one input to the AND A38 of the 0 position of the AND Unit. Finally, FPS–7 provides a pulse to OR circuit R92 and thus, gate circuit G92 to gate the contents of the selected column of the $\underline{X}$ Register over cable C75 (all on FIG. 15) to the AND Unit on FIG. 12. The FPS–7 pulse is applied to OR circuit R122 and gate G116 on FIG. 12 to gate the output of the AND Unit over cable C80 to the $\underline{v}$ Register on FIG. 11. The turnoff of FPS–7 initiates FPS–8.

The turnon of FPS–8 is applied to the Multiple Shift Right Unit on FIG. 18. This turnon pulse will cause a number of shifts which is determined by the particular setting of the Multiple Shift Right Ring of all of the numbers in the $\underline{X}$ and $\underline{Y}$ Registers, which, as stated previously, make up the 54 bit register complex for purposes of the Shifting operations and wherein said shift is also limited to those numbers in said Shift Registers wherein the corresponding bit position in the $\underline{v}$ Register is equal to 1. It will be remembered that in the previous description of FPS–6, the Multiple Shift Right Ring was set to 16. Hence, for every number stored in the Shift Registers having a 1 appearing in the particular $\underline{X}$ Column, a 16 bit shift of this number will occur. The details of such a shift will be described subsequent to FPS–10. In this description, the situation wherein the Multiple Shift Right Ring is set to 1 will be described since this is a generic case to all shifts and in addition has several criteria which must be satisfied on this last shift position. On the turnoff of FPS–8 clock stage FPS–9 is initiated.

The turnon of FPS–9 is applied to OR circuit R68 on FIG. 7 to increment the Counter J. The pulse is also applied to OR circuit R100 to advance the $\underline{X}$ Column Output Selector on FIG. 15. It is also applied to advance the Multiple Shift Right Ring on FIG. 18. The turnoff of FPS–9 initiates FPS–10.

The turnon of FPS–10 is applied to gate circuit G120 to test the setting of the Counter J. If the Counter is not set on a 6, the system loops back to step FPS–7 and an additional Shift operation occurs and this loop is continued until the Counter J is equal to 6. At this point, an output from gate G120 on FIG. 7 is applied to AND circuit A44 and A46. If the FAD flip-flop is set to a "1," the other side of the A44 has an input which causes an input to OR circuit R126 which, in turn, sets the FPS flip-flop to a "0." This indicates to the Floating Point Add Clock (FAD) that the Floating Point Shift is complete and subsequent steps in the Floating Point Add routine may be continued. If the VRFSM flip-flop had been set to a "1" rather than the FAD flip-flop, a second enabling input would be received at AND circuit A46 thus providing an output to also turn off FPS flip-flop and also set the SR flip-flop to a "1" and initiate clock step sequence SR–1.

This last test made under clock sequence FPS–10 when the Counter J is set to a 6 completes the Floating Point Shift Clock sequence.

A brief description of a Shift Right operation referring principally to FIG. 18 but also referring to FIGS. 22 and 6 will follow. Referring first to FIG. 22, it will be assumed that the flip-flop "4" has been set to a "1" by previous clock sequences as will be explained. With this flip-flop set to a "1," one input is provided to gate circuit G122 which is any gate circuit in row K in the 35th column of the $\underline{X}$ Register. The other input to the gate circuit will either be from the "1" or the "0" line of the $k^{th}$ bit position of the 35th column of the $\underline{X}$ Register, it being understood that there are 17 such gates per column. What this circuit does, in effect, is set up a path for transfer of data from the 35th column of the $\underline{X}$ Register to the 9th column of the $\underline{Y}$ Register.

It should be noted that the setting of the flip-flops "1" "2" and "3" on FIG. 22 to a "0" prevents the shifting of any of the bits in columns 0–8 of both the $\underline{X}$ Register and $\underline{Y}$ Register. *It will be noted that the Shift Right line on FIG. 22 is shown as having one output designated "to shift right gate $\underline{X}$ Registers Columns 9–35."* Such shift right gate is designated in FIG. 6 as gate G124. It is, of course, again understood that FIG. 6 is but exemplary of a single bit position in a particular column and particular row in the $\underline{X}$ Registers. It will also be noted that the Shift Right line is ANDed in AND circuit A48 with an output from OR circuit R128 *from the Shift Right gate of the $\underline{Y}$ Register*. These gates would be identical to the gate G124 of the $\underline{X}$ Register illustrated in FIG. 6.

Returning now to FIG. 18, the clock pulse FPS–8 is applied to the AND gate A50 in addition to the Multiple Shift Right Unit. Since it is now being assumed that the Multiple Shift Right Ring is set to a 1, the other input to the AND gate A50 is thereby provided and an output is obtained on the Shift Right common line from this AND circuit. This line applies a pulse to a series of 17 OR circuits typified by R130 whose output is applied to flip-flop F12 and single shot S12. The output of S12 is applied to OR circuit R132 to a given output to the Shift Intermediate Store line. Such line is illustrated on FIG. 6 as being applied to gate circuit G72. It will, of course, be understood that this is a common line applied to the entire row of the $\underline{X}$ Register of which the bit position illustrated in FIG. 6 is but exemplary. The turnoff of single shot S12 is applied to AND circuit A52 and is ANDed with the "1" side of the flip-flop F10 to produce a pulse on the Shift Right line coming out of AND circuit A52. It will be noted that the turnoff pulse of FPS–8 is supplied as one input to OR circuit R134 whose output, in turn, shuts off the Column Shift flip-flops such as, F12.

It should perhaps be noted that the gate circuit G124 shown on FIG. 6 provides a direct connection to the next immediate storage bit position to effect a 1 bit position shift. For the 2, 4, 8 and 16 position shifts, separate gate circuits would be provided for each bit storage locations which would be connected directly to the second, fourth, eighth, and sixteenth bit storage locations displaced to the right of the subject bit storage location. However, to avoid undue complication of the drawing, only the single *Shift Right gate* is illustrated in FIG. 6 as it is believed to be within the knowledge of a person skilled in the art appropriately connecting such gates in an obvious manner.

Search for Uppermost One (UMO)

During this clock sequence it will be desired to determine the index or register number in the $\underline{X}$ Register which contains an uppermost 1 in the 17 bit binary number stored in the $\underline{u}$ Register on FIG. 8. It was further desired to make the address or register position number available to the system subsequent to this test. This operation is performed by applying the UMO–1 pulse to gate circuit G150 on FIG. 8 which transfers the contents of the $\underline{u}$ Register over cable C82 to the AND Unit on FIG. 12. UMO–1 is applied to OR circuit R166 on FIG. 12 to set bit position 0 of the AND unit to a "0." UMO–1 is also applied to OR circuit R120 on FIG. 20 and thence to gate G114 to transfer the contents of the $\underline{s}$ Register over cable C79 to the AND Unit on FIG. 12. The output of the AND Unit is then gated over cable C80 through gate circuit C116 energized by UMO–1 to the $\underline{v}$ Register on FIG. 11. The turnoff of UHO–1 then transfers to clock step LGSM–12 in the Search for Largest Smallest Clock. This clock sequence then proceeds to actually search for the proper number and up-dates the appropriate Index Registers, i.e., on FIG. 2.

Floating Add Clock (FAD)

There are 8 illustrated operations within the Floating Add routines described with the present system as will be remembered from the previous description of the general operation of the Arithmetic Units of the present system. It should be noted that before the Floating Add operations begin or for that matter any of the other arithmetic operations, the $\underline{X}$ Registers will be loaded with a set of operands and the $\underline{Z}$ Register loaded with a second set of operands. The operation or "*op*" code indicating the particular operation to be performed will, of course, be obtained from the Instruction Register and will control the particular clock sequence which performs the necessary system operations. As will further be remembered, all operations performed in the 16 Arithmetic Units will be identical, therefore, a single operator in the Instruction Register will indicate just which operation is to be performed. The operator is detected in the Instruction Register under control of the INSTF Clock and particularly, on clock sequence INSTF–9 which on turning off, initiates clock stage FAD–1.

Before proceeding with the specific operation of the FAD clock, the following general description of the operation is helpful in understanding the purpose for each detailed step.

The $\underline{X}^i$'s are gated to the Adder. If the signs of $\underline{X}^i$ and $\underline{Z}^i$ are alike, $\underline{Z}^i$ is gated to the Adder *i*. If the signs of $\underline{Z}^i$ and $\underline{X}^i$ are different, gate $\underline{Z}^{-1}$ (bit by bit) "1's" to the Adder *i*. If the signs are the same and a carry out of the high order bit of the Adder exists, an overflow has occurred.

If the signs of $\underline{X}^i$ and $\underline{Z}^i$ are different, gate the possible Carry Output of the high order position to the Carry Input on the low order position. Also, store the high order carry. The result is placed in $\underline{XT}^i$. If a carry existed out of the high order position, the sign of $\underline{X}^i$ is correct and the sum in $\underline{XT}$ is correct and is to be balanced in $\underline{X}$. If no carry existed out of the high order position of the Adder, complement the sign of $\underline{X}^i$ and transfer the bit by bit complement of $\underline{XT}$ to $\underline{X}$.

The turnon of FAD–1 is applied (see FIG. 13) to OR circuit R252 and then to the 16 OR circuits labeled as OR circuits R254, to set all 16 Carry Control flip-flops #1 to "0." FAD–1 is also applied directly to set Carry Control flip-flop #2 to a "1." The turnoff of FAD–1 initiates FAD–1A.

The turnon of FAD–1A is applied to OR circuit R256 which gates the inverted output of the exponent portion of the $\underline{X}$ Registers to the Exponent Adders (16). FAD–1A is also applied to OR circuit R258 and thence to OR circuit R260 to gate the True Output of the exponent portion of the $\underline{Z}$ Registers to the Exponent Adders (still on FIG. 13). At this point it should perhaps be noted that if the $\underline{X}^i$ exponent is smaller than the $\underline{Z}^i$ exponent, a carry will result for that particular Exponent Adder. What is desired here is not a value of the particular sum of these two numbers but only the knowledge that there is a carry out which indicates that the $\underline{Z}$ Register exponent is larger. In this case, it will be necessary to switch the numbers in the particular positions of the $\underline{X}$ and $\underline{Z}$ Register where this condition exists. The controls for doing this include the setting of the Carry Control flip-flop #2 which has been preset to a "1." The "1" output of this flip-flop is supplied as one input to the 16 gate circuits G256 and the other input being the output from the 16 inverter circuits I18. The output from these 16 gate circuits G256 is carried on cable C120 from FIG. 13 to FIG. 12 where it passes through the OR gate R94 to the AND Unit. FAD–1A is also applied to OR circuit R120 and gate circuit G114 on FIG. 20 to gate the contents of the $\underline{s}$ Register over cable C79 to the AND Unit on FIG. 12. FAD–1A is also applied to OR circuit R80 to gate a "0" to the 0 position of the AND Unit. The clock pulse FAD–1A is applied to OR circuit R122 and gate circuit G116 to gate the output of the AND Unit over cable C80 to the $\underline{v}$ Register on FIG. 11. FAD–1A is applied to gate G258 to gate the output of the AND Unit on FIG. 12 over cable C122 to set the $\underline{Z}$ Register Input Rings (both Odd and Even Numbered) in accordance with said output. The turnoff of FAD–1A initiates clock stage FAD–2.

What has been accomplished by the previous clock stage is that the Input Rings of the $\underline{Z}$ Register are set to 1's and the $\underline{v}$ Register is set to 1's in those positions wherein the data in the $\underline{X}$ and $\underline{Z}$ Registers is to be exchanged. As will be remembered, it is desired to have all of the operands for a particular operation to be performed in the $\underline{X}$ Register having the smaller exponents.

The turnon of FAD–2 is applied to the 16 OR circuits R132 on FIG. 18 which shifts all positions of the $\underline{X}$ Register into the Intermediate Storage flip-flops for each position. Referring to the details of this operation, the output of the OR circuits R132 on FIG. 18 are applied over the "shift to intermediate storage" lines which, referring now to FIG. 6, are shown to supply an input to the gate circuit G72. Referring now to FIG. 13, FAD–2 is applied to the True Sign gate which gates its contents directly to the gate circuit G260. FAD–2 is also applied to OR circuit R260 and thence to the True 1–8 gate which gates bit positions 1 through 8 of the $\underline{Z}$ Register (exponent) through the Exponent Adder to the gate circuit G260. FAD–2 is also applied to OR circuit R262 and the True 9–35 gate which gates positions 9 through 35 of the $\underline{Z}$ Register through the Fraction Adder to the gate circuit G260. All three of these inputs are combined coming out of gate circuit G260 (i.e., a single 36 bit cable) and are transmitted to the $\underline{X}$ Register shown, for example, on FIG. 15. It will, of course, be understood that there will be 16 such output cables from the gate circuits G260 which are labeled Array Input cable C85 on FIG. 13. Referring briefly again to FIG. 6, this cable is shown as the two lines marked Array Input and as such, are obviously capable of storing the contents thereon in the Storage flip-flop $\underline{X}_i^k$. The flip-flop will be reset only if the corresponding bit position of the $\underline{v}$ Register contains a "1" and, thus, applies an input to gate circuit G60. The turnoff of FAD–2 turns on FAD–2A. The turnon of FAD–2A is applied on FIG. 15 to OR circuit R230 and thence to gate circuit G204 which gates the contents of the $\underline{X}$ Registers. Intermediate Storage flip-flops over cable C112 to OR circuit R232. FAD–2A is also applied to OR circuits R234 and R236 and thence to gate circuits G206 and G208 to gate the output of OR circuit R232 into the $\underline{Z}$ Register. This Inputing operation into the $\underline{Z}$ Register is done under control of the Odd and Even Numbered $\underline{Z}$ Register Input Rings which, as will be remembered, were set with the output of the AND Unit during clock sequence FAD–1A so that only those positions of the $\underline{Z}$ Register selected by said Input Rings will be reset. The turnoff of FAD–2A initiates clock stage FAD–3.

At the end of clock stage FAD–2A, the Shifting operation between the $\underline{X}$ and $\underline{Z}$ Register whereby the operands with the smaller exponents are now in the $\underline{X}$ Register has now been completed. It should perhaps be noted that this is done because in the normal case it is desired to shift the number with the smaller exponent in accordance with the value of the number or operands with the larger exponent and in the present embodiment the X Register is the only one which is provided with Shifting circuitry. However, it is to be understood that a person skilled in the art could supply the other registers with appropriate Shifting circuitry and, thus, make some of the previous operations unnecessary.

FAD–3 is applied to OR circuit R264 on FIG. 13 to set the Carry Control flip-flop back to "0." FAD–3 is also applied to OR circuit R138 on FIG. 20 and gate circuit G80 to gate the contents of the s Register over cable C71 to the v Register on FIG. 11. Note that $v_0$ remains set to a "0." The turnoff of FAD–3 initiates clock stage FAD–4.

The turnon of FAD–4 is applied to OR circuit R258 and thence to the gate True Z 1–8 which gates the exponent bits from the Z Register at the indicated position to the Exponent Adder (on FIG. 13). FAD–4 is also applied to OR circuit R256 whose output is in turn applied to the Complement X 1–8 which gates the complement of the exponent in the indicated position of the X Register as the second input to the Exponent Adder. FAD–4 is also applied to the OR circuits R266 whose output gates a "1" into the low order bit position of the Exponent Adders. This last operation makes the current addition in the Exponent Adder a true subtraction by using 2's complement. The output of the Exponent Adders pass through gate circuit G262 under control of the clock pulse FAD–4. The outputs from the gates G262 go into the 8 exponent bit positions of the Array Input cable C85 and are, thus, applied to reset the bit positions 1 through 8 of those rows of the X Register having a "1" stored in the associated bit position of the v Register. FAD–4 is also applied to OR circuit R140 to reset the rows of the Y Register (all positions) again where the corresponding bit position of the v Register is set to a "1." The turnoff of FAD–4 initiates FAD–5.

The turnon of FAD–5 is applied to OR circuit R268 which is applied if a gate signal to gate True X 1–8 which gates positions 1 through 8 of the indicated row of the X Register to the Exponent Adder (on FIG. 13). FAD–5 is also applied to OR circuit R270 whose output applies a pulse to one of the gate circuits G266 to apply the 2's complement of 27 as the second input to the Exponent Adder.

It should perhaps be reiterated once again that all of the operations being performed and described relative to FIG. 13 are being performed for all 16 row positions of the X and Z Registers.

Returning now to a description of the clock stage FAD–5, this pulse is also applied to the gates G264 to gate the outputs of the Exponent Adders in true form via the cable C120 to the AND Unit on FIG. 12. FAD–5 is also applied to the OR circuit R120 on FIG. 20 and gate G114 to gate the contents of the s Register via cable C79 as a second input to the AND Unit on FIG. 12. FAD–5 is further applied to OR circuit R122 and gate circuit G116 to gate the output of the AND Unit on FIG. 12 over cable C80 to the v Register on FIG. 11. FAD–5 is also applied to OR circuit R80 to set the 0 position of the AND Unit to a "0" so that subsequently the position $v_0$ will be set to a "0."

What the last sequence of operations has accomplished, i.e., FAD–5, is that a "1" has been stored in each position of the v Register wherein the exponent in a corresponding position of the X Register is greater than 27. This has been done, in effect, by subtracting the number 27 from the exponent and determining if the difference is equal to or greater than 0. The turnoff of FAD–5 initiates clock stage FAD–6.

The turnon of FAD–6 is applied to OR circuit R272 whose output is applied to the True X 9–35 gate on FIG. 13C to gate the friction portion of the indicated position of the X Register to the Fraction Adder. The other input to the Fraction Adder is not enabled which gives, effectively, a 0 input to the other Input Terminal, thus, the number being transmitted from the X Register comes out the result cable unmodified. FAD–6 is also applied to OR circuit R274 whose output is applied to gate circuit G268 to gate the friction portion just gated out of the Fraction Adder into the fraction portion, i.e., positions 9–35, of the Y Register. This gate circuit G268 is also shown on FIG. 15B as being energized by FAD–6 to make this particular transfer. It should be noted at this time that only those row positions are shifted where it has both been found that the shift required for the particular numbers is greater than 27 and also, when compared with the contents of the s Register (Screen) which indicates that these particular row positions are to be included in the current operation. This termination is made in the AND Unit on FIG. 12 during the clock sequence FAD–5. Therefore, these shifts will only be done in such row positions wherein the associated position of the v Register is set to a "1." FAD–6 is further applied to OR circuit R276 which sets the X Column Reset Selector in positions 9–35 to "1." The turnoff of FAD–6 initiates clock sequence FAD–6A.

The turnon of FAD–6A is applied to OR circuit R146 which energizes the Column Reset line. Thus, if $X^1$ has the associated position $v_1$ equal to "1," this particular row of the X Registers will be reset to 0 in positions 9–35 due to the previous setting of the Column Reset Selector to "1's" in positions 9–35. The above lines are shown on FIG. 15. Referring now to FIG. 6, the X Column Reset Selector is applied to AND circuit A56. The other input comes from the Column Reset line. The output of AND circuit A56 is applied to OR circuit R56 and thence to gate circuit G60 whose control input comes from the v Register for the bit positon corresponding to the particular row of the X Register. It will be noted that the farthest right hand output from gate circuit G60 resets the main storage flip-flop $X_1^k$ to a "0." Referring now to FIG. 13, FAD–6A is applied to OR circuit R270 whose output is applied to the gate circuits G266 (16) which gates the normal 2's Complement of 27 to the Exponent Adder. FAD–6A is also applied to OR circuit R268 whose output is applied to the True X 1–8 gate to gate the exponent from the indicated row of the X Register into the Exponent Adder. The output from this Adder is applied to the gate circuits G262 which is energized also by FAD–6A. The output from G262 is transmitted over cable C85 to the exponent portion of the $X_1$ Register. What this operation has done is to subtract a number 27 by adding the 2's complement from the actual exponent of the particular number currently stored in the X Register and then restores this difference in the exponent portion of the X Register. The turnoff of FAD–6A initiates clock stage FAD–7.

The turnon of FAD–7 is applied to set flip-flop F4 on FIG. 22 to a "1." The setting of this flip-flop enables the circuitry on FIG. 22 to directly connect the 35th bit position of the X Register of row $k$ to the 9th bit position of the Y Register at row position $k$. The operation of this circuitry was described during the description of the Floating Point Shift operation. FAD–7 is also applied to set the Floating Point Shift flip-flop to a "1." The "1" output of this flip-flop is used to turn on clock stage FPS–1. At the same time the turnoff of FAD–7 is utilized to turn on FAD–7A.

FAD–7A is utilized to determine when the Floating Point Shift operation is completed. This is done by applying the fall of FAD–7A to gate circuit G272. If the Floating Point Shift flip-flop is set to a "1," the output from this gate will branch this system to FAD–7B. FAD–7B is merely a delay stage which cycles back to FAD–7A which repeats the test. As soon as the Floating Point Shift flip-flop is reset to a "0" by the completion of the Floating Point Shift operation, the output from gate circuit G72 will branch the system control to clock stage FAD–8.

At this point all of the Shifting operations will have been completed and the fraction addition is about to begin under control of clock stage FAD–8. FAD–8 is applied to OR circuit R138 and thence to gate circuit G80 on FIG. 20 to gate the contents of the s Registers over cable C71 to the v Register positions 1–16 on FIG. 11. It will be noted that register position $v_0$ remains set to a "0." FAD–8 is also applied to OR circuit R144 on FIG. 15 which sets the X Column Reset Selector in positions 1 through 8 to a "1." The turnoff of FAD–8 initiates clock stage FAD–9.

The turnon of FAD–9 is applied to OR circuit R146 which enables the X Column Reset lines on FIG. 15 to actually reset the positions 1–8 of all rows of X wherein the corresponding bit positions of the v Register are set to 1's. The turnoff of FAD–9 initiates FAD–10.

The turnon of FAD–10 is applied to set the Carry to p flip-flop to a "1" on FIG. 13. FAD–10 is also applied to gate circuit G274 on FIG. 13. This gates the output from the Compare Unit. The inputs to this Compare Unit are the sign bits or the 0 column of the X and Z Registers for the indicated row posiiton. Thus, it will be remembered as with all of the circuit shown on FIG. 13, the Compare Units, gates G274, etc., are replicated 16 times in this circuitry. The output from the gate circuit G274 is applied to set the Carry Control flip-flop to a "1" if the equal line from the Compare Unit is energized and to a "0" if the not equal output from the Compare Unit is energized. FAD–10 is also applied to the OR circuits R280 to reset all 17 positions of the p Register on FIG. 9 to "0." The turnoff of FAD–10 initiates clock stage FAD–10A.

The turnon of FAD–10A is applied to gate circuit G276 which energizes the Complement Z 9–35 gate if the Carry Output flip-flop is set to a "0." This causes the complement of bit positions 9–35 of the Z Register for the indicated row to be transmitted to the 1 input of the Fraction Adder. Similarly, if the Carry Output flip-flop is set to a "0," the output from gate circuit G276 will cause all 0's to be gated into the 1 input of the Exponent Adder. Assuming now that the Carry Output flip-flop had been set to a"1," the output from gate circuit G276 would have caused the True Z 9–35 gate to gate the true contents of bit positions 9–35 of the indicated row of the Z Register into the Fraction Adder and would have caused the True Z 1–8 gate to gate the bit positions 1–8 (exponent) of the indicated row of the Z Register into 1 input of the Exponent Adder. FAD–10A is also applied to OR circuit R272 regardless of the setting of the Carry Output flip-flop to cause energization of the True X 9–35 gate to gate the bit positions 9–35 of the appropriate row of the X Register into the second input of the Fraction Adder. It should be noted that since the exponent portion of the X Registers at this time have been previously set to 0, there is no need to gate this exponent position into the Exponent Adder. Thus, the exponent from the Z Register will be transmitted unmodified through the Exponent Adder and will come out on the appropriate result cable. The outputs of both the Fraction Adder and Exponent Adder are brought together in gate circuit G278 and brought out on a single 35 bit cable (no sign), which cable is designated C85 which is used to reset the X Register. It will again be noted referring briefly to FIG. 6 that only those row positions of the X Register having associated bits of the v Register set to a "1" can be modified or changed in accordance with the contents of cable C85 due to the operation of the gate circuit G60. It should be noted at this time that gate circuit G280 has two inputs, one of which is from the Carry Output from the Fraction Adder. The other input to gate circuit G260 comes from the "1" side of the Carry Output flip-flop. An output from gate circuit G280 means that a "1" will be entered into the low order position of the Exponent Adder due to the fact that a carry resulted from the addition in the Fraction Adder. As will be appreciated, if the signs of the two numbers are equal and there is an overflow from the Fraction Adder, the exponent will automatically be incremented. A Shift Right operation and the insertion of a 1 into the appropriate position of the fraction portion of the number will be performed subsequently. The Carry Output line from the Fraction Adder is also applied as one input to gate circuit G282 whose control pulse is applied from the "1" side of the Carry to p flip-flop. Thus, whenever a carry is obtained from the Fraction Adder, it is desired to set the appropriate bit of the p Register to a "1." Thus, the output from G282 is transmitted over cable C87 to the p Register on FIG. 9. Referring to this figure, cable C87 is shown going through OR circuits R282 (16 inputs) to appropriately set the p Register flip-flops to "1." The turnoff of FAD–10A now initiates FAD–11.

The turnon of FAD–11 is applied to the indicated line on FIG. 15 of the X Column Complement Selector to set positions 0 and 9–35 to a "1." FAD–11 is also applied to set the X Column Input Selector at position 9 to a "1." The turnoff of FAD–11 initiates FAD–11A.

The turnon of FAD–11A is applied to the 16 gate circuits G284 indicated on FIG. 18. It will be noted that the Compare Units shown on FIG. 18 are the same as the Compare Boxes indicated on FIG. 13. They are duplicated on FIG. 18 since more outputs are required, thus, making it more convenient to show the unit on a separate drawing together with the associated logical circuitry for these outputs. It will be noted that the gate circuits G284 have two inputs from the Compare Units and two inputs from the two sides of he p Register for the $k^{th}$ position. The AND circuits A114, A116, and A118 receive the outputs from the gate circuit G284. The AND circuit A114 will be energized if the Not Equal Symbol line from the Compare Unit is energized and the "0" line from the p Register is energized. This means that the signs were unequal and there was no carry count in the Addition operation. The output from AND circuit A14 on FIG. 18 is applied to the X Row Complement Input line, which line is again shown on FIG. 15. What happens now is that the appropriate bit positions for the selected row having their associated X Column Complement Selector set to "1's" will be selected. As will be remembered, the X Column Complement Selector was previously set to 1's positions 0 and 9–35. Referring briefly to FIG. 6, it will be noticed that the Column Complement Selector line is ANDed in AND circuit A120 with the Row Complement line to produce an input to OR circuit R142 which will produce a Complement Output through gate G60 under the usual control of the v Register. The output of AND circuit A114 is also applied to OR circuit R284. It will be noted that the output from AND circuit A116 is also applied to OR circuit R284 as its only function. It will be noted at this point that AND circuit A116 is energized when the Not Equal Symbol line from the Compare Unit is energized and the "1" line from the p Register is energized. Thus, the OR circuit R284 will have an output whenever the Not Equal Symbol line from the Compare Unit is up regardless of the setting of the p Register. Referring now to FIG. 13, the output from OR circuit R284 is applied to the True Z 1–8 gate which causes the exponent bits in the Z Register to be gated to the Exponent Adder. Since there is no other input at this time to the Adder, the exponent just transmitted thereto will propogate through the Adder to gate circuit G262 which is controlled by FAD–11A and thence transmitted to the exponent portion of the X Register via cable C85.

If now the Equal Symbol line from the Compare Unit is energized on FIG. 18 and the "1" line from the p Register is energized, AND circuit A118 will be activated. The output from A118 is applied to the OR circuits R130 whose outputs set the F12 flip-flops to "1," and initiates the single shot S12. The turnon pulse from S12 is applied to OR circuit R132. The output of R132 energizes the Shift to Intermediate Storage line on FIG. 18 which is also shown on FIG. 6. This line applies a pulse to the gate circuit G72, thus, transferring the current contents of the Main Storage flip-flop designated as $\underline{X}_i^k$ into the Intermediate Storage flip-flop. The turnoff of S12 is ANDed with the "1" side of the flip-flop F12, thus, enabling AND circuit A52. The output from A52 enables the Shift Right line shown on FIG. 18 and also on FIG 6, thus, applying an input to the gate circuit G124 which gates the *i* column of the X Register to the *i*+1 column.

The output of the AND circuits A118 on FIG. 18 is also transmitted via cable C126 to FIG. 13 to AND circuits A122 which when energized, apply a 1 to the 9th bit position of the Fraction Adders. As before this, the output from the Adder will be transmitted directly over cable C85 to the appropriate row of the X Register. However, it will be noted that since only the 9th position of the X Column Input Selector is set to a 1, only this bit position will be modified by this operation and, thus, set to a "1." The operation just completed with this condition out of the gate circuit G284 has resulted in shifting the fractions in the X and Y Register (which it will be remembered were connected between their 35th and 9th bit positions respectively one bit to the right and set the 9th bit position of the X Register to a "1").

Assuming now the latter condition possible with the four inputs to the gate circuits G284 wherein the Equal Symbol line from the Compare Unit is energized and the "0" line from the *p* Register is energized, nothing happens since no logical circuitry is initiated by this combination. What this latter condition means is that the condition of both the fraction and exponent portions of the X and Y Registers is satisfactory and need not be modified. The turnoff of FAD–11A now energizes FAD–11B. FAD–11B is applied to set the Z Register Input Ring, both odd and even numbered to all 1's.

The turnon of FAD–11B resets the Carry to *p* flip-flop to "0." The next operation performed by FAD–11B is to test the output of the Instruction Register Decoder on FIG. 5. The test desired is to determine whether or not the instruction has called for a normalized or an unnormalized result. Accordingly, FAD–11B is applied to gate circuit G286. It will be noted that one of the inputs to gate G286 is OR circuit R288. The input to this OR circuit is from the lines marked VUFA, VUFS, VUAM, and VUSM. What these stand for is for an Unnormalized Floating Add, Unnormalized Floating Subtract, Unnormalized Add Magnitude, and Unnormalized Subtract Magnitude. If OR circuit R288 produces an output, the fall of FAD–11B will cause gate circuit G286 to branch the system to clock step FAD–12.

If on the other hand an output had been obtained from OR circuit R290, the system would have branched to FAD–13. Referring again to FIG. 5, it will be noted that the lines from the Instruction Register Decoder marked VFAD, VFSB, VFAM, and VFSM are capable of providing an input to the OR gate R290 if any one of same is energized.

It will be first assumed that the instruction is for an Unnormalized operation and the system branches to clock stage FAD–12.

It will now be assumed that one of the output lines from the Instruction Register Decoder on FIG. 5 labeled VUFA, VUFS, VUAM, or VUSM is energized and the system branches to clock stage FAD–12. The turnon of FAD–12 is applied to OR circuit R268 and thence to the True X 1–8 gate on FIG. 13 which gates the exponent from the appropriate row position of the X Register to the Exponent Adder. FAD–12 is applied to OR circuit R270 and thence to gate G266 which gates the 2's complement of the 27 to the other side of the Exponent Adder. The output from the Exponent Adder is transferred to the exponent position, i.e., 1–8, of the appropriate position of the Y Register by applying FAD–12 to OR circuit R278 and thence to gate G270. FAD–12 is also applied to OR circuit R290 and thence to the True X Sign gate on FIG. 13 which gates the sign bit from the indicated row position of the X Register to the sign position, i.e., 0, of the Y Register. It should perhaps be noted that this transfor of exponents and signs from the X to the Y Registers occurs only in those positions where the associated *v* Register position, i.e., $v_k$, is equal to 1. At this point an Unnormalized operation is complete and FAD–12 is applied to OR circuit R292 to reset the Floating Add flip-flop on FIG. 5 to a "0." FAD–12 on turning off again initiates the clock sequence beginning with STA–2.

Assuming now that the test made during clock stage FAD–11B indicated that an output was present on one of the lines from the Instruction Register Decoder on FIG. 5 which is labeled VFAD, VFSB, VFAM or VFSM which requires a normalized number as the result of the operation. This test, as will be remembered, initiates clock sequence FAD-13. The turnon of FAD–13 is applied to the OR circuits R288 (16 such circuits, one for each row position of the registers). The output of these OR circuits applied to the 16 gate circuits G288 (all on FIG. 16), and the input to the gate circuits G288 is from the 28 Input AND circuits and also from the inverters I20. The input to said 28 input AND circuit is from the 0 side of the fraction portion, i.e., bits 9–35, and the 1 side of the associated *s* Register flip-flop. The output of the AND circuit is up when all of the fraction positions of the X Register are 0, i.e., a true 0 exists in the register, and the associated screen bit, i.e., *s* Register, is equal to 1 which indicated that this is a significant position of the operation and is to be normalized. Thus, the output from the inverters I20 will be up when there is no output from the 28 Input AND circutis. The outputs from the 16 gate circuits G288 are transferred via cable C89 on FIG. 16 to the *v* Register on FIG. 11 to set positions 1–16 of same in accordance with the output of said gate circuits G288. It will be noted in passing that $v_0$ remains set to a 0 from previous operations. At this point a 16 bit binary number will be stored in the *v* Register wherein a "1" setting indicates that the fraction in the associated position of the X Register is a true zero while a "0" setting indicates either that the fraction is not a true zero or that the particular position is deleted from the operation in accordance with the contents of the *s* Register. FAD–13 is also applied to OR circuit R294 and thence to gate circuit G202 to gate the contents of the Y Register over cable C114 and through OR circuit R232 into gate circuits G206 and G208 which are enabled respectively by applying FAD–13 to the OR circuits R234 and R236. Thus, the entire contents of the Y Register will be transferred in the Z Register since, as will be remembered, both of the Z Register Input Rings were set to all 1's on clock step FAD–11B. The turnoff of FAD–13 initiates clock stage FAD–14.

The turnon of FAD–14 is applied to OR circuit R252 which results in all 16 of the Carry Control flip-flops #1 being set to "0." FAD–14 is applied to OR circuit R264 to set the single Carry Control flip-flop #2 to a "0" (only 1). FAD–14 is applied to OR circuit R262 and thence to gate True Z 9–35 which gates the fraction portion from the associated row position of the Z Register through the Fraction Adder (in unmodified form since there is no second input to this Adder at this point) and thence to gate circuit G278. Concurrently, FAD–14 is applied to the OR circuit R268 and thence to the True X 1–8 gate which gates the exponent portion of the associated row of the X Register to the associated Exponent Adder as 1 input thereto. At the same time, FAD–14 is applied to OR circuit R270 and thence to gate G266 to gate the 2's complement of the 27 to the other side of the Exponent Adder. The output from the Exponent Adder is also applied to the gate circuit G278 (i.e., on the line positions 1–8 of the Transfer cable). Gate circuit G278 is enabled by applying FAD–14 to the OR circuit R296. This results in transferring a new exponent and a new fraction over the cable C85 to the X Register.

What happened thus far is that the number stored in the Y Register has been, in effect, shifted to the left 27 positions and the exponent modified accordingly.

Continuing with clock stage FAD–14, this pulse is applied on FIG. 7 to the OR circuit R116 to reset the Counter J to 0. FAD–14 is also applied on FIG. 18 to set the Multiple Shift Left Ring to the 16 position. The turnoff of FAD–14 initiates FAD–15.

It should perhaps be noted at this point that clock stages FAD–15, FAD–16, and FAD–16A constitute a loop which tests the fraction portions of the X Register for 0's and performs Shift Left operations when all 0's are encountered in the following groups of bits of left most bit positions, i.e., 16, 8, 4, 2, and 1. Thus, for example, when the Multiple Shift Left Ring is set to the 16 position, the left most 16 bits will be tested to see if they are all 0's. If they are all 0's, it will obviously mean that a shift to the left of at least 16 is required and this particular phase of the loop will cause such shift and modify the associated exponent accordingly. Thus, the system will cycle down until the Multiple Shift Left Ring is set to the 1 position and this test made and the shift performed. Thus, on the turnoff of FAD–16A, the number stored in the X Register will have been normalized.

Referring now to FIG. 17, there shown in the upper portion of the figure in dotted lines, the test circuitry for testing for all 0's in the fraction portion of the X Register and ANDing same with the contents of the Screen Register or s Register. In this figure it will be noted that the 5 bit cable C128 comes from FIG. 18 as the output from the Multiple Shift Left Ring and one of these lines will be up in accordance with the setting of this ring. Referring back to FIG. 17, 1 of the AND circuits A124, A126, A128, A130, or A132 will be energized in accordance with the setting of the Multiple Shift Left Ring. It will also be noted that the 16 bit cable C92 from the s Register on FIG. 20 is brought into this circuitry and applied as the second input to the AND circuits A124, A126, A128, A130, and A132. The third input to all 5 of these AND circuits is from the AND circuits A134, A136, A138, A140, and directly from the 0 side of the 9 position of the appropriate row of the X Register as will be explained. The inputs to these latter 4 AND circuits are from the "0" side of the indicated bit positions of the X Register, i.e., positions 9–24, which are the 16 left most fraction bits. Thus, if all 0's are present in position 9–24, AND circuit A134 will be enabled. If all 0's are present in positions 9–16, AND circuit A136 will be enabled. If all 0's are present in positions 9–12, AND circuit A138 will be enabled, and if 0's are present in positions 9 and 10, AND circuit A140 will be enabled. The output of the 5 AND circuits A124, A126, A128, A130 and 132 is collected in the OR circuit R298 whose output is applied directly to gate circuit G290 and also through the inverter I22. The outputs of all 16 gate circuits G290 are collected in the 32 bit cable C91. The contents of the cable C91 are transferred to FIG. 11 and utilized to set bit positions 1–16 of the v Register accordingly. The turnoff of FAD–15 initiates FAD–16.

Referring now again to FIG. 18, FAD–16 is applied to the Multiple Shift Left Unit. The application of a pulse to this Unit causes a shift to the left of 16 positions in accordance with those row positions of the X and Y Registers having a corresponding "1" in the v Register. The operation of the Multiple Shift Left Unit is substantially identical to the operation of the Multiple Shift Right Unit which was described in detail in the clock sequence Floating Point Shift (FPS). The way in which this shift was accomplished was by making direct connections from a desired bit position to a Shift line which directly connected to a bit position to the right or left in accordance with the number of bits of shift desired. It should be remembered that, on FIG. 6, while only single position shift lines are shown to right and left, there would actually be 5 such lines for each shift direction, i.e., a 16, 8, 4, 2, as well as the 1 bit shift. As stated previously, these lines are not shown in complete detail in FIG. 6 as they would needlessly complicate the drawing and would clearly be understood by one skilled in the art. It will also be appreciated that such lines would only be necessary for the bit positions 9–35 in both the X and the Y Registers since only the fraction portion of these registers need be shifted. Thus, it will be appreciated, the turnon of FAD–16 which initiates the operation of the Multiple Shift Left Unit causes the shifting of the fraction portions of the X and Y Registers a number of bit positions which is directly related to the setting of the Multiple Shift Left line.

The operation by which clock stage FAD–16 modifies the exponent portion of the X Register will now be explained referring to FIG. 13. FAD–16 is applied as a single input to the AND circuits A142, A144, A146, A148, and A150. The other input to these AND circuits comes from the Multiple Shift Left Ring on FIG. 18. (Only one shift position or line will be enabled at any one stage of operations in accordance with the setting of this ring.) The outputs of the AND circuits A142 through A150 is applied to the 5 gate circuits G294, G296, G298, G300 and G302. (Thus, only 1 gate circuit will be energized during any particular cycle of the loop.) The output of these gate circuits, i.e., G294 through G302, causes the 2's complement of the shift value, i.e., 16, 8, 4, etc., to be applied as 1 input to the Exponent Adders. FAD–16 is applied to OR circuit R268 and thence to the True X 1–8 gate to gate the exponent portion of the associated X Register as a second input to the Exponent Adders. The output from the Exponent Adders is transmitted to gate circuit G278 which in turn is enabled by FAD–16 through OR circuit R296. The output of gate G278 is thence applied over cable C85 to reset the exponent portion, i.e., bit positions 1–8, of the X Register. It will here be again noted that only those rows of the X Register will be reset wherein a "1" is contained in the associated bit position of the v Register (v was set in step FAD–15). FAD–16 is finally applied to OR circuit R68 and, thus, increments the Counter J. The turnoff of FAD–16 initiates FAD–16A.

FAD–16A is applied to the Advance line for the Multiple Shift Left Ring on FIG. 18. FAD–16A is applied to gate G304 on FIG. 7 which tests the setting of the Counter J. It will be noted that the input to this gate circuit is labeled 5 and not 5. If the not 5 input to gate circuit G304 is energized, the output of gate circuit G304 branches back to clock stage FAD–15. If the 5 line to gate circuit G304 is energized, this circuit then branches the system to clock stage FAD–17. What a 5 setting of the Counter J will mean is that all 5 positions of the Multiple Shift Left Ring will have been tested and performed and the system will then signal that the Shift Left operation necessary for Normalization is complete.

Clock stages FAD–17, FAD–18, and FAD–19 perform the function of modifying the exponent in the Y Register by subtracting 27 from the exponent in the associated X Register. This operation is performed in order to allow double precision operations and the minimize round off erorr. The turnon of FAD–17 is applied to the OR gate R138 on FIG. 20 and thence to gate circuit G80 which gates the contents of the s Register over cable C71 to the v Register on FIG. 11. The turnoff of FAD–17 initiates FAD–18.

The turnon of FAD–18 is is applied to OR circuit R268 on FIG. 13 which is then applied to the True X 1–8 gate to gate the exponent portion of the X Register as 1 input to the Exponent Adders. FAD–18 is also applied to OR circuit R270 and thence to gate G266 to gate the 2's complement of the 27 as the second input to the Exponent Adders. The ouput from the Exponent Adders is then transferred through gate circuit G270 which is activated by FAD–18 being applied to OR circuit R278. The output from gate circuit G270 is then applied over cable C90 to FIG. 15B which resets the exponent portion, i.e., bit positions 1–8, of the rows of the Y Register wherein v equals "1." The turnoff of FAD–18 initiates FAD–19.

The turnon of FAD–19 is applied to OR circuits R144 and R276 to set all positions of the X Column Reset Selector (still on FIG. 15) to 1's. FAD–19 is also applied to the OR circuit R288 on FIG. 16 and the output from this circuit, thus, tests the fraction positions of all rows of the X Register in exactly the same manner as was described for clock step FAD–13. Thus, the v Register will contain a bit pattern of 1's and 0's wherein a "1" indicates that the fraction is all "0's" and the setting of the associated screen bit, i.e., s Register, is equal to 1. The turnoff of FAD–19 initiates FAD–20.

The turnon of FAD–20 is applied to OR circuits R140 which is applied to the Y Row Reset lines on FIG. 15 to reset all rows of the Y Register having an associated v bit of "1." Similarly, in the X Register, FAD–20 is applied to OR circuit R124 and the X Row Reset line to similarly completely reset the indicated rows of the X Register to all 0's. i.e., positions 0–35, wherein the associated bit of the v Register is "1." Thus, all row positions of the X and Y Registers containing a true 0 has all 0's stored therein in the sign bit position, the exponent bit positions, and the fraction bit positions. The fall of FAD–20 is applied on FIG. 5 to OR circuit R292 which resets the FAD flip-flop to a "0." The turnoff of FAD–20 also initiates the clock sequence beginning with STA–2.

SECTION 10

Summary

The above description of the detailed operation of the presently disclosed multiprocessing system clearly indicates the wide range of mathematical problems the system is capable of solving. It will be apparent that the many possible control functions make it specifically adaptable for the solution of vector problems and for use in array processing in general.

While only the Add operations have been specifically described, it will be appreciated that subtraction may be readily performed by providing for suitable sign changes and complements. Further, the Subtract operation is indicated in the disclosed embodiment in the output of the Instruction Register Decoder. Multiplication and Division operations may be performed by the apparatus shown with the provision of specific clock control sequences as will be understood by those skilled in the art. These have not been shown in the present embodiment as they would add no material structure to this system and would obscure the broad system concepts in unnecessary detail.

It will be appreciated that all of the basic functional blocks shown in the figures are well known circuits readily available in the computer arts which may be embodied in tube circuitry, conventional transistor circuitry or in integrated circuit technology without departing from the spirit and scope of the disclosed system concepts.

The particular multiple Access Memory shown comprises 16 separate Memory Boxes each of which is a substantially conventional random access magnetic memory such as used in the IBM 7090 computer and could be replaced by a single memory wherein up to 16 different word locations could be addressed simultaneously.

For example, if the memory were arranged so that an entire X row or selected parts thereof could be addressed in parallel, data would have to be stored in such memory so that related vectors of such data followed in a predetermined organization along such X row or partial X row. Also, while the general type of memory currently available in the computer arts is the core memory, it is understood that thin film memories could equally well be used in the system assuming, of course, that they incorporate the same type of memory organization, i.e., random access. The particular Arithmetic Units shown and described in the present embodiments could similarly be varied without changing the more general concepts of the present system, i.e., having a separate controllable Arithmetic Unit for simultaneously performing a given individual operation in the vector problem. Obviously, different algorithms could be incorporated for doing the addition of two numbers having different signs, i.e., subtraction wherein different complementary and carrying facilities could be used.

As stated previously, a number of different methods are available for genearting the addresses from a base address plus an increment. In the system disclosed and described, it is apparent that up to 16 addresses could be generated simultaneously if it were desired to provide sufficient Holding Registers and circuitry to accomplish same.

While data word lengths of 36 bits, i.e., 1 sign bit, 8 exponent bits and 27 fraction bits, have been illustrated in the present embodiment it will be clearly understood that more or less bits could easily be provided in the system depending on the degree of precision desired within the system. Similarly, instruction word bits have also been shown as being 36 bits long. It will again be appreciated that the instruction word could also be varied depending on the amount of control it is desired to place in a particular instruction word.

Similarly, the system timing has been illustrated by the use of many separate clock sequencies each of which sequences comprises a plurality of single shot multivibrators which produce a discrete turnon pulse and a subsequent turnoff pulse, said pulses being displaced from each other a sufficient time to allow the performance of the particular operation required. It will be apparent that other timing schemes either synchronous or asynchronous could readily be provided if so desired. This particular timing scheme was selected for purposes of describing the board concepts of the invention because of the clarity of the presentation and the discrete manner in which each step may be shown and described. It should be understood that it is not intended that the system be limited to the particular timing controls illustrated in the present embodiment.

Further, as will be understood, many other types of operations and instructions would be possible with the present system other than those described herein which were believed most illustrative of the novel aspects of the present system. For example, it would be possible to do non-vector problems, i.e., a single operation at a time such as Addition, Subtraction, Multiplication or Division by merely masking out all but the desired Arithmetic Unit and Storage Registers. Similarly, single address computations and memory accesses may be quite readily accomplished.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A vector arithmetic multiprocessor computing system which comprises:

a system memory, address means for concurrently generating a plurality of addresses for accessing said system memory, means for concurrently accessing a plurality of data words from said memory at said plurality of addresses, a plurality of arithmetic units capable of concurrently performing the same arithmetic operation, an instruction unit for interpreting system instructions and including control means for initiating operation of said address means to generate said plurality of addresses, for accessing a plurality of data words from said system memory means in accordance with said generated addresses, for routing said plurality of data words to said arithmetic units as operands, for causing all of said arithmetic units to perform the same arithmetic operation on data supplied thereto and for placing the results obtained from said arithmetic operations in storage registers therefor.

2. A vector arithmetic multiprocessor computing system as set forth in claim 1 wherein as many operations are capable of current performance as there are arithmetic units and including control means for each arithmetic unit effective to inhibit the arithmetic unit operation,
said control means including means to interpret a mask instruction included in the system instruction program to effect the inhibiting of selected arithmetic units.

3. A vector arithmetic multiprocessor computing system as set forth in claim 2 including a plurality of multiword storage registers for storing the operands for said arithmetic unit as they are accessed from the system memory and for storing the results of operations performed by the arithmetic units, wherein each of said registers has at least as many word storage locations as there are arithmetic units and wherein each word storage location has a sign bit field, an exponent bit field and a fraction bit field.

4. A vector arithmetic multiprocessor computing system as set forth in claim 3 wherein said multiword storage registers are so arranged that individual data words are stored in rows of said multiword storage registers and the individual bits making up the data word are stored in columns,
said multiword storage registers including bit transfer lines and gating means disposed between bit storage locations in the columns and rows of said registers for selectively shifting data words to adjacent rows and for concurrently shifting the bits in selected columns of said multiword storage registers a desired number of bit positions to the right or to the left.

5. A vector arithmetic multiprocessor computing system as set forth in claim 4 including means responsive to an instruction stating that the results of an arithmetic operation are to be normalized which comprises means for concurrently examining all of the data words in the multiword storge registers containing said results for significant zeros between the radix point and the first nonzero bit and for concurrently shifting all of said data words appropriately to remove said zeros and for adjusting the exponent indication for each such data word in accordance with the amount of shifting necessary to normalize same.

6. A vector arithmetic multiprocessor computing system as set forth in claim 5 wherein said means for normalizing includes means for detecting when a data word in a row of said storage register is a true zero and for inhibiting further attempts to shift the data word and modify its exponent during the remainder of the normalizing operation.

7. A vector arithmetic multiprocessor computing system as set forth in claim 6 wherein said normalizing means includes:
means for searching for strings of consecutive zeros concurrently in selected word positions of said result storage register, said means including:
means for consecutively searching for said zeros in descending powers of 2 the largest group of zeros searched for being dependent upon the number of bits in the fraction portion of the storage registers,
means responsive to a successful search for a given number of successive zeros to concurrently shift those data word bits stored in the fraction of the storage register a number of bit positions equal to the number of zeros found and for subtracting one from the appropriate bit position of the exponent portion of the data word stored in the data register, and
means for continuing this operation until the power of 2 being searched for equals zero.

8. A vector arithmetic multiprocessor computing system as set forth in claim 4 including:
means for directly interconnecting two of said multiword storage registers together to provide for double precision accuracy in certain computations, whereby the fraction bit storage capability is at least doubled, said interconnecting means including:
means for selectively connecting the least significant bit position of each row of the first of said multiword storage registers to the most significant bit storage location of corresponding rows of the second of said multiword storage registers wherein said most significant bit position of said second multiword storage register may be the sign bit storage location, the most significant bit of the exponent storage location or the most significant bit position of the fraction storage location.

9. In a vector arithmetic multiprocessor computing system for the concurrent execution of like arithmetic operations,
a group of at least three data storage registers each such register having at least one data word storage location for each arithmetic unit included in the system, said registers being organized to store individual data words in rows of said register and the individual bits comprising each said word within columns of said register, each bit storage location of said register, selectively storing a binary "1" or binary "0," means associated with each of said registers for accessing all rows thereof concurrently, means associated with at least one of said registers for selectively accessing a single column, each of said register bit storage locations comprising a primary bistable storage element and an intermediate bistable storage element selectively settable from said primary storage element, said intermediate storage element temporarily storing data contained in said primary storage element during shifting operations with said register.

10. A vector arithmetic multiprocessor computing system as set forth in claim 9 wherein each of said primary and intermediate storage bistable elements comprises an electronic bistable flip-flop circuit and wherein said primary storage element includes means for selectively setting said element to a binary "1," a binary "0" or for complementing the current setting thereof.

11. A vector arithmetic multiprocessor computing system as set forth in claim 9 wherein at least one of said registers includes means for selectively shifting each data word stored in each row of said register to either adjacent row position.

12. A vector arithmetic multiprocessor computing system as set forth in claim 11 wherein said at least one register additionally includes means for concurrently shifting a plurality of the columns of said register to the right or to the left.

13. A vector arithmetic multiprocessor computing system as set forth in claim 12 including means for inhibiting the shifting of selected bits within such columns during a shifting operation.

14. A vector arithmetic multiprocessor computing system as set forth in claim 12 including means for inhibiting the resetting of the primary storage element of selected rows of said register.

15. A vector arithmetic multiprocessor computing system as set forth in claim 12 including means for varying the magnitude of said shifting left or shifting right of data in said columns.

16. A vector arithmetic multiprocessor computing system as set forth in claim 15 including means to determine the magnitude of a shift right or shift left operation for directly enabling shift paths to bit positions displaced by a power of 2 wherein the maximum power of 2 shift magnitude utilized is determined by the total number of bits in the fraction portion of a data word stored in said register.

17. A vector arithmetic multiprocessor computing system as set forth in claim 12 including means for con necting two of said registers directly together to permit double precision operations to be performed wherein the individual bit storage locations in the last column of one of said registers is selectively connectable to corresponding bit positions in the first, second or tenth columns of said second register wherein data stored in said registers utilizes the first bit position for storage of the sign bit, positions 2 through 9 for storage of exponent bits and bit positions 10 through 36 for storage of fraction bits.

18. In a vector arithmetic multiprocessor computing system:

means for concurrently generating a plurality of addresses from a base address and an address increment comprising:

means for concurrently adding the base address and the increment and the base address and at least one successive multiple of the increment, means responsive upon completion of the aforesaid addition to perform a further addition using the result of the addition of the base address and the largest address increment multiple obtained previously as the new base address, means for continuing said additions until a desired number of addresses are generated and means for utilizing said generated addresses to access the system memory.

19. A vector arithmetic multiprocessor computing system as set forth in claim 18:

means for detecting an address increment of zero, and means for transferring the single base address to a memory address decoder for utilization and inhibiting subsequent address generation.

20. A vector arithmetic multiprocessor computing system as set forth in claim 18, said system including means for generating two addresses at a time wherein the means for concurrently adding the base address and the address increment comprising:

a first adder for adding the base address and the address increment and a second adder for adding the base address and the second multiple of the address increment, means for subsequently supplying the sum address from said second adder back into a register having means for transmitting said sum address to both of said adders upon command for the generation of subsequent addresses together with said address increment.

21. A vector arithmetic multiprocessor computing system as set forth in claim 20, wherein said addresses comprise two parts, the first part denoting a second of a multisection memory, each of said sections being concurrently accessible, and the second part denoting a specific address within said section:

first and second decoders selectively connectable to the output of said first and second adders for decoding the memory section portion of the addresses generated therein, and means responsive to the output of said decoders to gate the respective storage location addresses within each section of memory into the specified section memory address register.

22. A vector arithmetic multiprocessor computing system as set forth in claim 21 including means for storing the partial results of said address generation additions, said means comprising:

a group of storage registers having separate input and output control wherein only that portion of the generated addresses specifying the section of the memory to be addressed is stored, means for selectively supplying addresses from said storage means to a first and second data decoder, means responsive to the output of said data decoders to connect the selected memory data registers to the computing system.

23. A vector arithmetic multiprocessor computing system as set forth in claim 21 including:

means to detect conflicts of generated addresses within the same section of the memory comprising means for comparing those portions of the generated addresses which specify the section of memory to be accessed, and sequencing means responsive to an equal comparison effective to allow first one and then the other of said memory access cycles to be completed before subsequent addresses are generated.

24. A vector arithmetic multiprocessor computing system as set forth in claim 23 including:

means for performing indirect memory accessing operations wherein data accessed during the address generating cycle comprises subsequent addresses to be accessed by the system, storage means for storing the address data accessed from memory until all of the desired addresses have been generated and data at said addresses transferred to said storage means, and means for transferring the data from said storage means back into the output of the address generation circuitry to access memory at the indicated addresses.

25. A vector arithmetic multiprocessor computing system as set forth in claim 24 including means for transferring the addresses from the storage means two at a time directly over a data transfer path directly to the first and second decoders and thence to the memory address busses.

26. A vector arithmetic multiprocessor computing system as set forth in claim 25 including means associated with each section of memory effective to indicate when said memory is currently being accessed, means responsive to a busy signal from said indicating means to inhibit further address generation until the addressed memory is available and the address just generated may be utilized to access said memory.

27. In a vector arithmetic multiprocessor computing system:

a storage register for storing a vector of numbers in consecutive row positions of said register wherein binary bits comprising the number are stored in respective bit positions of said rows, means for restructing a list of numbers stored in the rows of said register wherein said numbers comprise a first sequential group which is to be interspersed in the rows of said register maintaining the original sequence but interspersed with rows containing all zeros depending upon the instruction contained in a special mask words, said mask word containing a binary bit position for each row of said register wherein a binary representation indicates whether the associated row position of the register is to subsequently contain a number of said first sequential list or a zero, means for examining the mask word sequentially beginning with the first bit position corresponding to the first row position of said register, means effective to shift all of the numbers stored in said register down one row if the mask word is found to contain a delete indication beginning with the row of the register corresponding to the bit position of the mask word currently being examined, means effective upon completion of said shift to examine the next position of said mask word and for preventing such a shift upon an indication in the mask word that a number is to be retained in the storage register, means for continuing said examination and said shifting of said register under control of the contents of said mask word until the last position of the mask word corresponding to the last row of said register is examined.

28. A computing system as set forth in claim 27 including means in said register responsive to the shifting of a number out of a row position of said register without shifting another number in effect to reset said row to all zeros.

29. In a vector arithmetic multiprocessor computing system including a data storage register for storing a vector of numbers wherein each number is stored in consecutive rows of said register and including control means for shifting numbers between adjacent rows of said registers, means to effect a restructing operation on the data stored in said register to compress a first sequential vector of numbers wherein certain members of said vector are to be deleted and the remaining members compressed to form a shorter, consecutive list, means including a register for storing a control word, said control word having an indication for each member of said vector as to whether it is to be retained or deleted, means for consecutively examining the control word beginning with the first position thereof corresponding to the first row of said register containing the first member of said vector, means for shifting the entire contents of said register up one row position beginning with the row of said vector corresponding to the position of said control word being interrogated, means for proceeding directly to an examination of the next position of said control word in the event a retain indication is encountered, means for discarding the data in the uppermost position being shifted on each shift cycle, means for proceeding with said testing of said control word and the shifting of data until the last position of said control word has been interrogated and an appropriate shift effected.

30. A vector arithmetic multiprocessor computing system as set forth in claim 29 wherein the control word comprises a sequence of binary bits wherein as many bit positions are provided as there are row positions in said register and members of said vector, means for interpreting a binary "1" in the control word as an indication that a corresponding member of said vector is to be retained, and means for interpreting a binary "0" as an indication that a member of said vector is to be deleted.

31. A vector arithmetic multiprocessor computing system as set forth in claim 30 including:

means for resetting a row of said register to zero when a number is shifted from such row into a higher position and no other number is shifted into that particular row position of said register from the adjacent lower row.

32. In a vector arithmetic multiprocessor computing system including two data storage registers for storing two vectors of numbers wherein in each register each member of said vector is stored in consecutive rows of said registers, means for modifying the contents of one of said registers with the contents of the other in accordance with a control instruction wherein said modification comprises replacing members of the vector stored in the first of said registers with the corresponding members of the vector stored in the second, said modifying means comprising:

means for selectively transferring the contents of a row of said second register into the corresponding row of said first register, register means for storing said control instruction having a control field corresponding to each member of one of said vectors wherein the two vectors stored in said first and second registers are of the same length, mean for examining each control field of said control word for a transfer indication and means for transferring all members from said second register into the first where the control word contain a transfer indication in the corresponding field.

33. A vector arithmetic multiprocessor computing system as set forth in claim 32 including:

means to examine consecutive positions of said control instruction beginning with the first field thereof corresponding to the first member of said vector, and means for effecting a shift of the number stored in the second register to the first corresponding to the field position of the control instruction currently being examined, means for sequentially examining subsequent field positions of said control word until said control instruction is completely interrogated and all shifts completed.

34. A vector arithmetic multiprocessor computing system as set forth in claim 33 wherein said control instruction comprises a binary number having a bit position for each member of the vector, means responsive to a binary "0" indication in a particular bit position of said control instruction to leave the contents of the corresponding row of said register unaltered, and means responsive to an indication of a binary "1" in said control instruction to effect a shift of the contents of the corresponding row of said second register into said first register.

35. In a vector arithmetic multiprocessor computing system:

a plurality of arithmetic units capable of concurrent operation, two storage registers for supplying operands to said arithmetic units, each said storage register having as many data storage locations as there are arithmetic units and each storage location being related to a particular arithmetic unit, means for concurrently supplying on command operands from said storage registers to said arithmetic units, means for returning the results from said arithmetic units to one of said storage registers, and means for effecting performance of the same arithmetic operation concurrently in all of said arithmetic units, means responsive to the completion of said arithmetic operations for examining and normalizing concurrently all of the results stored as data words in said one of two storage registers, said means including:

means for concurrently detecting and counting significant zeros in those data words stored in said result register which are not normalized and means for concurrently shifting said unnormalized data words in said register and decrementing the exponents accordingly to produce completely normalized results.

36. A vector arithmetic multiprocessor computing system as set forth in claim 35 including:

means for detecting the number of said zeros as decreasing powers of two until said power equals zero and each time a number of zeros equal to the searched for power of two is encountered for concurrently shifting all such data words encountered in said register by an amount equal to the number searched for, and means for subsequently continuing the search, and effecting parallel shifting operations within said register until all significant zeros are removed from the data words stored in the result register and appropriate modifications to the exponents are made.

37. In a vector arithmetic multiprocessor computing system:

a random access three dimensional memory, means for concurrently accessing a plurality of word storage locations in said memory within a system access cycle time, said memory being comprised of a plurality of sections, means for concurrently accessing different sections of memory in accordance with addresses provided therefor, means for inhibiting more than one access to a given section of memory at one time, each section of memory having as many address busses for supplying addresses thereto as there are potential addresses, each section of memory including as many data transfer busses thereto as there are potential addresses supplied to said section, and means for connecting a particular address and data buss to said section of memory operable by decoding a predetermined total memory address field applied to the memory system.

References Cited

UNITED STATES PATENTS

| | | | |
|---|---|---|---|
| 3,037,192 | 5/1962 | Everett | 340—172.5 |
| 3,270,325 | 8/1966 | Carter | 340—172.5 |
| 3,274,554 | 9/1966 | Hopper | 340—172.5 |
| 3,287,703 | 11/1966 | Slotnick | 340—172.5 |
| 3,304,417 | 2/1967 | Hertz | 235—164 |
| 3,312,954 | 4/1967 | Bible | 340—172.5 |
| 3,319,226 | 5/1967 | Mott | 340—172.5 |
| 3,346,853 | 10/1967 | Koster | 340—172.5 |

PAUL J. HENON, Primary Examiner

R. F. CHAPURAN, Assistant Examiner

U.S. Cl. X.R.

235—164